(12) United States Patent
Steffens et al.

(10) Patent No.: US 12,290,959 B2
(45) Date of Patent: *May 6, 2025

(54) CONCRETE MIXER VEHICLE

(71) Applicant: Oshkosh Corporation, Oshkosh, WI (US)

(72) Inventors: Greg Steffens, Oshkosh, WI (US); Jeremy Andringa, Oshkosh, WI (US); Connor Hietpas, Oshkosh, WI (US); Jesse Gander, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 827 days.

This patent is subject to a terminal disclaimer.

(21) Appl. No.: 17/505,309

(22) Filed: Oct. 19, 2021

(65) Prior Publication Data

US 2022/0072736 A1 Mar. 10, 2022

Related U.S. Application Data

(63) Continuation-in-part of application No. 16/813,042, filed on Mar. 9, 2020, now Pat. No. 11,186,008, and
(Continued)

(51) Int. Cl.
*B28C 5/42* (2006.01)
*B60K 11/08* (2006.01)
(Continued)

(52) U.S. Cl.
CPC ............ *B28C 5/422* (2013.01); *B28C 5/4213* (2013.01); *B28C 5/4237* (2013.01);
(Continued)

(58) Field of Classification Search
CPC ....... B28C 5/4213; B28C 5/468; B28C 5/422; B28C 5/4237; B28C 5/4272;
(Continued)

(56) References Cited

U.S. PATENT DOCUMENTS 2,722,408 A 11/1955 Hilkemeier
3,190,621 A 6/1965 Green et al.
(Continued)

FOREIGN PATENT DOCUMENTS

DE 10 2014 211 992 A1 12/2015
DE 10 2014 211 999 A1 12/2015
(Continued)

*Primary Examiner* — Charles Cooley
(74) *Attorney, Agent, or Firm* — Foley & Lardner LLP

(57) ABSTRACT

A concrete mixer vehicle includes a chassis, a cab coupled to the chassis, a drum assembly coupled to the chassis, and a module coupled to the chassis and positioned rearward of the drum assembly. The module includes a prime mover, a cooling system, and a hood. The hood has a first end positioned proximate the drum assembly, an opposing second end positioned proximate a rear end of the chassis, and a top surface. The hood defines an internal cavity within which the prime mover and the cooling system are disposed. The first end defines an inlet airflow cavity. The inlet airflow cavity has a bottom surface and an air inlet positioned between the top surface and the bottom surface. The air inlet connects the inlet airflow cavity to the internal cavity.

15 Claims, 99 Drawing Sheets

Related U.S. Application Data a continuation-in-part of application No. 16/813,163, filed on Mar. 9, 2020, now Pat. No. 11,186,009, and a continuation-in-part of application No. 16/813,072, filed on Mar. 9, 2020, now Pat. No. 11,186,010, and a continuation-in-part of application No. 16/813,597, filed on Mar. 9, 2020, now Pat. No. 11,187,138, and a continuation-in-part of application No. 29/683,330, filed on Mar. 12, 2019, now Pat. No. Des. 956,629.

(60) Provisional application No. 62/817,276, filed on Mar. 12, 2019, provisional application No. 62/817,375, filed on Mar. 12, 2019, provisional application No. 62/817,281, filed on Mar. 12, 2019, provisional application No. 62/817,367, filed on Mar. 12, 2019, provisional application No. 62/817,360, filed on Mar. 12, 2019, provisional application No. 62/817,347, filed on Mar. 12, 2019, provisional application No. 62/817,340, filed on Mar. 12, 2019, provisional application No. 62/817,371, filed on Mar. 12, 2019.

(51) Int. Cl.
  B60P 3/16 (2006.01)
  B62D 21/02 (2006.01)

(52) U.S. Cl.
  CPC .......... B28C 5/4272 (2013.01); B60K 11/085 (2013.01); B60P 3/16 (2013.01); B62D 21/02 (2013.01)

(58) Field of Classification Search
  CPC ....... B28C 5/4203; B28C 5/4251; B60P 3/16; B60K 11/085; B62D 21/02; B62D 25/10; B62D 33/06; B60R 3/00
  USPC ...................................................... 366/60–61
  See application file for complete search history.

(56) References Cited

U.S. PATENT DOCUMENTS

| | | | |
|---|---|---|---|
| 3,603,565 A | 9/1971 | Johnson | |
| D269,419 S | 6/1983 | Umlauf et al. | |
| 4,461,577 A | 7/1984 | Mechem | |
| 4,542,990 A | 9/1985 | Fouquet | |
| 4,575,254 A | 3/1986 | Johnston | |
| 4,598,786 A | 7/1986 | Kirchweger | |
| D291,547 S | 8/1987 | Silbernagel | |
| 5,538,274 A | 7/1996 | Schmitz et al. | |
| 5,884,998 A * | 3/1999 | Silbernagel | B28C 5/4203 366/62 |
| D423,409 S | 4/2000 | Silbernagel | |
| 6,074,083 A | 6/2000 | Gebhard et al. | |
| 6,149,290 A | 11/2000 | Quigley | |
| 6,520,494 B1 | 2/2003 | Andersen et al. | |
| D490,579 S | 5/2004 | Cunningham | |
| 6,779,806 B1 | 8/2004 | Breitbach et al. | |
| D502,296 S | 2/2005 | Cunningham | |
| 7,188,991 B1 | 3/2007 | Weiler | |
| D549,742 S | 8/2007 | Koss | |
| 7,281,753 B2 | 10/2007 | Curtis et al. | |
| D572,642 S | 7/2008 | Steckling et al. | |
| D653,173 S | 1/2012 | Dolesh | |
| 9,045,014 B1 | 6/2015 | Verhoff et al. | |
| 9,656,640 B1 | 5/2017 | Verhoff et al. | |
| D837,702 S | 1/2019 | Gander et al. | |
| D843,281 S | 3/2019 | Gander et al. | |
| D856,860 S | 8/2019 | Gander | |
| D860,887 S | 9/2019 | Gander et al. | |
| D863,144 S | 10/2019 | Gander | |
| D864,031 S | 10/2019 | Gander et al. | |
| D869,332 S | 12/2019 | Gander et al. | |
| D871,283 S | 12/2019 | Gander et al. | |
| D888,629 S | 6/2020 | Gander et al. | |
| D892,002 S | 8/2020 | Gander | |
| D899,972 S | 10/2020 | Lamanna | |
| 11,472,308 B2 * | 10/2022 | Messina | B60L 50/66 |
| 12,172,546 B2 * | 12/2024 | Messina | B28C 5/421 |
| 2003/0163228 A1 | 8/2003 | Pillar et al. | |
| 2003/0163229 A1 | 8/2003 | Pillar et al. | |
| 2003/0163230 A1 | 8/2003 | Pillar et al. | |
| 2003/0171854 A1 | 9/2003 | Pillar et al. | |
| 2004/0069865 A1 | 4/2004 | Rowe et al. | |
| 2004/0199302 A1 | 10/2004 | Pillar et al. | |
| 2004/0245039 A1 | 12/2004 | Braun et al. | |
| 2005/0004733 A1 | 1/2005 | Pillar et al. | |
| 2006/0192361 A1 | 8/2006 | Anderson et al. | |
| 2006/0249325 A1 | 11/2006 | Braun et al. | |
| 2007/0061054 A1 | 3/2007 | Rowe et al. | |
| 2007/0185625 A1 | 8/2007 | Pillar et al. | |
| 2008/0205188 A1 | 8/2008 | Lindblom et al. | |
| 2008/0221754 A1 | 9/2008 | Rowe et al. | |
| 2009/0154287 A1 | 6/2009 | Lindblom et al. | |
| 2009/0238026 A1 | 9/2009 | Johnson | |
| 2011/0058446 A1 | 3/2011 | Khouri | |
| 2013/0107656 A1 | 5/2013 | Datema et al. | |
| 2014/0010035 A1 | 1/2014 | Takahashi | |
| 2014/0269146 A1 | 9/2014 | Harris et al. | |
| 2014/0271066 A1 | 9/2014 | Hou | |
| 2015/0151651 A1 | 6/2015 | Stingle et al. | |
| 2015/0232269 A1 | 8/2015 | Hou | |
| 2015/0246331 A1 | 9/2015 | Broker et al. | |
| 2015/0367300 A1 | 12/2015 | McNeilus et al. | |
| 2016/0031486 A1 | 2/2016 | Shoen | |
| 2016/0304051 A1 | 10/2016 | Archer et al. | |
| 2017/0080600 A1 | 3/2017 | Dickerman et al. | |
| 2017/0218832 A1 | 8/2017 | Kurokawa et al. | |
| 2017/0225888 A1 | 8/2017 | Betz et al. | |
| 2017/0253221 A1 | 9/2017 | Verhoff et al. | |
| 2017/0361491 A1 | 12/2017 | Datema et al. | |
| 2017/0361492 A1 | 12/2017 | Datema et al. | |
| 2018/0235150 A1 | 8/2018 | Nogami et al. | |
| 2018/0250847 A1 | 9/2018 | Wurtz et al. | |
| 2019/0091890 A1 | 3/2019 | Rocholl et al. | |
| 2019/0106083 A1 | 4/2019 | Archer et al. | |
| 2019/0161272 A1 | 5/2019 | Betz et al. | |
| 2019/0185077 A1 | 6/2019 | Smith et al. | |
| 2019/0217698 A1 | 7/2019 | Broker et al. | |
| 2019/0276102 A1 | 9/2019 | Zuleger et al. | |
| 2019/0292975 A1 | 9/2019 | Hou et al. | |
| 2019/0344475 A1 | 11/2019 | Datema et al. | |
| 2019/0351883 A1 | 11/2019 | Verhoff et al. | |
| 2019/0382005 A1 | 12/2019 | Nishi et al. | |
| 2020/0078986 A1 | 3/2020 | Clifton et al. | |
| 2020/0108364 A1 | 4/2020 | Glass | |
| 2020/0230841 A1 | 7/2020 | Datema et al. | |
| 2020/0230842 A1 | 7/2020 | Datema et al. | |
| 2020/0290236 A1 * | 9/2020 | Bjornstad | B28C 5/4206 |
| 2020/0290237 A1 * | 9/2020 | Steffens | B60P 3/16 |
| 2020/0290238 A1 | 9/2020 | Andringa et al. | |
| 2020/0291846 A1 | 9/2020 | Steffens et al. | |
| 2020/0316816 A1 | 10/2020 | Messina et al. | |
| 2021/0031649 A1 * | 2/2021 | Messina | B62D 33/06 |
| 2021/0094619 A1 | 4/2021 | Masuda | |
| 2022/0072736 A1 * | 3/2022 | Steffens | B28C 5/4272 |
| 2023/0049763 A1 * | 2/2023 | Messina | B28C 5/422 |
| 2023/0174000 A1 * | 6/2023 | Peotter | B28C 5/4248 366/54 |
| 2023/0226719 A1 * | 7/2023 | Datema | H02J 7/0047 366/61 |

FOREIGN PATENT DOCUMENTS

| | | |
|---|---|---|
| WO | WO-2005/070637 A2 | 8/2005 |
| WO | WO-2020/003507 | 1/2020 |

* cited by examiner

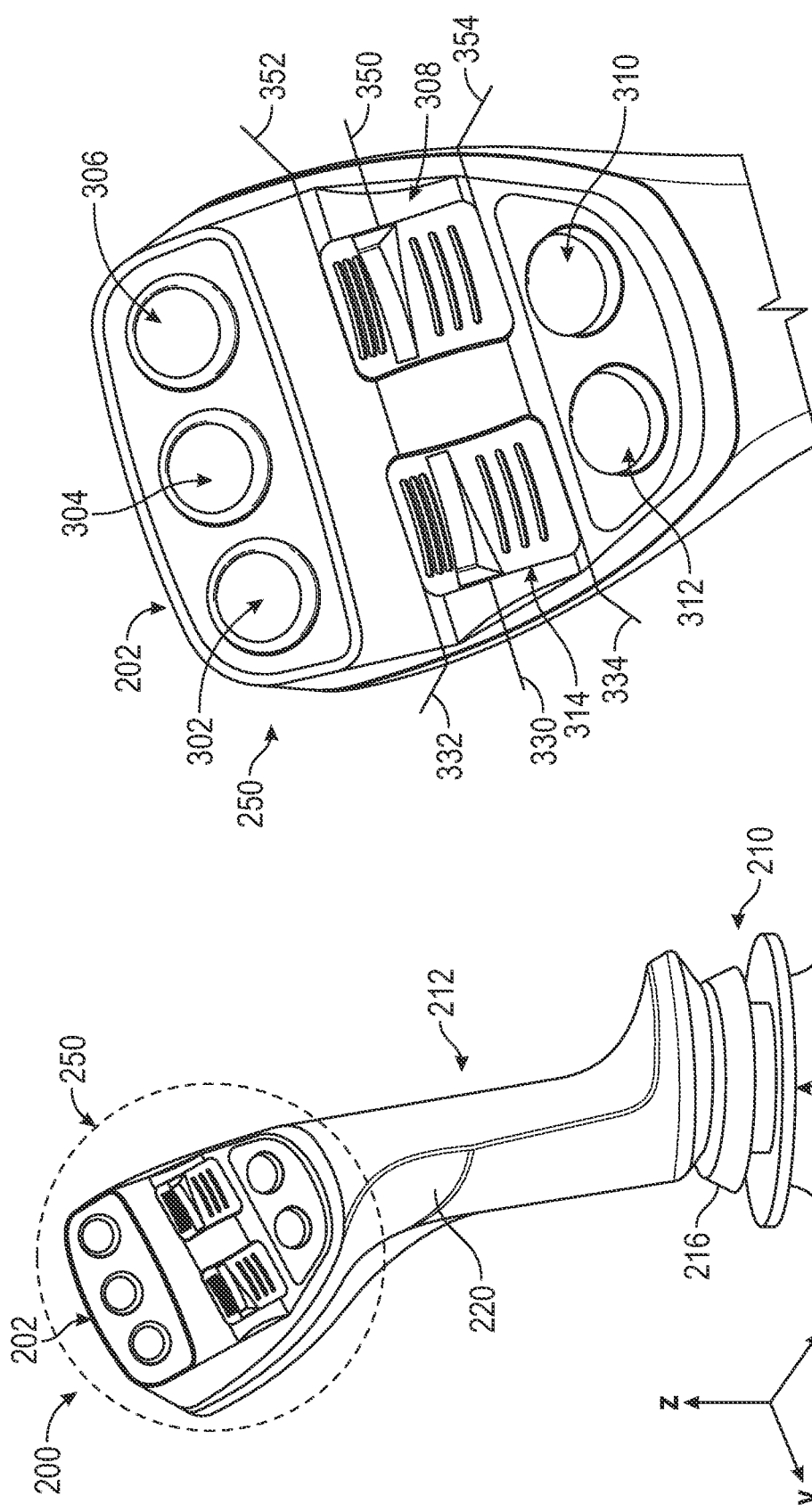

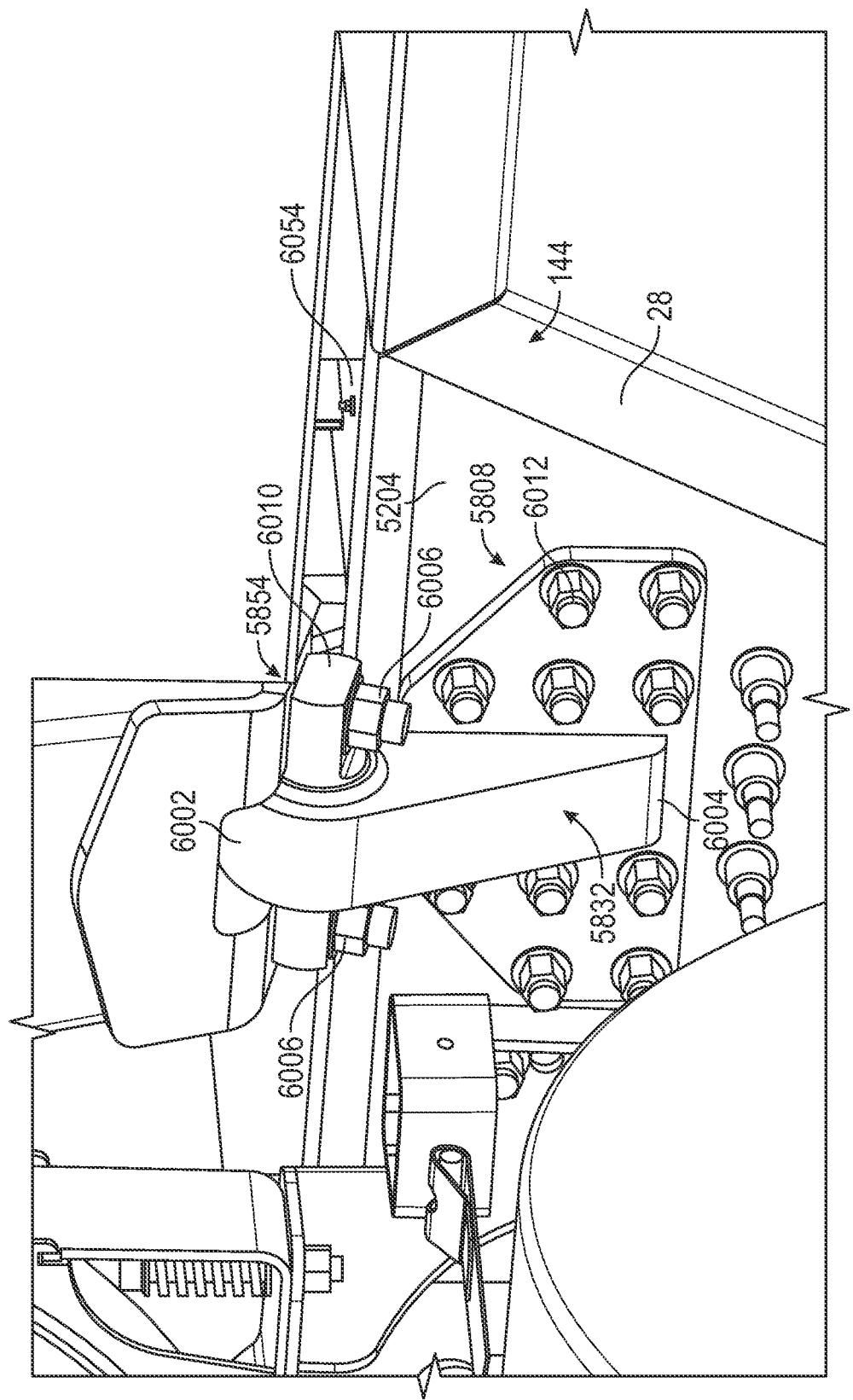

CONCRETE MIXER VEHICLE

CROSS-REFERENCE TO RELATED PATENT APPLICATION

This application is a continuation-in-part of (i) U.S. patent application Ser. No. 16/813,042, filed Mar. 9, 2020, which claims the benefit of U.S. Provisional Patent Application No. 62/817,340, filed Mar. 12, 2019; (ii) U.S. patent application Ser. No. 16/813,072, filed Mar. 9, 2020, which claims the benefit of U.S. Provisional Patent Application No. 62/817,347, filed Mar. 12, 2019, and U.S. Provisional Patent Application No. 62/817,367, filed Mar. 12, 2019; (iii) U.S. patent application Ser. No. 16/813,163, filed Mar. 9, 2020, which claims the benefit of U.S. Provisional Patent Application No. 62/817,360, filed Mar. 12, 2019; (iv) U.S. patent application Ser. No. 16/813,597, filed Mar. 9, 2020, which claims the benefit of U.S. Provisional Patent Application No. 62/817,276, filed Mar. 12, 2019, U.S. Provisional Patent Application No. 62/817,281, filed Mar. 12, 2019, U.S. Provisional Patent Application No. 62/817,371, filed Mar. 12, 2019, and U.S. Provisional Patent Application No. 62/817,375, filed Mar. 12, 2019; and (v) U.S. patent application Ser. No. 29/683,330, filed Mar. 12, 2019; all of which are incorporated herein by reference in their entireties.

BACKGROUND

Concrete mixer vehicles are configured to receive, mix, and transport wet concrete or a combination of ingredients that when mixed form wet concrete to a job site. Concrete mixer vehicles include a rotatable mixing drum that receives concrete poured from vehicles or from stationary facilities, such as concrete mixing plants, and mixes the concrete disposed therein. Concrete mixer vehicles may be front discharge concrete mixer vehicles or rear discharge concrete mixer vehicles, which dispense concrete from the front or rear thereof, respectively. Rear discharge concrete mixer vehicles generally feature a drum with an outlet positioned at an aft end and a cab enclosure positioned at a fore end of the concrete mixer truck. Front discharge concrete mixer vehicles include a drum with an outlet supported above the cab enclosure of the concrete mixer vehicle to discharge concrete through a chute extending forward the concrete mixer vehicle. Because front discharge concrete mixer vehicles discharge concrete at the fore end, they can be used to supply concrete to locations having limited access. Concrete mixer vehicles are typically driven by an onboard internal combustion engine.

SUMMARY

One embodiment relates to a concrete mixer vehicle. The concrete mixer vehicle includes a chassis, a cab coupled to the chassis, a front bumper coupled to a front end of the chassis, a drum assembly coupled to the chassis, and an engine module coupled to the chassis and positioned rearward of the drum assembly. The drum assembly includes a mixing drum defining an aperture and an internal volume, a charge hopper positioned proximate the aperture and above the cab, a chute positioned proximate the aperture, beneath the charge hopper, and a drum driver. The engine module includes an engine, a cooling system, and a hood. The hood includes a housing within which the engine and the cooling system are disposed and a door. The housing has a first end proximate the drum assembly and an opposing second end defining an opening. The door is pivotally coupled to the opposing second end of the housing and positioned to selectively enclose the opening.

Another embodiment relates to a concrete mixer vehicle. The concrete mixer vehicle includes a chassis, a cab coupled to the chassis, a drum assembly coupled to the chassis, a module coupled to the chassis and positioned rearward of the drum assembly, a front bumper, and an actuator. The chassis includes a pair of frame rails, a front cross-member coupled to the pair of frame rails at a front end of the chassis, and a rear cross-member extending between the pair of frame rails at a rear end of the chassis. The front cross-member includes a vertical shaft. The rear cross-member includes a battery box configured to store one or more batteries. The drum assembly includes a mixing drum defining an aperture and an internal volume, a charge hopper positioned proximate the aperture and above the cab, a chute positioned proximate the aperture, beneath the charge hopper, and a drum driver. The module includes a prime mover and a hood within which the prime mover is disposed. The front bumper is coupled to the front end of the chassis and positioned over the front-cross member. A top portion of the front bumper defines a slot. The vertical shaft of the front-cross member extends upward through the slot. The actuator extends between the vertical shaft and the chute. The actuator is configured to pivot the chute up and down about a lateral axis.

Still another embodiment relates to a concrete mixer vehicle. The concrete mixer vehicle includes a chassis, a cab coupled to the chassis, a drum assembly coupled to the chassis, and a module coupled to the chassis and positioned rearward of the drum assembly. The module includes a prime mover, a cooling system, and a hood. The hood has a first end positioned proximate the drum assembly, an opposing second end positioned proximate a rear end of the chassis, and a top surface. The hood defines an internal cavity within which the prime mover and the cooling system are disposed. The first end defines an inlet airflow cavity. The inlet airflow cavity has a bottom surface and an air inlet positioned between the top surface and the bottom surface. The air inlet connects the inlet airflow cavity to the internal cavity.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIG. 74 is a perspective view of a user controller of the concrete mixer truck of FIG. 1, according to an example embodiment.

FIG. 75 is a detailed view of a portion of the user controller of FIG. 74, according to an exemplary embodiment.

FIG. 84 is a perspective view of portion of the rear pedestal in FIG. 82, according to an example embodiment.

DETAILED DESCRIPTION

Figure 1:
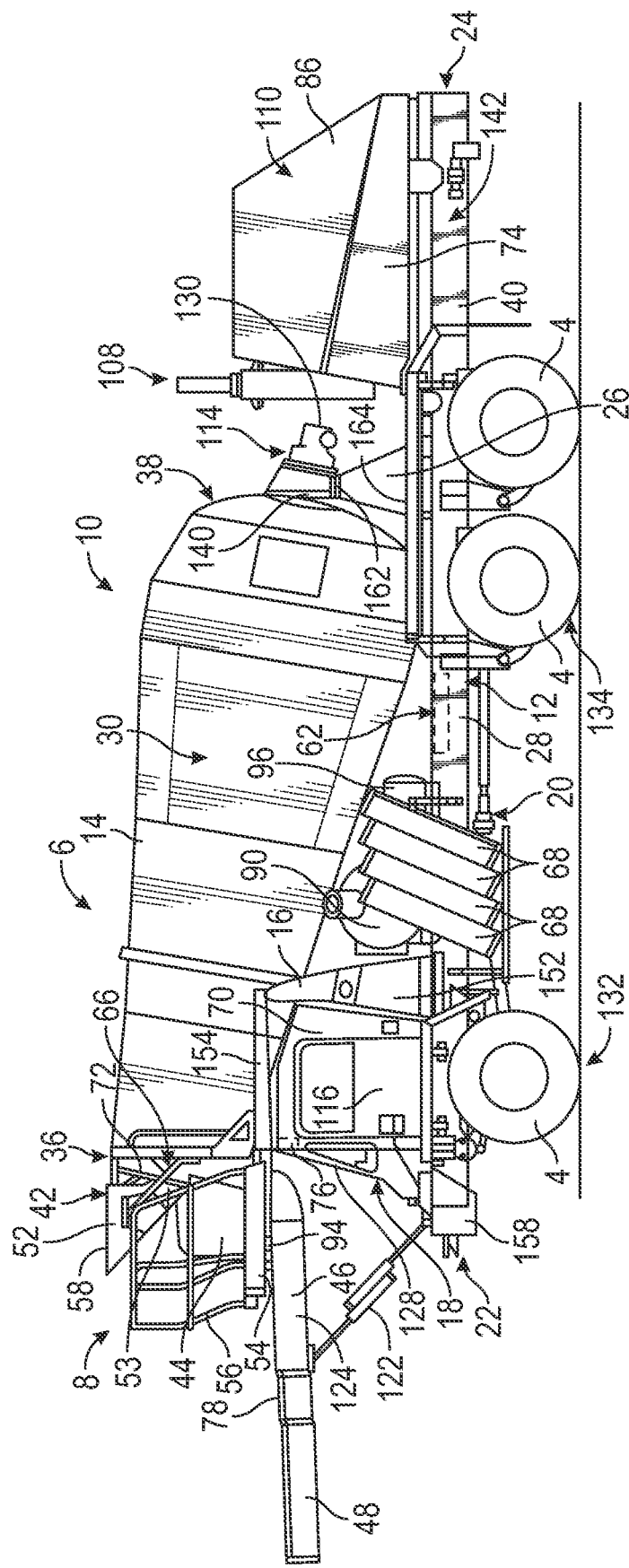
FIG. 1 is a side view of a concrete mixer truck, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a single controller (e.g., a multi-function joystick) of a concrete mixer vehicle provides an operator with the ability to control multiple functions of multiple components (e.g., a mixing drum function, a chute function, a charge hopper function, a vehicle function, etc.) of the concrete mixer vehicle using the single controller. By way of example, the single controller may be configured to facilitate controlling (i) a chute to (a) swing left-to-right (e.g., about a vertical axis), (b) elevate and lower (e.g., about a horizontal axis), and/or (iii) fold and unfold; (ii) a rotational speed, a rotation direction (e.g., clockwise or counter-clockwise), and/or movement of a mixing drum; (iii) a position of a charge hopper; and/or (iv) a drive system to shift a transmission between neutral, forward, and reverse.

According to an exemplary embodiment, a water tracking system of the concrete mixer vehicle is configured to monitor and provide information related to water used from a water tank of the concrete mixer vehicle for use in (i) the mixing drum to facilitate controlling the properties of a mixture within the mixing drum, (ii) cleaning components of the concrete mixer vehicle, and/or (iii) other non-mixing drum related water usage applications. The water tracking system may be operably connected to an outlet of the water tank and controlled via a control panel of the concrete mixer truck. An operator may press, rotate, or otherwise engage features of the control panel to control and/or monitor water usage of the water in the water tank.

According to an exemplary embodiment, a rear drive pedestal that implements a four-point mount is described. The rear drive pedestal is configured to be fastened with bar pin bushings to a transmission mounting bracket that allow for several degrees of movement with the drum assembly. The rear drive pedestal may be bolted at a first installation location (e.g., short drum configuration) or a second installation location (e.g., long drum configuration). The rear drive pedestal is configured to isolate the rear drive pedestal from the frame to reduce stress during articulation and other driving scenarios of the concrete mixer truck by allowing the rear drive pedestal to move slightly relative to the frame.

According to an exemplary embodiment, a front roller pedestal having either a curved support frame or a straight support frame is described. The front roller pedestal implements a three-point mount. The front roller pedestal is configured to include a support member from the pedestal frame to provide longitudinal stability and allow the pedestal frame to be narrower in design. The three points of contact—the support member, a first mounting bracket on the first lateral side, and a second mounting bracket on the second lateral side—decrease the restriction within the mounting structure of the front roller pedestal and drive less stress into the frame and pedestal components compared to a traditional configuration having four points of contact. Beneficially, the curved support frame extends over the water tank and allows the front roller pedestal to be much narrower in design. Additionally, coupling the pedestal frame to the web of the frame, as opposed to conventional front pedestals that are coupled to a top of a flange of the frame allows for a better disbursement of stress into the frame.

According to an exemplary embodiment, a hopper assembly with a chute motor and gear assembly positioned away from potential concrete discharge is described. Conventional concrete mixer drums have a tendency to have concrete build up on a right hand side (e.g., from the perspective of an operator looking out of the front of the cab of the concrete mixer truck) of the hopper assembly as a result of the clockwise rotation (e.g., looking at the mixer drum from in front of the concrete mixer truck) of the mixer drum during discharge and movement of components and/or concrete mixer truck during discharge. This spillover concrete may cover and block operation by a chute motor and gear assembly positioned on the right hand side of the chute assembly. Conversely, the chute motor and gear assembly described herein is positioned on the left hand side (e.g., from the perspective of the operator looking out of the front of the cab of the concrete mixer truck) of the hopper assembly to alleviate concrete spillover onto the chute motor and gear assembly and to provide ease of access and service on an adjacent ladder.

According to an exemplary embodiment, a superstructure that includes support structures and an operator ladder that improve driver visibility, increase driver perspective, and minimize blind spots is described. The operator ladder may include a ladder rail that couples to the ladder rungs at an angle such that the ladder rail is generally parallel to the driver's sight line. Beneficially, the superstructure components improve visibility and operability for when the operator is pouring concrete and controlling the chute assembly. A larger, curved windshield may be implemented within the cab to provide greater visibility. To maximize visibility the windshield may be a single piece of glass that mounts to vertical pillars and slopes forward to allow space for the instrument panel. The pillars, superstructure, and ladder support have been located to minimize view obstruction in the corner.

According to an exemplary embodiment, bar-pin bushing support elements and/or torque rod ends are implemented with a superstructure to provide support to the superstructure platform while still allowing movement during chassis articulation is described. The bar-pin bushing support element reduces the impact load on the superstructure from chassis inputs. The bar-pin bushing support elements reduce superstructure noise and rattling audible in the cab, thereby increasing driver comfort. The bar-pin bushing support elements further reduce vibration of the side-view mirrors, thereby increasing visibility. Contrary to conventional systems that implement a bolted, welded, and rigid design, the bar-pin bushing support elements include bushings that are replaceable and provide serviceable components to the superstructure.

According to an exemplary embodiment, a hood for the engine module with improved airflow cooling and rear accessibility of the hood and components therein is described. The hood is configured to direct airflow into the cooling system and airflow through the air cleaner. An opening on the front end of the hood includes one or more features with angles and overlapping surfaces that are configured to reduce rain intrusion into the internal portion of the hood. Beneficially, the design of the opening on the front end minimizes water into the air intake and air cleaner to reduce restriction into the air cleaner. The rear of the hood includes a hatch and hatch door with a conical internal portion and movable between an open and closed position. A grill disposed on the hatch door is configured to provide low restriction around the outer parts of the conical internal portion as the conical internal portion is where a majority of the airflow from the fan flows. A drum pump is integrated with the same structure that supports the cooling system. Beneficially, integrating the drum pump on the cooling system eliminates additional support structure(s) needed to support the drum pump in conventional systems. In some embodiments, the drum pump bolts to a lower portion of the cooling system support structure and the cooling system fan assembly is coupled to the upper portion.

According to another exemplary embodiment, a multi-function pump is configured to provide flow along multiple components to accomplish a wide variety of functions is described. Implementing the multi-function pump with a hydraulic circuit and pump control logic, the multi-function pump is able to power multiple auxiliary functions of the concrete mixer truck including any one of chute movement (e.g., rotation, raise/lower, etc.), chute folding and unfolding, providing water, driving a fan, and controlling an axle assembly. The multi-function pump is configured to reduce hydraulic complexity along the concrete mixer truck, improve hydraulic efficiency, and allows ease of installation of additional hydraulic components. In some embodiments, an electronically controlled variable displacement piston pump is utilized to allow the multi-function pump to only produce the flow/pressure as needed, thereby increasing efficiency. Additionally, as the fan is driven hydraulically, there is a large simplification of the cooling system through the elimination of the mechanical fan drive components. In some embodiments, the multi-function pump does not interact with the steering circuit to prevent the steering feel and speed of the concrete mixer truck to be impeded when the multi-function pump is powering one or more of the multiple auxiliary functions. In those embodiments, a dedicated steering pump and steering circuit may be implemented.

According to an exemplary embodiment, a fan assembly mounted on a rear side of a cooling system downstream of an engine is described. Conventional cooling systems utilize a pusher fan assembly mounted to the engine. Conversely, positioning the fan assembly on the back side of the cooling package improves accessibility to the cold side of the cooling cores, provides completed access to the front side of the cooling cores, and increased serviceability of the cooling system. In some embodiments, the cooling cores are mounted such that it provides complete (or near complete) access to the front side (e.g., inlet) of the cores and provides access to the rear side of the cores. Further, the front side of the core is visible for inspection when an operator is in a standing position next to the concrete mixer truck, thereby improving regular core inspection accuracy, convenience, and efficiency. Beneficially, the engine has minimal connection to the cooling package, which reduces the time needed to replace the engine in the concrete mixer truck.

Overall Vehicle

Figure 2:
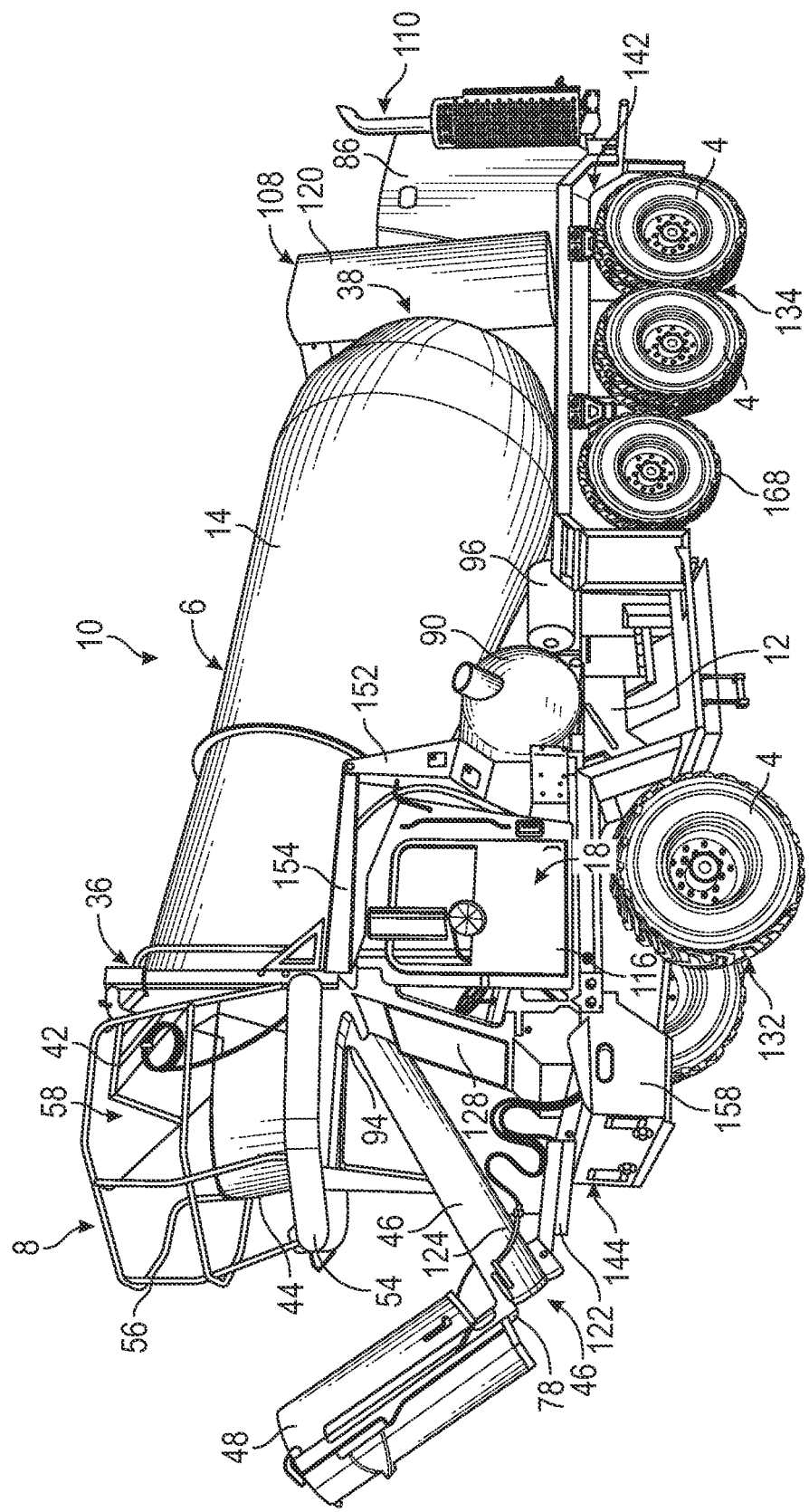
FIG. 2 is a front perspective view of the concrete mixer truck of FIG. 1, according to an exemplary embodiment.
Figure 3:
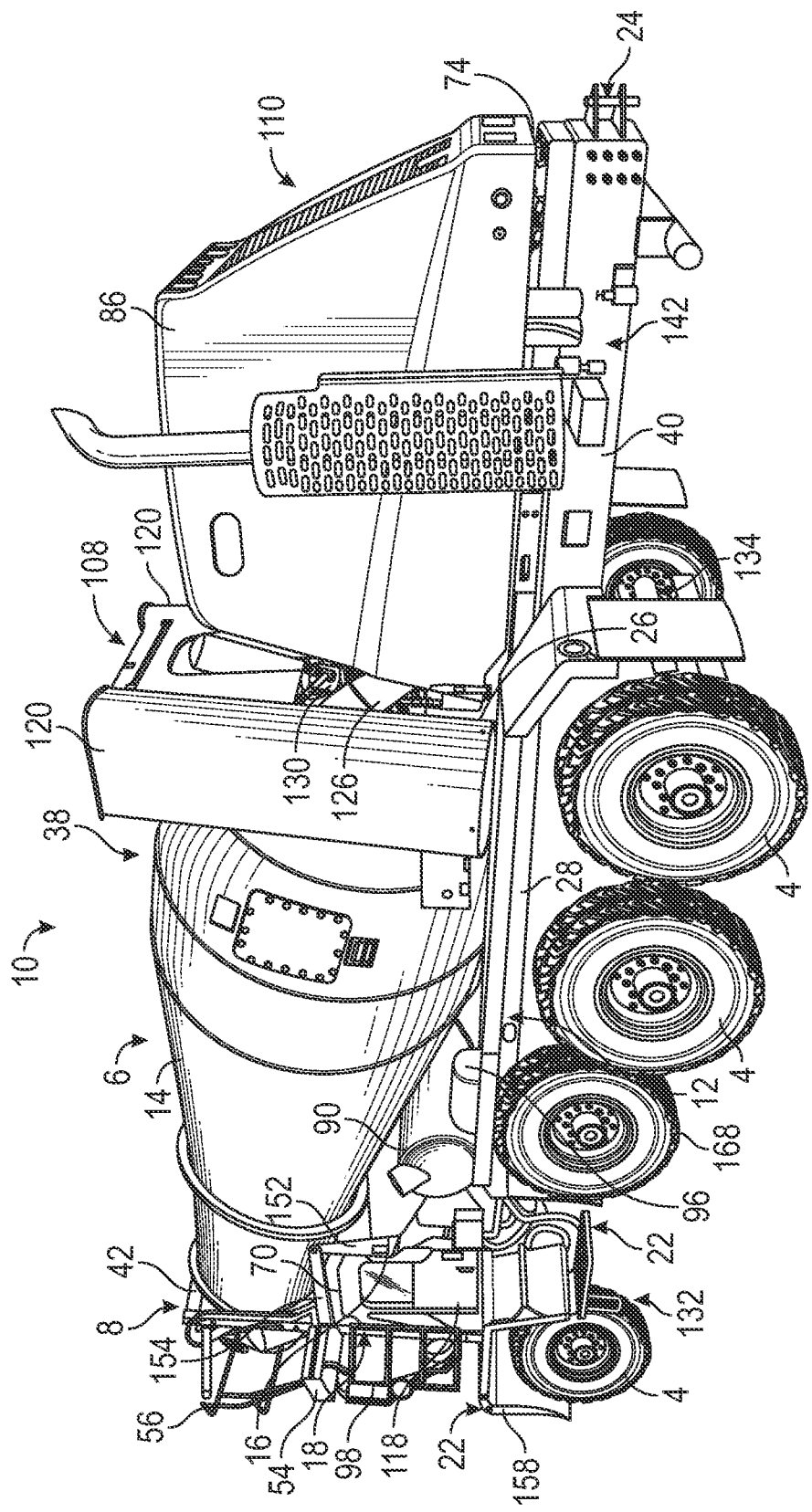
FIG. 3 is a rear perspective view of the concrete mixer truck of FIG. 1, according to an exemplary embodiment.

According to the exemplary embodiment shown in FIGS. 1-3, a vehicle, shown as concrete mixer truck 10, is configured to transport concrete from a loading location (e.g., a batching plant, etc.) to a point of use (e.g., a worksite, a construction site, etc.). In some embodiments, as shown in FIGS. 1-3, the concrete mixer truck 10 is a front discharge concrete mixer vehicle. In other embodiments, the concrete mixer truck 10 is a rear discharge concrete mixer vehicle. The concrete mixer truck 10 includes a chassis 12, a drum assembly 6, a hopper assembly 8, a drive system 20, a fuel system 108, and an engine module 110. The concrete mixer truck 10 may include various additional engine, transmission, drive, electronic, tractive assembly, braking, steering and/or suspension systems, and hydraulic systems that are configured to support the various components of the concrete mixer truck 10. Generally, the chassis 12 supports a mixing drum 14 of the drum assembly 6, a front pedestal 16, a rear pedestal 26, a cab 18, and the engine module 110. Each of the chassis 12, the drum assembly 6, the hopper assembly 8, the drive system 20, the fuel system 108, and the engine module 110 are configured to facilitate receiving, mixing, transporting, and delivering concrete to a job site via the concrete mixer truck 10.

The chassis 12 includes a frame 28 that extends from a front end 22 to a rear end 24 of the concrete mixer truck 10. Wheels 4 are coupled to the frame 28 and moveably support the frame 28 above a ground surface or road. The wheels 4 may be replaced by other ground engaging motive members, such as tracks. In some embodiments, the chassis 12 includes hydraulic components (e.g., valves, filters, pipes, hoses, etc.) coupled thereto that facilitate operation and control of a hydraulic circuit including a drum drive pump and/or an accessory pump. The frame 28 provides a structural base for supporting the mixing drum 14, the front pedestal 16, the rear pedestal 26, the cab 18, and the engine module 110. In some embodiments, the frame 28 includes a widened front portion that extends over and about the wheels 4 positioned at the front end 22 of the chassis 12 to simultaneously support the cab 18 and serve as a fender for the wheels 4 positioned at the front end 22 of the chassis 12. The frame 28 may include lift eyes or other structures that facilitates lifting along the chassis 12 such that the chassis 12 can be manipulated as a subassembly for assembly and/or maintenance of the concrete mixer truck 10. One or more components may be coupled to the chassis 12 using isolating mounts made of a compliant material, such as rubber. The isolating mounts may be configured to reduce the transfer of vibrations between the components and the chassis 12.

The frame 28 includes a pair of frame rails 40 coupled with intermediate cross members, according to an exemplary embodiment. The frame rails 40 extend in a generally-horizontal and longitudinal direction (e.g., extend within 10 degrees of perpendicular relative to a vertical direction, extend within ten degrees of parallel relative to a ground surface when concrete mixer truck 10 is positioned on flat ground, etc.) between the front end 22 and the rear end 24. The frame rails 40 may be elongated "C-channels" or tubular members, according to various exemplary embodiments. In other embodiments, the frame rails 40 include another type of structural element (e.g., monocoque, a hull, etc.). In still other embodiments, the frame rails 40 include a combination of elongated C-channels, tubular members, a monocoque element, and/or a hull element. A first frame rail 41 of the frame rails 40 may be disposed along a first lateral side 142 and a second frame rail 43 of the frame rails 40 may be disposed along a second lateral side 144, respectively, of the concrete mixer truck 10. By way of example, the first lateral side 142 of the chassis 12 may be the left side of the concrete mixer truck 10 (e.g., when an operator is sitting in the cab 18 and positioned to drive the concrete mixer truck 10, etc.) and the second lateral side 144 of the chassis 12 may be the right side of the concrete mixer truck 10 (e.g., when an operator is sitting in the cab 18 and positioned to drive the concrete mixer truck 10, etc.).

The cab 18 is coupled to the frame rails 40 proximate the front end 22 of the chassis 12. According to various embodiments, the cab 18 (e.g., operator cabin, front cabin, etc.) is configured to house one or more operators during operation of the concrete mixer truck 10 (e.g., when driving, when dispensing concrete, etc.), and may include various components that facilitate operation and occupancy of the concrete mixer truck 10 (e.g., one or more seats, a steering wheel, control panels, screens, joysticks, buttons, accelerator, brake, gear lever, etc.). The cab 18 includes a housing 70 that forms the structure of the cab 18. At least one door 116 is affixed to the housing 70 to allow an operator to enter and exit the cab 18. A windshield 128 is disposed along a front side of the housing 70, near the front end 22, and above a front bumper 158 of the concrete mixer truck 10. The windshield 128 is configured to provide visibility to the operator while driving the concrete mixer truck 10, operating a main chute 46, and completing other tasks. The front bumper 158 may be affixed to a bottom portion of the housing 70. In some embodiments, the front bumper 158 is affixed to the frame 28 at the front end 22 of the concrete mixer truck 10.

A control assembly 76 is disposed within the cab 18 and is configured to control one or more components of the concrete mixer truck 10. The control assembly 76 may include controls, buttons, joysticks, and other features that control the movement and orientation of the concrete mixer truck 10, the hopper assembly 8, the main chute 46, a charge hopper 42, a discharge hopper 44, the mixing drum 14, and/or other components of the concrete mixer truck 10. For example, the control assembly 76 may include overhead controls (e.g., in a forward overhead position) that allow an occupant of the cab 18 to toggle a switch from a 'Close' position to an 'Open' position to open and close the charge hopper 42 and/or the discharge hopper 44. In some embodiments, the control assembly 76 includes a user interface with a display and an operator input. The display may be configured to display a graphical user interface, an image, an icon, or still other information. In one embodiment, the display includes a graphical user interface configured to provide general information about the concrete mixer truck 10 (e.g., vehicle speed, fuel level, warning lights, etc.). The graphical user interface may also be configured to display a current mode of operation, various potential modes of operation, or still other information relating to a transmission, modules, the drive system 20, and/or other components of the concrete mixer truck 10.

An air tank 96 is coupled to and supported by the chassis 12 and positioned directly beneath the mixing drum 14. The air tank 96 is configured to store compressed air (e.g., for use in an air brake system, for use when raising and lowering a pusher axle assembly, etc.). A water tank 90 extends laterally across the length of the chassis 12, forward of the air tank 96. The water tank 90 is coupled to the frame rails 40 and positioned beneath the mixing drum 14. The water tank 90 may be used to supply water to wash the concrete mixer truck 10 after pouring a concrete load and/or to add water to the concrete within the mixing drum 14 at the construction site and/or during transit, among other uses.

The drum assembly 6 is configured to store, mix and dispense concrete. The drum assembly 6 includes the mixing drum 14, a drum driver 114, and the hopper assembly 8. The mixing drum 14 extends longitudinally along a majority of the length of the concrete mixer truck 10 and may be angled relative to the frame rails 40 (e.g., when viewed from the side of the concrete mixer truck 10). The mixing drum 14 has a first end 36 that is positioned toward the front end 22 of the concrete mixer truck 10 and coupled to the front pedestal 16 (e.g., support post, support column, etc.). The first end 36 may at least partially extend over the cab 18. The first end 36 defines a drum opening 72 in communication with the hopper assembly 8 through which concrete may flow (e.g., between the charge hopper 42, the mixing drum 14, the discharge hopper 44, the main chute 46, and extension chutes 48, etc.). The mixing drum 14 has a second end 38 that is positioned toward the rear end 24 of the concrete mixer truck 10 and coupled to the rear pedestal 26 (e.g., support post, support column, etc.). The mixing drum 14 may be rotatably coupled to front pedestal 16 (e.g., with a plurality of wheels or rollers, etc.) and rear pedestal 26 (e.g., with a drum drive transmission, etc.). Each of the front pedestal 16 and the rear pedestal 26 may be a part of a superstructure of the concrete mixer truck 10. The superstructure further includes the frame 28 and the chassis 12. In other embodiments, the mixing drum 14 is otherwise coupled to the frame rails 40. Although the concrete mixer truck 10 illustrated in FIGS. 1-3 is a front discharge concrete mixer vehicle, it is to be understood that in other embodiments the concrete mixer truck 10 may include a drum assembly 6 having any other discharge arrangement (e.g., rear discharge).

The front pedestal 16 includes an upper portion 152 and a lower portion 154. The upper portion 152 is coupled to and supports the hopper assembly 8. The lower portion 154 is coupled to the frame rails 40 and supports the upper portion 152 of the front pedestal 16 and the first end 36 of the mixing drum 14. The rear pedestal 26 includes an upper portion 162 and a lower portion 164. The lower portion 164 is coupled to the frame rails 40 and supports the upper portion 162. The upper portion 162 supports a bottom interface of a drum drive transmission 140 (e.g., a bottom portion of the housing thereof) and/or the second end 38 of the mixing drum 14. In some embodiments, the rear pedestal 26 includes a pair of legs extending between the frame rails 40 and the drum drive transmission 140.

The drum opening 72 at the first end 36 of the mixing drum 14 is configured to receive a mixture, such as a concrete mixture, or mixture ingredients (e.g., cementitious material, aggregate, sand, etc.) such that the mixture can enter and exit an internal volume 30 of the mixing drum 14. The mixing drum 14 may include a mixing element (e.g., fins, etc.) positioned within the internal volume 30. The mixing element may be configured to (i) agitate the contents of mixture within the mixing drum 14 when the mixing drum 14 is rotated in a first direction (e.g., counterclockwise, clockwise, etc.) and (ii) drive the mixture within the mixing drum 14 out through the drum opening 72 when the mixing drum 14 is rotated in an opposing second direction (e.g., clockwise, counterclockwise, etc.). During operation of the concrete mixer truck 10, the mixing elements of the mixing drum 14 are configured to agitate the contents of a mixture located within the internal volume 30 of the mixing drum 14 as the mixing drum 14 is rotated in a counterclockwise and/or a clockwise direction by the drum driver 114.

The drum driver 114 is configured to provide an input (e.g., a torque, etc.) to the mixing drum 14 to rotate the mixing drum 14 relative to the chassis 12. The drum driver 114 may be configured to selectively rotate the mixing drum 14 clockwise or counterclockwise, depending on the mode of operation of the concrete mixer truck 10 (i.e., whether concrete is being mixed or dispensed). The drum driver 114 is coupled to a rear or base portion of the second end 38 of the mixing drum 14 and a top end of the lower portion 164 and/or a lower end of the upper portion 162 of the rear pedestal 26. The drum driver 114 includes a transmission, shown as drum drive transmission 140, and a driver, shown as drum drive motor 130, coupled to drum drive transmission 140. The drum drive transmission 140 extends rearward (e.g., toward the rear end 24 of the concrete mixer truck 10, toward the engine module 110, etc.) from the second end 38 of mixing drum 14 and the drum drive motor 130 extends rearward from drum drive transmission 140. In some embodiments, the drum drive motor 130 is a hydraulic motor. In other embodiments, the drum drive motor 130 is another type of actuator (e.g., an electric motor, etc.). The drum drive motor 130 is configured to provide an output torque to the drum drive transmission 140, according to an exemplary embodiment, which rotates the mixing drum 14 about a rotation axis. The drum drive transmission 140 may include a plurality of gears (e.g., a planetary gear reduction set, etc.) configured to increase the turning torque applied to the mixing drum 14, according to an exemplary embodiment. The plurality of gears may be disposed within a housing. In some embodiments, a drum drive pump and/or accessory pump may be configured to receive rotational mechanical energy and output a flow of pressurized hydraulic fluid to drive one or more components of the concrete mixer truck 10.

The hopper assembly 8 is positioned at the drum opening 72 of the mixing drum 14. The hopper assembly 8 is configured to introduce materials into and allow the materials to flow out of the internal volume 30 of the mixing drum 14 of the concrete mixer truck 10. The hopper assembly 8 is configured to prevent loss of material or spillage when the material enters and exits the mixing drum 14. The hopper assembly 8 includes the charge hopper 42, the discharge hopper 44, a hopper actuator 66, a platform 54, and the main chute 46, which are positioned above at least partially forward of the cab 18 of the concrete mixer truck 10. The charge hopper 42 is configured to direct the materials (e.g., cement precursor materials, etc.) into the drum opening 72 of the mixing drum 14. The discharge hopper 44 is configured to dispense mixed concrete from the internal volume 30 of the mixing drum 14 to the main chute 46 and, ultimately, the desired location.

The platform 54 includes a perforated surface that surrounds the charge hopper 42 and the discharge hopper 44. In some embodiments, the platform 54 includes an asymmetric base. The platform 54 includes platform sides extending beneath the perforated surface. A guardrail 56 is coupled to the platform 54 and follows the contour of a periphery of the platform 54. The platform 54 is situated at a position near the drum opening 72 of the mixing drum 14 to facilitate access by the operator to the drum opening 72, the internal volume 30, the charge hopper 42, the discharge hopper 44, and/or the main chute 46. In some embodiments, the concrete mixer truck 10 includes a ladder 98 that extends downward from a side of the platform 54 to allow an operator to climb and reach the platform 54.

The charge hopper 42 includes a first portion 52 that is configured to receive materials during a charging/loading operation. The first portion 52 has a rim 58 (e.g., opening) formed at a free end of the first portion 52. The charge hopper 42 includes a second portion 53 aligned with the bottom of the first portion 52. According to an exemplary embodiment, the charge hopper 42 is selectively repositionable/movable. In some embodiments, the charge hopper 42 is configured to rotate about a horizontal, lateral axis. In some embodiments, the charge hopper 42 is configured to raise and lower vertically. Specifically, the charge hopper 42 is configured to lift, pivot, or otherwise move between a first position (e.g., a lowered position, loading position, a charging position, etc.) and a second position (e.g., a raised position, a dispensing position, a pivoted position, etc.) above or shifted from the first position. In the first position, the charge hopper 42 is configured to direct material (e.g., concrete, etc.) from a source positioned above the concrete mixer truck 10 (e.g., a batch plant, etc.) through the drum opening 72 and into the internal volume 30 of the mixing drum 14. The first position may also facilitate transport of the concrete mixer truck 10 by lowering the overall height of the concrete mixer truck 10. In the second position, the charge hopper 42 moves (e.g., lifts, pivots, etc.) away from the drum opening 72 and facilitates material flowing unobstructed out of the drum opening 72 and into the discharge hopper 44 and the main chute 46.

A hopper actuator 66 is positioned to move the charge hopper 42 between the first position and the second position. The hopper actuator 66 facilitates selectively controlling movement of the charge hopper 42 between the first position and the second position. The hopper actuator 66 is coupled to and extends between the charge hopper 42 and the platform 54. In some embodiments, the hopper actuator 66 is a hydraulic cylinder. In other embodiments, the hopper actuator 66 is another type of actuator (e.g., a pneumatic cylinder, a lead screw driven by an electric motor, an electric motor, etc.).

When receiving the material, the charge hopper 42 may be in the first position and the main chute 46 may be in a first configuration (e.g., a transport configuration, a stored configuration, etc.). Accordingly, material can be deposited into the charge hopper 42, and the charge hopper 42 directs the material into the internal volume 30 of the mixing drum 14 through the drum opening 72. While material is being added to the mixing drum 14, the drum driver 114 may be operated to drive the mixing drum 14 to agitate the material and facilitate fully loading/packing the mixing drum 14. Alternatively, the mixing drum 14 may be stationary while material is added to the mixing drum 14. When discharging and the charge hopper 42 is in the second position, the discharge hopper 44 funnels material from the mixing drum 14 into the main chute 46.

The main chute 46 functions as an outlet of the mixing drum 14 and is used to direct concrete dispensed from the internal volume 30 of the mixing drum 14 and through the discharge hopper 44 to a target location near the concrete mixer truck 10. The main chute 46 is pivotally coupled to the platform 54 and/or the discharge hopper 44 such that the main chute 46 is configured to rotate about both a vertical axis and a horizontal axis. The main chute 46 includes a base section 124 that may be pivotally coupled to the platform 54 and/or the discharge hopper 44. An extension chute 48 (e.g., a folding section, a second chute section, etc.) is pivotally coupled to the distal end of the base section 124. In some embodiments, a plurality of extension chutes 48 are pivotally connected to one another. One or more removable/detachable extension chutes 68 may be selectively coupled to the distal end of the extension chute 48. The main chute 46 is selectively reconfigurable between a first configuration (e.g., a storage configuration, a transport configuration, etc.) and a second configuration (e.g., a use configuration, a dispensing configuration, etc.). In the first configuration, (i) the base section 124 may be selectively oriented substantially horizontal and extending laterally outward, (ii) the extension chute 48 may be selectively pivoted relative to the base section 124 and extending substantially vertically, and (iii) the removable extension chutes 68 may be removed from the extension chute 48 and stored elsewhere in the concrete mixer truck 10 (e.g., coupled to the chassis 12 beneath the mixing drum 14, etc.). In the first configuration, the main chute 46 may, therefore, minimally obscure the view of an operator positioned within the cab 18. In the second configuration, (i) the extension chute 48 may be pivoted relative to the base section 124 from the substantially vertical orientation to a substantially horizontal orientation such that the base section 124 and the extension chute 48 are aligned with one another to form a continuous path through which material can flow, and (ii) one or more of the removable extension chutes 68 may be coupled to the distal end of the extension chute 48 to increase the length of the main chute 46 (e.g., to distribute concrete further away from the concrete mixer truck 10, etc.).

A first chute actuator 122 (e.g., a chute raising/lowering actuator, etc.) is coupled to and extends between the main chute 46 (e.g., a distal end thereof, etc.) and the chassis 12. In some embodiments, the first chute actuator 122 extends between the main chute 46 and the front bumper 158. The first chute actuator 122 is configured to raise and lower the main chute 46 to control the orientation of the main chute 46 relative to a horizontal plane (e.g., the ground, etc.). In some embodiments, the first chute actuator 122 is a pair of opposing hydraulic cylinders. In other embodiments, the first chute actuator 122 is another type of actuator (e.g., a pneumatic cylinder, a lead screw driven by an electric motor, a single hydraulic cylinder, etc.). In some embodiments, the first chute actuator 122 and the main chute 46 are both configured to rotate about the same or substantially the same vertical axis (e.g., as the main chute 46 is pivoted about the vertical axis as described in more detail herein).

A second chute actuator 94 (e.g., a chute pivot/rotation actuator, etc.) is coupled to the base section 124 of the main chute 46 and the platform 54. The second chute actuator 94 is configured to rotate the main chute 46 about a vertical axis. The second chute actuator 94 is configured to move the distal end of the main chute 46 through an arc along the left, front, and right sides of the chassis 12 (e.g., a 150 degree arc, a 180 degree arc, a 210 degree arc, etc.). In one embodiment, the second chute actuator 94 is a hydraulic motor. In other embodiments, the second chute actuator 94 is another type of actuator (e.g., a pneumatic motor, an electric motor, etc.).

A third chute actuator 78 (e.g., a chute folding/unfolding actuator, etc.) is configured to reposition (e.g., extend and retract, fold and unfold, etc.) the extension chute 48 relative to the base section 124 of the main chute 46. The third chute actuator 78 may be coupled to and extend between the base section 124 and the extension chute 48. In some embodiments, the third chute actuator 78 includes a plurality of actuators positioned to reposition a first extension chute 48 relative to the base section 124 and one or more second extension chutes 48 relative to the first extension chute 48. The first chute actuator 122, the second chute actuator 94, and the third chute actuator 78 facilitate selectively reconfiguring the main chute 46 between the first configuration and the second configuration. In some embodiments, a controller (e.g., joystick) is configured to facilitate providing commands to control operation of the first chute actuator 122, the second chute actuator 94, and the third chute actuator 78 to direct the main chute 46 and concrete flow therefrom. In some embodiments, a hopper pump may be coupled to the chassis 12 and configured to provide pressurized hydraulic fluid to power the first chute actuator 122, the second chute actuator 94, and/or the third chute actuator 78. The hopper pump may be a variable displacement pump or a fixed displacement pump. Additionally or alternatively, a pneumatic pump and/or an electrical storage and/or generation device is used to power one or more of the first chute actuator 122, the second chute actuator 94, and/or the third chute actuator 78.

Once at the job site, the concrete mixer truck 10 may be configured to dispense the material to a desired location (e.g., into a form, onto the ground, etc.). The charge hopper 42 may be repositioned into the second position from the first position by the hopper actuator 66. The extension chute(s) 48 may be extended by the third chute actuator(s) 78 to reconfigure the main chute 46 into the second configuration from the first configuration. An operator can then couple one or more removable extension chutes 68 to the distal end of the extension chute 48 to increase the overall length of the main chute 46 (as necessary). Once the main chute 46 is in the second configuration, the operator can control the first chute actuator 122 and/or the second chute actuator 94 to adjust the orientation of the main chute 46 (e.g., about a vertical axis, about a lateral axis, etc.) and thereby direct the material onto the desired location. Once the main chute 46 is in the desired orientation, the operator can control the drum driver 114 to rotate the mixing drum 14 in the second direction, expelling the material through the drum opening 72, into the discharge hopper 44, and into the main chute 46. The operator may control the speed of the mixing drum 14 to adjust the rate at which the material is delivered through the main chute 46. Throughout the process of dispensing the material, the operator can change the location onto which the material is dispensed by varying the orientation of the main chute 46 and/or by controlling the drive system 20 to propel/move the concrete mixer truck 10.

The drive system 20 is configured to propel the concrete mixer truck 10 and may drive other systems of the concrete mixer truck 10 (e.g., the drum driver 114, etc.). The drive system 20 includes driven tractive assemblies that include a front axle assembly 132 and a pair of rear axle assemblies 134, each coupled to various wheels 4. In some embodiments, the drive system 20 includes a driveshaft coupled to the front axle assembly 132 and/or the rear axle assemblies

134. The front axle assembly 132 and the rear axle assemblies 134 are coupled to the power plant module 62 through the drive system 20 such that the front axle assembly 132 and the rear axle assemblies 134 at least selectively receive mechanical energy (e.g., rotational mechanical energy) and propel the concrete mixer truck 10. In some embodiments, a pusher axle assembly 168 (e.g., tag axle assembly, etc.) is configured to be raised and lowered to selectively engage the support surface (e.g., based on the loading of the concrete mixer truck 10, etc.). Such a configuration distributes the pressure exerted on the ground by the concrete mixer truck 10, which may be required, for example, when traveling through certain municipalities under load.

The power plant module 62 (e.g., prime mover module, driver module, etc.) is configured to supply rotational mechanical energy to drive the concrete mixer truck 10. The power plant module 62 is coupled to the chassis 12 and positioned near the longitudinal center of the concrete mixer truck 10, beneath the mixing drum 14. According to an exemplary embodiment, the power plant module 62 receives a power input from the engine module 110. In some embodiments, the power plant module 62 includes a transmission and/or an electromagnetic device (e.g., an electrical machine, a motor/generator, etc.) coupled to the transmission. In some embodiments, the transmission and the electromagnetic device are integrated into a single device (e.g., an electromechanical infinitely variable transmission, an electromechanical transmission, etc.). The electromagnetic device is configured to provide a mechanical energy input to the transmission. By way of example, the electromagnetic device may be configured to supply a rotational mechanical energy input to the transmission (e.g., using electrical energy generated from the mechanical power input provided by the engine module 110, etc.). In some embodiments, the power plant module 62 and/or the drive system 20 includes additional pumps (hydraulic fluid pumps, water pumps, etc.), compressors (e.g., air compressors, air conditioning compressors, etc.), generators, alternators, and/or other types of energy generation and/or distribution devices configured to transfer the energy from the power plant module 62 to other systems.

The fuel system 108 is configured to provide fuel to the engine module 110 and/or other components of the concrete mixer truck 10. Specifically, the fuel system 108 may be configured to provide fuel to an engine 74 of the engine module 110. The engine 74 may use the fuel in an internal combustion process to generate a mechanical power output that is provided to the power plant module 62 (e.g., to generate electricity, to power onboard electric motors used to rotate wheel and tire assemblies, to drive the transmission etc.) and/or to power the drum driver 114. The fuel system 108 may include one or more valves, hoses, regulators, filters, and/or various other components configured to facilitate providing fuel to the engine 74. The fuel system 108 includes a container 126 (e.g., a vessel, reservoir, tank, etc.) that is configured to store a fluid (e.g., fuel, air, hydraulic fluid, etc.). The container 126 is disposed behind the drum driver 114 along the chassis 12. In other embodiments, the container 126 is coupled to a side of the rear pedestal 26. In some embodiments, the container 126 is coupled to the chassis 12 and positioned directly beneath the mixing drum 14. According to an exemplary embodiment, the container 126 includes a fuel tank that stores fuel used to power the engine 74. In some embodiments, the container 126 additionally or alternatively includes an air tank configured to store compressed air (e.g., for use in an air brake system, for use when raising and lowering the pusher axle assembly 168, etc.). In some embodiments, the container 126 additionally or alternatively includes a hydraulic tank configured to store hydraulic fluid for use in one or more hydraulic circuits (e.g., a hydraulic circuit that includes the drum driver 114, etc.).

A cover assembly 120 including a plurality of cover panels is positioned between the second end 38 of the mixing drum 14 and the engine module 110. The cover assembly 120 is disposed around the fuel system 108 (e.g., the container 126, etc.), the drum driver 114, and the rear pedestal 26. The cover assembly 120 is configured to protect the various internal components from debris. Such debris may be encountered while the concrete mixer truck 10 is driven along a roadway, for example. The cover assembly 120 may also protect the various internal components from damage due to collisions with trees, poles, or other structures at a jobsite or while transporting concrete. In some embodiments, all or some of the fuel system 108 is incorporated under a hood 86 of the engine module 110.

The engine module 110 is coupled to the frame rails 40 proximate the rear end 24 of the chassis 12. The engine module 110 is configured to directly, or indirectly, supply the various components of the concrete mixer truck 10 with the power needed to operate the concrete mixer truck 10. By way of example, the engine module 110 may be configured to provide mechanical energy (e.g., rotational mechanical energy) (i) to one or more components directly (e.g., via a power-take-off, etc.) to drive the one or more components (e.g., a hydraulic pump of the drum driver 114, etc.) and/or (ii) to the power plant module 62 to drive the one or more components indirectly. The engine module 110 may be defined by any number of different types of power sources. According to an exemplary embodiment, the engine module 110 includes the engine 74 coupled to the frame rails 40 and disposed within the hood 86. The engine 74 may include an internal combustion engine configured to utilize one or more of a variety of fuels (e.g., gasoline, diesel, bio-diesel, ethanol, natural gas, etc.) to output mechanical energy. In some embodiments, at least one of the drum drive motor 130, the first chute actuator 122, the second chute actuator 94, and the third chute actuator 78 is electrically driven (i.e., powered using electrical energy) rather than hydraulically driven.

In some embodiments, the engine module 110 additionally or alternatively includes multiple battery modules (e.g., batteries, capacitors, ultra-capacitors, etc.) spread throughout the concrete mixer truck 10, which cooperate to act collectively as an energy storage device. The engine module 110 can be charged through an onboard energy source (e.g., through use of an onboard generator powered by an internal combustion engine, by operating the electromagnetic device as a generator, during regenerative braking, through an onboard fuel cell, through an onboard solar panel, etc.) or through an external energy source (e.g., when receiving mains power from a power grid, etc.). In some embodiments, the concrete mixer truck 10 is a purely electric vehicle that does not include an internal combustion engine and, as such, is driven by electrical energy in all modes of operation. In such embodiments, the concrete mixer truck 10 may not include a fuel tank.

Chassis

According to an exemplary embodiment, a frame configuration is described. The rearward cross-member configuration includes utilizing a rear cross-member and a front cross-member positioned forward of the rear cross-member to mount various concrete mixer truck components. A fluid tank is positioned between the frame rails in a lateral (e.g., transverse) direction and coupled to the front cross-member. Mounting the fluid tank between the frame rails reduces the exposure of the fluid tank to foreign objects and thereby reduces the likelihood of damage to the fluid tank. A remote fill is utilized to fill the fluid tank, and conduits to and from the tank are shortened because the fluid tank is in a central location along the chassis. A battery box is positioned between the front cross-member and rear cross-member rearward of the fluid tank. By mounting the battery box between the frame rails, the need for an additional mounting location and corresponding mounting components is eliminated, resulting in a lighter load on the chassis and reducing the number of components needed to house the batteries. Additionally, mounting the battery box in between the frame rails protects the battery box from damage. Specifically, the battery box does not extend outward from the side of the frame rail at the rear of the concrete mixer truck, like in conventional systems.

According to an exemplary embodiment, a front cross-member is described. The front cross-member is configured to couple to a steering assembly (e.g., axle assembly). This integrated design permits the steering gears to be moved rearward along the frame and placed directly a set of spring hangers, thereby reducing the front overhang of the steering assembly. By packaging all these components in a small area formed between the existing front cross-member and structure, this arrangement facilitates high steering cramp angles with large tires. Further packaging all these components together reduces the front overhang of the vehicle. Beneficially, the front cross-member is configured to be removable to facilitate access when servicing the steering assembly. The front cross-member may be configured to include a front leaf spring mounting, a chute pivot support mounting, a hydraulic chute control manifold, and a front vehicle recovery provision along with the steering assembly mounting.

According to an exemplary embodiment, an engine mount is described. The engine mount is positioned directly under the engine and couples the engine to the chassis, thereby reducing a cantilever effect on the mount. The engine mount implements a single isolator and is mounted directly to a cross-member of the chassis, thereby eliminating the need for additional cross-members, components, and mounting assemblies. Beneficially, the engine mount includes one or more chassis routings for HVAC routings, fuel filter mountings, and electrical clippings.

According to an exemplary embodiment, a routing assembly is described. The routing assembly includes an HVAC hose cluster, a tube assembly, and an electric cover that extends from the cab, along the frame rails, to the engine. Both the HVAC hose cluster and the tube assembly extend along internal portions of a respective rail in the frame rails. The routing assembly provides an organized and protected route for electrical, air, hydraulic, fuel, and HVAC connectors within the chassis, and the positions of the wires and hoses inside of the frame rails ensure that the frame rails protect these wires and hoses from exposure to foreign objects.

Rearward Cross-Members

Figure 4:
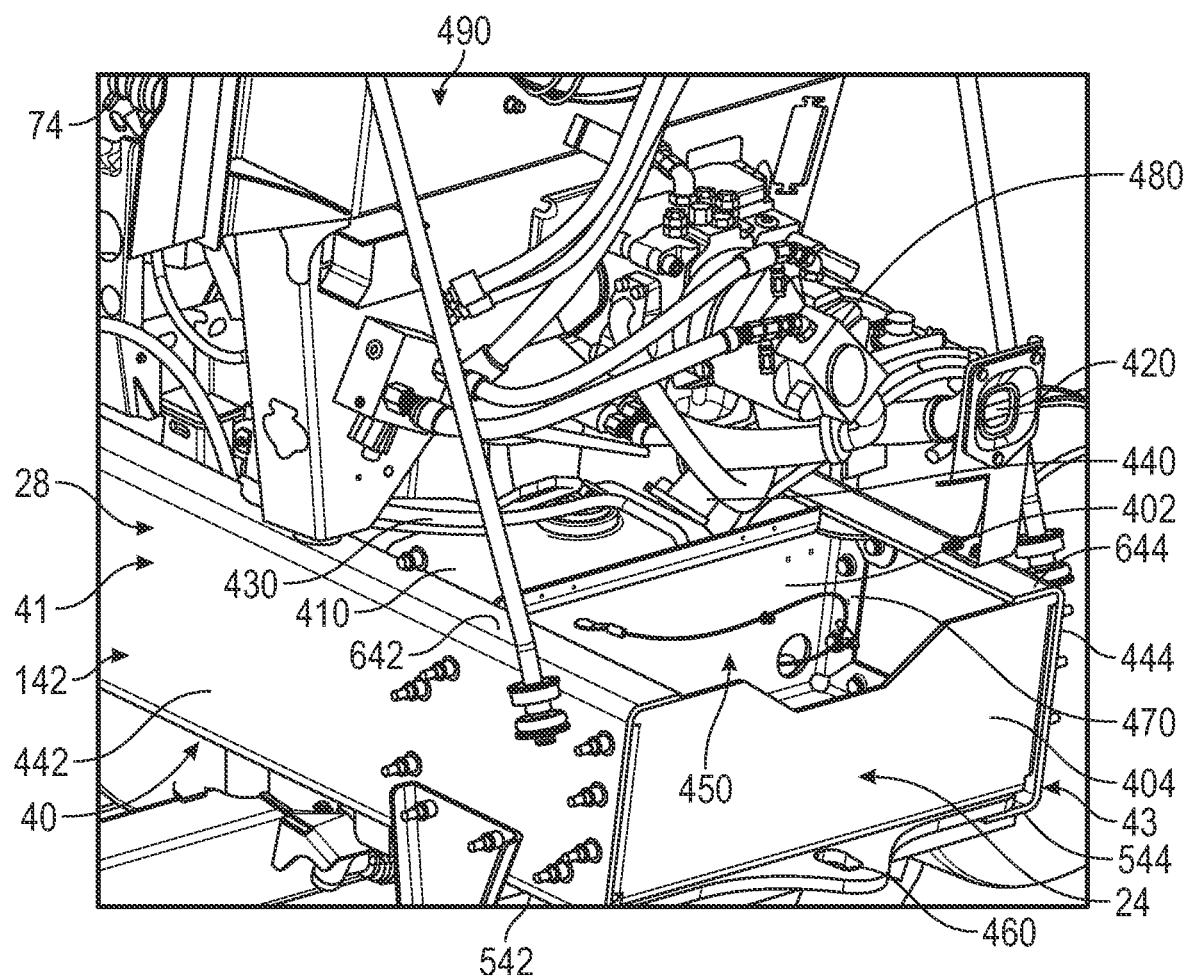
FIG. 4 is a top perspective view of a rearward cross-member of a chassis of the concrete mixer truck of FIG. 1, according to an exemplary embodiment.
Figure 5:
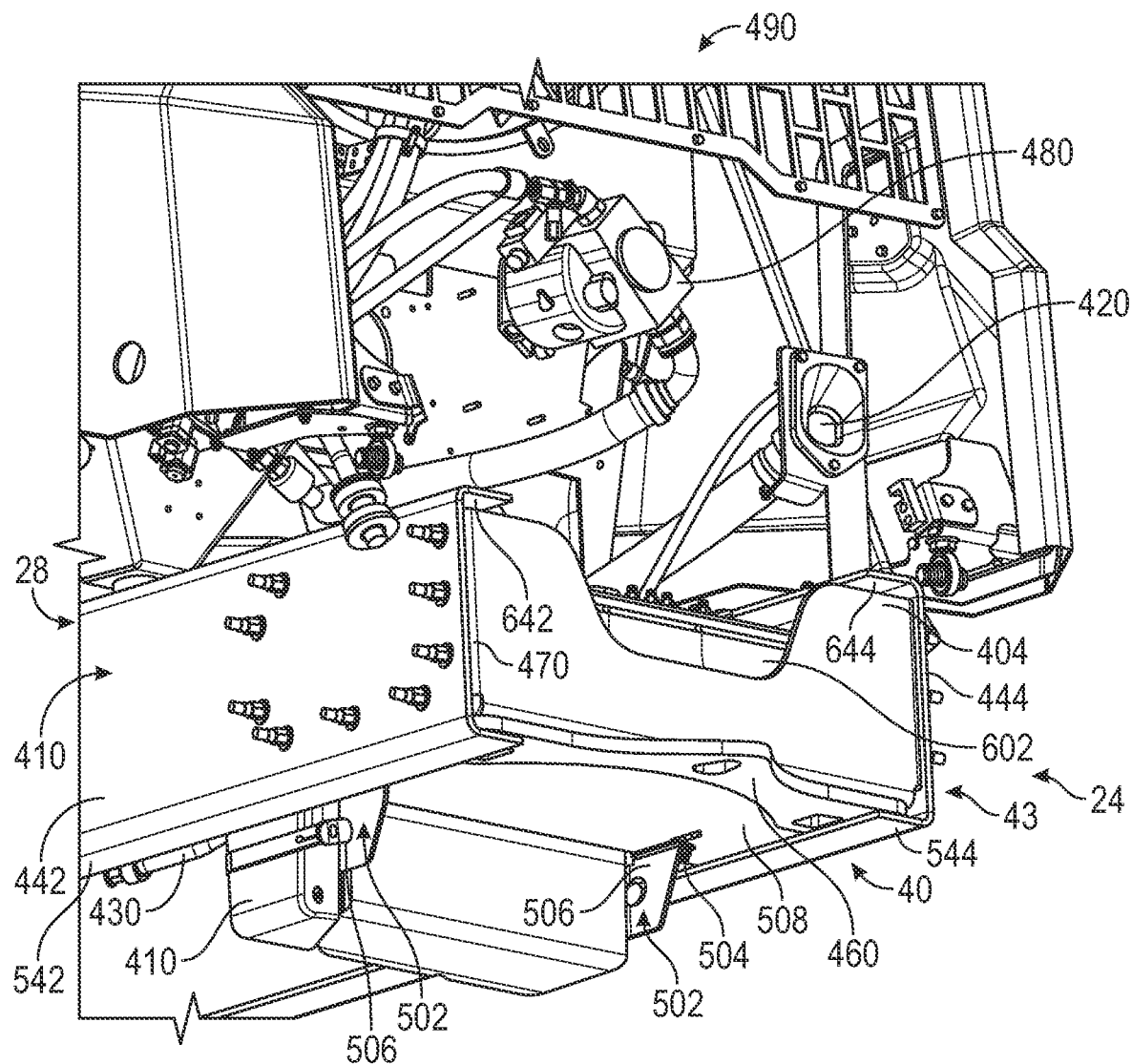
FIGS. 5 and 6 are various perspective views of the rearward cross-member of FIG. 4 with a battery box, according to an exemplary embodiment.
Figure 6:
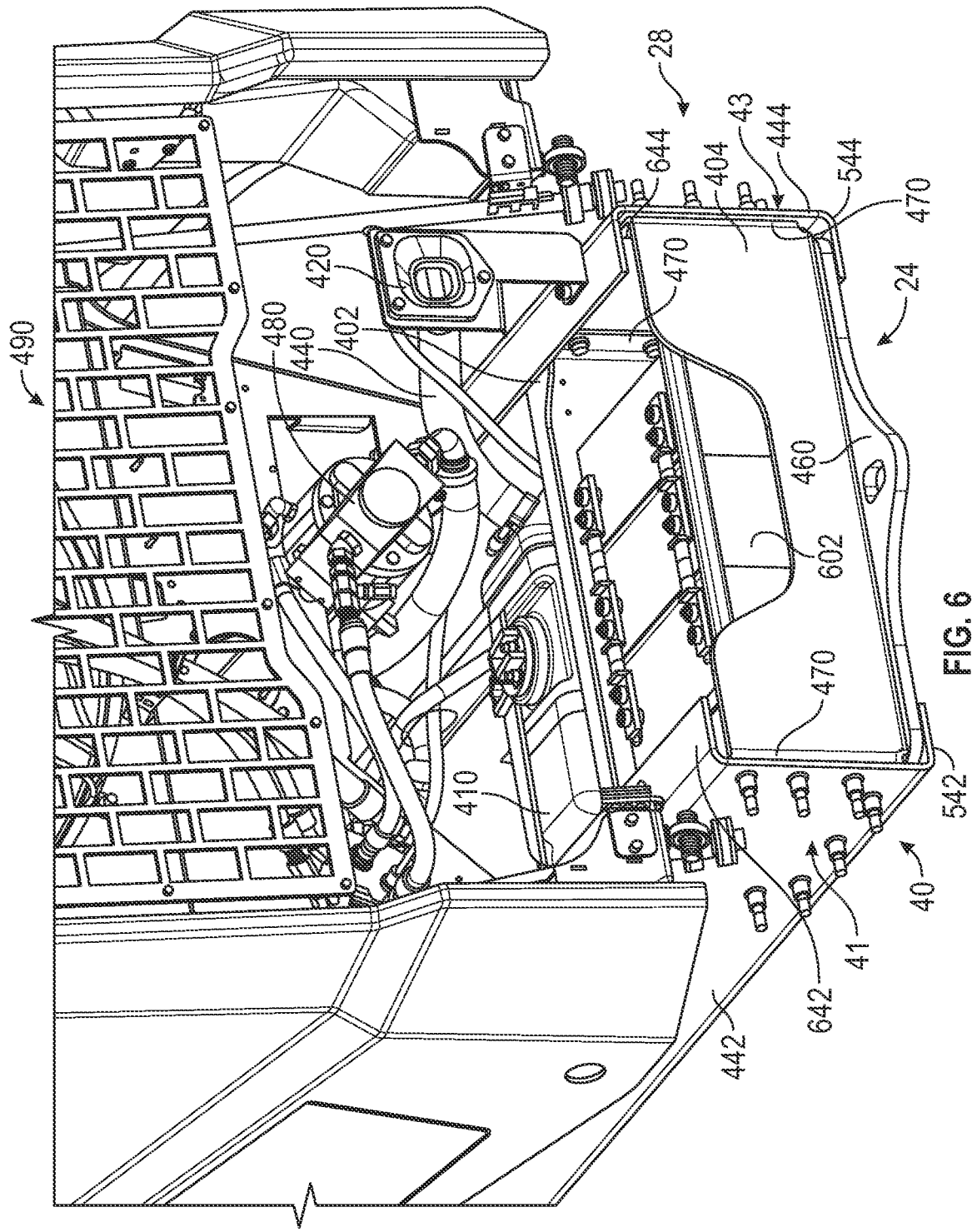

Referring to FIG. 4-6, the frame 28 includes a rearward cross-member configuration. The rearward cross-member configuration includes a pair of frame members, shown as cross-member 402 and rear cross-member 404. The cross-member 402 is positioned forward of the rear cross-member 404. As shown, the frame rails 40 each have a C-shaped cross-section (i.e., are C-channels) that includes a base and two legs oriented perpendicular to the base such that the legs define a horizontal width of the frame rail 40, and the base defines a vertical height of the frame rail 40. The first frame rail 41 on the first lateral side 142 includes a first base rail 442 (e.g., a base portion, a vertical portion, etc.), a first upper leg 642 (e.g., a horizontal portion, a protrusion, etc.), and a first lower leg 542 (e.g., a horizontal portion, a protrusion, etc.). The second frame rail 43 on the second lateral side 144 includes a second base rail 444, a second upper leg 644, and a second lower leg 544. In other embodiments, the frame rails 40 may have a different cross-sectional shape (e.g., tubular, etc.).

The cross-member 402 is coupled to the first base rail 442 and extends laterally toward, and is coupled to the second base rail 444. The cross-member 402 includes a pair of frame coupling members, shown as flanges 470, positioned on opposite ends of the cross-member 402 and coupled to an interior surface of each frame rail. Specifically, the flanges 470 may be fastened (e.g., bolted), welded, fixed, etc., to the frame rails 40. As shown, the flanges 470 are bolted to the frame rails 40. The cross-member 402 may be made from a wide variety of materials (e.g., steel, aluminum, etc.) with wide variety of cross-sections (e.g., square tube, C-channel, angle, etc.). As shown in FIGS. 4-6 the cross-member 402 is generally C-shaped with the flanges 470 positioned at each end. The cross-member 402 is positioned substantially below (e.g., directly below) a cooling system 490 and a pump 480. The cross-member 402 is offset a longitudinal distance forward of the rear cross-member 404 such that a volume, shown as cross-member cavity 450, is positioned therebetween. A horizontal plate, shown as base plate 508 is coupled to the cross-member 402, the rear cross-member 404, and the frame rails 40 and defines the bottom of the cross-member cavity 450.

The rear cross-member 404 is coupled to the first base rail 442 and extends laterally toward, and is coupled to a second base rail 444. The rear cross-member 404 includes a pair of frame coupling members, shown as flanges 470, positioned on opposite ends of the cross-member 402 and coupled to an interior surface of each frame rail. Specifically, the flanges 470 may be fastened (e.g., bolted), welded, fixed, etc., to the frame rails 40. As shown, the flanges 470 are bolted to the frame rails 40. The rear cross-member 404 may be made from a wide variety of materials (e.g., steel, aluminum, etc.) with wide variety of cross-sections (e.g., square tube, C-channel, angle, etc.). As shown in FIGS. 4-6, the cross-member 402 has a substantially flat base defining a tapered recess or opening at the top (e.g., two angled portions and a flat position disposed therebetween) and with a leg extending forward from the bottom of the base. The rear cross-member 404 is positioned at the rear end 24 of the concrete mixer truck 10.

Referring to FIGS. 4 and 5, a fluid tank 410 is coupled to the frame 29. The fluid tank 410 is positioned between the frame rails 40 and extends in a lateral (e.g., transverse) direction. The fluid tank 410 is positioned forward of the cross-member 402 and is coupled to a front side of the cross-member 402. The fluid tank 410 may be further coupled to the base plate 508 disposed under the cross-member cavity 450. As shown, a pair of brackets 502 may be used to couple the fluid tank 410 to the base plate 508. A strap 506 extends around a bottom portion of the fluid tank 410 from one bracket 502 to the other bracket 502, coupling the fluid tank 410 to the brackets 502. A series of fasteners 504 couple the brackets 502 to the base plate 508. In some embodiments, the fluid tank 410 is a diesel exhaust fluid (DEF) tank. In other embodiments the fluid tank 410 contains another type of fluid (e.g., water, fuel, hydraulic fluid, etc.). The fluid tank 410 is fluidly coupled to an outlet conduit 430 configured to provide fluid to one or more components (e.g., the engine 74, through the pump 480, etc.). An inlet conduit 440 is coupled to the fluid tank 410 and defines a remote fill opening 420 disposed near the rear end 24. The remote fill opening 420 permits an operator to pour a fluid into the remote fill opening 420 to fill the fluid tank 410.

Due to the positioning of the fluid tank 410 below the pump 480 and inside of the chassis 12, conduits to and from the fluid tank 410 are shortened and are protected by the frame rails 40 and other components along the chassis 12. In some embodiments, the pump 480 is configured to provide fluid from the fluid tank 410 to one or more components along the concrete mixer truck 10. Additionally, by mounting the fluid tank 410 between the frame rails 40 it reduces the exposure of the fluid tank 410 to the environment and therefore decreases the likelihood of damage. Conventionally, concrete mixer trucks position fluid tanks outside of a set of frame rails and near an engine. In contrast, the rearward cross-member configuration provides protection to the fluid tank 410 against intrusion from a wide variety of directions due to the protection provided by the frame rails 40.

Referring to FIGS. 5 and 6, a container, shown as battery box 602, is positioned in the cross-member cavity 450 between the frame rails 40 in a lateral (e.g., transverse) direction and is coupled to the rear cross-member 404. The battery box 602 may contain or include one or more energy storage devices, such as batteries or capacitors. In some embodiments, the battery box 602 is additionally or alternatively coupled to the cross-member 402. By positioning the battery box 602 between the frame rails 40, the exposure of the battery box 602 to the environment is reduced, and therefore the likelihood of damage to the battery box 602 and the need for a separate mounting structure is eliminated. In conventional concrete mixer trucks, a battery box is mounted to an exterior surface of a frame at the rear of the concrete mixer truck. In contrast, the rearward cross-member configuration utilizes existing structures to mount the battery box 602, thereby eliminating the need for an additional mounting location and corresponding mounting components and resulting in a lighter load onto the chassis 12 and reducing the number of components needed to house the batteries in the battery box 602.

The rearward cross-member configuration provides improvements over conventional concrete mixer truck designs. The rearward cross-member configuration provides structure to the chassis 12. In some embodiments, the rearward cross-member configuration provides mounting locations (e.g., apertures) for one or more LSTA auxiliary axles. In some embodiments, the rearward cross-member configuration provides one or more lift and/or tow provisions (e.g., tow points, lift points, apertures, mounts, etc.). As shown in FIGS. 5 and 6, the base plate 508 may includes a protrusion, shown as receiver 460, that extends outwardly away from the chassis 12. Specifically, the receiver 460 extends rearward of the rear cross-member 404. The receiver 460 is configured as an interface for a connection to another object (e.g., with a strap or chain), may facilitate towing (e.g., push, pull) another object, and/or for the vehicle to be towed. Specifically, the receiver 460 defines an aperture configured to receive one or more objects (e.g., hooks, straps, etc.).

Front Cross-Member

Figure 7:
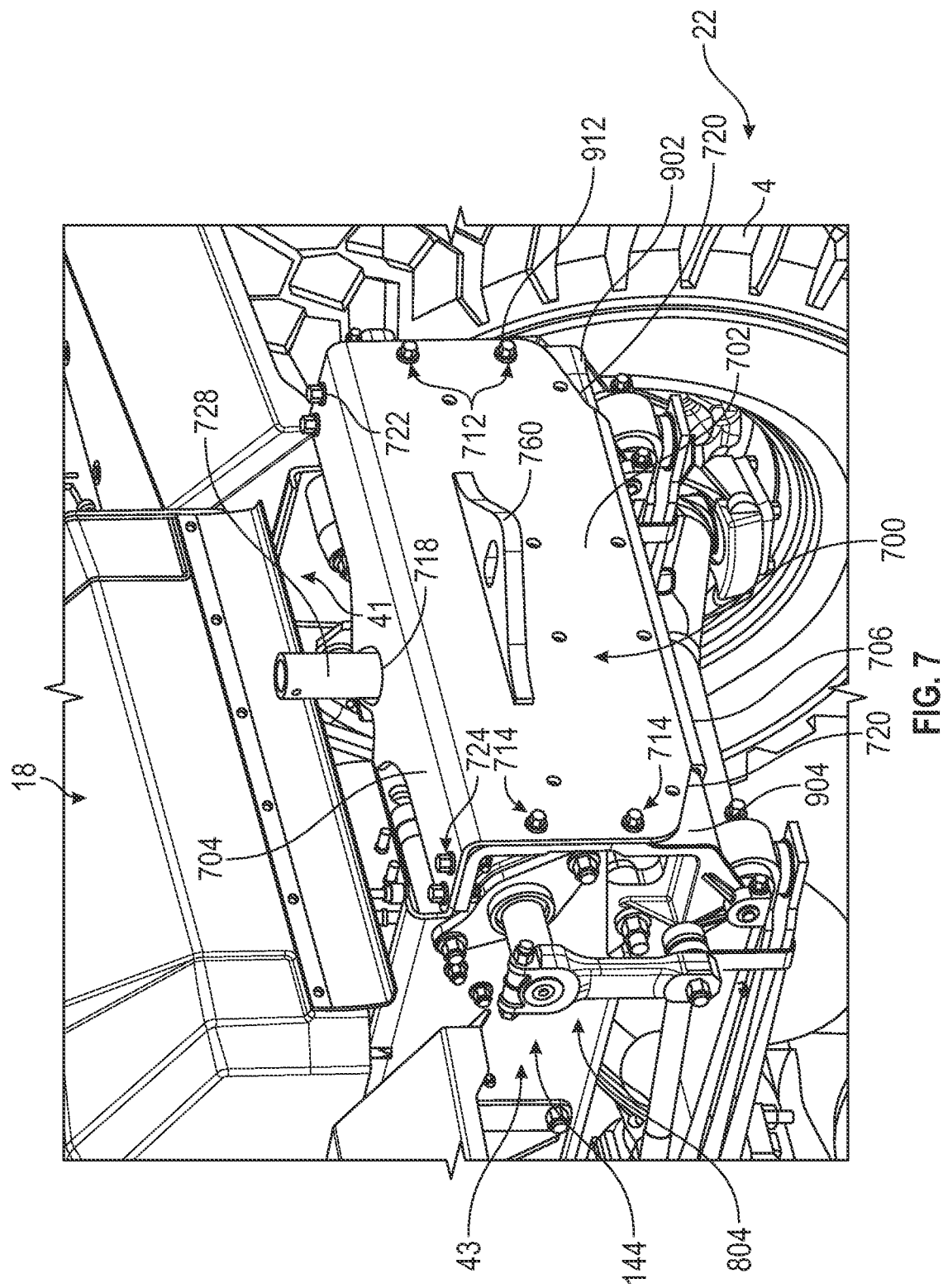
FIGS. 7 and 8 are various perspective views of a front cross-member and steering assembly of a chassis of the concrete mixer truck of FIG. 1, according to an exemplary embodiment.
Figure 8:
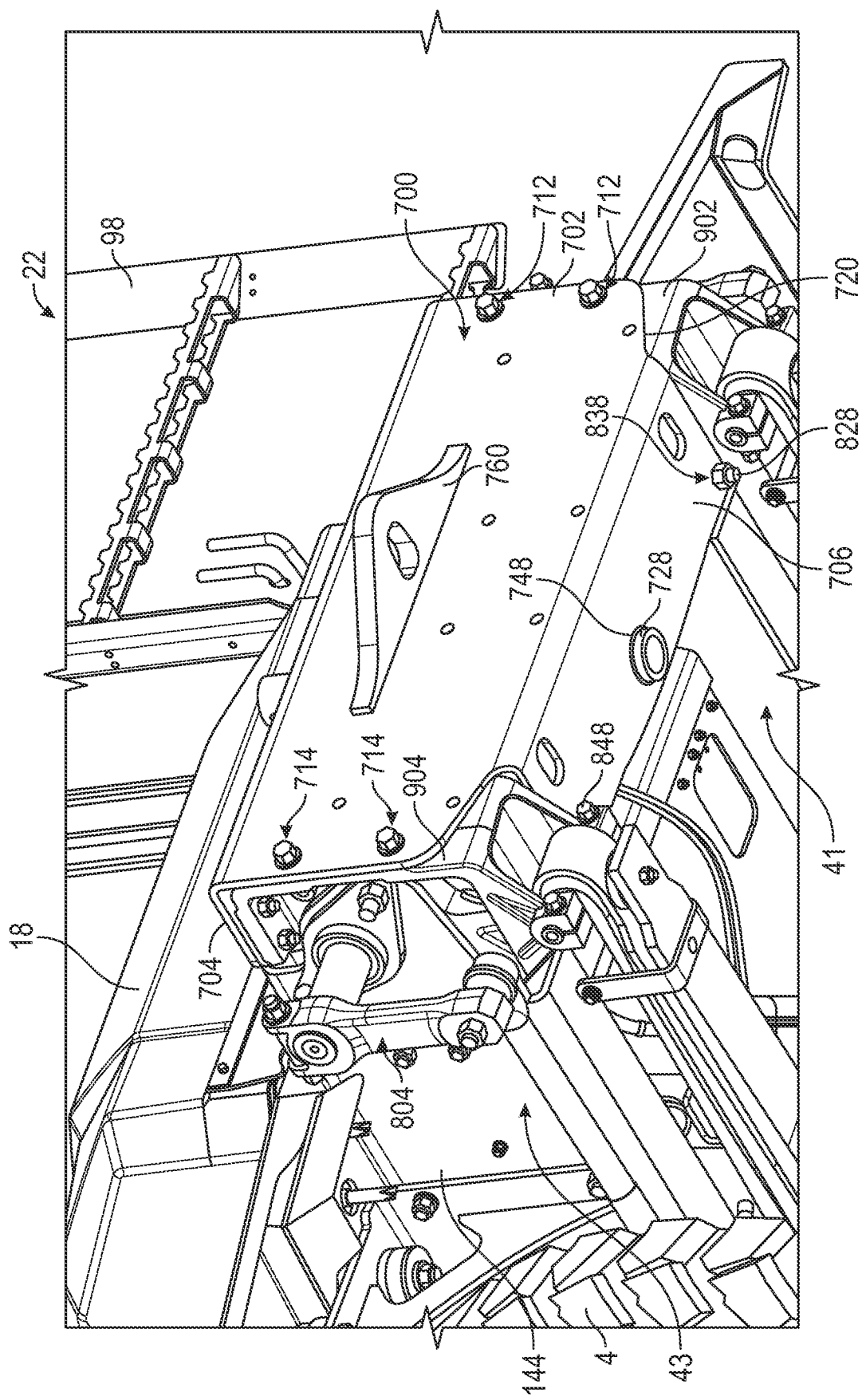
Figure 9:
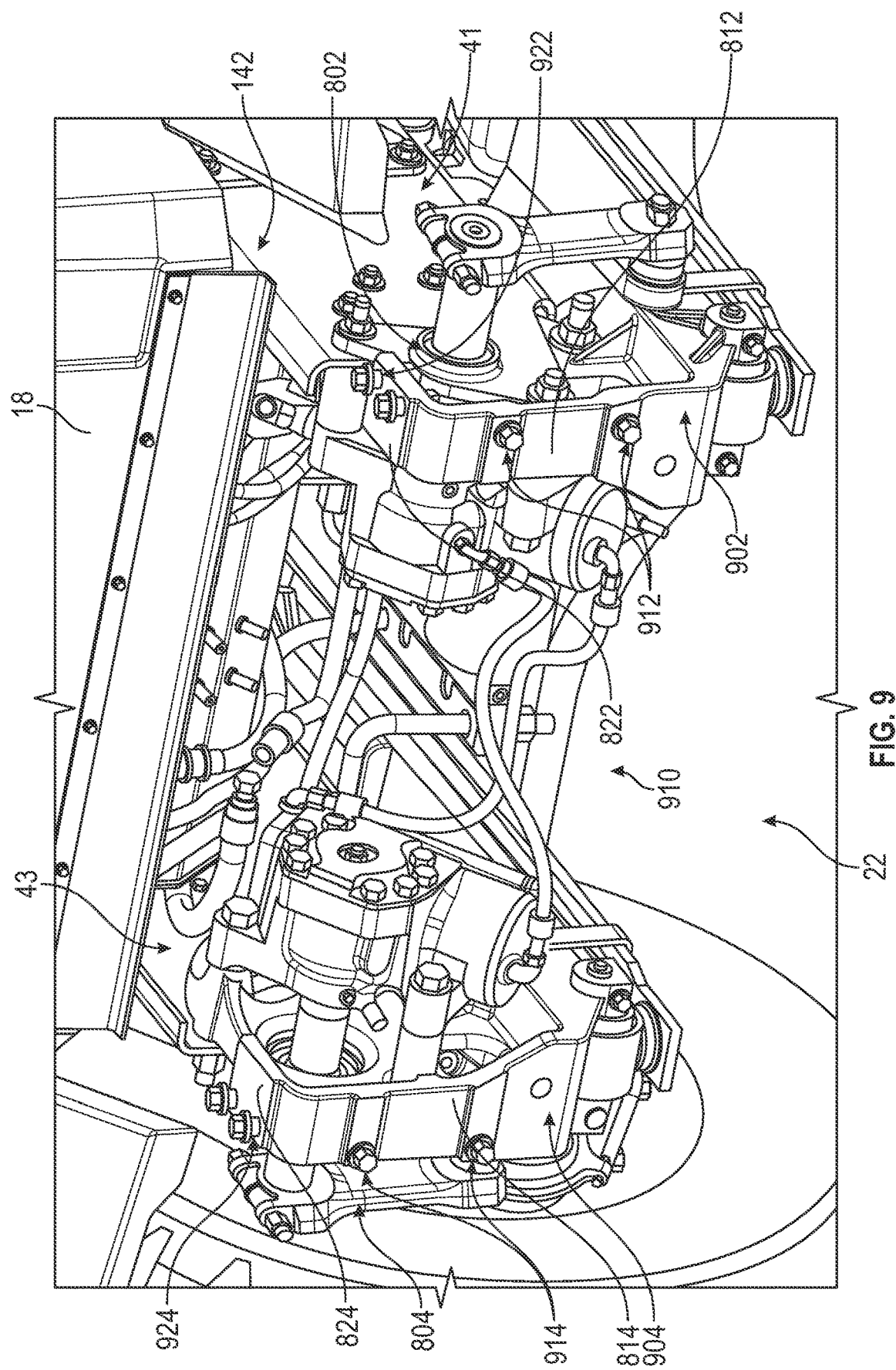
FIG. 9 is a top perspective view of the steering assembly of FIGS. 7 and 8, according to an exemplary embodiment.

Referring to FIGS. 7-9, the frame 28 includes a frame member, shown as front cross-member 700, according to an exemplary embodiment. The front cross-member 700 is configured to couple to a steering assembly 910 along the frame rails 40. The front cross-member 700 is positioned at the front end 22 of the concrete mixer truck 10 and is coupled to the steering assembly 910 adjacent the front end 22. The front cross-member 700 includes a base 702 (e.g., a base portion, a vertical portion, etc.), an upper leg 704 (e.g., a horizontal portion, a protrusion, etc.) oriented perpendicular to the base 702, and a lower leg 706 (e.g., a horizontal portion, a protrusion, etc.) oriented perpendicular to the base 702, parallel to and offset above the upper leg 704. The front cross-member 700 has a C-channel cross-section such that the upper leg 704 and a lower leg 706 define a width of the front cross-member 700, and the base 702 defines a height of the front cross-member 700. In other embodiments, the front cross-member 700 may have a different cross-sectional shape (e.g., tubular, etc.). As shown in FIG. 9, the steering assembly 910 is included as part of a first wheel assembly 802 and a second wheel assembly 804. The first wheel assembly 802 and the second wheel assembly 804 are configured to be connected with a drive shaft of the vehicle, receiving rotational energy from the engine 74 (e.g., prime mover) and allocating torque provided by the engine 74 between the half shafts and/or wheel assemblies. The half shafts and/or wheel assemblies deliver the rotational energy to each wheel-end assembly.

The first wheel assembly 802 includes a first wheel bracket 902 and may include various components of the drive system 20 including brakes, a gear reduction, steering components, a wheel hub, a wheel, and other features. The first wheel bracket 902 includes a first bracket face 812 and a first bracket leg 822. The first bracket face 812 is coupled to a pair of first front coupling members 912 (e.g., fasteners, bolts, etc.). The first bracket leg 822 is coupled to a pair of first upper coupling members 922 (e.g., fasteners, bolts, etc.). The second wheel assembly 804 includes a second wheel bracket 904 and may include various components of the drive system 20 including brakes, a gear reduction, steering components, a wheel hub, a wheel, and other features. The second wheel bracket 904 includes a second bracket face 814 and a second bracket leg 824. The second bracket face 814 is coupled to a pair of second front coupling members 914 (e.g., fasteners, bolts, etc.). The second bracket leg 824 is coupled to a pair of second upper coupling members 924 (e.g., fasteners, bolts, etc.).

The base 702 includes a bottom portion 720 that tapers and curves as the base 702 transitions to the lower leg 706. As shown in FIG. 8, the bottom portion 720 is configured to fit the lower shape and components of the steering assembly 910, including the first wheel assembly 802 and a second wheel assembly 804. The base 702 is coupled to a protrusion, shown as receiver 760, that extends outwardly away from the chassis 12. Specifically, the receiver 760 extends forward of the base 702. The receiver 760 is configured as an interface for a connection to another object (e.g., with a strap or chain). The receiver 760 may facilitate towing (e.g., push, pull) another object and/or may facilitate towing the concrete mixer truck 10. As shown, the receiver 760 defines an aperture (e.g., a vertical aperture) configured to receive another object (e.g., a hook, a strap, etc.). The base 702 defines a first front set of holes 712 or apertures adjacent to the first lateral side 142. The first front set of holes 712 are configured to receive the first front coupling members 912 of the first wheel bracket 902. The base 702 includes a second front set of holes 714 or apertures adjacent to the second lateral side 144. The second front set of holes 714 are configured to receive the second front coupling members 914 of the second wheel bracket 904. The shape of the base 702 is complementary to the shape of the first bracket face 812 and the second bracket face 814 such that the base 702 engages the first bracket face 812 and the second bracket face 814.

The upper leg 704 defines a shaft opening 718 or aperture positioned centrally and configured to receive an actuator shaft 728. The actuator shaft 728 is configured to couple with the first chute actuator 122 to move the main chute 46. The upper leg 704 defines a first upper set of holes 722 or apertures adjacent to the first lateral side 142. The first upper set of holes 722 are configured to receive the first upper coupling members 922 of the first wheel bracket 902. The upper leg 704 defines a second upper set of holes 724 or apertures adjacent to the second lateral side 144. The second upper set of holes 724 are configured to receive the second upper coupling members 924 of the second wheel bracket 904. The shape of the upper leg 704 is complementary to the shape of the first bracket leg 822 second bracket leg 824 such that the upper leg 704 engages the first bracket leg 822 second bracket leg 824.

The lower leg 706 defines a shaft opening 748 or aperture positioned centrally and configured to receive the bottom portion of the actuator shaft 728. The actuator shaft 728 is supported by and able to rotate within the shaft opening 748 and the shaft opening 718 of the upper leg 704. The lower leg 706 defines one or more lower holes 838 or apertures adjacent to the first lateral side 142. The lower holes 838 are each configured to receive a coupling member 828 (e.g., a fastener, a bolt, etc.) that couples the lower leg 706 to a bottom surface of one of the frame rails 40. The shape of the lower leg 706 is complementary to the shape of the frame rails 40 such that the lower leg 706 engages the frame rails 40.

As shown in FIGS. 7-9, the integrated design of the front cross-member 700 facilitates moving the steering assembly 910 rearward along the concrete mixer truck 10 and placed directly above spring hangers, thereby reducing the overhang on the front end 22. Additionally, the relatively close spacing between the front cross-member 700 and the steering assembly 910 components in a small area facilitates having high steering cramp angles with large tires. As shown in FIG. 9, the front cross-member 700 is removable (e.g., by unscrewing the coupling members from the holes) to allow for easy servicing of the steering assembly 910 components and other components of the drive system 20. In some embodiments, the front cross-member 700 may be configured to include a front leaf spring mounting, a chute pivot support mounting, a hydraulic chute control manifold, and a front vehicle recovery provision along with the steering gear mounting.

Engine Mounting

Figure 10:
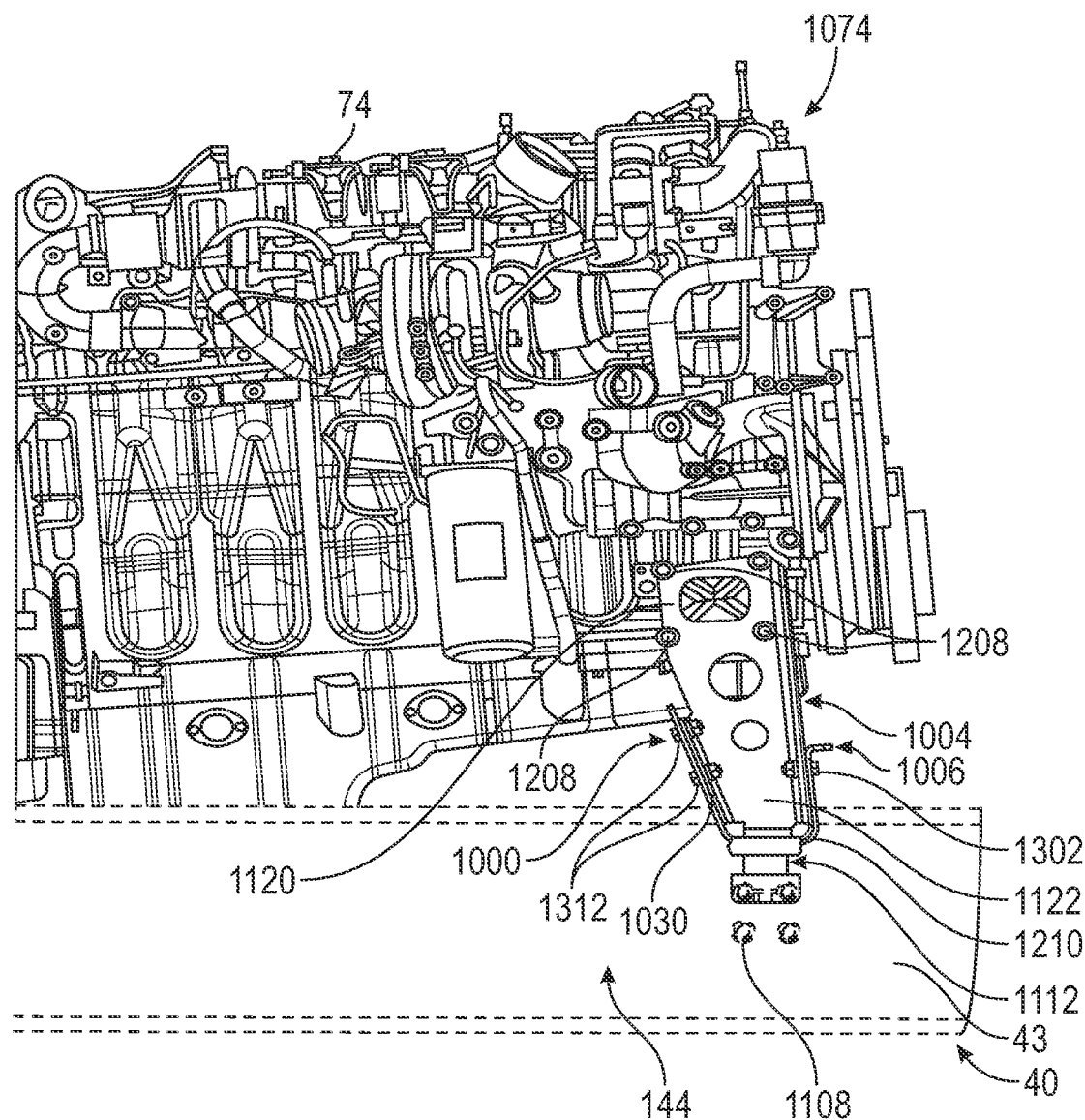
FIGS. 10-13 are various views an engine mount coupled to a chassis of the concrete mixer truck of FIG. 1, according to an exemplary embodiment.
Figure 11:
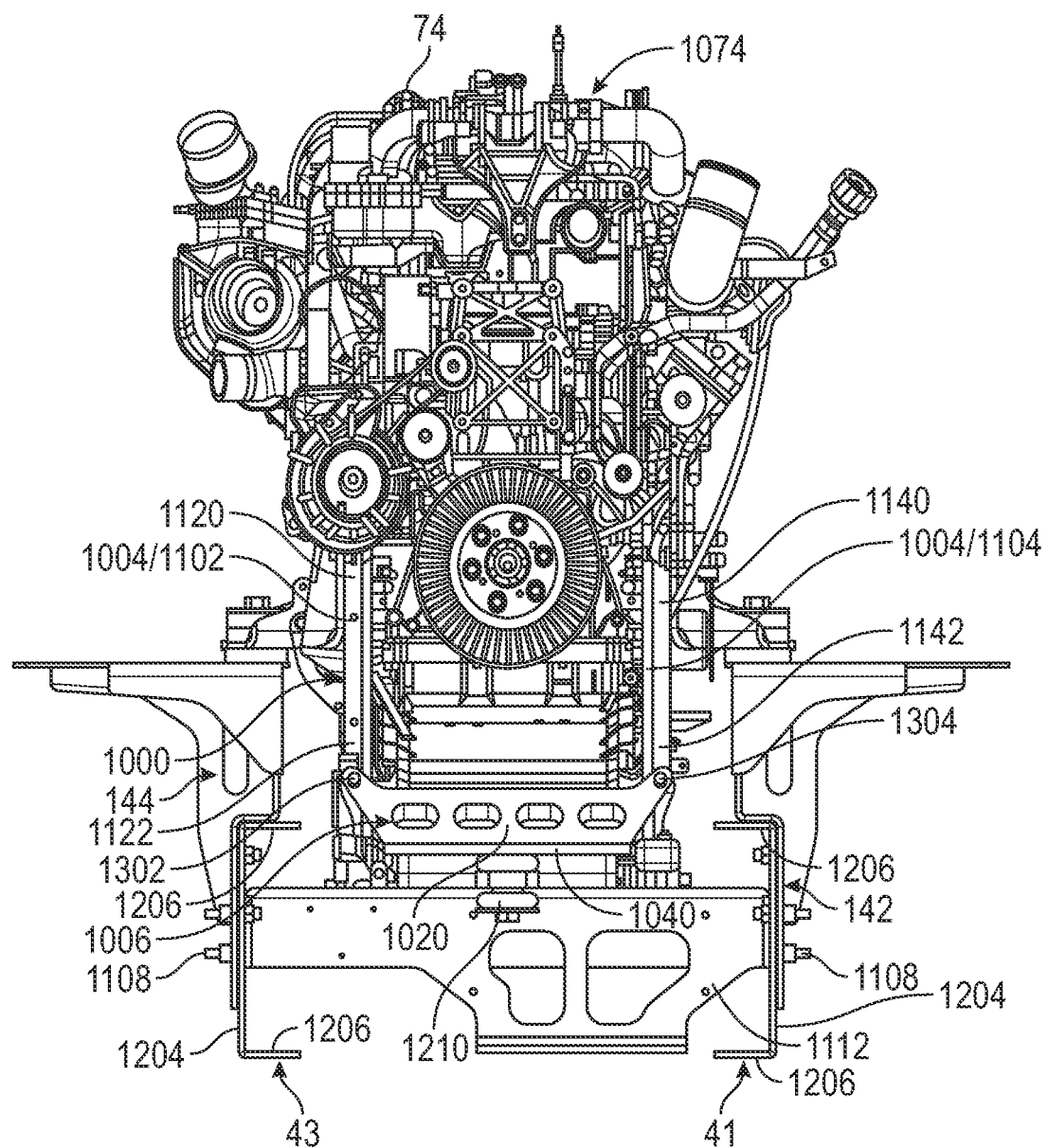
Figure 12:
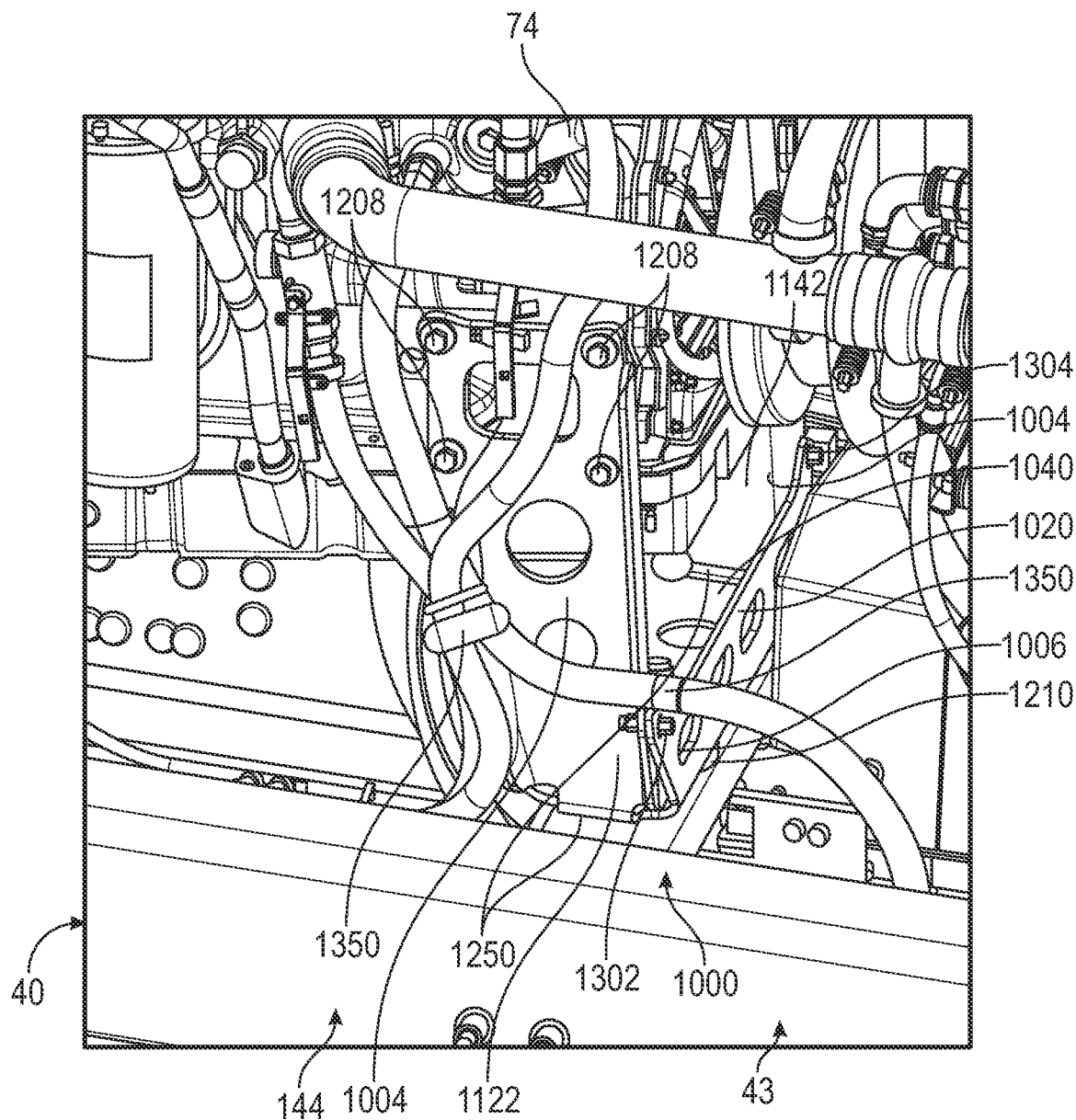

Referring to FIG. 10-14, the concrete mixer truck 10 further includes a frame assembly, shown as an engine mount 1000. The engine mount 1000 is coupled to the engine 74 and to the chassis 12. The engine mount 1000 is positioned directly under the engine 74 and adjacent a front end 1074 of the engine 74. The engine mount 1000 is directly coupled to a cross-member in the chassis 12, shown as a mid-section cross-member 1112 (e.g., a frame member). The engine mount 1000 eliminates the need for additional cross-members and a robust, heavy bracket mount that is offset from the engine 74. Such engine mounts may be offset from an engine by 7.5" in some conventional systems. The engine mount 1000 includes a pair of mounting arms 1004 or mounting members coupled to a bracket 1006 or frame member that extends laterally along the mid-section cross-member 1112. The mounting arms 1004 are configured to couple the engine 74 to the bracket 1006. The bracket 1006 is configured to couple the engine 74 to the chassis 12. The bracket 1006 includes a base portion 1040, a front leg 1020, and rear leg 1030. As shown in FIG. 12, the mounting arms 1004 and the bracket 1006 are formed as a single continuous piece with bends or curved portions 1250 extending between each portion.

The frame rails 40 have a C-channel cross-section that includes a base 1204 (e.g., a base portion, a vertical portion) and a pair of legs 1206 (e.g., horizontal portions, protrusions, etc.) oriented perpendicular to the base 1204. In other embodiments, the frame rails 40 may have a different cross-sectional shape (e.g., tubular, etc.). The legs 1206 define a width of the frame rail 40, and the base 1204 defines a height of the frame rail 40. The mid-section cross-member 1112 is coupled to the frame rails 40 by fasteners, shown as coupling members 1108. The mid-section cross-member 1112 extends from the frame rail 40 on the first lateral side 142 to the frame rail on the second lateral side 144. In some embodiments, a frame liner may be coupled (e.g., bolted, welded, etc.) to the interior of the frame rails 40 and provide additional structural rigidity (e.g., in areas of high stress, etc.). In areas with lesser stresses, the frame liners may be omitted from the frame rails 40 in order to reduce weight. In some embodiments, the frame liners have a C-channel cross-section. In other embodiments, the frame liners have various cross-sections (e.g., angle, rectangular tube, etc.).

The pair of mounting arms 1004 are shaped, sized, and oriented to fit between the frame rails 40 and have a length to support the engine 74 in a desired orientation. The pair of mounting arms 1004 includes a first mounting arm 1102 and a second mounting arm 1104 oriented substantially parallel to, and laterally offset from, the first mounting arm 1102. The first mounting arm 1102 includes a first top portion 1120 and a first lower portion 1122. A plurality of coupling members 1208 or fasteners positioned along the first top portion 1120 couple the first mounting arm 1102 to a side of the engine 74. The second mounting arm 1104 includes a second top portion 1140 and a second lower portion 1142. A plurality of coupling members 1308 or fasteners positioned along the second top portion 1140 couple the second mounting arm 1104 to a side of the engine 74 opposite the first mounting arm 1102.

Figure 13:
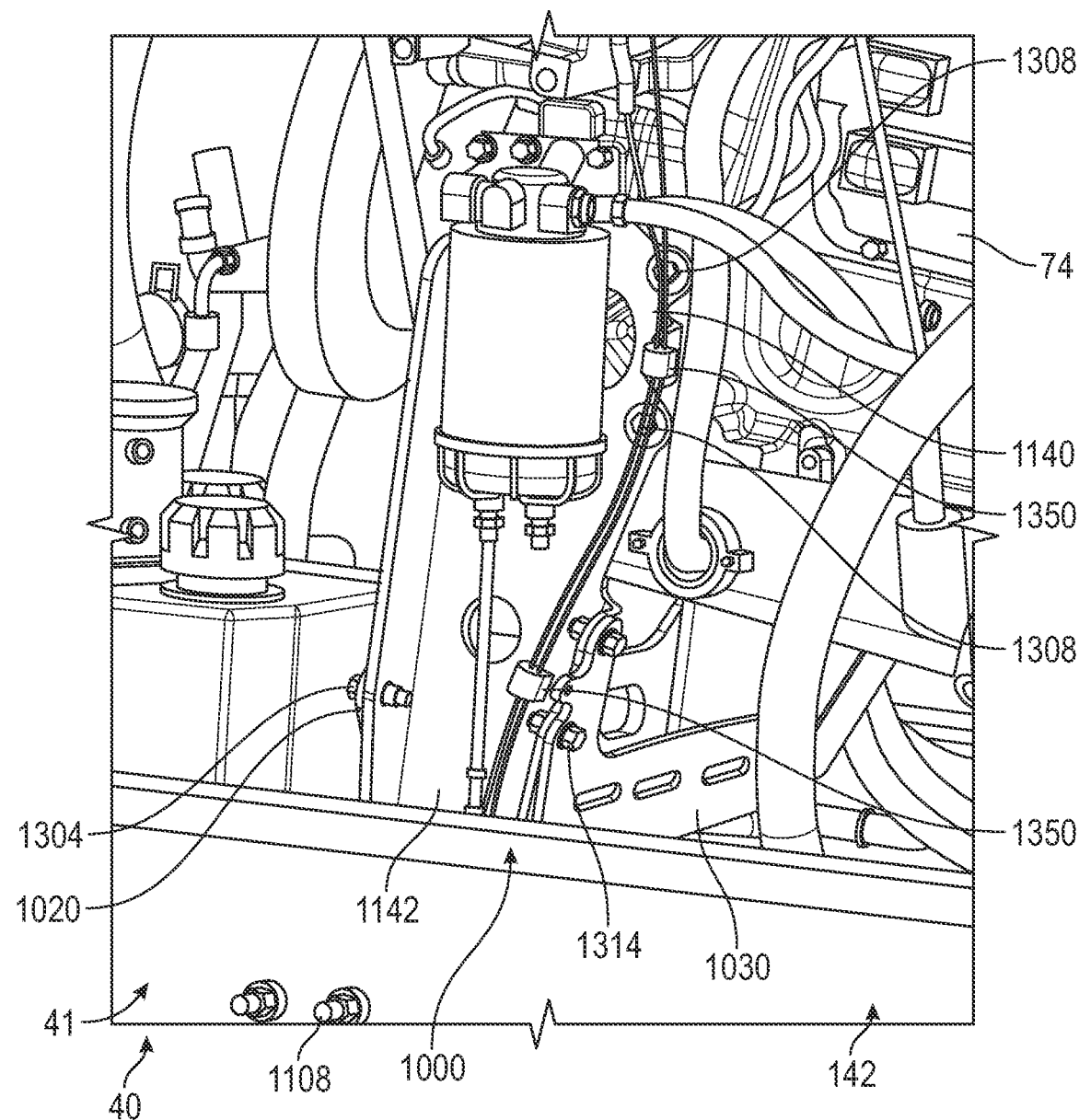

As shown in FIG. 12, the mounting arms 1004 and the bracket 1006 are formed as a single continuous piece. Specifically, the mounting arms 1004 are coupled to the bracket by bends or curved portions 1250. To provide additional mounting support, the first lower portion 1122 and the second lower portion 1142 are each configured to couple with the front leg 1020 and rear leg 1030 to provide lateral support to the engine mount 1000. A front surface of the first lower portion 1122 and a front surface of the second lower portion 1142 are configured to couple with the front leg 1020 of the bracket 1006. As shown in FIGS. 11 and 12, a first coupling member 1302 or fastener adjacent the second lateral side 144 is configured to couple the first lower portion 1122 with the front leg 1020 of the bracket 1006 and a second coupling member 1304 or fastener adjacent the first lateral side 142 is configured to couple the second lower portion 1142 to the front leg 1020 of the bracket 1006. Additionally, a rear surface of the first lower portion 1122 and a rear surface of the second lower portion 1142 are coupled to a rear leg 1030 of the bracket 1006. As shown in FIGS. 10 and 13, a third coupling member 1312 adjacent the second lateral side 144 is configured to couple the first lower portion 1122 with the rear leg 1030 of the bracket 1006 and a fourth coupling member 1314 adjacent the first lateral side 142 is configured to couple the second lower portion 1142 to the rear leg 1030 of the bracket 1006.

The base portion 1040 of the bracket 1006 is coupled to the top portion of the mid-section cross-member 1112. In some embodiments, a single isolator 1210 is implemented between the base portion 1040 and the mid-section cross-member 1112. Because the bracket 1006 is disposed directly below the engine 74 and couples the engine 74 to chassis 12 through the mid-section cross-member 1112, the cantilever effect on the engine mount 1000 is less than conventional mounting systems. Additionally, as shown in FIG. 13, the engine mount 1000 is configured with a plurality of guidance elements 1350 (e.g., clips, mounts, etc.) that are positioned along the mounting arms 1004, bracket 1006, and other portions to provide for one or more connections for securing and routing HVAC tubes, fuel filters, and electrical wires.

Chassis Routing

Referring to FIGS. 14-19, the concrete mixer truck 10 includes a conduit assembly, shown as routing assembly 1400. The routing assembly 1400 includes an HVAC hose cluster 1450 (e.g., one or more conduits) and a tube assembly 1410 (e.g., one or more conduits). Both the HVAC hose cluster 1450 and the tube assembly 1410 extend along internal portions of a respective rail in the frame rails 40. As shown, each of the frame rails 40 have a C-channel cross-section that includes a base 442 (e.g., a base portion, a vertical portion, etc.) and a pair of legs 542 and 642 (e.g., horizontal portions, protrusions, etc.) oriented perpendicular to the base 442. Specifically, the leg 542 extends along a bottom side of the base 442, and the leg 642 extends along a top side of the base 442. In other embodiments, the frame rails 40 may have a different cross-sectional shape (e.g., tubular, etc.). The legs 542 and 642 define a width of the frame rail 40, and the base 442 defines a height of the frame rail 40. The frame rails 40 include the first frame rail 41 that extends along the first lateral side 142 and the second frame rail 43 that extends along the second lateral side 144.

The HVAC hose cluster 1450 includes one or more HVAC hoses (e.g., conduits that transport one or more HVAC fluids, such as coolant) that extend along an internal portion (e.g., between the legs 542 and 642 and the base 442) of the first frame rail 41. The HVAC hose cluster 1450 may be coupled to the internal portion by a series of brackets 1460 (e.g., P clamps) at multiple locations separated longitudinally along the internal portion of the first frame rail 41 to secure the hoses in the HVAC hose cluster 1450. In some embodiments, the HVAC hose cluster 1450 is clipped to brackets along first frame rail 41. In some embodiments, the HVAC hose cluster 1450 includes three HVAC hoses. In other embodiments, the HVAC hose cluster 1450 includes more or fewer hoses and/or a different type of hose or wire.

Figure 15:
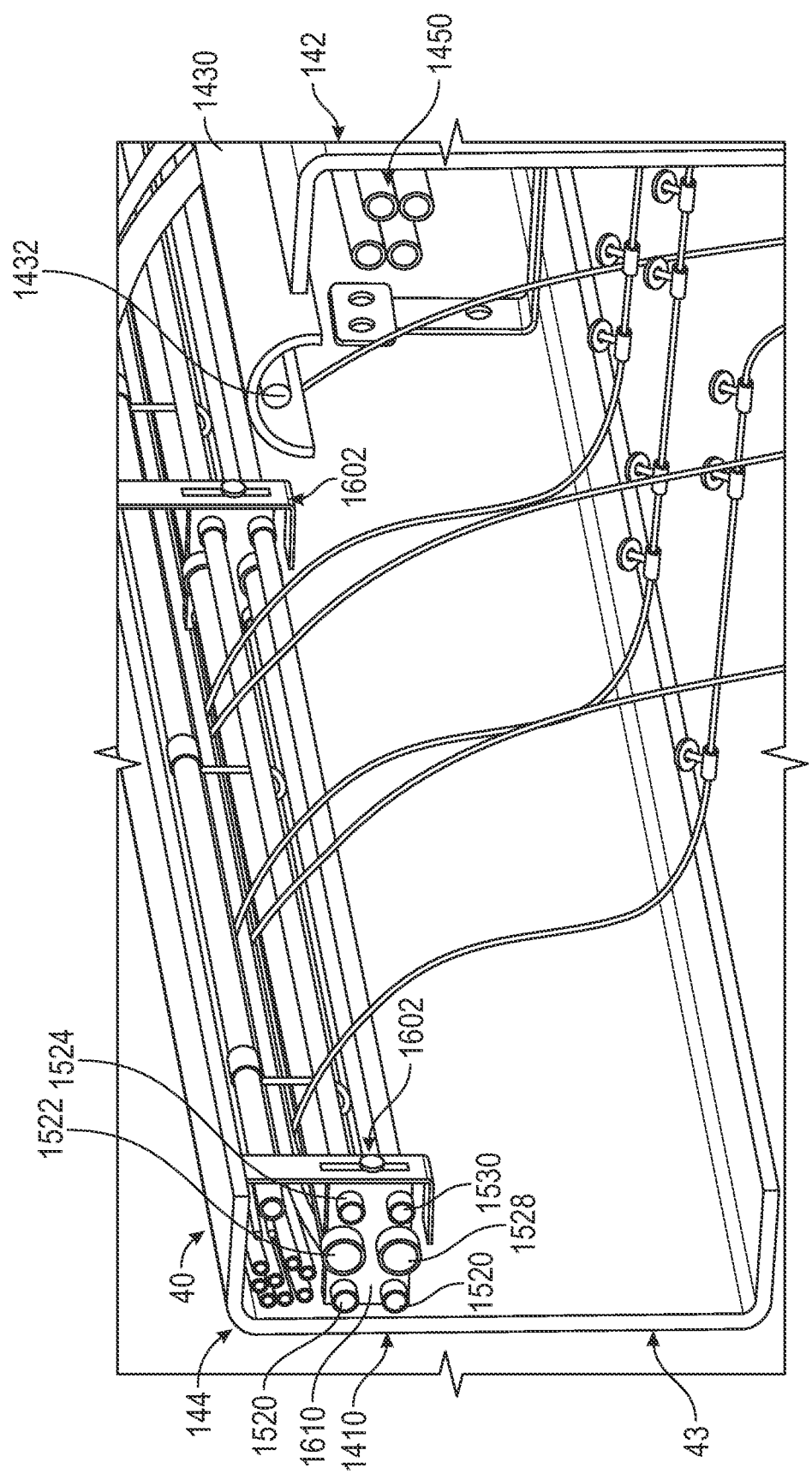
Figure 16:
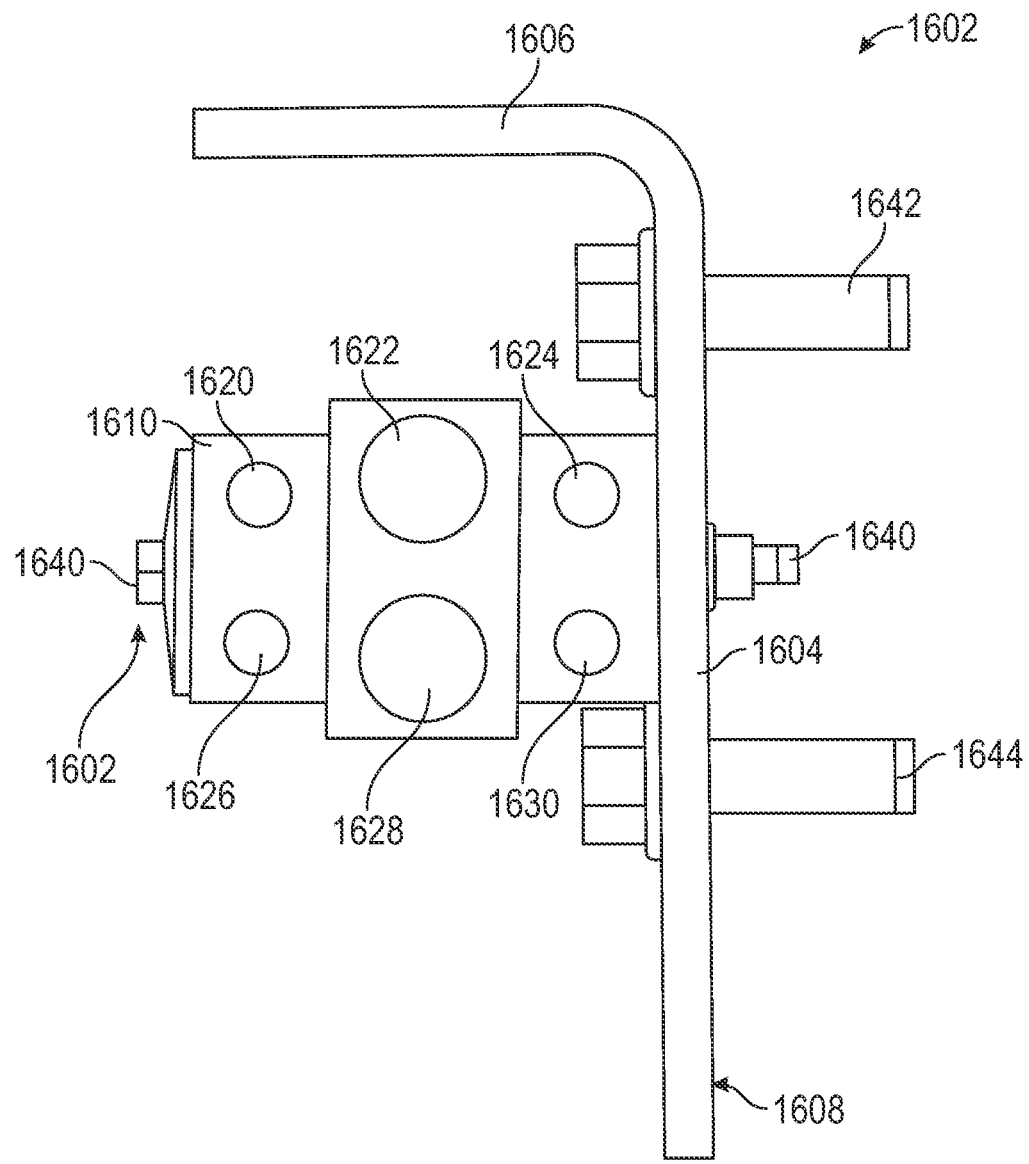

As shown, the tube assembly 1410 includes six tubes (e.g., conduits) that are connected by an adapter 1610 (e.g., a plate defining a series of apertures that each receive a tube) and extend along an internal portion (e.g., between the legs 542 and 642 and the base 442) of the second frame rail 43. As shown in FIG. 15, the tube assembly 1410 includes a first tube 1520, a second tube 1522, a third tube 1524, a fourth tube 1526, a fifth tube 1528, and a sixth tube 1530. In some embodiments, the tube assembly 1410 includes a first fuel line, a second fuel line, an air compressor discharge line, a first hydraulic line, a second hydraulic line, and a third hydraulic line, respectively. Referring to FIG. 16, the tube assembly 1410 includes a tube mounting member 1602 (e.g., an assembly) that includes the adapter 1610, which defines a series of apertures including a first tube receiver 1620, a second tube receiver 1622, a third tube receiver 1624, a fourth tube receiver 1626, a fifth tube receiver 1628, and a sixth tube receiver 1630 configured to receive the first tube 1520, the second tube 1522, the third tube 1524, the fourth tube 1526, the fifth tube 1528, and the sixth tube 1530, respectively. In some embodiments, each tube receiver includes an O-ring (e.g., configured to engage an outer surface of the corresponding tube).

The tube assembly 1410 is coupled to an internal portion of the second frame rail 43. The tube mounting member 1602 includes the adapter 1610 and a bracket 1608. The adapter 1610 is coupled to the bracket 1608 by a coupling member 1640 or fastener. Specifically, the coupling member extends through a bracket base portion 1604 of the bracket 1608 (e.g., a vertical portion). The bracket 1608 further includes bracket arm 1606 (e.g., a horizontal portion) that provides additional protection to the tubes in the tube assembly 1410. The bracket arm 1606 may extend substantially parallel to the leg 642 of the second frame rail 43, such that the tube assembly 1410 is protected from above and below by the leg 642 and the bracket arm 1606, respectively. In some embodiments, a first clamp 1642 (e.g., a fastener) and a second clamp 1644 (e.g., a fastener) couple the bracket 1608 to the second frame rail 43. The first clamp 1642 and the second clamp 1644 may be configured to facilitate adjusting the location of the adapter 1610, and in turn the tubes, along the vertical direction. In some embodiments, the tubes of the tube assembly 1410 are stainless steel to reduce corrosion. While the tube assembly 1410 is shown with six tubes, a wide variety of number of tubes may be implemented with the tube assembly 1410, varying in width, type, and length, to accommodate a variety of cables, wires, connectors, conduits, and other chassis routing members. Additionally or alternatively, the tube assembly 1410 may accommodate (e.g., receive, support, etc.) one or more wires.

Figure 14:
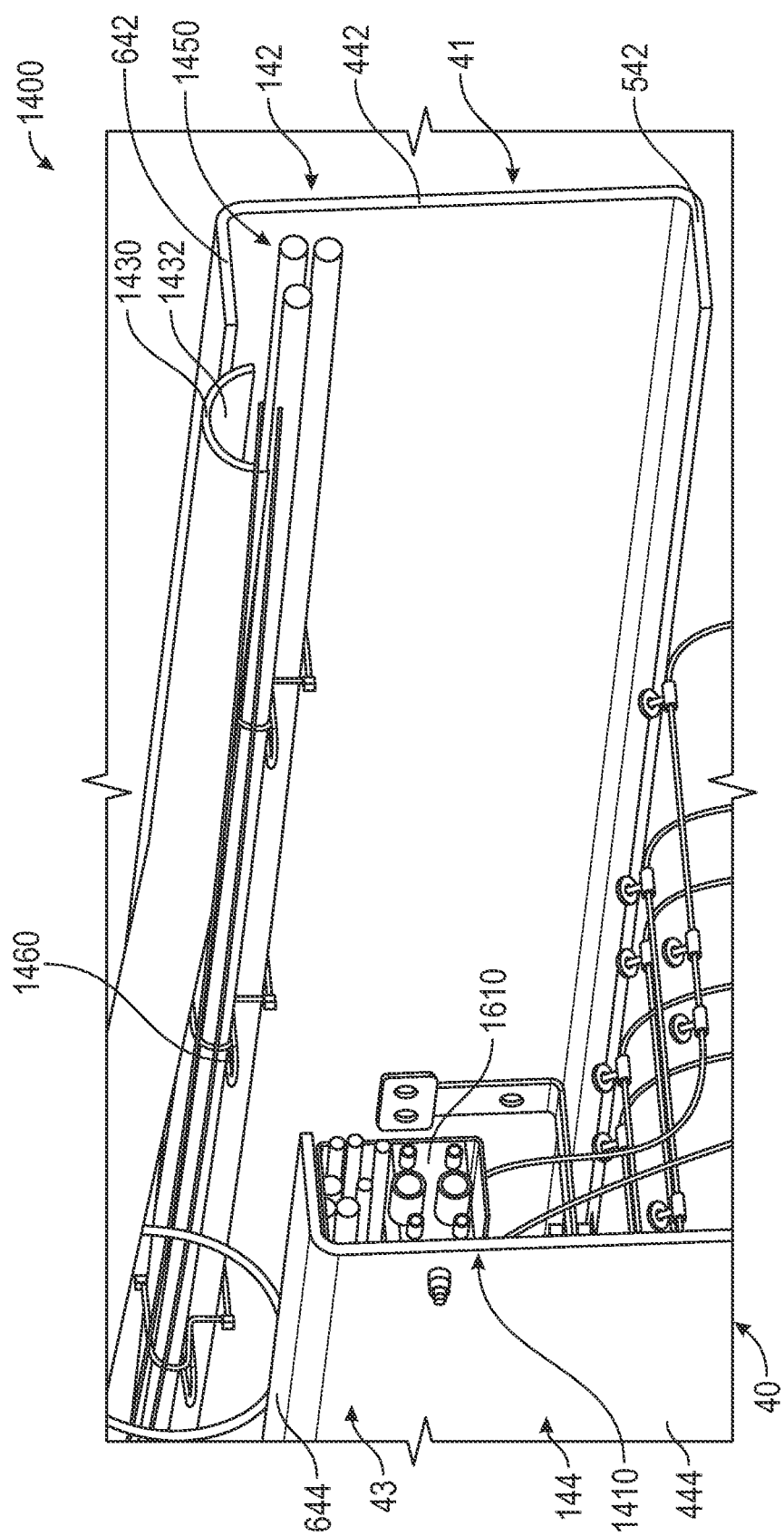
FIGS. 14-19 are various views of a tube assembly of a chassis of the concrete mixer truck of FIG. 1, according to an exemplary embodiment.
Figure 18:
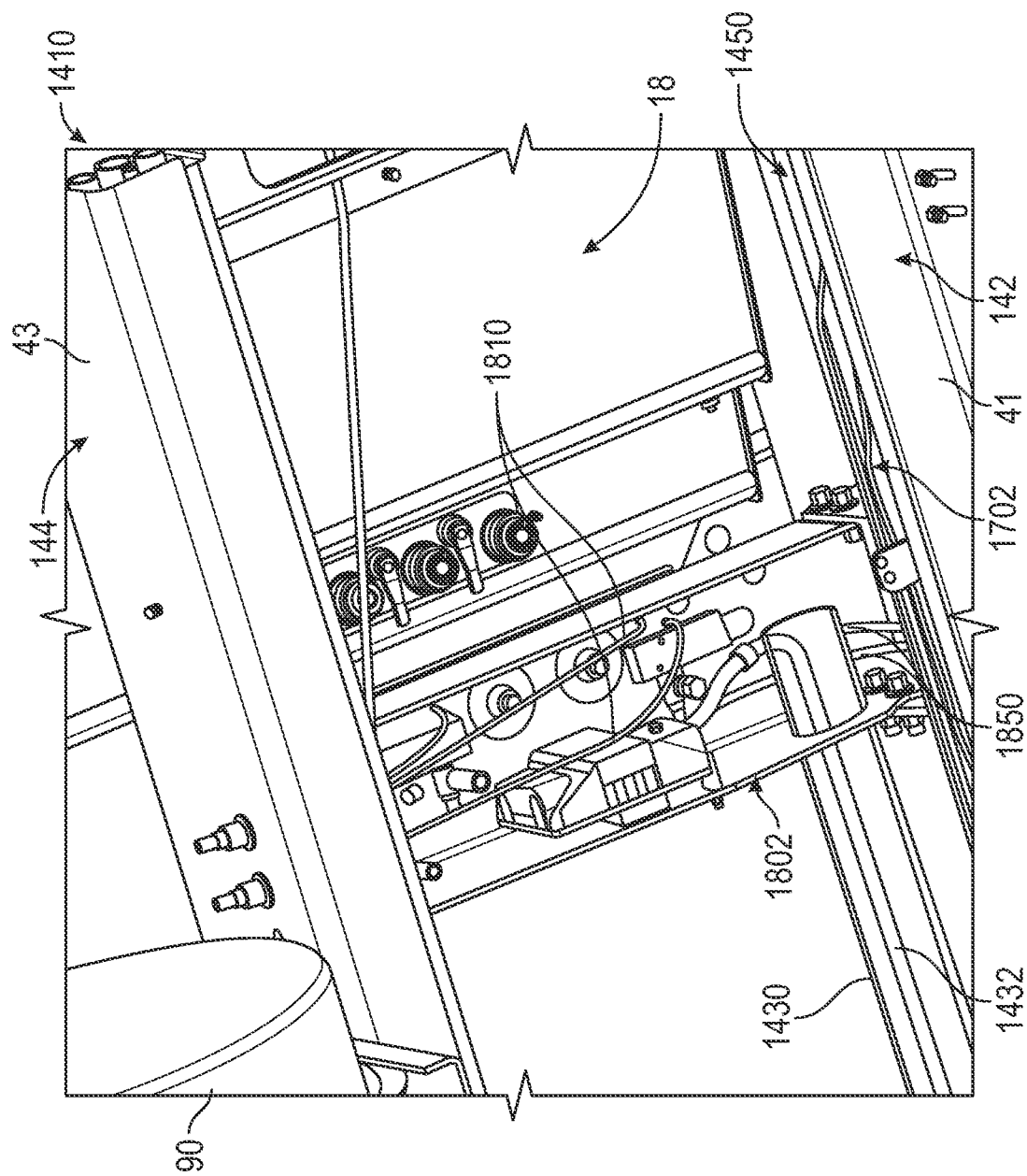

As shown in FIGS. 14 and 15, an electrical cover 1430 extends along the chassis 12, adjacent the first frame rail 41, from the cab 18 to the engine 74. The electrical cover 1430 may be a cover that protects and routes electrical wiring 1432 along the chassis 12 to various components. In some embodiments, the electrical cover 1430 is made from a composite material. As shown in FIG. 18, as the electrical wiring 1432 exits the cab 18, the electrical wiring 1432 is routed through a frame member, shown as cross-member 1802, to shield the electrical wiring 1432 (e.g., from water used in a washdown process). The cross-member 1802 extends between and is coupled to the frame rails 40. The electrical cover 1430 is routed into (e.g., extends into) such that the electrical wiring 1432 is covered along its entire length (e.g., without a gap between the electrical cover 1430 and the cross-member 1802). Beneficially, this provides further protection to the electrical wiring 1432 in an area prone to concrete buildup and exposure to wash water (e.g., as a result of attempts to clean up the concrete buildup).

Figure 17:
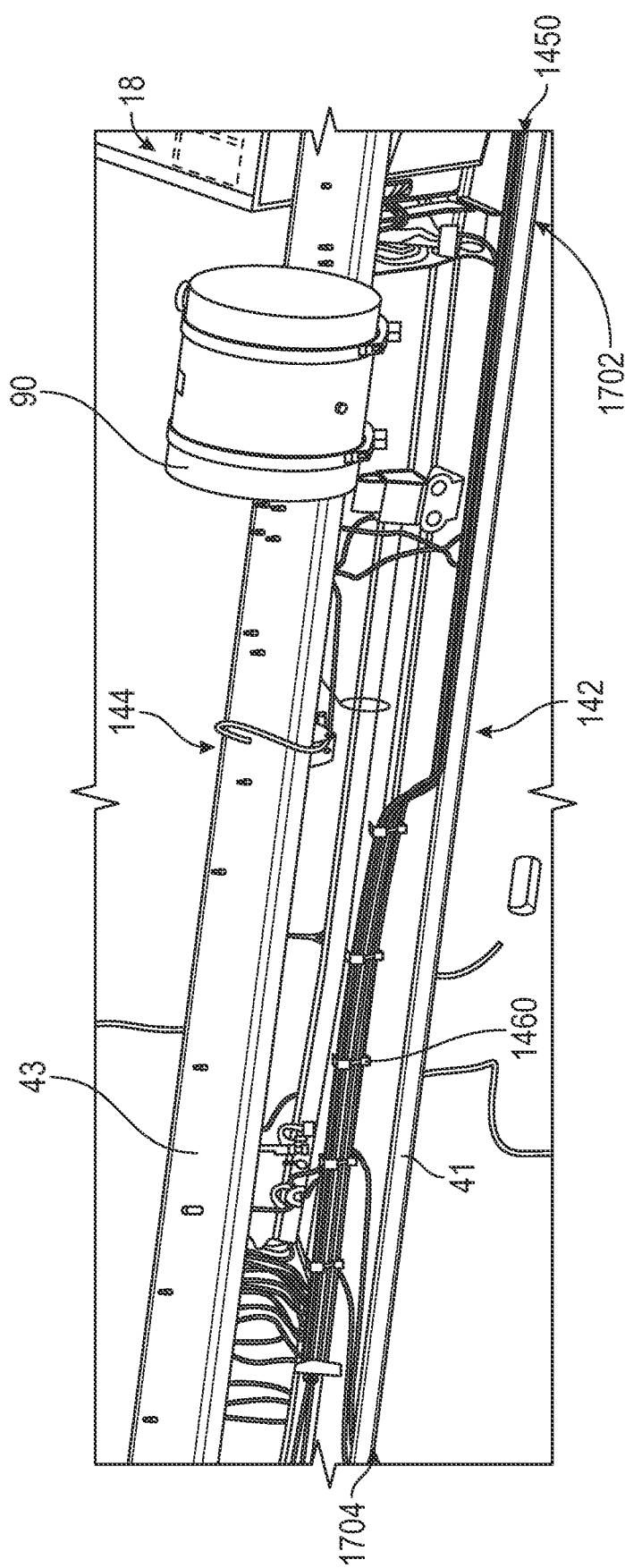

FIG. 17 is a bottom perspective view of the concrete mixer truck 10. As seen along the internal portion of the first frame rail 41, the HVAC hose cluster 1450 extend from a first location 1702 along the internal portion of the first frame rail 41 to a second location 1704. The first location 1702 is positioned near the front pedestal 16 and the cab 18 toward the front end 22. The second location 1704 is positioned along the chassis near the engine 74 and rear pedestal 26. Referring to FIG. 18, a pair of HVAC hoses 1850 extend laterally inward form the HVAC hose cluster 1450 and into the cross-member 1802. In some embodiments, the HVAC hose cluster 1450 provides air conditioning to the cabin of the cab 18 through the pair of HVAC hoses 1850 (e.g., the HVAC hoses 1850 provide refrigerant to the cab 18, the HVAC hoses 1850 are fluidly coupled to an inlet defined by the cab 18, etc.).

Figure 19:
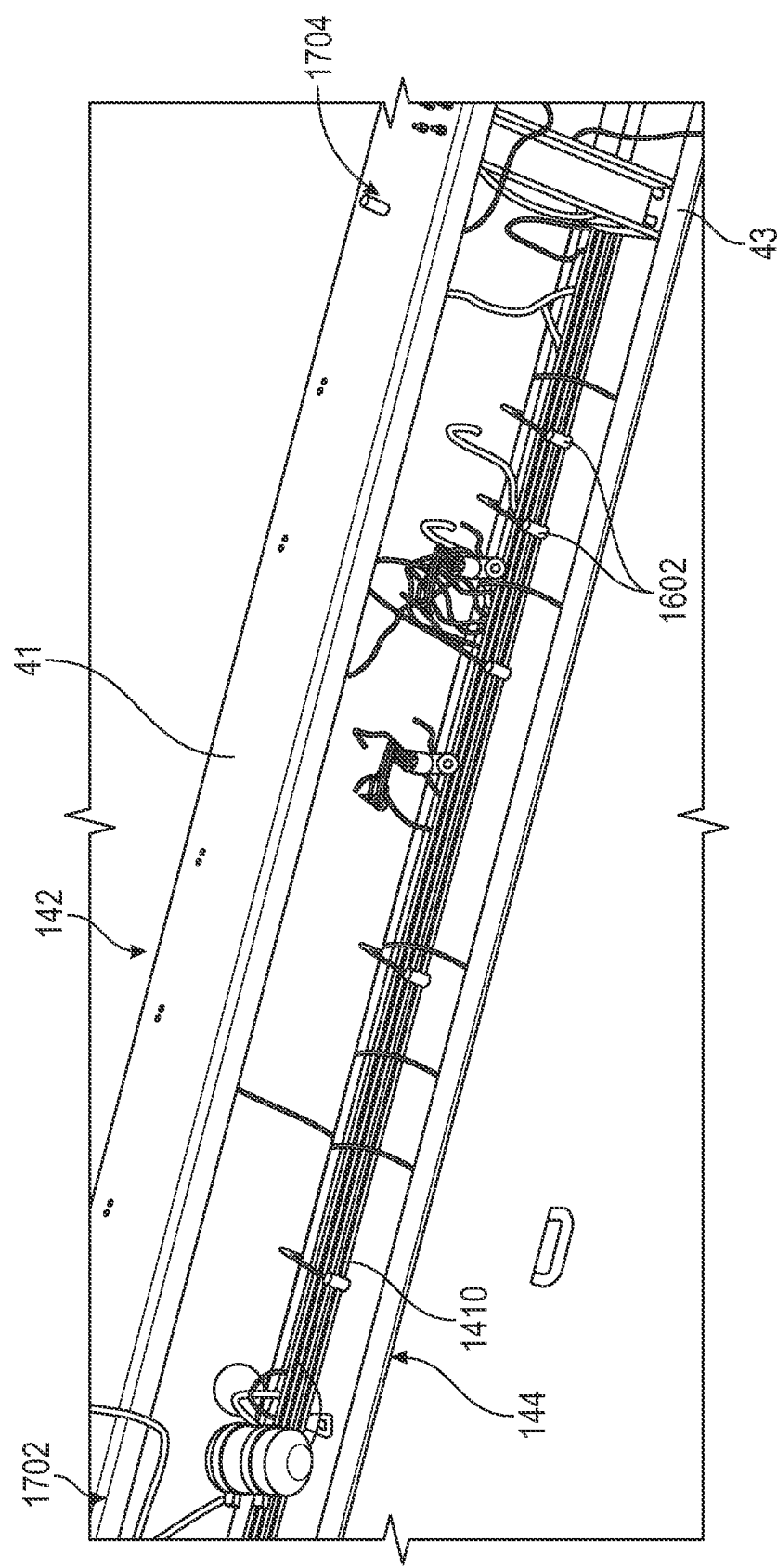

FIG. 19 is a bottom perspective view of the concrete mixer truck 10. As shown, the tube assembly 1410 extends from a first location 1702 along the internal portion of the second frame rail 43 to a second location 1704. The first location 1702 is positioned along the chassis 12 near the front pedestal 16 and cab 18 toward the front end 22. The second location 1704 is positioned along the chassis near the engine 74 and rear pedestal 26. The tube assembly 1410 may not include additional mounting members in between each tube mounting member 1602 to reduce the change of leaks or snags. Referring to FIG. 18, a pair of connectors 1810 extend laterally inward from the tube assembly 1410 toward the center portion of the chassis 12 and into the crossmember 1802. In some embodiments, the pair of connectors 1810 include an electrical wire and a hydraulic conduit and provide electrical energy and hydraulic fluid to components of the concrete mixer truck 10. By providing the connections for a wide variety of components in a predetermined, dedicated location, the routing assembly 1400 provides ease of servicing and management.

Cab

According to an exemplary embodiment, a cab with improved visibility and ergonomics is described. The single occupancy cab may include aluminum extrusions, fiberglass front and roof portions, and a curved windshield configured to increase operator visibility. One or more cab pillars are designed to optimize side visibility, thereby eliminating the need for side windows as found in conventional cab designs. A control panel (e.g., dash) is more compact than traditional control panel designs to increase windshield surface area—and therefore increase visibility—without sacrificing required controls. An overhead console is raised to further increase the windshield surface area and, in turn, the viewing area of the operator. Beneficially, the increased visibility improves operator control and comfort by minimizing blind spots and extraneous cab space compared to convention cab designs.

According to an exemplary embodiment, one or more aspects of the cab are configured to accommodate an operator and operation of the concrete mixer truck. The cab floor plan is configured to provide greater surface area of the floor space by removing extraneous frame rails, including a top flange of the frame rail, and altering the geometry of the floor compared to conventional floor layouts by altering the size of door components. The cab door is larger than conventional cab doors to provide greater clearance and comfort to the entrance and exit of operators through the cab. A removable panel is implemented that provides structural support for an interior panel and is coupled to an interior handle and window regulator. Front cab pillars are configured to receive a curved windshield and minimize obstruction of the side views of the operator. The windshield is curved to provide a greater longitudinal length of the dash. A number of electrical modules and wire harnesses are disposed within a storage space (e.g., a cabinet) on a right side of the cab thereby facilitating a greater range of positioning for the seat and ease of access compared traditional cabs that dispose electrical modules and wire harnesses in a door panel. An HVAC unit may be disposed on the right hand side of the cab such that the heat and air conditioning cores run parallel with the frame rails. Beneficially, the orientation and location allow for ease of service of the cores, blowers, and other components, and for removal of the filter element.

Figure 26:
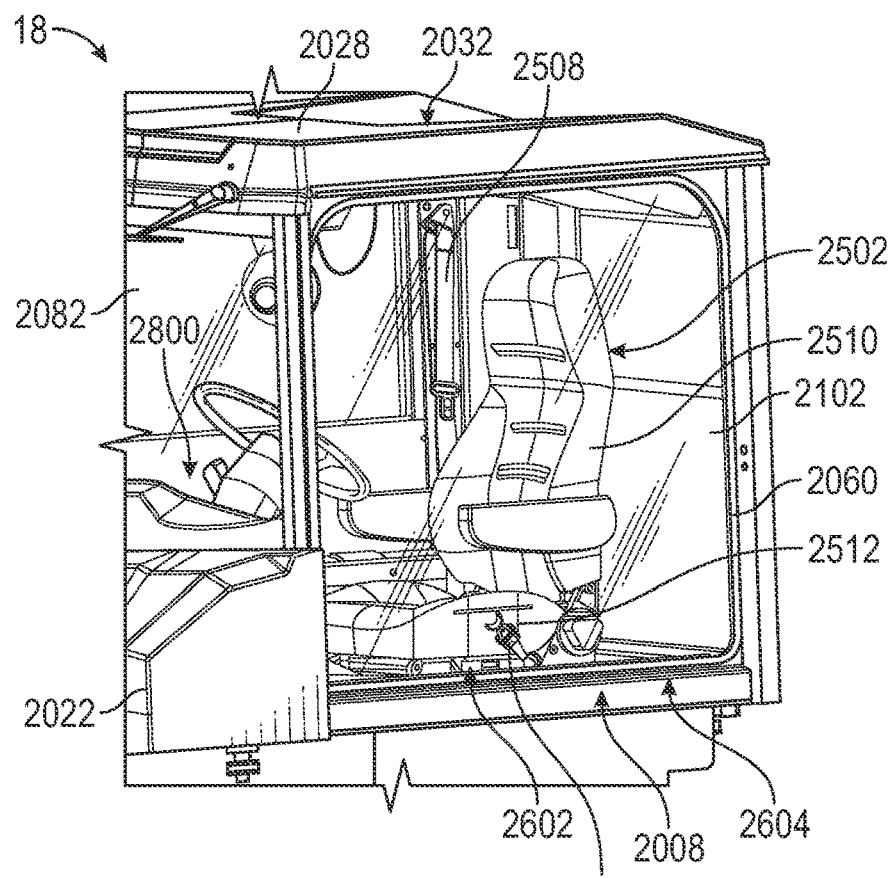
FIGS. 26-29 are various views of an internal cabin within the cab of FIGS. 20-22, according to an exemplary embodiment.
Figure 27:
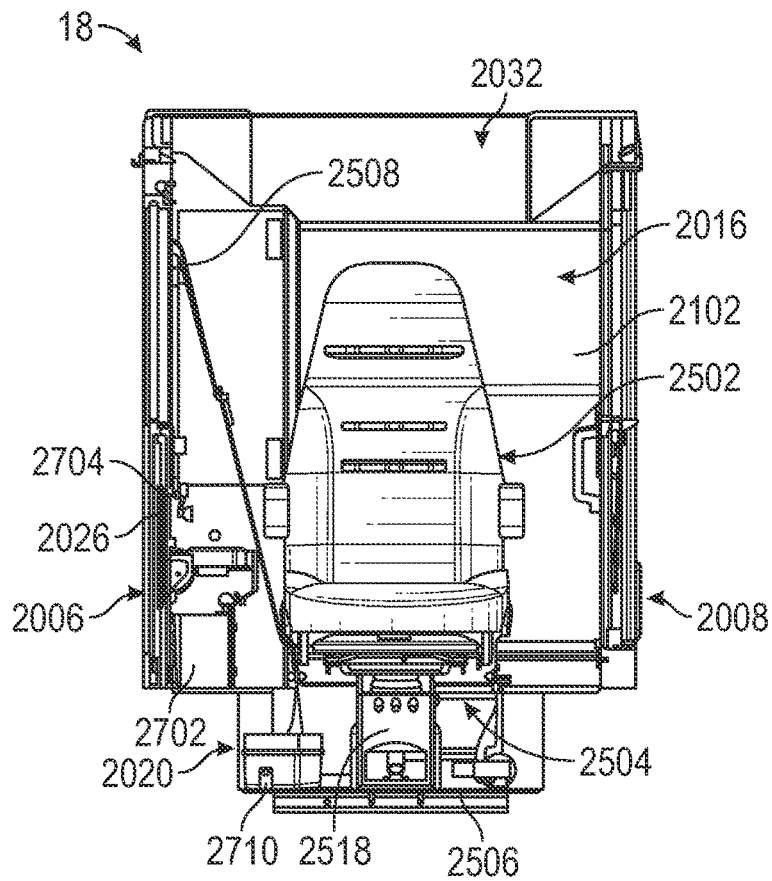

Referring to FIGS. 20, 21, and 53-73, the cab 18 is shown according to an exemplary embodiment. The cab 18 has a front end 2002, a rear end 2004 disposed longitudinally rearward from the front end 2002, a top end 2010, a bottom end 2012 disposed vertically below the top end 2010, a first end 2008 (e.g., a left side) adjacent the first lateral side 142, and a second end 2006 (e.g., a right side) laterally offset from the first end 2008 and positioned adjacent the second lateral side 144. A cab frame 2014 includes a bottom portion 2020, a hood 2022, a roof 2028, a door frame 2060, a first window frame 2062, a second window frame 2064, a first pillar 2050, and a second pillar 2052. The cab frame 2014 forms an internal cabin 2016 (e.g., an internal volume, a cabin volume, a passenger compartment, etc.) which contains operator components (e.g., user interfaces, a steering wheel, seats, pedals, etc.). The bottom portion 2020 is disposed adjacent the bottom end 2012 and forms the bottom portion of the cab frame 2014. As shown in FIGS. 26 and 27, the bottom portion 2020 includes an internal cavity 2504 that receives a seat 2502 (e.g., operator chair) and form the floor portion 2506 of the cab 18. The bottom portion 2020 is configured to be disposed between the frame rails 40 when the cab 18 is coupled to the chassis 12.

Figure 35:
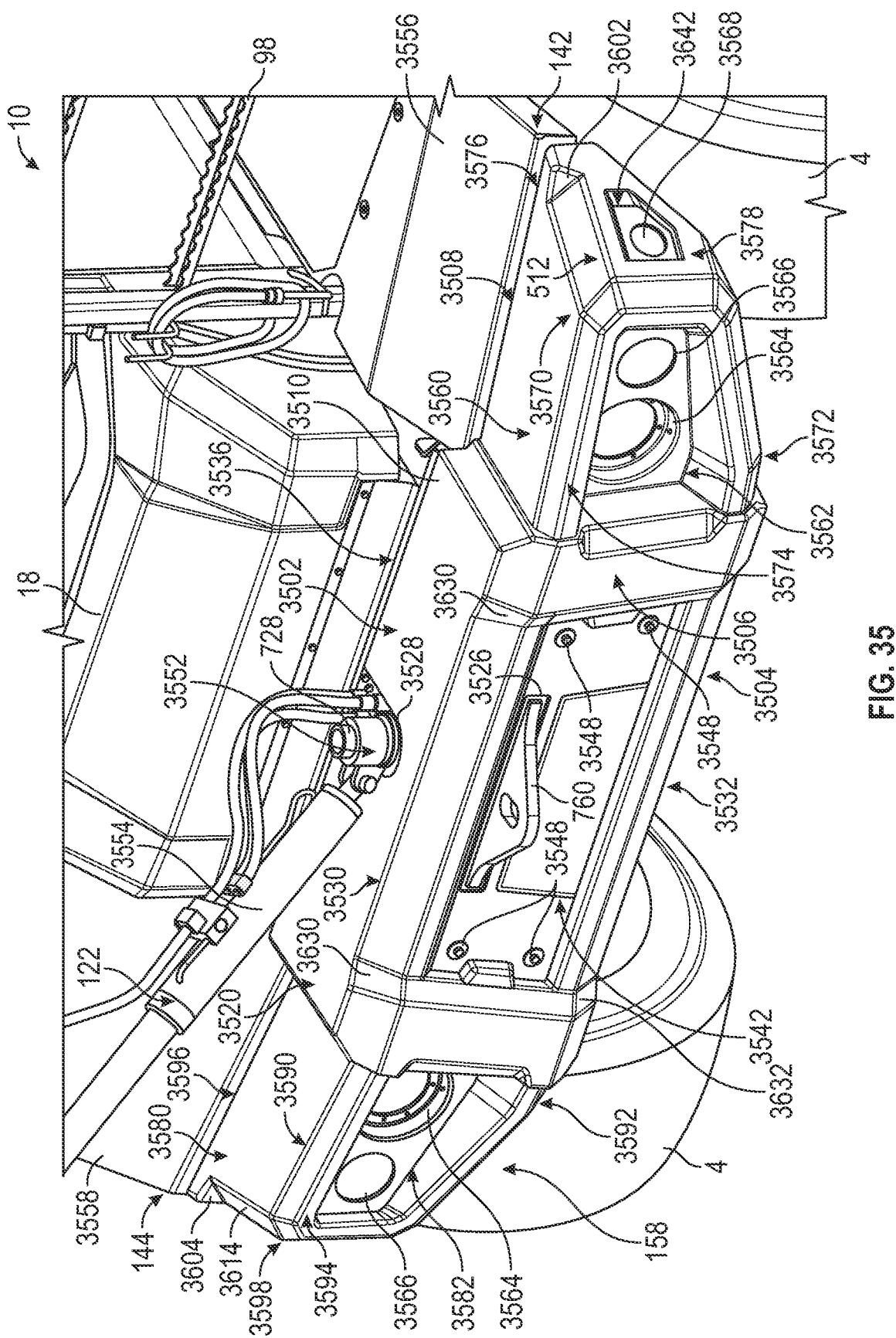
FIGS. 35-41 are various views of a front bumper of the concrete mixer truck of FIGS. 1-3, according to an exemplary embodiment.

The hood 2022 extends from the windshield frame 2046 toward the front end 2002. The hood 2022 may include one or more electrical or mechanical components within. The hood 2022 may be configured to receive a front bumper 158 (e.g., as shown in FIG. 35). The roof 2028 is disposed adjacent the top end 2010 and forms the top portion of the cab frame 2014. The roof 2028 defines a first notch 2030 (e.g., a recess, an indent, etc.) located near the leading edge and a second notch 2032 (e.g., a recess, an indent, etc.) disposed near the trailing edge. The first notch 2030 is configured to provide clearance to a component of the hopper assembly 8. The second notch 2032 is configured to provide clearance for (e.g., not interfere with) the mixing drum 14. The second notch 2032 includes a pair of angled side portions 2036 and an inclined central portion 2034 that are configured to accommodate the round shape of the mixing drum 14. A second window frame 2064 is disposed along the wall 2026 of the cab frame 2014 that extends along the second end 2006. The second window frame 2064 is configured to receive a second window 2082 on the second lateral side 144. The wall 2026 may not be configured to open (e.g., not a door) and forms an end of the internal cabin 2016.

Figure 23:
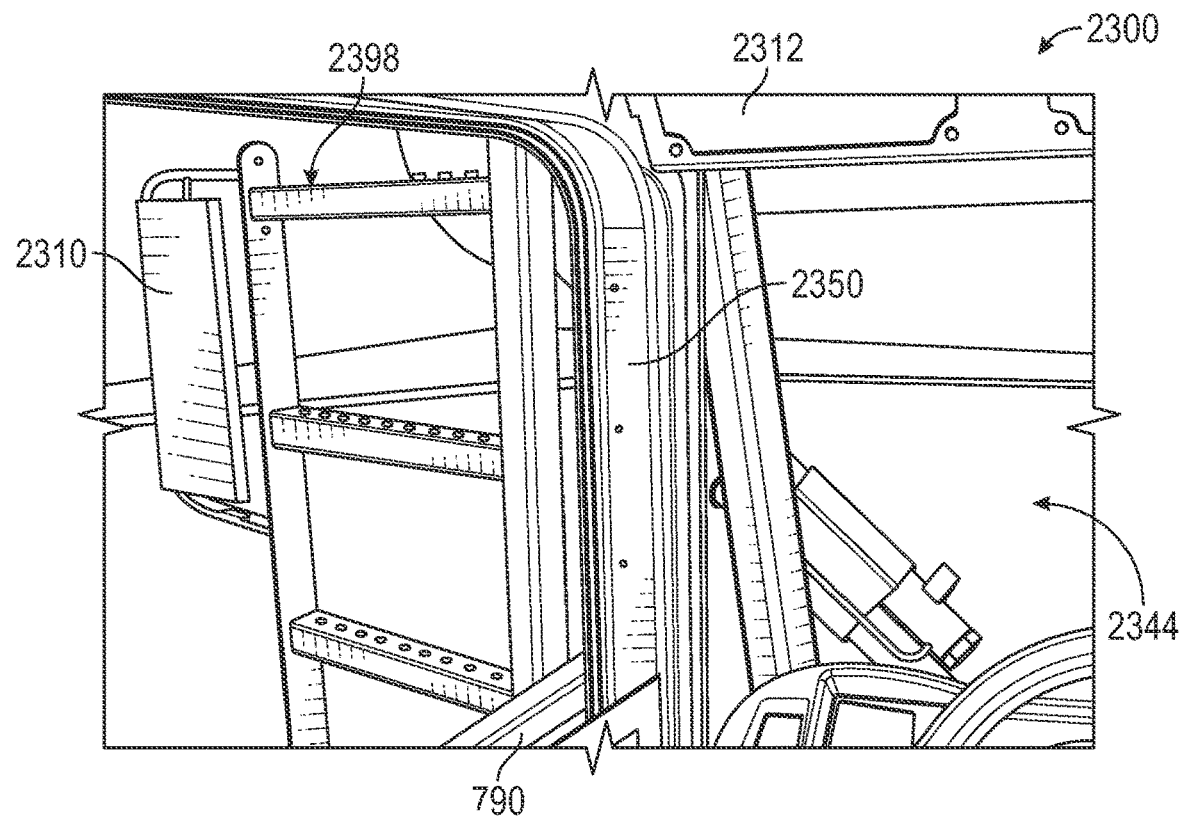
FIG. 23 is an operator view from within an internal cabin of a conventional cab.
Figure 24:
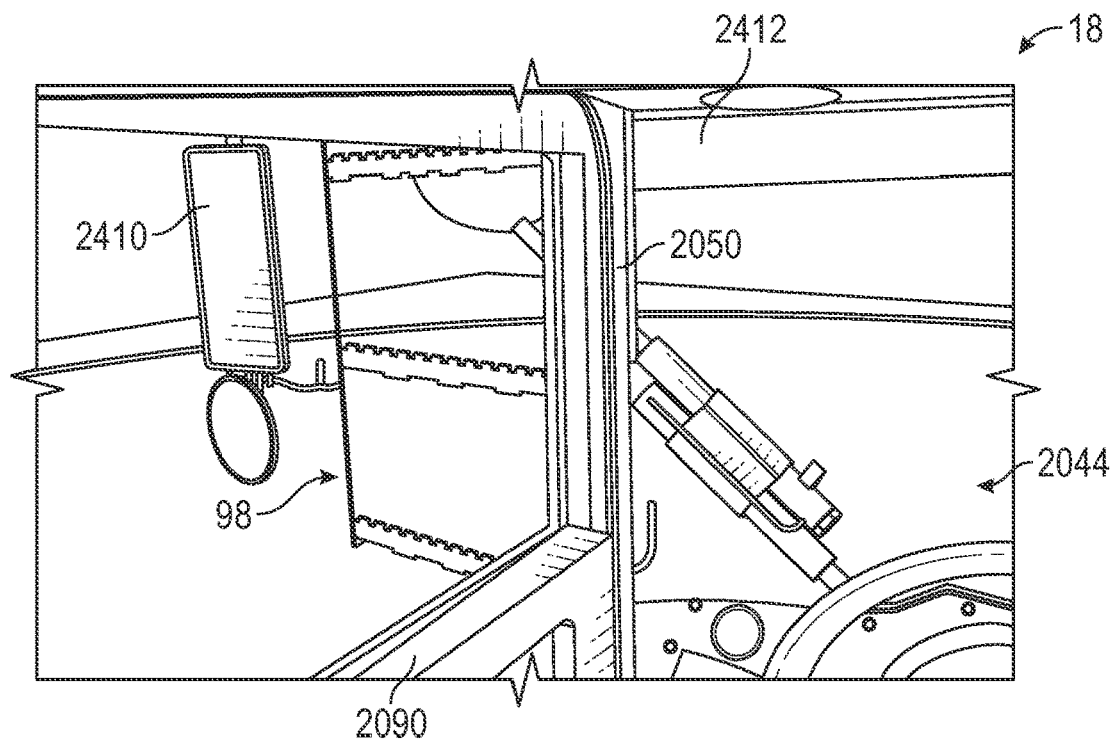
FIG. 24 is an operator view from within an internal cabin of the cab of FIGS. 20-22, according to an exemplary embodiment.

A first pillar 2050 extends from a bottom portion of the roof 2028 substantially vertically downward toward a top portion of the hood 2022. The first pillar 2050 is positioned adjacent the first end 2008. A second pillar 2052 extends from a bottom portion of the roof 2028 substantially vertically downward toward a top portion of the hood 2022. The second pillar 2052 is substantially parallel to the first pillar 2050 and is adjacent the second end 2006. The first pillar 2050 and the second pillar 2052 have a reduced width that improves visibility for an operator in the internal cabin 2016 compared to conventional cab designs that obstruct more of the operator's view. As shown in FIG. 23, a conventional cab 2300 includes a first pillar 2350, a ladder 2398, and a door 790. This arrangement obstructs a relatively large portion of an operator's view through a windshield 2344 and out of a side window. Additionally, the pillar 2350 and the ladder 2398 are positioned such that the side mirror 2310 has an orientation that produces a relatively large number of blind spots. The conventional cab 2300 further includes a relatively tall overhead console 2312. In contrast, the cab 18 is shown in FIG. 24. In the cab 18, the first pillar 2050 and a ladder 98 are configured to obstruct relatively less of the operator's view. The orientation of the side mirror 2410 of the cab 18 produces relatively fewer blind spots. The internal cabin 2016 of the cab 18 includes a shorter overhead console 2412 than the overhead console 2312 of the conventional cab 2300. Accordingly, an operator in the cab 18 can see through more of the windshield 2044 than an operator in the conventional cab 2300 looking through the windshield 2344.

Figure 22:
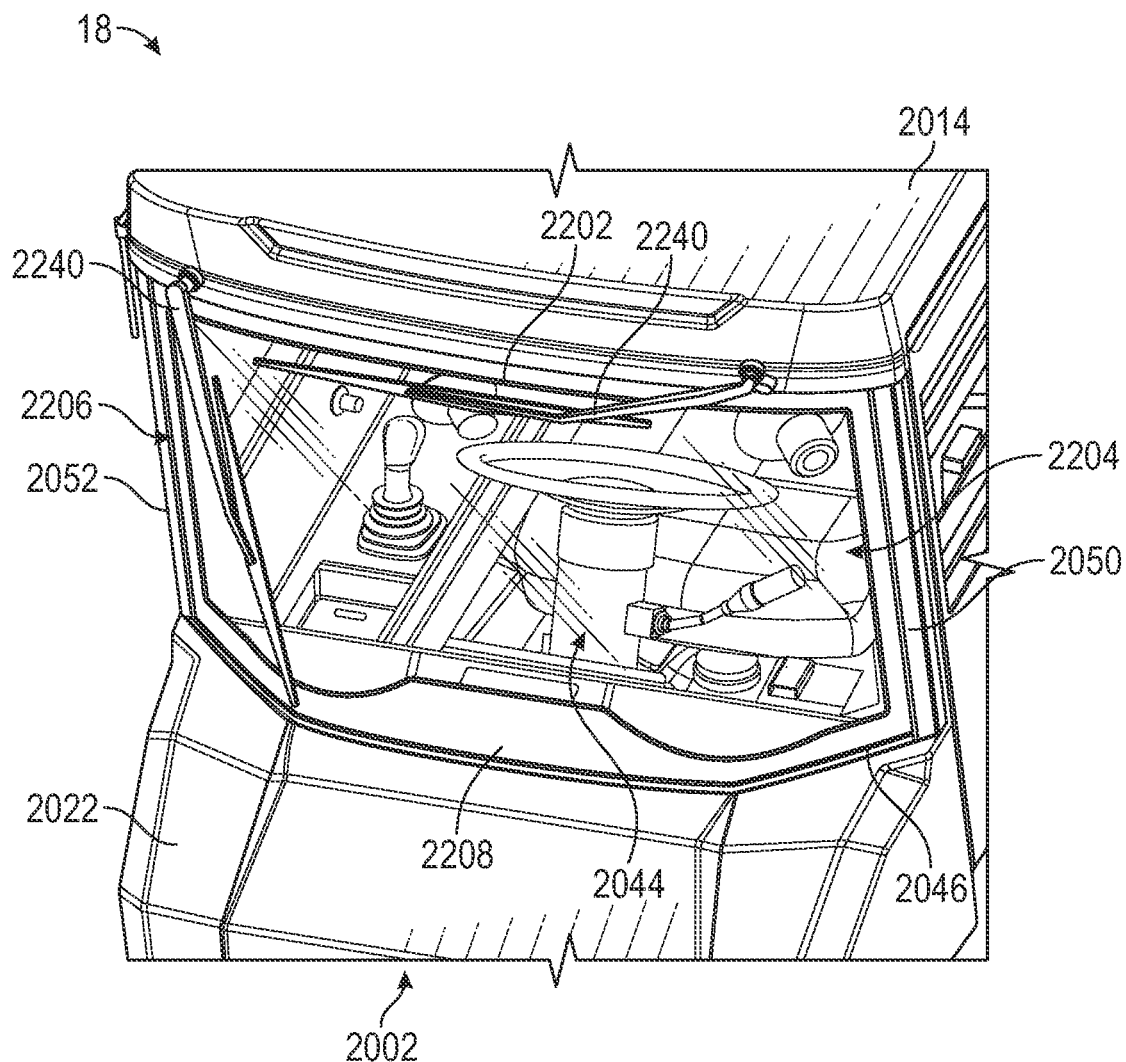

Referring to FIG. 22, the first pillar 2050 and the second pillar 2052 are configured to receive the windshield 2044 therebetween. In some embodiments, a windshield frame 2046 that is similarly shaped to the windshield 2044 extends around the front face of the cab frame 2014 and couples the windshield 2044 to the cab frame 2014. The windshield 2044 is a single piece that includes a first curved portion 2204, a second curved portion 2206, and central portion 2202 disposed between the first curved portion 2204 and the second curved portion 2206. The bottom portion of the central portion 2202 has a sloped portion 2208 that slopes toward the front end 2002 to provide space for an instrument panel 2380 (e.g., shown in FIG. 28). Beneficially, neither the windshield 2044 nor the cab frame 2014 have a front corner structure that is found in conventional cabs. In some embodiments, the windshield maintains an 8" raid to prevent visual distortion and manufacturing issues. A pair of windshield wipers 2240 are pivotally coupled to the cab frame 2014 and configured to remove fluid from an outer portion of the windshield 2044.

Figure 25:
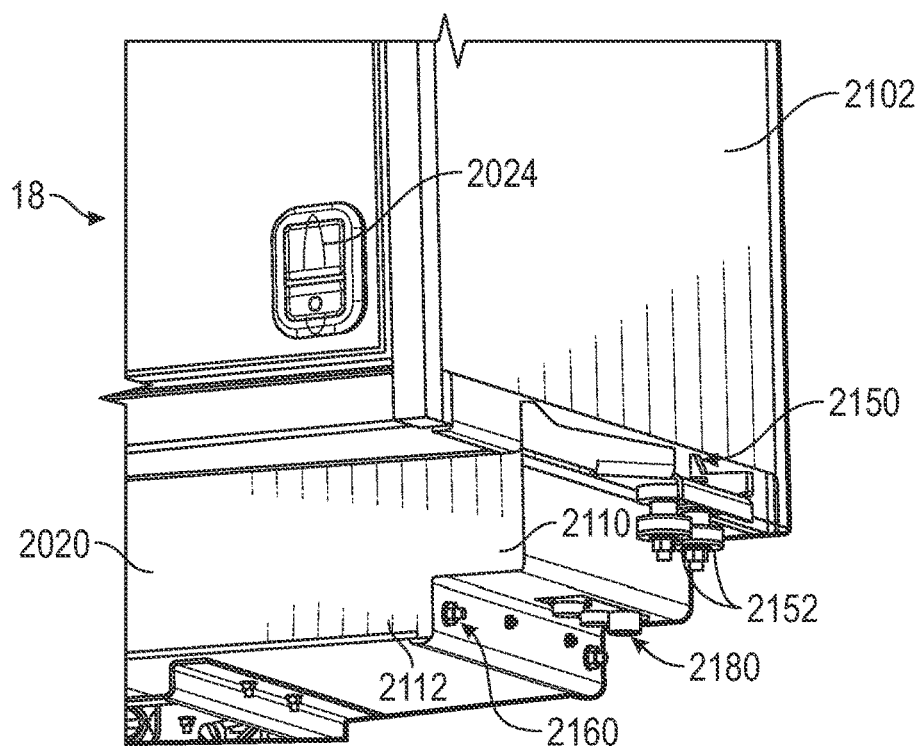
FIG. 25 is a perspective view of a portion of the cab of FIGS. 20-22, according to an exemplary embodiment.

Referring to FIG. 25, a rear perspective view of the cab 18 is shown. A rear cab mount isolator member 2150 including a pair of rear cab mount isolators 2152 extends from a bottom portion of a rear wall 2102 of the cab frame 2014 downward away from the cab 18. The rear cab mount isolators 2152 are configured to couple the cab 18 to the frame 28, the frame rails 40, or another portion of the chassis 12. The rear cab mount isolator member 2150 includes mounting bolts that are accessible from the exterior when installing or removing the cab 18. An electrical bulkhead 2180 extends from the internal cabin 2016, through a surface on an upper section 2110 of the bottom portion 2020. The electrical bulkhead 2180 is configured to route power and data from a location inside the internal cabin 2016 to another location along the concrete mixer truck 10 outside of the internal cabin 2016. In some embodiments, the electrical bulkhead 2180 includes connections that are incorporated into a bracket and located to protect the connections from moisture on the floor portion 2506 from wash water coming down the rear wall 2102 or other surfaces of the cab 18. A seat tether mount 2160 is disposed along a lower section 2112 of the base portion. The seat tether mount 2160 may include one or more fasteners that couple the seat 2502 to the cab frame 2014. In some embodiments, the seat tether mount 2160 incorporated into a bracket with the electrical bulkhead 2180. The upper section 2110 and lower section 2112 are configured to fit along the frame rails 40 and to not interfere with cross members extending laterally along the frame rails 40.

Referring to FIGS. 26 and 27, a side perspective view and a front view, respectively, of the internal cabin 2016 without a door 2090 is shown. The seat 2502 includes a seat bottom 2512 configured to support an occupant's bottom and a seat back 2510 configured to support an occupant's back, head, neck, and/or upper back. A seat belt 2508 is located on the second end 2006 of the cab 18 and selectively extends from an upper section of the second end 2006 downward to a seat belt buckle 2608 positioned the seat bottom 2512 adjacent the first end 2008. Positioning the seat belt 2508 on the second end 2006 instead of the first end 2008 allows the door opening (e.g., door frame 2060) to increase in size to facilitate access when entering or exiting the concrete mixer truck 10. The seat 2502 may be movable along the longitudinal direction between a first position 2602 located proximate a dash 2800 and a second position 2604 proximate to the rear wall 2102 to facilitate unobstructed movement of the occupant throughout the internal cabin 2016. The seat bottom 2512 may be rotatably coupled to the floor portion 2506 by a seat assembly coupling member 2518 (e.g., a frame). The seat assembly coupling member 2518 permits the seat 2502 to selectively be translated in the longitudinal direction and rotated left or right (e.g., about a vertical axis) to accommodate instances where the operator is dispensing concrete through the main chute 46.

A second window handle 2704 is disposed on the wall 2026 and is configured to raise and lower the second window 2082. A side dash 2702 (e.g., a user interface) is disposed adjacent to the seat bottom 2512 and the wall 2026. In some embodiments, the side dash 2702 includes one or more components of an HVAC system. The floor portion 2506 is configured to provide more floor space in the occupant's foot area by cutting out the top flange of the frame rail 40 and changing the geometry of the bottom portion 2020. Additionally, the floor portion 2506 is configured to minimize the width of the lower door tube to shorten the step over distance from the fender step to the floor portion 2506. In some embodiments, the floor portion 2506 is configured to reduce the step over distance by 3.6", which is approximately 50% of conventional cabs 2300. The internal area of the bottom portion 2020 may include an emergency material compartment 2710 or container (e.g., containing a fire extinguisher, a first aid kit, etc.).

Figure 28:
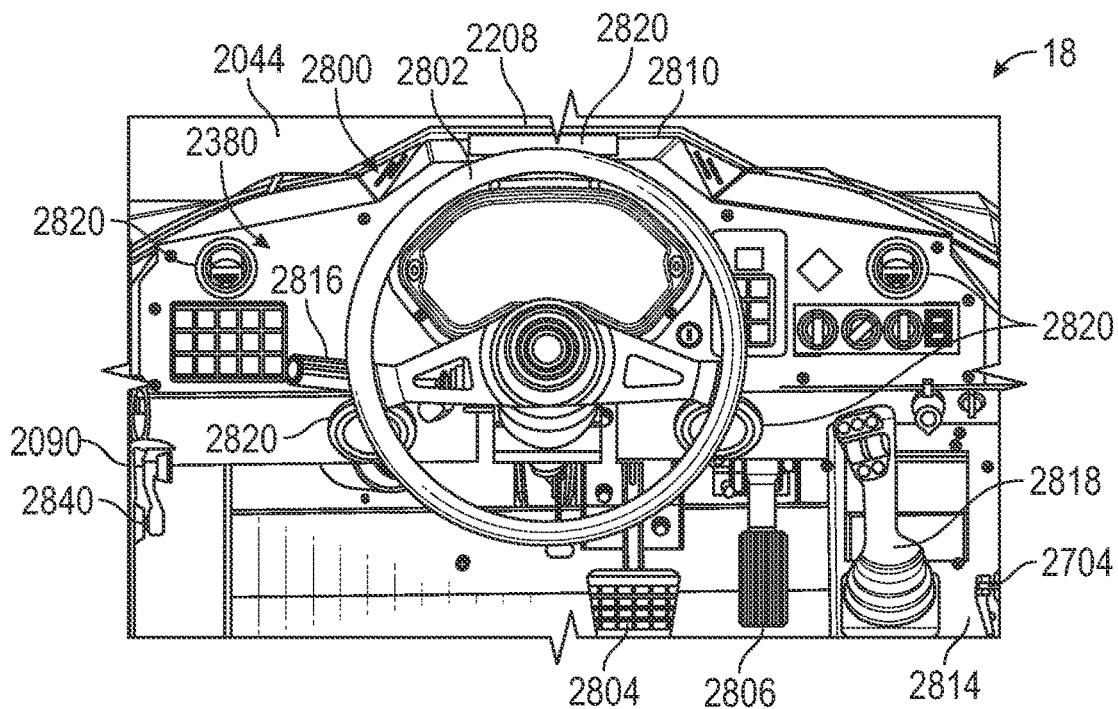
Figure 29:
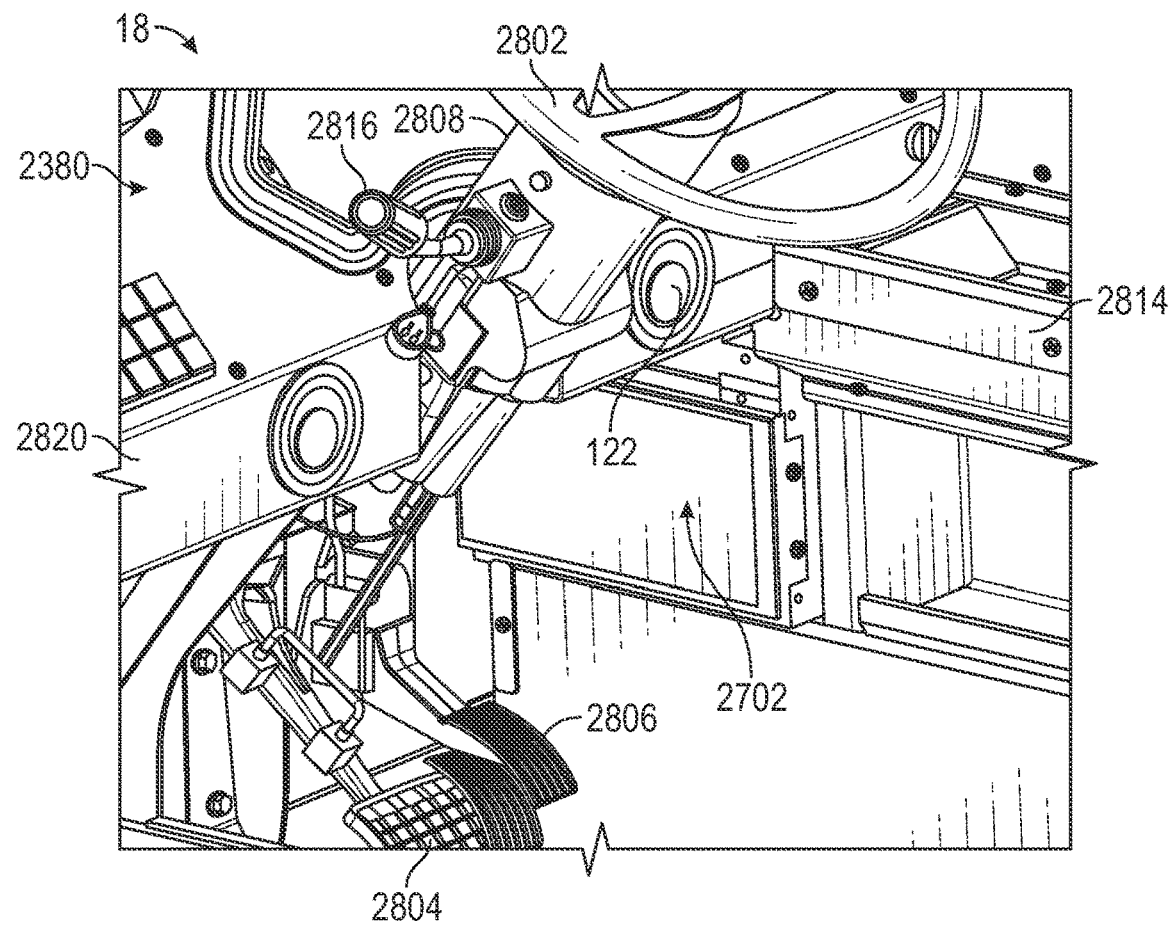

Referring to FIGS. 28 and 29, the dash 2800 (e.g., a user interface) includes an instrument panel 2380. The dash 2800 includes a steering wheel 2802 coupled to a steering column 2808, the instrument panel 2380, a plurality of AC vents 2820, and a sloped portion 2810. The dash 2800 is configured to be shorter compared to conventional dashes, thereby providing a larger area for the windshield 2044 and permitting the operator to view the front bumper 158 when the operator is seated. In some embodiments, the dash 2800 is made of aluminum that is designed to withstand cleaners and a concrete environment. The sloped portion 2810 is configured to match (e.g., have a similar angle to) the sloped portion 2208 that slopes toward the front end 2002 on the windshield. The steering column 2808 includes a lever 2816 (e.g., a shift lever, a turn signal lever, etc.) and includes one or more joints (e.g., universal joints) and shafts. Turning the steering wheel 2802 rotates the universal joints and the shafts, which in turn rotates an input to a steering box or element that actuates the other steering components of the concrete mixer truck 10 to steer the concrete mixer truck 10 in response to an input to the steering wheel 2802. The concrete mixer truck 10 may be controlled by the pressing and depressing of an accelerator pedal 2806 and a brake pedal 2804 disposed near the floor portion 2506. In some embodiments, the instrument panel 2380 may include additional components (e.g., electrical components in a cab area of the vehicle such as dashboard displays, radios, or other components that are configured to enhance operator comfort and monitor/control vehicle operations). These additional components may include radios for communication or entertainment, a camera system configured to provide parking assistance, displays (e.g., dashboard displays for navigation, vehicle speed reporting, health monitoring of electronic equipment, etc.), seat heaters, electric motors for windshield wiper control, an electronic control module for a cruise control system, etc. These components may be disposed between the cab frame 2014 and the internal cabin 2016, may be coupled directly or indirectly to a forward part of the cab frame 2014 proximate to where an operator would be positioned, or may be otherwise positioned along the cab frame 2014.

The side dash 2702 has a top surface 2814 that defines one or more openings and/or includes one or more features to provide accessibility and comfort to the operator, for example, a cup holder, a storage space, and the like. In some embodiments, a joystick 2818 is positioned along the top surface 2814 in a location that is ergonomic and convenient to allow the operator to monitor and control discharge operations with the main chute 46. In some embodiments, the internal portion of the side dash 2702 includes electrical modules and wire harnesses that are packaged therein to allow the seat 2502 slide an additional 1.8 inches. Beneficially, placement of the electrical modules and wire harnesses in the side dash 2702 alleviate the need to store such components in the door 2090.

Figure 30:
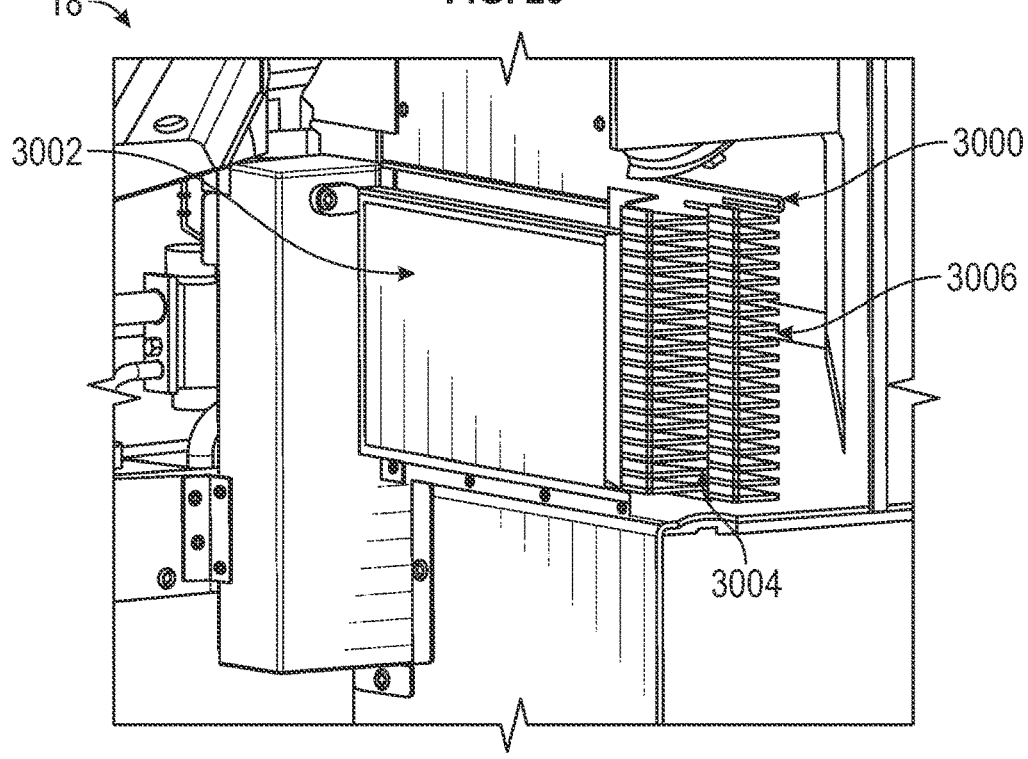
FIG. 30 is a detailed view of a portion of a HVAC system positioned in the internal cabin FIGS. 26-29, according to an exemplary embodiment.
Figure 31:
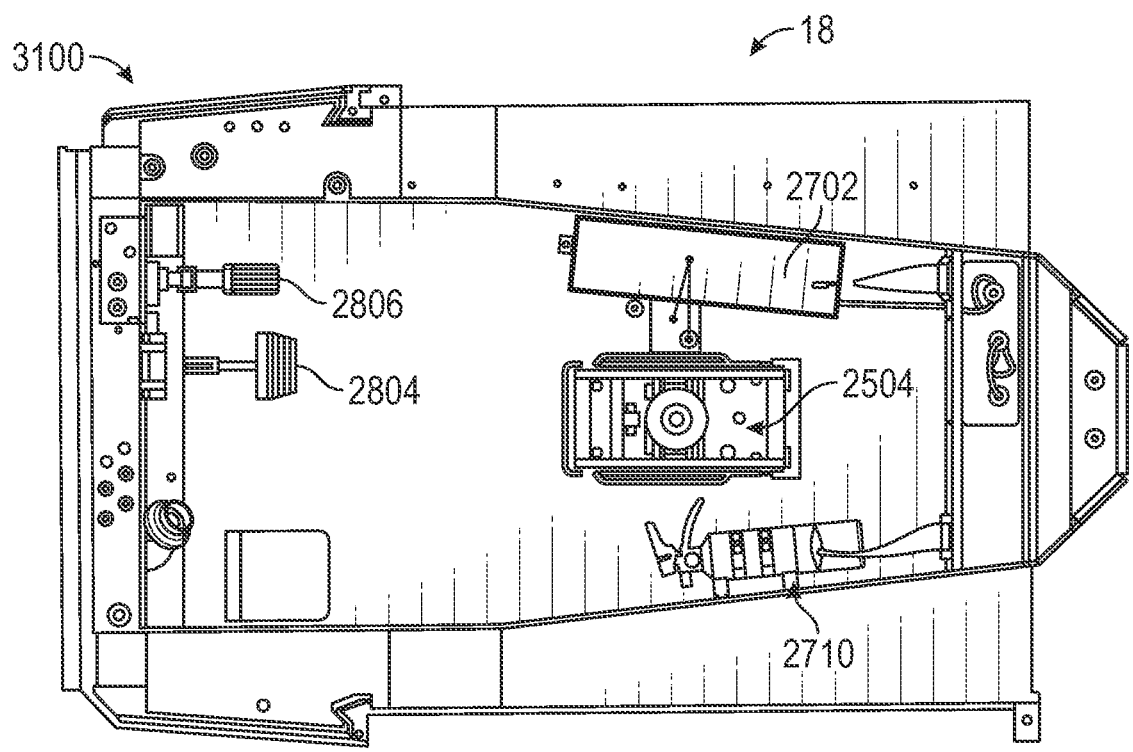
FIG. 31 is a cross-sectional bottom view of the cab of FIGS. 20-22, according to an exemplary embodiment.

In some embodiments, as shown in FIG. 30, the side dash 2702 includes an HVAC unit 3000 that is configured to control the heating and cooling operations within the cab 18. The HVAC unit 3000 includes an air filter 3002, an AC core 3004 (e.g., an evaporator), and a heater core 3006 (e.g., a radiator). The AC core 3004 is accessible without removing the heater core 3006, which allows operators to add AC as a service kit and facilitates service of both the AC core 3004 and the heater core 3006 without removing the HVAC unit 3000. Additionally, the orientation and placement of the HVAC unit 3000 facilitates ease of access to and replacement of the air filter 3002. FIG. 31 is a cross-sectional bottom plan view 3100 of the cab 18.

Figure 20:
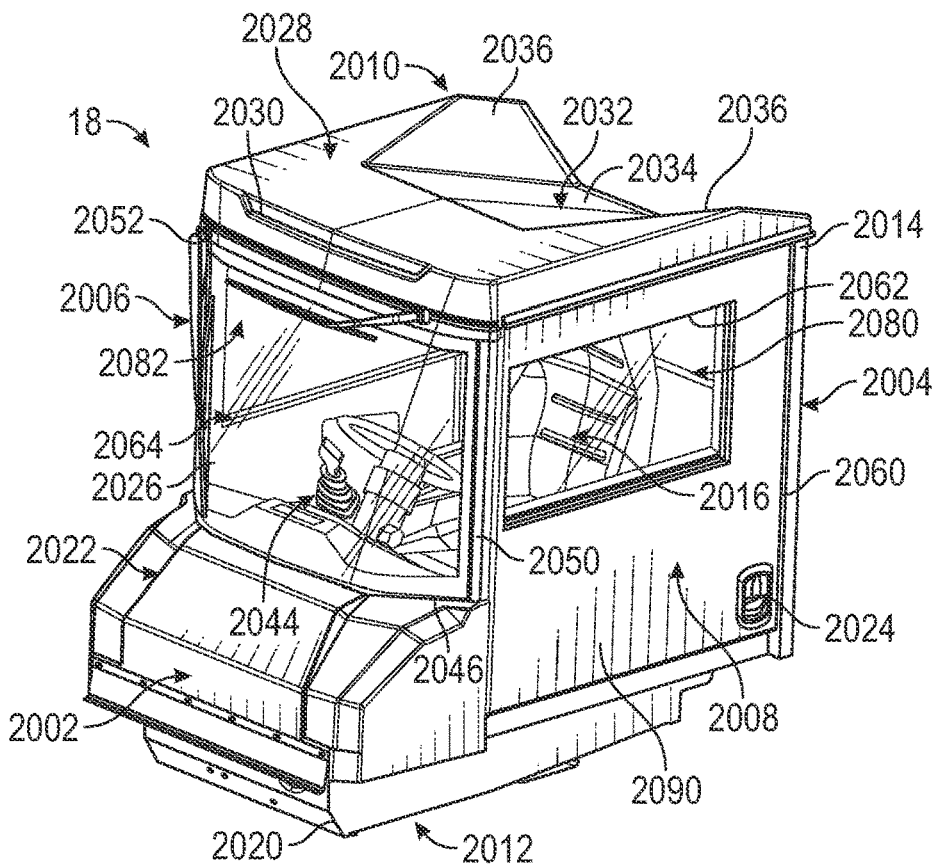
FIGS. 20-22 and 53-73 are various views of a cab of the concrete mixer truck of FIG. 1, according to an exemplary embodiment.
Figure 21:
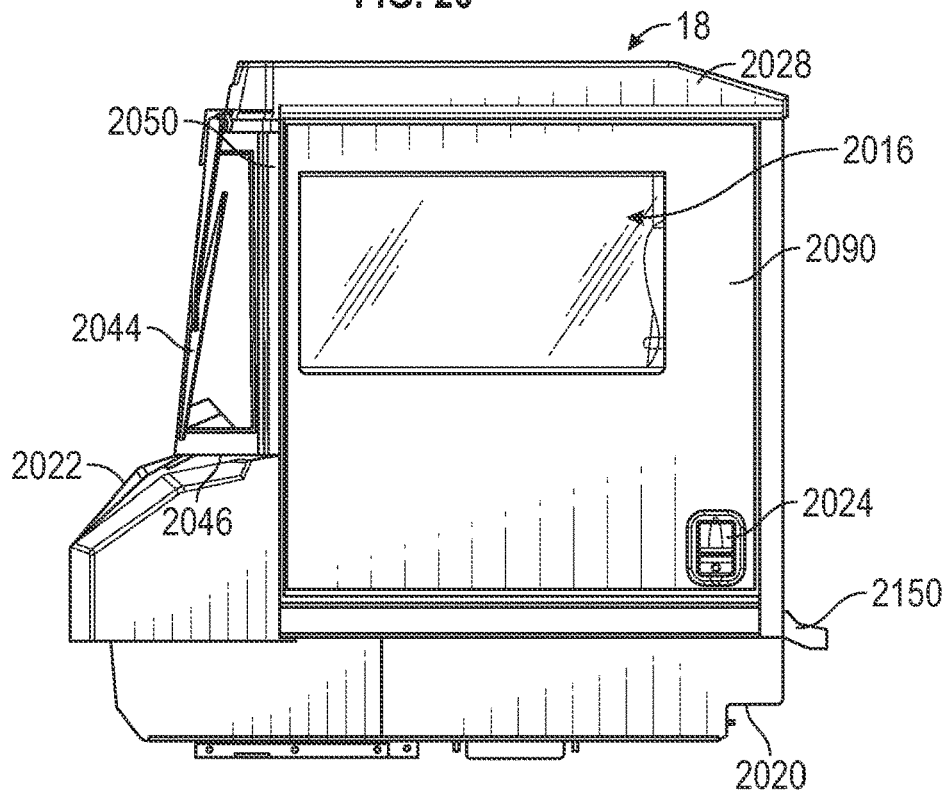
Figure 32:
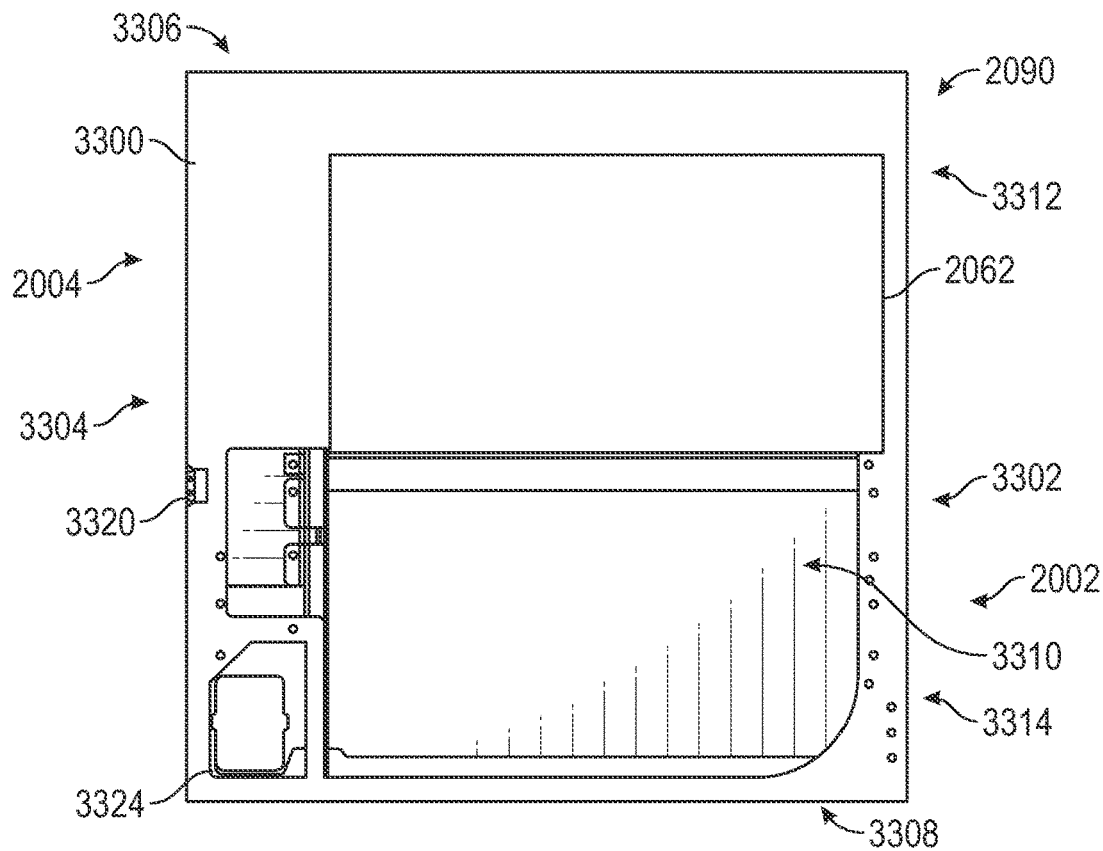
FIG. 32 is an exterior side view of a door of the cab of FIGS. 20-22, according to an exemplary embodiment.

Referring to FIG. 32, the door 2090 has a door frame 3300 a door front end 3302 adjacent the front end 2002, a door rear end 3304 disposed longitudinally rearward from the front door end and adjacent the rear end 2004, a door bottom end 3308, and a door top end 3306 disposed vertically above from the door bottom end 3308. The first window frame 2062 is disposed in a top portion 3312 of the door frame 3300. The first window frame 2062 is configured to receive the first window 2080 or a similar transparent portion (e.g., as shown in FIG. 20). The first window 2080 facilitates the operator seeing out of the side of the internal cabin 2016. In some embodiments, the first window 2080 is made from glass. The first window 2080 is held in place relative to the door 2090 by the first window frame 2062. The first window frame 2062 may clamp the first window 2080, provide a recess in which the first window 2080 resides, fasten to the first window 2080, or otherwise couple to the first window 2080.

The door 2090 is rotatably coupled to the first pillar 2050 or adjacent surface of the cab frame 2014 through a pair of hinges that connect to a set of apertures. In some embodiments, a spring and/or damper is coupled to both the door 2090 and the first pillar 2050 and is configured to provide a damping force and/or a biasing force to assist an operator in opening or closing the door 2090. By way of example, the spring may provide a biasing force to assist the operator in opening the door 2090. By way of another example, the spring may provide a dampening force to prevent the door 2090 from swinging open or closed too quickly.

Figure 33:
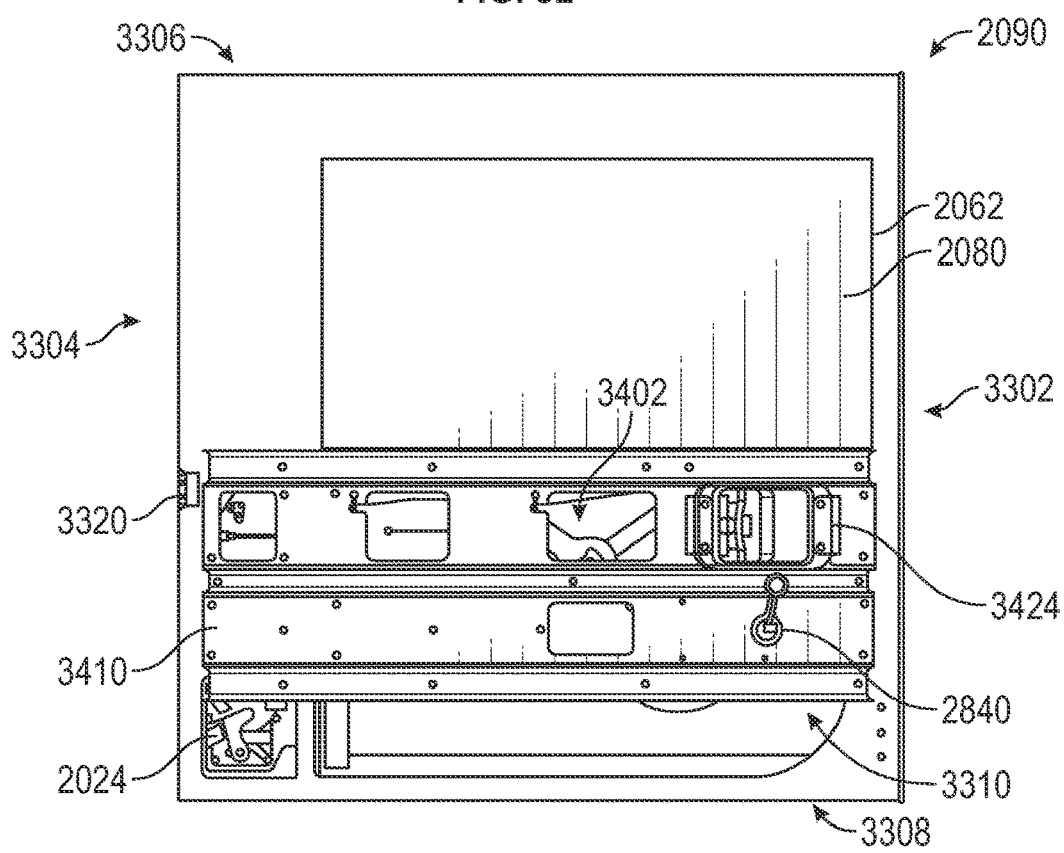
FIG. 33 is an interior side view of the door of FIG. 32, according to an exemplary embodiment.

Referring to FIGS. 32 and 33, the lower portion 3314 of the door frame 3300 includes a door cavity 3310 and a latch assembly frame 3324. The latch assembly frame 3324 is configured to receive a lower latch assembly 2024 or lock assembly. The lower latch assembly 2024 may include a handle that can be pulled to open a latch 3320. The lower latch assembly 2024 may be disengaged (e.g., unlatched) from outside of the cab 18 to selectively provide access to an interior of the internal cabin 2016. In some embodiments, the lower latch assembly 2024 is additionally configured to be selectively locked such that unauthorized access is prevented (e.g., the latch 3320 cannot be moved to an open position unless a user provides an indication of authorization, such as a key). As shown in FIG. 33, a panel 3410 extends from the door front end 3302 to the door rear end 3304 and covers a portion of the door cavity 3310. The panel 3410 is configured to provide structural support for one or more components in or around the door cavity 3310. An upper latch assembly 3424 is coupled to and accessible through a portion of the panel 3410. The upper latch assembly 3424 may include a handle that can be pulled to open the latch 3320. The upper latch assembly 3424 is disengaged from an interior of the internal cabin 2016 to provide access to an exterior of the internal cabin 2016. The latch 3320 is positioned centrally along the door rear end 3304 and is configured to selectively prevent opening of the door 2090. The latch 3320 is operably connected to an access assembly 3402 that is configured to unlatch and latch the latch 3320. The access assembly 3402 includes one or more levers, shafts, paddles, and linkages that transfer motion from the lower latch assembly 2024 and/or the upper latch assembly 3424 to unlatch the latch 3320. The access assembly 3402 may additionally or alternatively transfer motion between the lower latch assembly 2024 and the upper latch assembly 3424. In other words, the upper latch assembly 3424 and the lower latch assembly 2024 are actuated between the engaged and disengaged positions by a series of linkages connected to a link or lever, shown as access assembly 3402. In some embodiments, the access assembly 3402 is coupled to a paddle such that when a handle link in the access assembly 3402 rotates clockwise, the paddle rotates to the engaged (e.g., locked) position and when the handle link in the access assembly 3402 rotates clockwise, the paddle rotates to the disengaged (e.g., unlocked) position. When the latch 3320 is engaged, the door 2090 is unable to be opened, conversely, when the latch 3320 is disengaged, the door 2090 is able to swing open freely.

Figure 34:
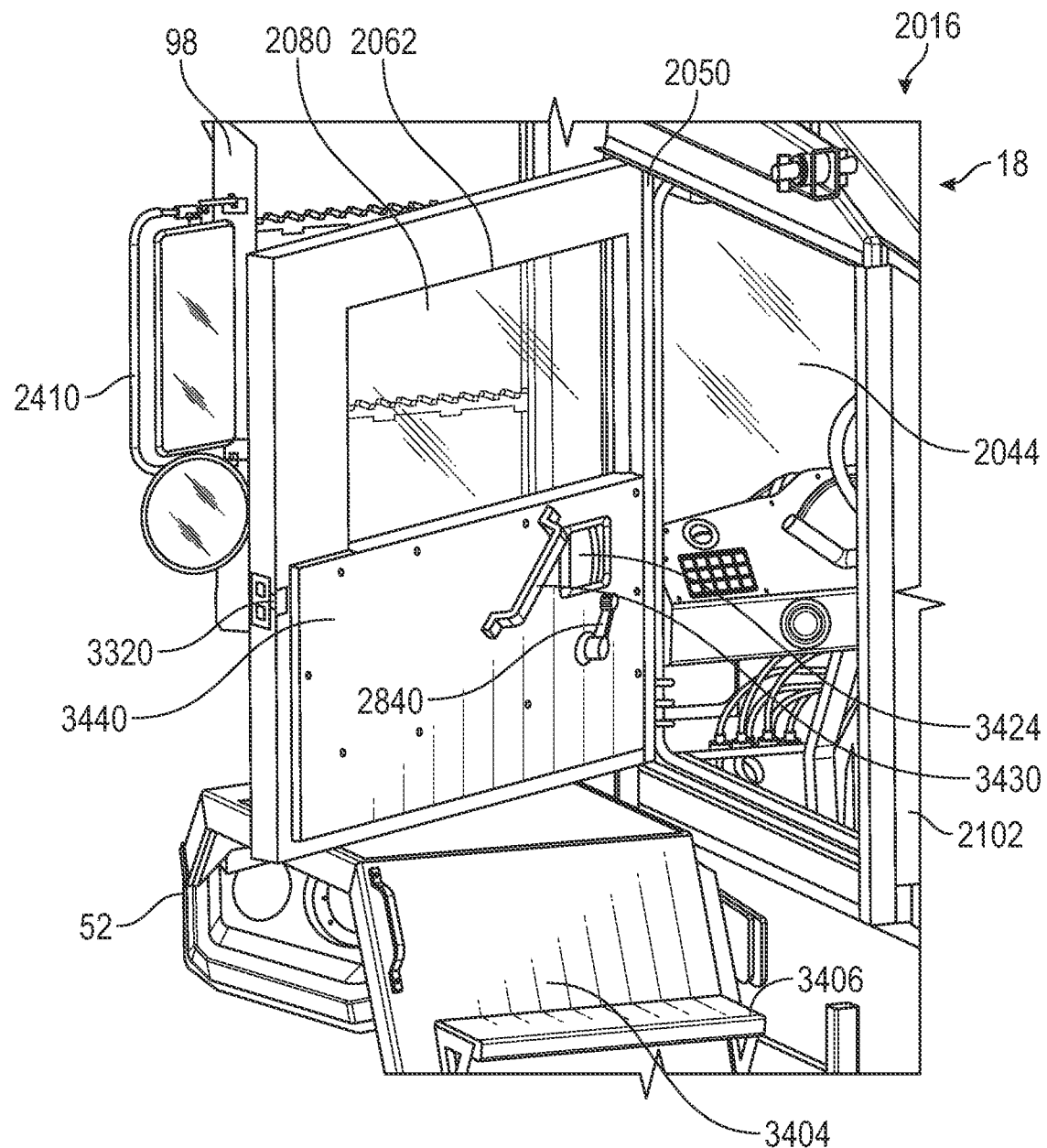
FIG. 34 is a rear perspective view of the door of FIGS. 32 and 33 coupled to the cab of FIGS. 20-22 in an open position, according to an exemplary embodiment.

As shown in FIG. 33, a panel 3410 extends from the door front end 3302 to the door rear end 3304 and covers a portion of the door cavity 3310. A first window handle 2840 is disposed on the panel 3410, toward the door front end 3302, and is configured to raise and lower a window within the first window frame 2062. Referring to FIG. 34, a plate 3440 or panel is installed over the lower portion 3314 of the door frame 3300 such that only the first window handle 2840, the upper latch assembly 3424, and a grip 3430 (e.g., a handle) are accessible from an interior side of the door 2090. The grip 3430 is an interface member that provides an operator with an interface through which to apply a pulling or pushing force to open or close the door 2090. As shown, the grip 3430 extends from the interior surface of the door 2090, forming a loop. The grip 3430 may also be used to support an operator entering the cabin by climbing a step 3406 along a wheel frame 3404. The plate 3440 and panel 3410 may be removable to facilitate access to the components in the door cavity 3310. In some embodiments, the door 2090 is fully sealed and implements aluminum extrusions. In those embodiments, a center extrusion may be configured to keep water out of the area that houses the lower latch assembly 2024 and other components to prevent corrosion issues. Linkages of the access assembly 3402 may be sealed with grommets to prevent water from entering the door 2090.

Bumper

As a general overview, the front bumper 158 is formed as a unitary, single piece. Due to the single piece design, the front bumper 158 eliminates the need for the assembly of deck plates, steering gear covers, and other multi-component bumper assemblies. This provides for the simplified installation and removal of the front bumper 158, improving accessibility and serviceability to steering gears and hydraulic components of the concrete mixer truck 10. The front bumper 158 is mounted directly to the front cross-member 700. The front bumper 158 includes outer corners and sides that are chamfered and that extend rearward to increase clearance during turns and while operating other components near the front bumper 158. The front bumper 158 is configured to provide sufficient clearance to allow for a full 180-degree swing of the main chute 46 in a lowered state (e.g., a dispensing position). The front bumper 158 incorporates surfaces that are angled downward and configured to shed water and concrete debris to prevent damage and buildup of material, dirt, concrete, or other debris. The front bumper 158 includes a plurality of light surfaces and apertures that are recessed to protect the lights disposed therein from debris.

Figure 37:
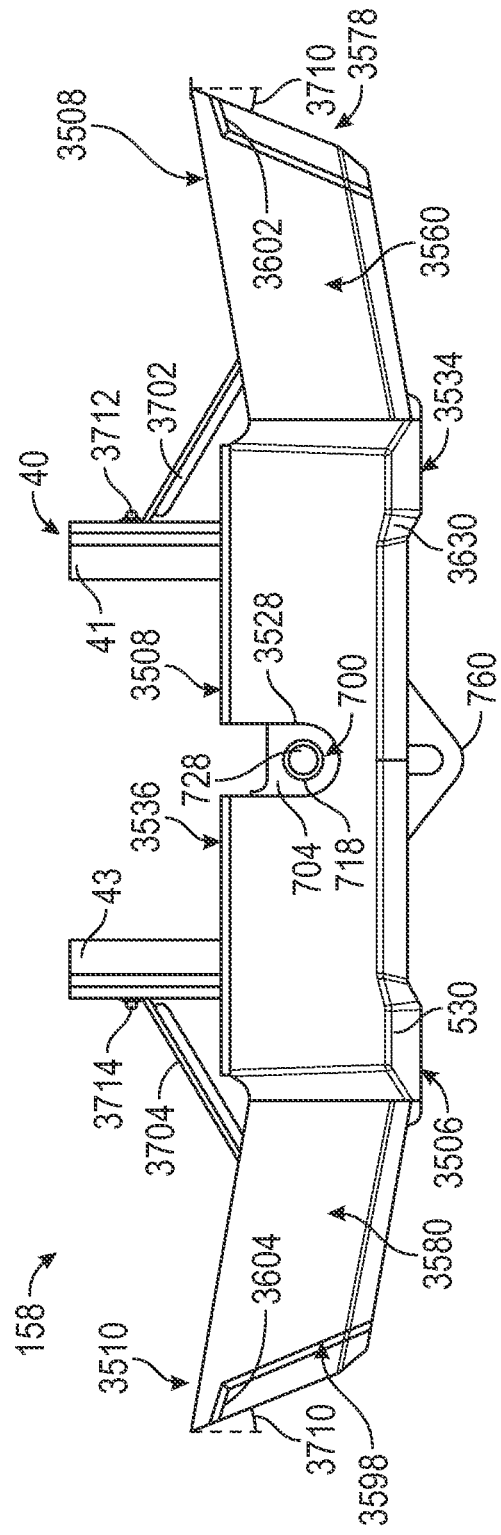
Figure 38:
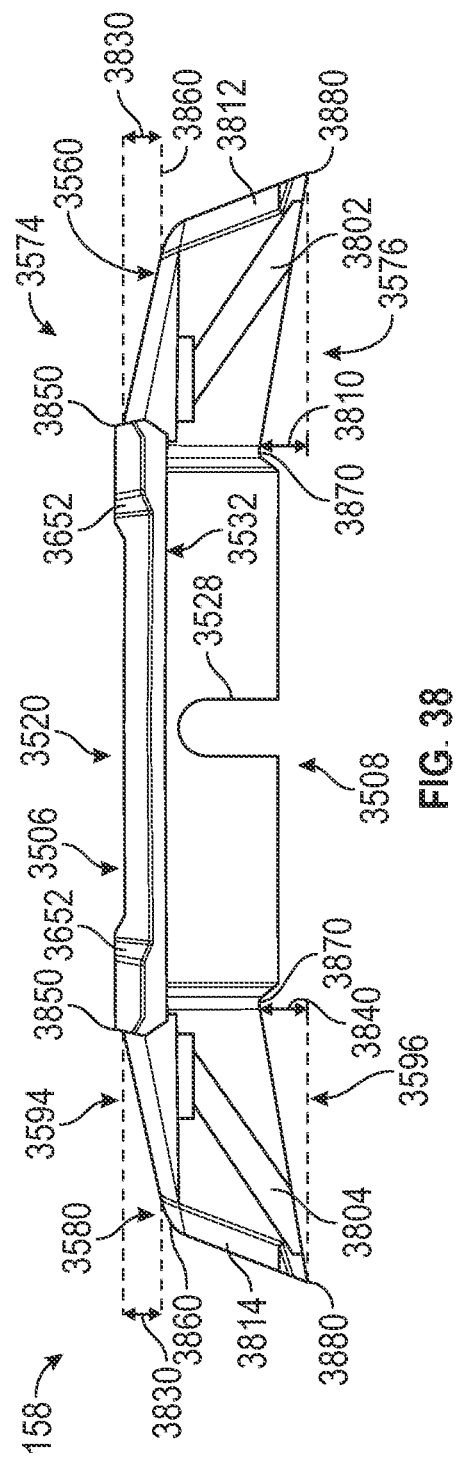
Figure 39:
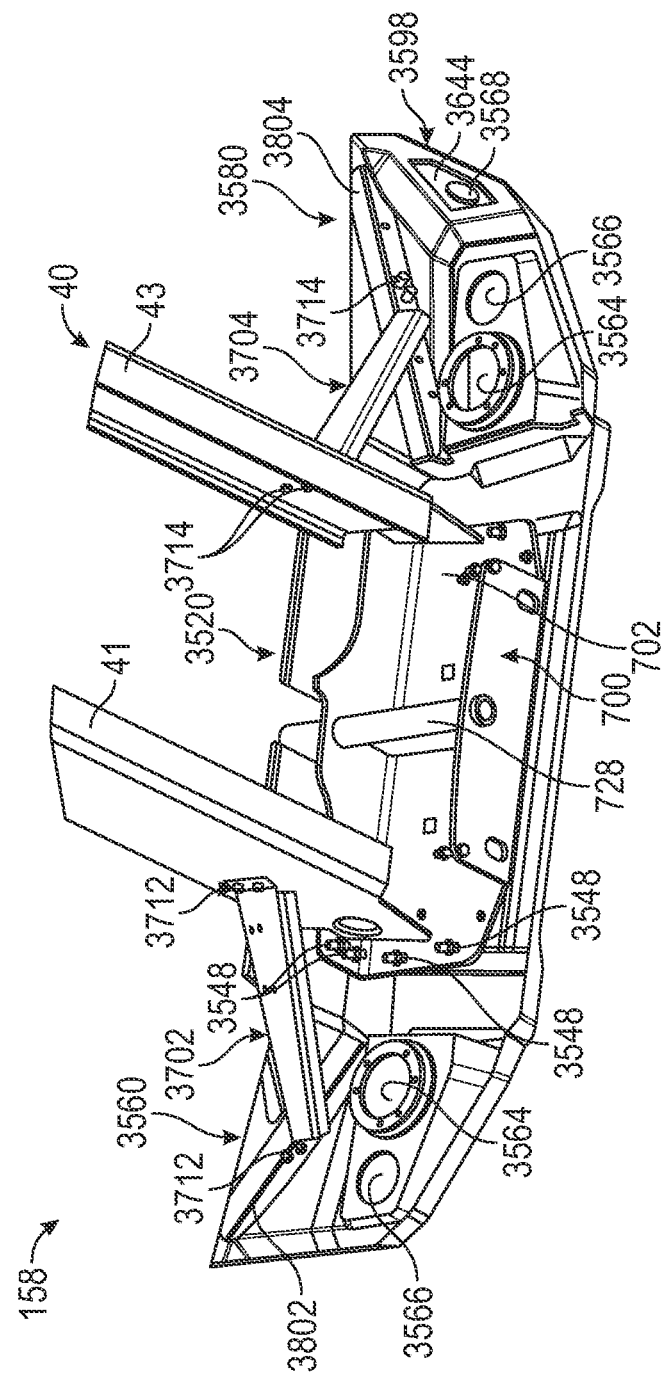
Figure 42:
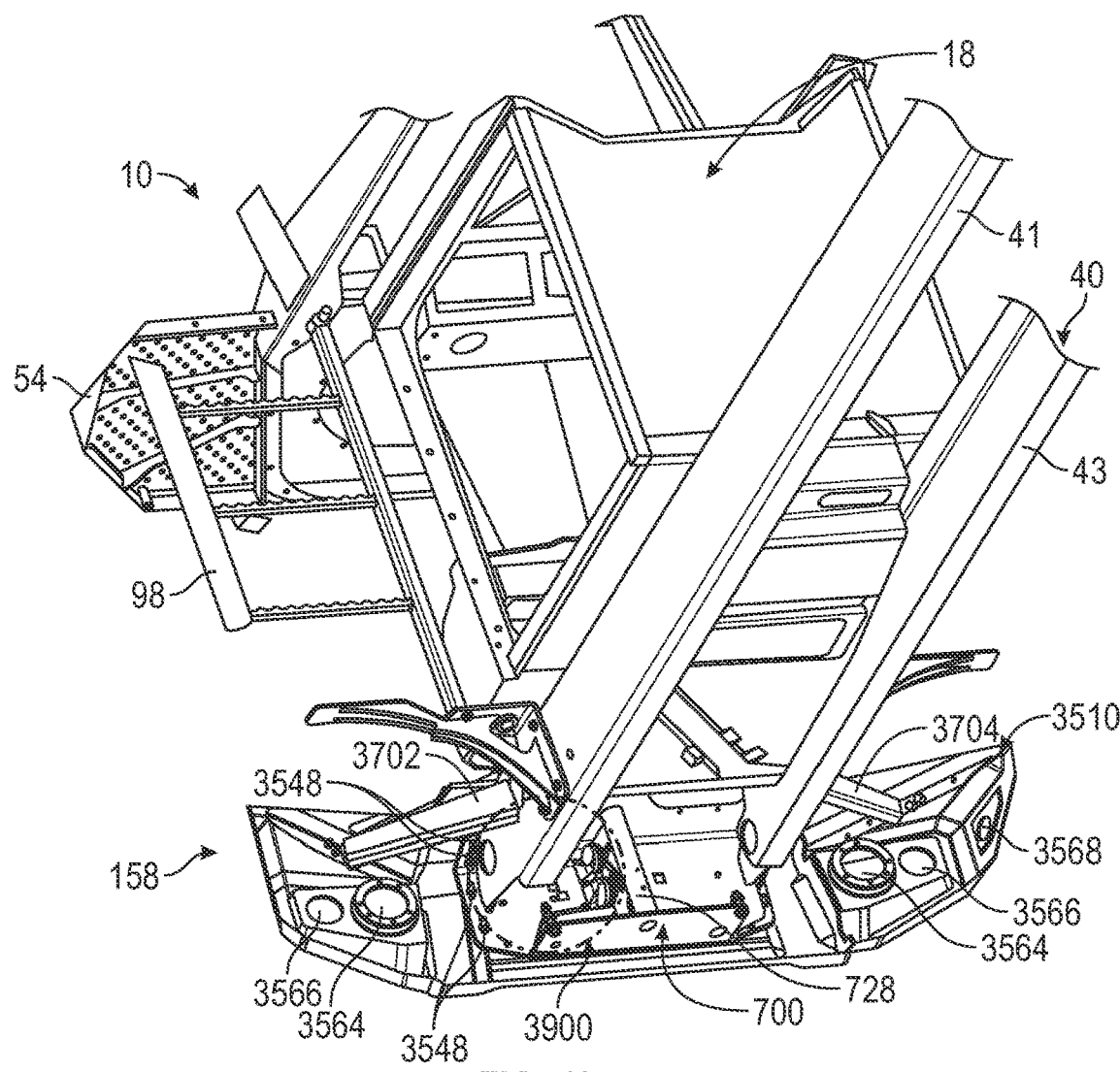
FIG. 42 is a rear perspective view of the front bumper of FIGS. 35-41 with a noise emitting system, according to an exemplary embodiment.

Referring now to FIGS. 35-42, the front bumper 158 is shown, according to an exemplary embodiment. Contrary to conventional front bumpers that are designed by incorporating multiple components and pieces bolted together to form a bumper assembly, the front bumper 158 is formed as a unitary, single piece. Due to the single piece design, the front bumper 158 eliminates the need for the assembly of deck plates, steering gear covers, and other multi-component bumper assemblies. As shown in FIGS. 39 and 42, the front bumper 158 is mounted directly to the front cross-member 700 of the chassis 12, which may improve forward and downward visibility of an operator of the concrete mixer truck 10 from the cab 18. In one embodiment, the front bumper 158 includes structural elements configured to absorb energy in an impact.

As shown in FIGS. 35-40 and 42, the front bumper 158 includes a bumper frame 3510 that is formed as a single piece (e.g., a single, discrete unit). The bumper frame 3510 includes a top bumper end 3502, a bottom bumper end 3504 disposed axially away from the top bumper end 3502, a front bumper end 3506 adjacent the front end 22 of the chassis 12, and a rear bumper end 3508 disposed longitudinally away from the front bumper end 3506 and adjacent the cab 18. The bumper frame 3510 includes (e.g., is formed with) outer corners and sides including a first side portion 3560 and a second side portion 3580 that are chamfered and extending (e.g., pulled) toward the rear end 24 of the chassis 12 to increase clearance during turns and while operating other components (e.g., the main chute 46, the extension chute 48, etc.) near the front bumper 158. According to an exemplary embodiment, the front bumper 158 provides a greater clearance than that of a conventional front bumper (e.g., a conventional bumper 160 is shown with a dotted line in FIG. 41). For example, the front bumper 158 is configured and positioned to provide the clearance sufficient to allow for a wide variety of movement of the main chute 46 in a lowered state (e.g., dispensing state), such that the main chute 46 may rotate a full 180-degrees between the first lateral side 142 and the second lateral side 144 while at a lowered depression angle.

As shown in FIGS. 35-39 and 42, the bumper frame 3510 has a central portion 3520 that is centrally positioned, the first side portion 3560 extending from the central portion 3520 in a direction toward the first lateral side 142 (e.g., direction that is left of an operator seated in the cab 18), and the second side portion 3580 extending from the central portion 3520 in a direction toward the second lateral side 144 (e.g., direction that is right of an operator seated in the cab 18). The central portion 3520, the first side portion 3560, and the second side portion 3580 are configured (e.g., shaped) to provide clearance around a wide variety of vehicle components. For example, the first side portion 3560 is configured to fit in front of a first wheel covering 3556 and the second side portion 3580 is configured to fit in front of a second wheel covering 3558 when the bumper frame 3510 is coupled with a front cross-member 700, or similar cross-member. In some embodiments, the bumper frame 3510 is designed to satisfy or exceed various regulatory requirements (e.g., the Pennsylvania DOT (PennDOT) requirements for a front underride, etc.).

Figure 40:
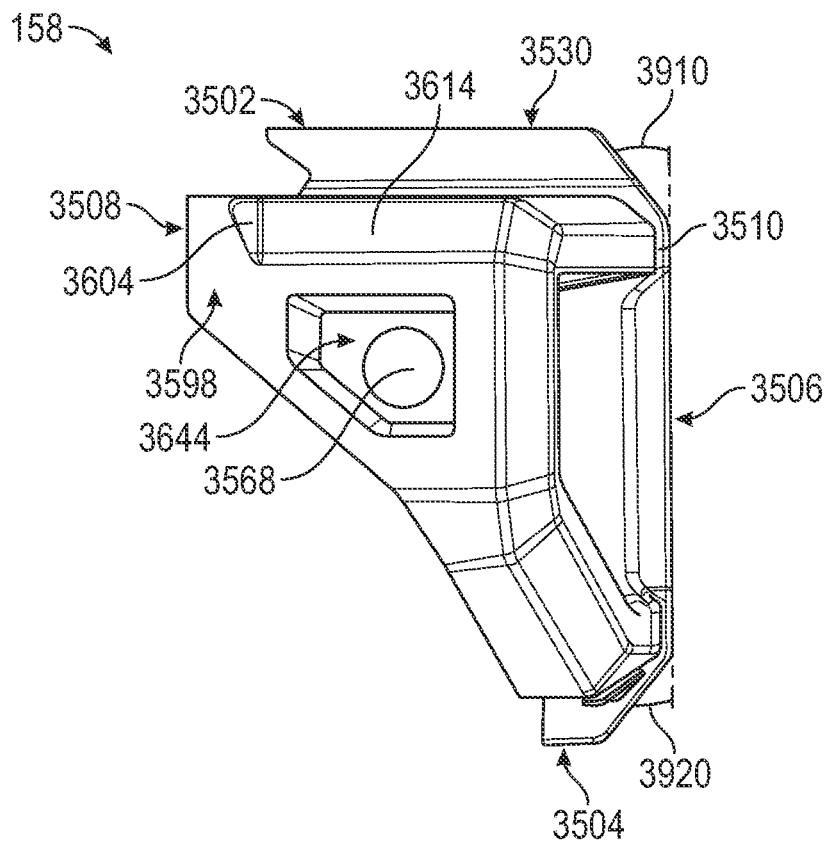
Figure 41:
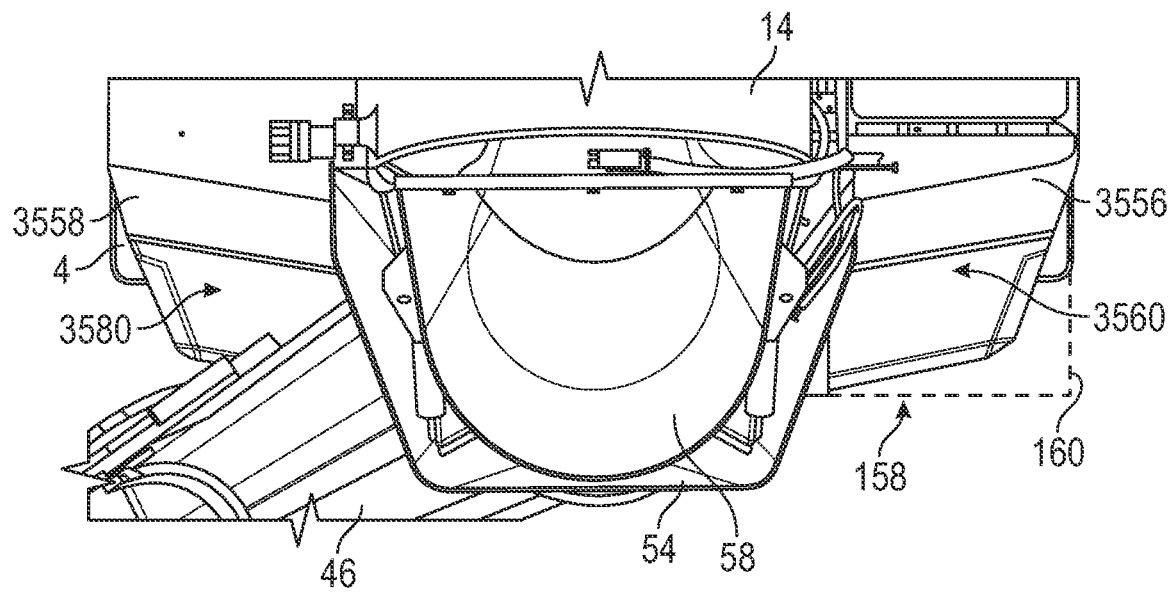

As shown in FIGS. 35-38 and 40, the central portion 3520 includes a central top end 3530, a central bottom end 3532 disposed axially away from the central top end 3530, a front central end 3534 adjacent the front end 22, and a rear central end 3536 disposed longitudinally away from the front central end 3534 and adjacent the cab 18. The central top end 3530 extends equal to (e.g., same height as) the top bumper end 3502, the central bottom end 3532 extends equal to (e.g., same height as) the bottom bumper end 3504. As shown in FIG. 35, the front central end 3534 defines a central recessed portion 3542. As shown in FIGS. 35 and 40, the central top end 3530 is angled outward as the surface extends downward toward the central recessed portion 3542 at an angle 3910 and the central bottom end 3532 is angled outward at an angle 3920 as the surface extends upward toward the central recessed portion 3542. As shown in FIG. 40, the angle 3920 may be similar to the angle 3910. In some embodiments, the angle 3910 or angle 3920 may be at any angle in the range of 30 degrees to 50-degrees with respect to a horizontal plane. As shown in FIG. 35, the sides of the central recessed portion 3542 are angled outward as the surface extends outward toward the first side portion 3560 and second side portion 3580, respectively. The surfaces are angled and configured to shed water and debris to prevent damage and build-up of material, dirt, concrete, and other debris.

As shown in FIGS. 35, 37, and 38, the central top end 3530 defines an actuator slot 3528. The actuator slot 3528 is configured to receive the actuator shaft 728. As shown in FIG. 39, the actuator shaft 728 is connected to the front cross-member 700. The actuator shaft 728 is configured to provide support to the first chute actuator 122 coupled to the main chute 46. An end 3552 of the first chute actuator 122 is coupled to the top of the actuator shaft 728 to pivotally couple the actuator body 3554 of the first chute actuator 122 to the actuator shaft 728 to allow the first chute actuator 122 to move the main chute 46 around the front 180-degrees portion of the concrete mixer truck 10.

Figure 44:
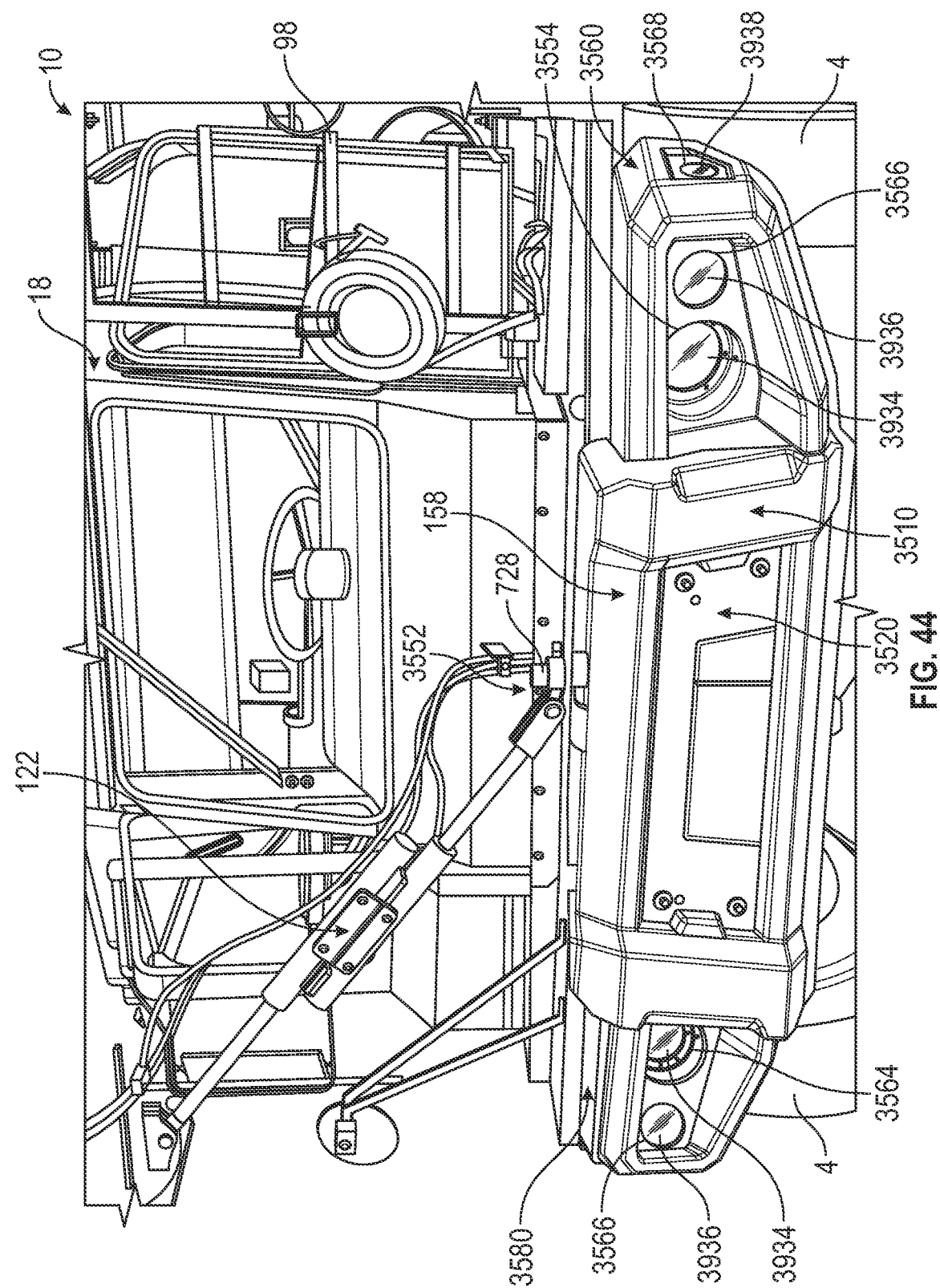
FIGS. 44 and 45 are various views of a front bumper of the concrete mixer truck of FIGS. 1-3, according to another exemplary embodiment.
Figure 45:
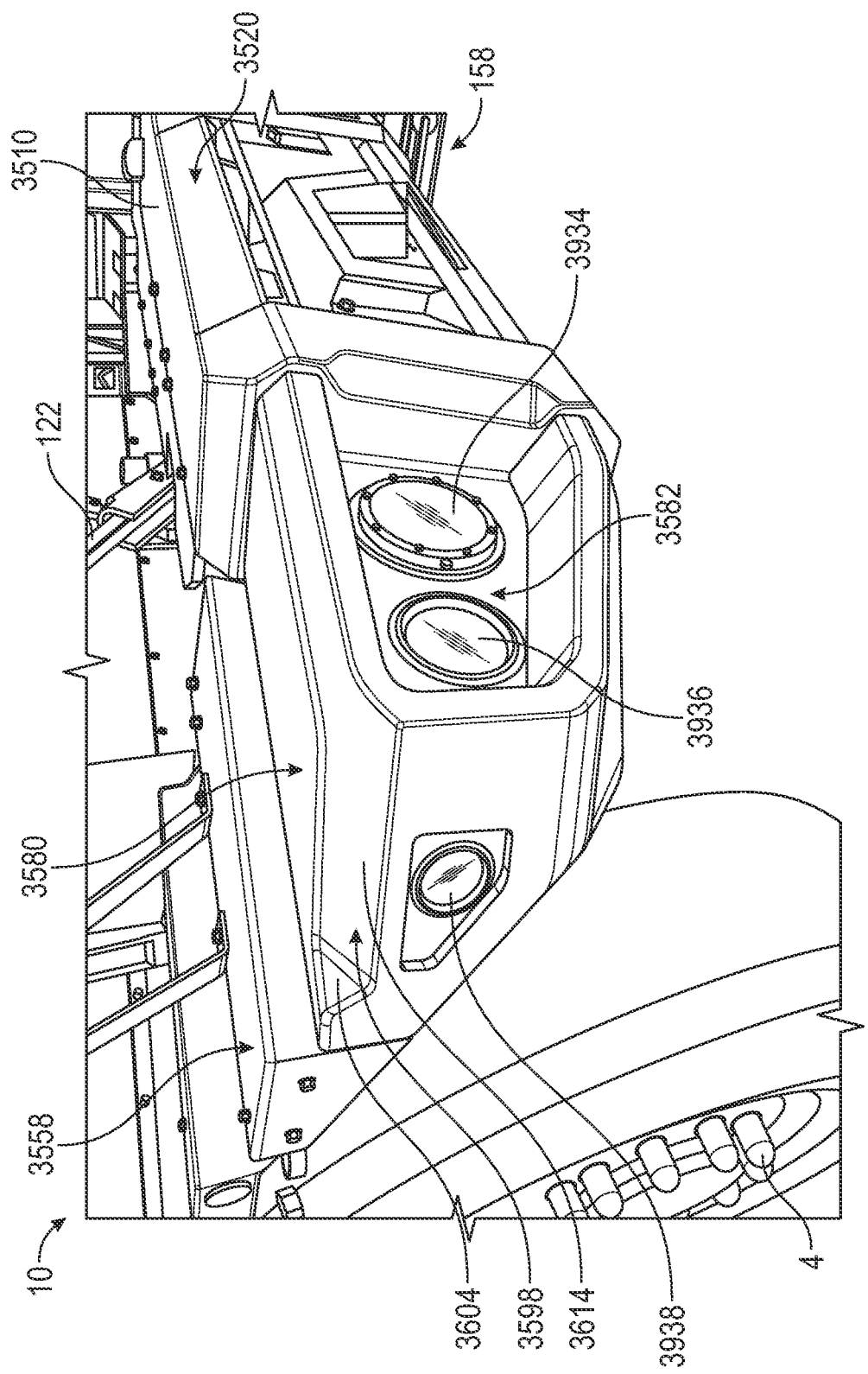

As shown in FIGS. 39 and 42, the central recessed portion 3542 is configured to receive the front cross-member 700 of the chassis 12 along an internal portion/wall of the central recessed portion 3542. As shown in FIG. 39, the base 702 of the front cross-member 700 is coupled to the central recessed portion 3542. The front cross-member 700 may be made from various materials (e.g., steel, aluminum, etc.) with various cross-sections (e.g., square tube, C-channel, angle, etc.). As shown, the base 702 is coupled to the central recessed portion 3542 at four locations with by fasteners, shown as coupling members 3548, such that the coupling members 3548 extend through the central recessed portion 3542 and the base 702. In some embodiments, four additional coupling members 3548 are used to couple a portion of the front cross-member 700, or a connected component, to an internal portion of the central top end 3530. In other embodiments, the front cross-member 700 is otherwise coupled (e.g., welded, bolted, etc.) to the front cross-member 700. As shown in FIG. 35, the central recessed portion 3542 defines an aperture, shown as lift member slot 3526, configured to receive the receiver 760 of the front cross-member 700. The receiver 760 may be used to affix, couple, or attach additional components or tools to the concrete mixer truck 10. By way of example, the receiver 760 may be coupled to a chain or strap to tow the concrete mixer truck 10, or the receiver 760 may be coupled to a jack or other lift device to lift the concrete mixer truck 10. In some embodiments, the central recessed portion 3542 may not include the lift member slot 3526, as shown in FIGS. 44 and 45.

Figure 36:
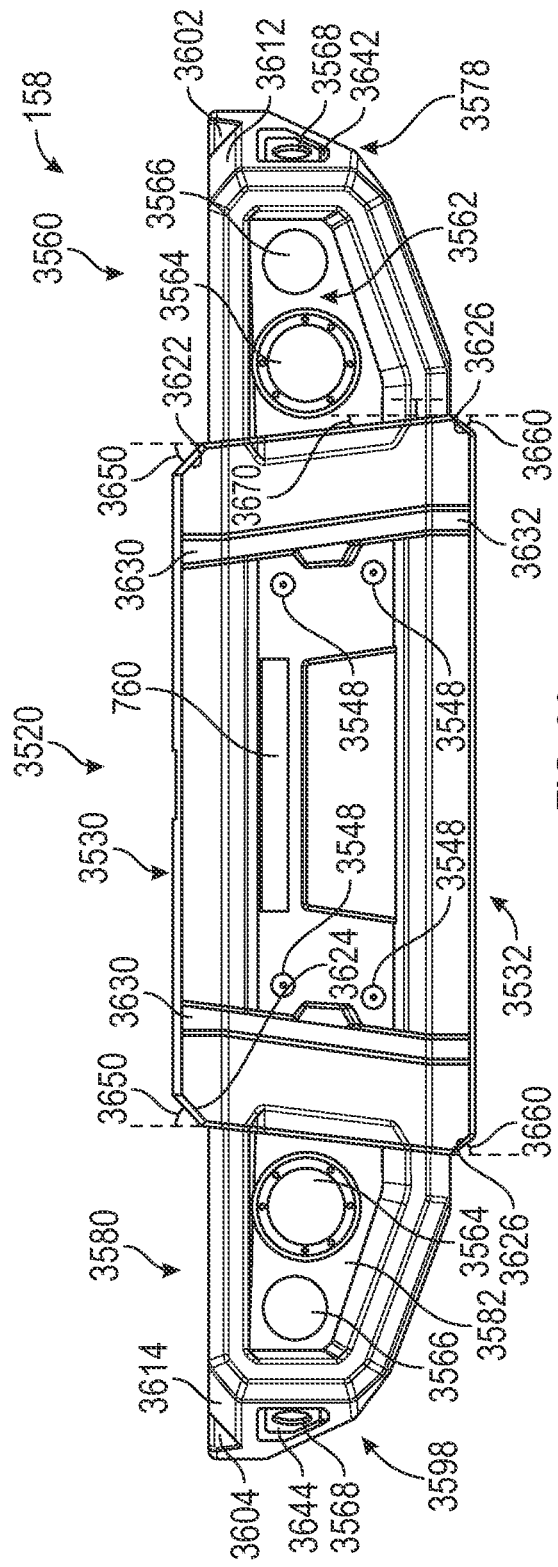

As shown in FIG. 36, the central top end 3530 may be narrower than the central bottom end 3532 such that the connecting outer surface of the central top end 3530 and the central bottom end 3532 has an angle 3670. In other words, the width of the central top end 3530 is shorter than the width of the central top end 3530 such that an angle 3670 is formed on each end due to the differences in width. In some embodiments, the angle 3670 is between 36-degrees and 15-degrees with respect to a normal axis. In other embodiments, a wide variety of widths, including the central top end 3530 being wider than the bottom central end, may be implemented within the central portion of the bumper frame 3510. The central top end 3530 may have angled end surfaces 3624 that are oriented at an angle 3650 with respect to the normal axis. Similarly, the central bottom end 3532 may have angled end surfaces 3626 that are oriented at an angle 3660 with respect to the normal axis. The central portion 3520 may include a pair of upper angled surfaces 3630 that transition an upper surface of the central portion 3520 outward to another surface at an angle. Similarly, the central portion 3520 may include a pair of lower angled surfaces 3632 that transition a lower surface of the central portion 3520 outward to another surface at an angle.

The first side portion 3560, which is disposed laterally outward from the central portion 3520 in the direction of the first lateral side 142 (e.g., to the left of an operator seated in the cab 18), includes a side top end 3570, a side bottom end 3572, a side front end 3574, and side rear end 3576. As shown in FIG. 38, the side front end 3574 is an angled surface with a first front end 3850 and a second front end 3860 displaced a distance 3830 longitudinally rearward from the first front end 3850 toward the rear bumper end 3508. The side rear end 3576 is an angled surface with a first back end 3870 and a second back end 3880 displaced a distance 3840 longitudinally rearward from the first back end 3870 toward the rear bumper end 3508. Additionally, the side rear end 3576, which extends out to the second back end 3880, is wider than the side front end 3574, which extends out to the second front end 3860. As shown in FIGS. 35 and 36, a recessed portion 3562 is disposed on the side front end 3574 of the first side portion 3560. The recessed portion 3562 defines a first light aperture 3564 and a second light aperture 3566 configured to receive a first light and a second light, respectively. In some embodiments, the first light aperture 3564 is inset from the surface of the recessed portion 3562 toward the rear bumper end 3508.

The top side of the first side portion 3560 includes an angled side portion 3578. The angled side portion 3578 includes a top angled surface 3612, a bottom angled surface 3812, and a side recessed portion 3642 disposed on a surface that extends from the outermost edge of the top angled surface 3612 and the bottom angled surface 3812. The side recessed portion 3642 includes a third light aperture 3568 configured to receive a third light. The top angled surface 3612 extends from the top portion of the second front end 3860 toward the top portion of the second back end 3880. Similarly, a bottom side of the first side portion 3560 includes the bottom angled surface 3812 that extends from the bottom portion of the second front end 3860 toward the bottom portion of the second back end 3880. The top angled surface 3612 includes a notch 3602 or angled surface near the side rear end 3576. In some embodiments, the notch 3602 extends from the top angled surface 3612 upward to align with the first wheel covering 3556 such that the two portions are substantially flush. As shown in FIG. 37, the top angled surface 3612 extends at an angle 3710 with respect to a longitudinal axis. The angle 3710 may be in the range of 20-degrees to 40-degrees.

As shown in FIG. 38, the first side portion 3560 includes a first coupling surface 3802 that extends from an internal surface of the side front end 3574 to an internal surface of the top angled surface 3612. As shown in FIG. 39, the first side portion 3560 is configured to couple with a first brace 3702 using a plurality of first brace coupling members 3712 or fasteners. The first brace 3702 is coupled to a portion of the frame rail 40 with the plurality of first brace coupling members 3712. The first brace 3702 provides additional support to the front bumper 158 through the connection with the side panels of the frame rail 40.

The second side portion 3580, which is disposed laterally away from the central portion 3520 in the direction of the second lateral side 144, includes a side top end 3590, a side bottom end 3592, a side front end 3594, and side rear end 3596. As shown in FIG. 38, the side front end 3594 is an angled surface with a first front end 3850 and a second front end 3860 displaced a distance 3830 longitudinally rearward from the first front end 3850 toward the rear bumper end 3508. The side rear end 3596 is an angled surface with a first back end 3870 and a second back end 3880 displaced a distance 3840 longitudinally rearward from the first back end 3870 toward the rear bumper end 3508. Additionally, the side rear end 3596, which extends out to the second back end 3880, is wider than the side front end 3594, which extends out to the second front end 3860. As shown in FIGS. 35 and 36, a recessed portion 3582 is disposed on the side front end 3594 of the second side portion 3580. The recessed portion 3582 includes a first light aperture 3584 and a second light aperture 3586 configured to receive a first light and a second light, respectively. In some embodiments, the first light aperture 3584 extends inward toward the rear bumper end 3508.

The top side of the second side portion 3580 includes an angled side portion 3598. The angled side portion 3598 includes a top angled surface 3614, a bottom angled surface 3814, and a side recessed portion 3644 disposed on a surface that extends from the outermost edge of the top angled surface 3614 and the bottom angled surface 3814. The side recessed portion 3644 includes a third light aperture 3568 configured to receive a third light. The top angled surface 3614 extends from the top portion of the second front end 3860 toward the top portion of the second back end 3880.

Similarly, a bottom side of the second side portion 3580 includes a bottom angled surface 3814 that extends from the bottom portion of the second front end 3860 toward the bottom portion of the second back end 3880. The top angled surface 3614 includes a notch 3604 or angled surface near the side rear end 3596. In some embodiments, the notch 3604 extends from the top angled surface 3614 upward to align with the first wheel covering 3556 such that the two portions are substantially flush. As shown in FIG. 37, the top angled surface 3614 is angled at an angle 3710 with respect to a longitudinal axis. The angle 3710 may be in the range of 20-degrees to 40-degrees.

As shown in FIG. 38, the second side portion 3580 includes a first coupling surface 3804 that extends from an internal surface of the side front end 3594 to an internal surface of the top angled surface 3614. As shown in FIG. 39, the second side portion 3580 is configured to couple with a second brace 3704 using a plurality of second brace coupling members 3714 or fasteners. The second brace 3704 is coupled to a portion of the frame rail 40 with the plurality of second brace coupling members 3714. The second brace 3704 provides additional support to the front bumper 158 through the connection with the side panels of the frame rail 40.

Figure 43:
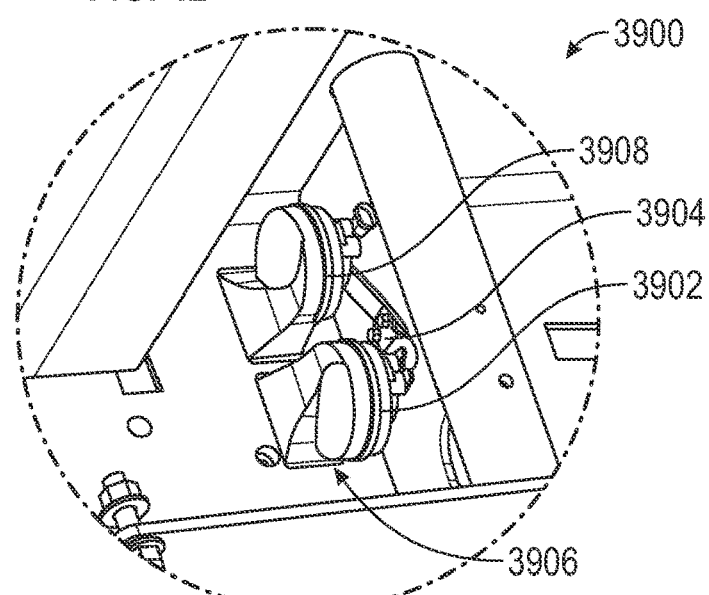
FIG. 43 is a detailed view of the noise emitting system of FIG. 42, according to an exemplary embodiment.

Referring to FIG. 42, a rear perspective view of a portion of the concrete mixer truck 10 is shown. In some embodiments, a noise emitting system 3902 (e.g., a horn, a siren, etc.) is coupled to an internal surface of the base 702 that is adjacent to the central recessed portion 3542. A portion 3900 of the base 702 with the noise emitting system 3902 is shown in FIG. 43. The noise emitting system 3902 includes a coupling member 3904, a noise generating element 3908, and a noise amplifying device 3906 (e.g., a horn or bell). The coupling member 3904 couples the noise emitting system 3902 to the front cross-member 700. The noise amplifying device 3906 is adjacent to the base 702 and central recessed portion 3542 and configured to amplify the noise generated from the noise generating element 3908. The noise emitting system 3902 may be a horn controlled by an operator in the cab 18.

FIGS. 44 and 45 show a pair of environmental view of the front bumper 158 installed on a concrete mixer truck 10. The front bumper 158 may be substantially similar to the front bumper 158 of FIGS. 35-43 except as otherwise specified. The front bumper 158 of FIGS. 44 and 45 does not include a lift member slot 3526, and the front cross-member of FIGS. 44 and 45 does not include the receiver 760 of the front cross-member 700. As shown in FIGS. 44 and 45, the first light aperture 3564, second light aperture 3566, and third light aperture 3568 have a first light 3934, a second light 3936, and a third light 3938, respectively, disposed within them. Similarly, the first light aperture 3584, second light aperture 3586, and third light aperture 3588, have a first light 3934, a second light 3936, and a third light 3938, respectively, disposed within them. In some embodiments, the first light 3934 and second light 3936 are located to the left of the cab 18 (e.g., as viewed by a drive) on the first side portion 3560 and the first light 3934 and second light 3936 are located to the right of the cab 18 on the second side portion 3580. The third lights 3938 are positioned to provide lighting toward the front sides of the concrete mixer truck 10. In alternative embodiments, the positions of the headlights may be different. Similar to the front bumper 158, the front bumper 158 can be removed by unfastening eight bolt and threaded member connections and one connector piece.

Hood

As a general overview, the hood 86 of the engine module 110 provides improved airflow through the engine module and rear accessibility of components disposed within the hood 86. The hood 86 is configured to direct airflow (i) into a cooling system and (ii) into an air intake and air cleaner of the engine 74. The front end of the hood 86 is configured to capture air flowing along the top and sides of the mixing drum 14. In some embodiments, the hood 86 is configured to optimize airflow into the cooling system at driving velocities (e.g., 50-70 miles per hour). The improved airflow through the cooling system facilitates reducing fan speed and improving cooling efficiency. Beneficially, the hood 86 provides improvements over conventional hood designs by providing more air to the cooling system. The front end of the hood 86 may be tailored to pull (e.g., capture) air from above, thereby reducing the likelihood of the hood 86 capturing dirt, dust, and other undesired particles and introducing them to the cooling system. An airflow inlet cavity at the front end of the hood 86 includes one or more features with angled and overlapping surfaces to reduce rain intrusion into the interior of the hood 86. Beneficially, the design of the airflow inlet cavity at the front end minimizes the introduction of water into the air intake and air cleaner to reduce restriction within the air cleaner.

The rear end of the hood 86 includes a hatch having hatch door and a conical-shaped internal housing extending from an interior of the hatch door. The hatch door is movable between an open and closed position. The hatch door may be movable via a gas strut and provides ease of access for the operator to various components disposed within the hood 86 including, for example, a battery box, a DEF tank, DEF fill apparatus, a cooling system, fan, a hydraulic motor, various electronic components, and/or still other components. The conical-shaped internal housing is configured to direct and diffuse hot air flowing out of the hood from the fan rearward and/or slightly upward to not disturb dust on the ground outside of the concrete mixer truck 10, to reduce recirculation, and to improve efficiency of the airflow through the hood 86. A grill disposed on the hatch door is configured to provide low airflow restriction.

Figure 46:
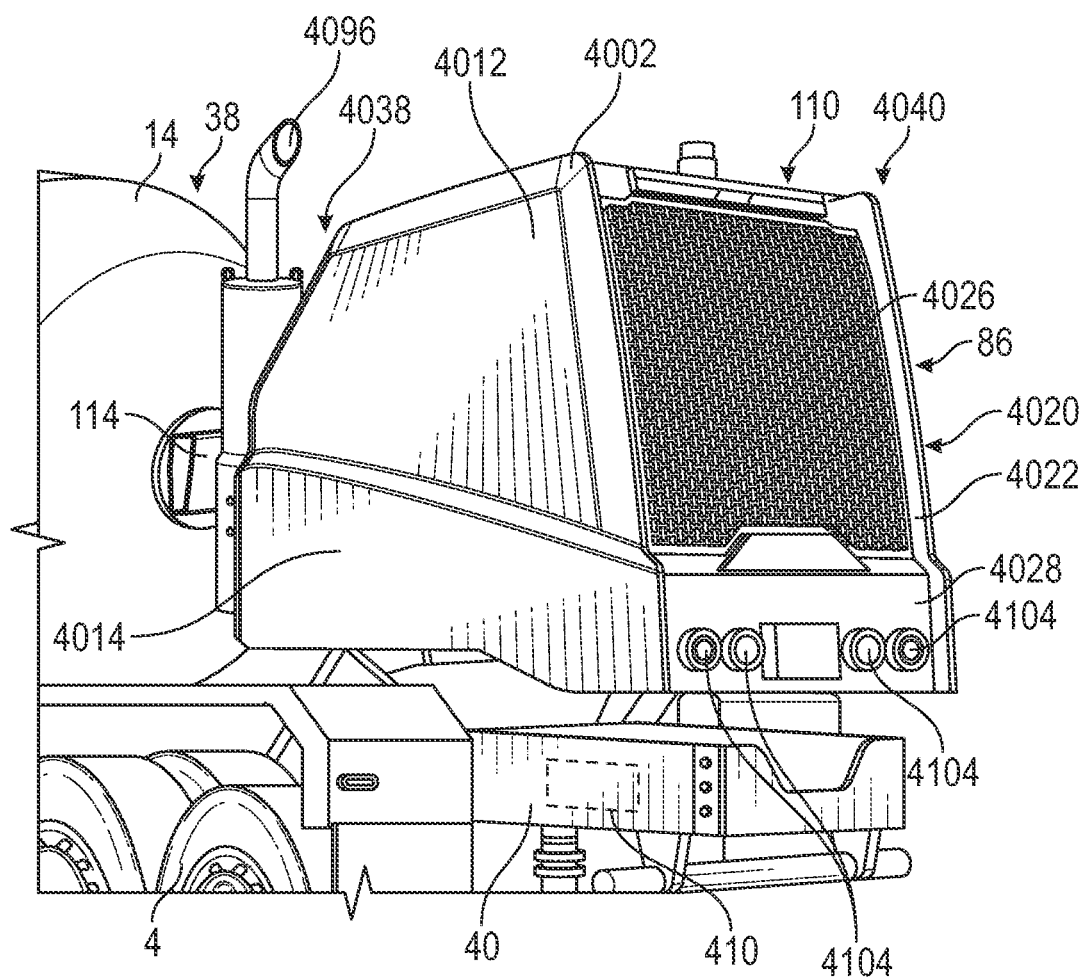
FIG. 46 is perspective view of an engine module of the concrete mixer truck of FIGS. 1-3 having a hood, according to an exemplary embodiment.
Figure 47:
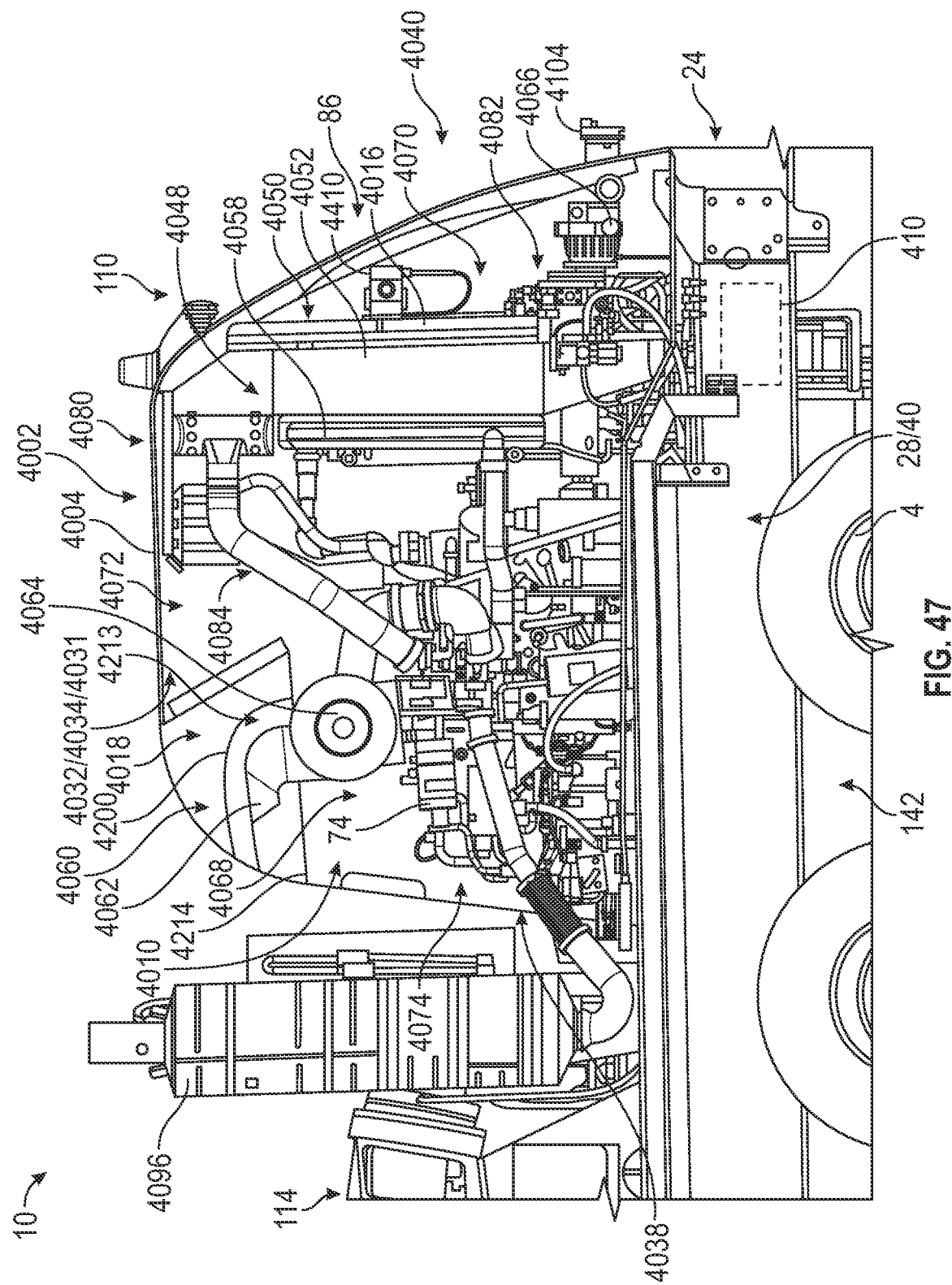
FIG. 47 is a side cross-sectional view of the engine module of FIG. 46, according to an example embodiment.
Figure 48:
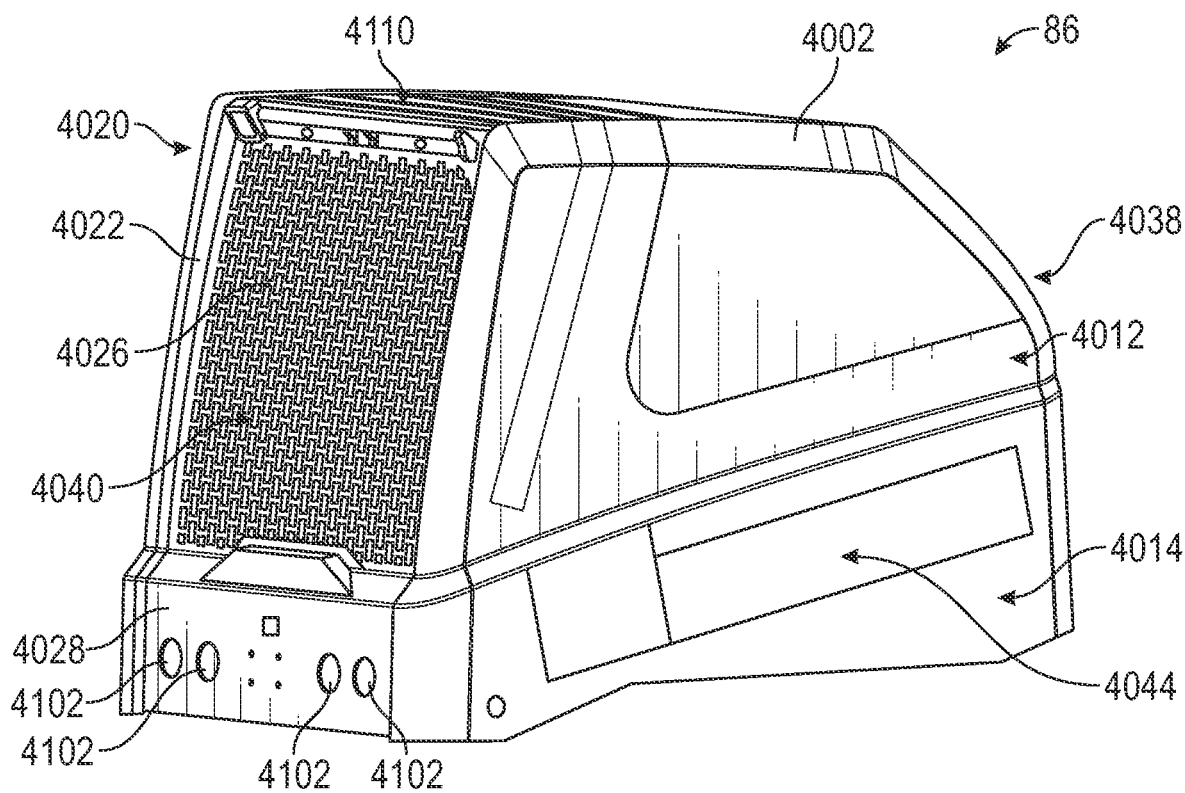
FIGS. 48-50 are various views of the hood of FIG. 46, according to an exemplary embodiment.
Figure 50:
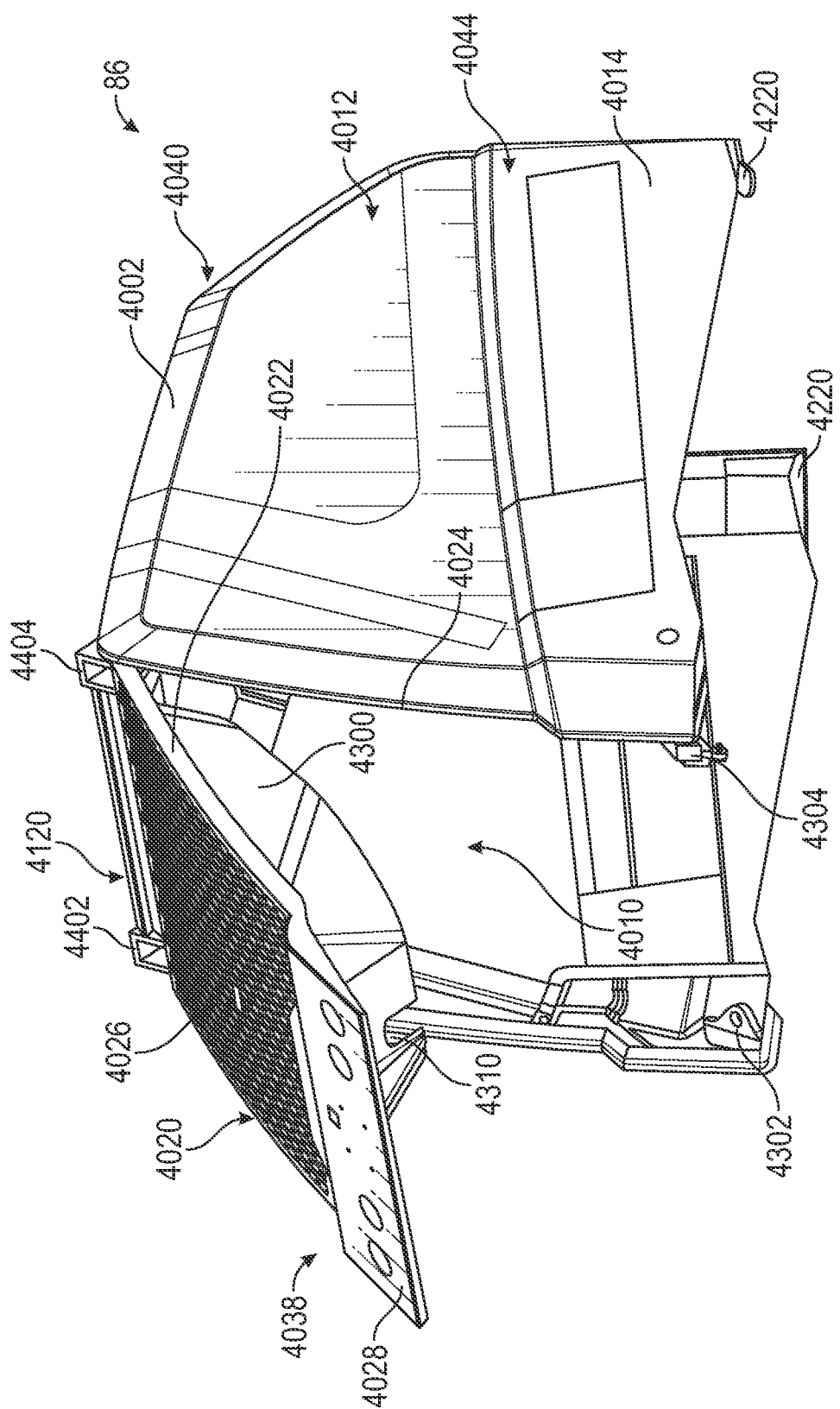
Figure 51:
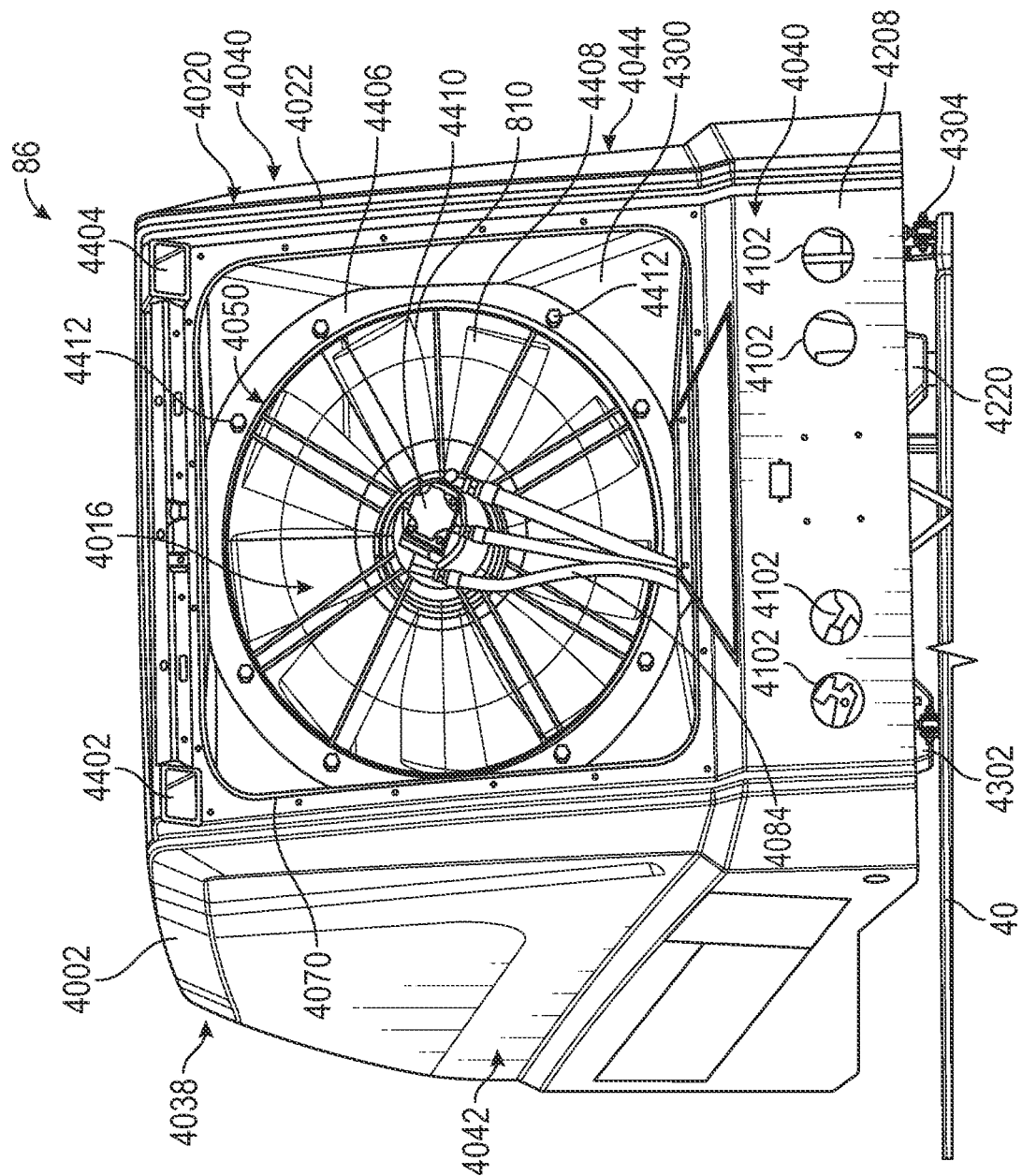
FIGS. 51 and 52 are various view of a cooling system disposed within the hood of the engine module of FIG. 46, according to an exemplary embodiment.
Figure 52:
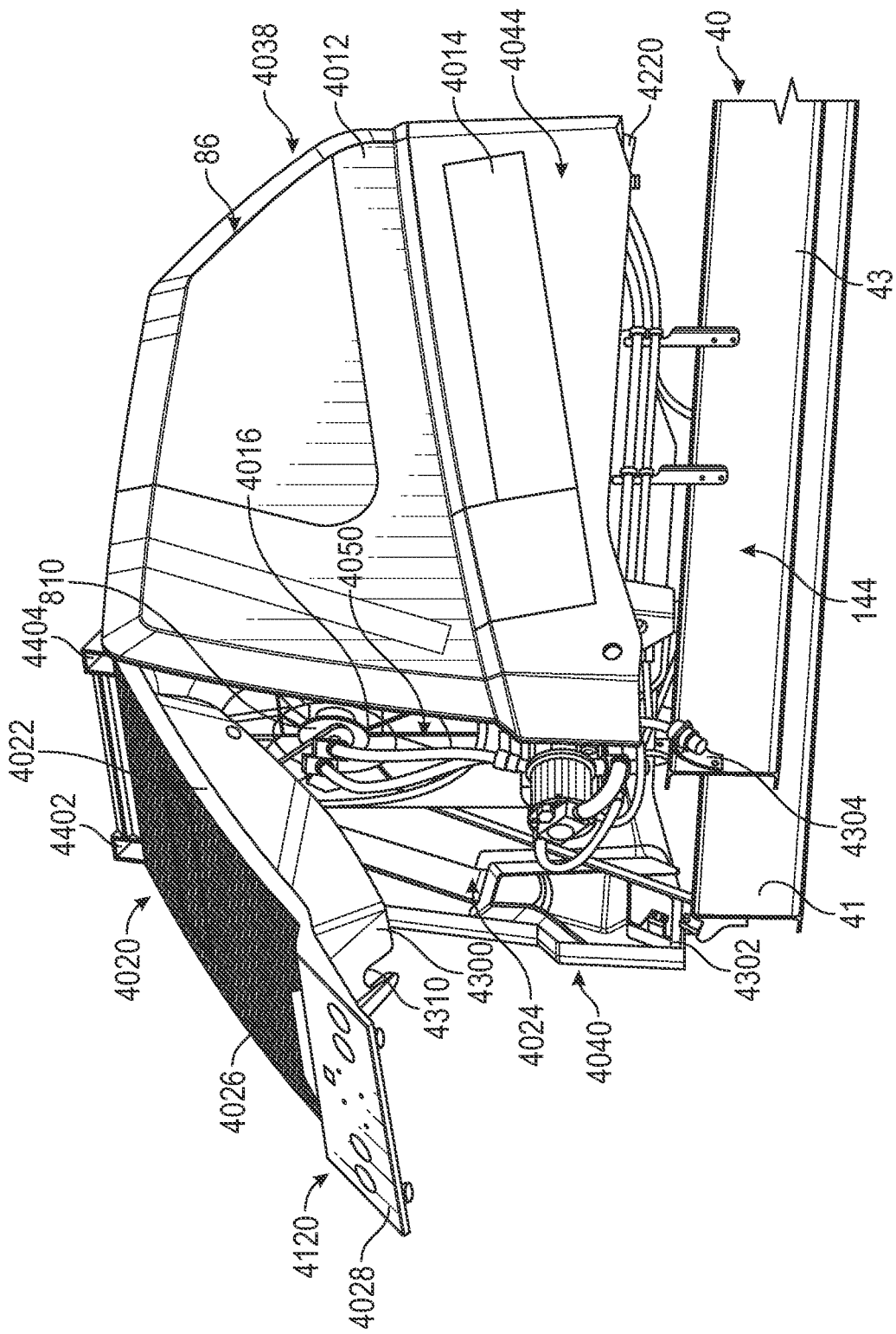
Figure 53:
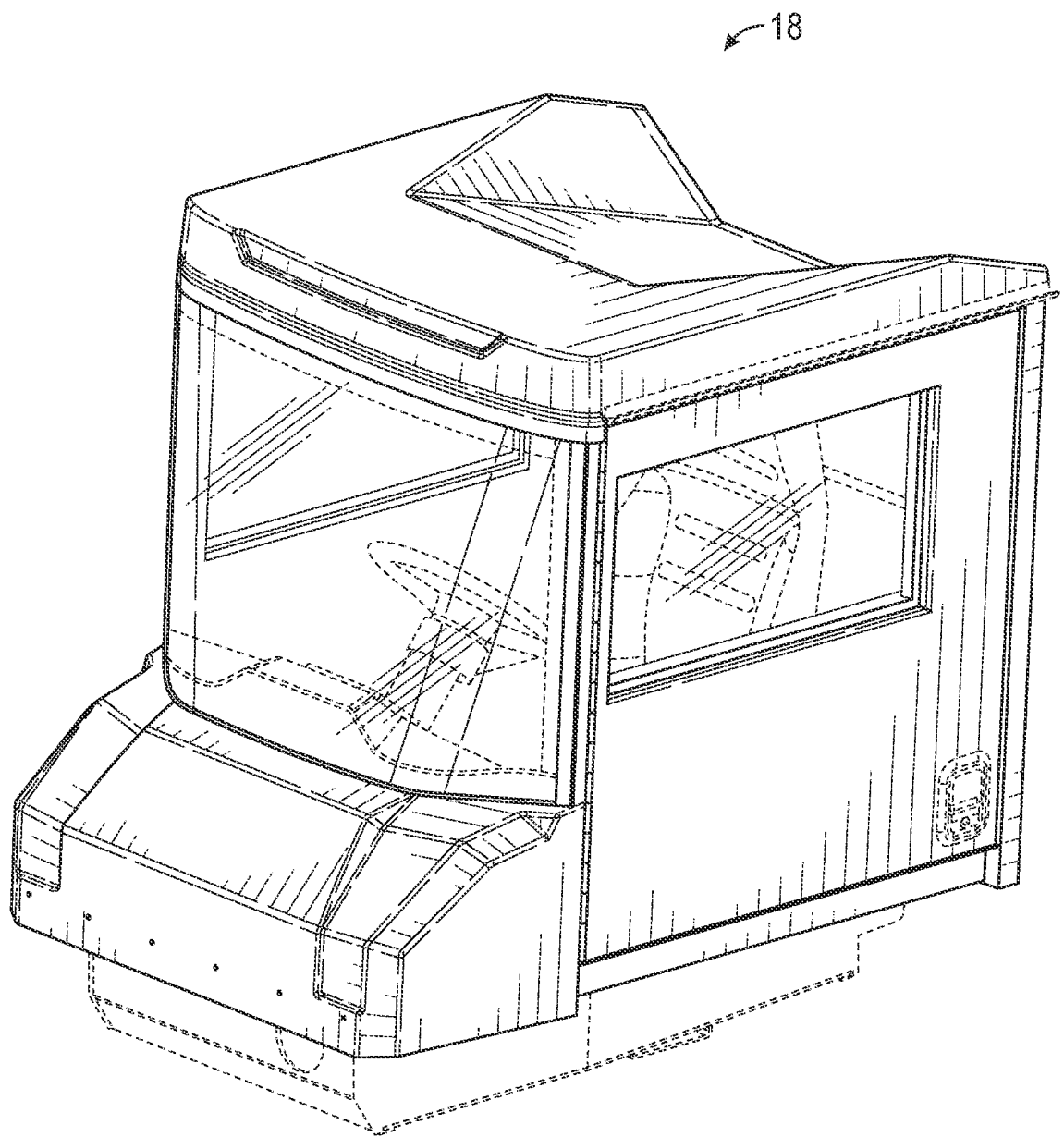
Figure 54:
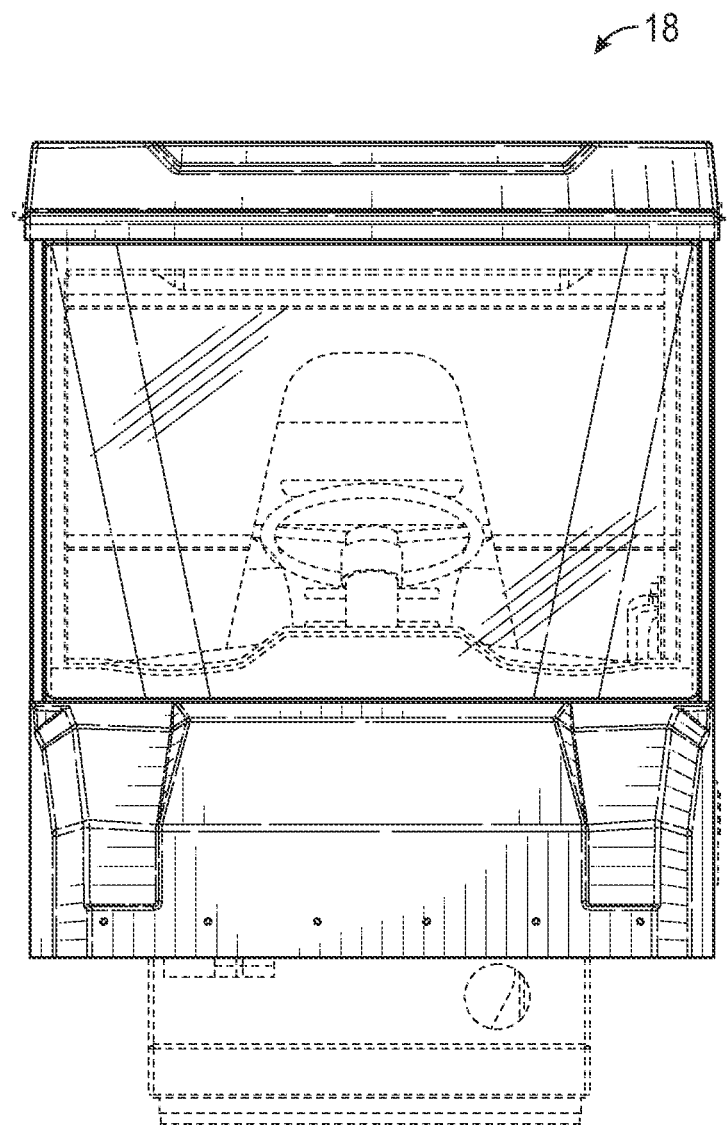
Figure 55:
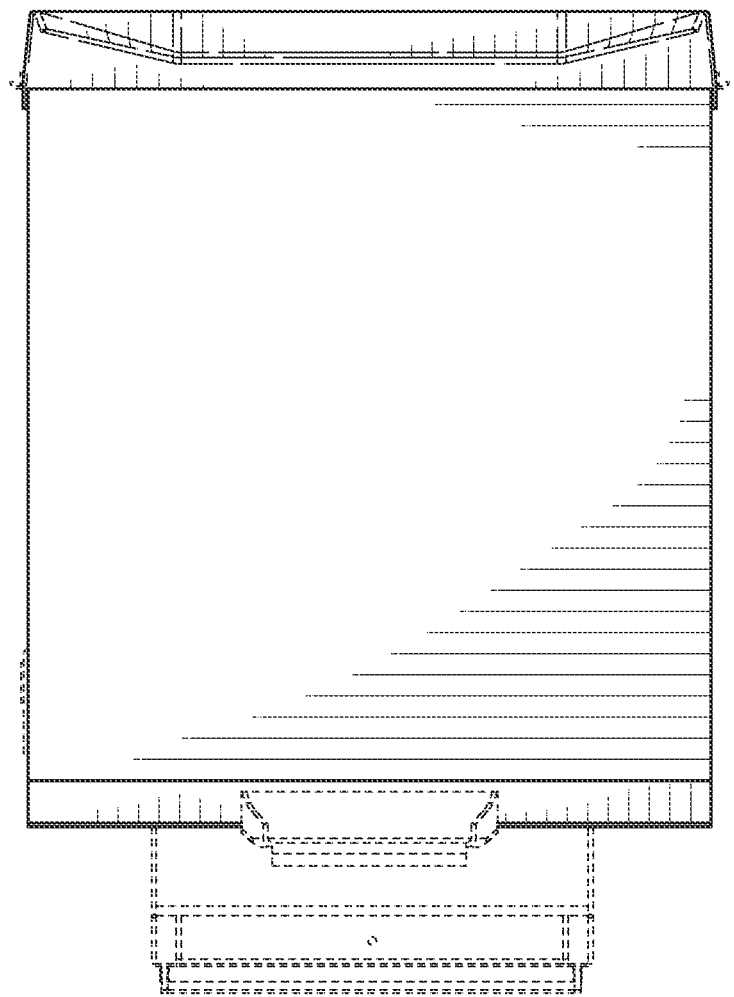
Figure 56:
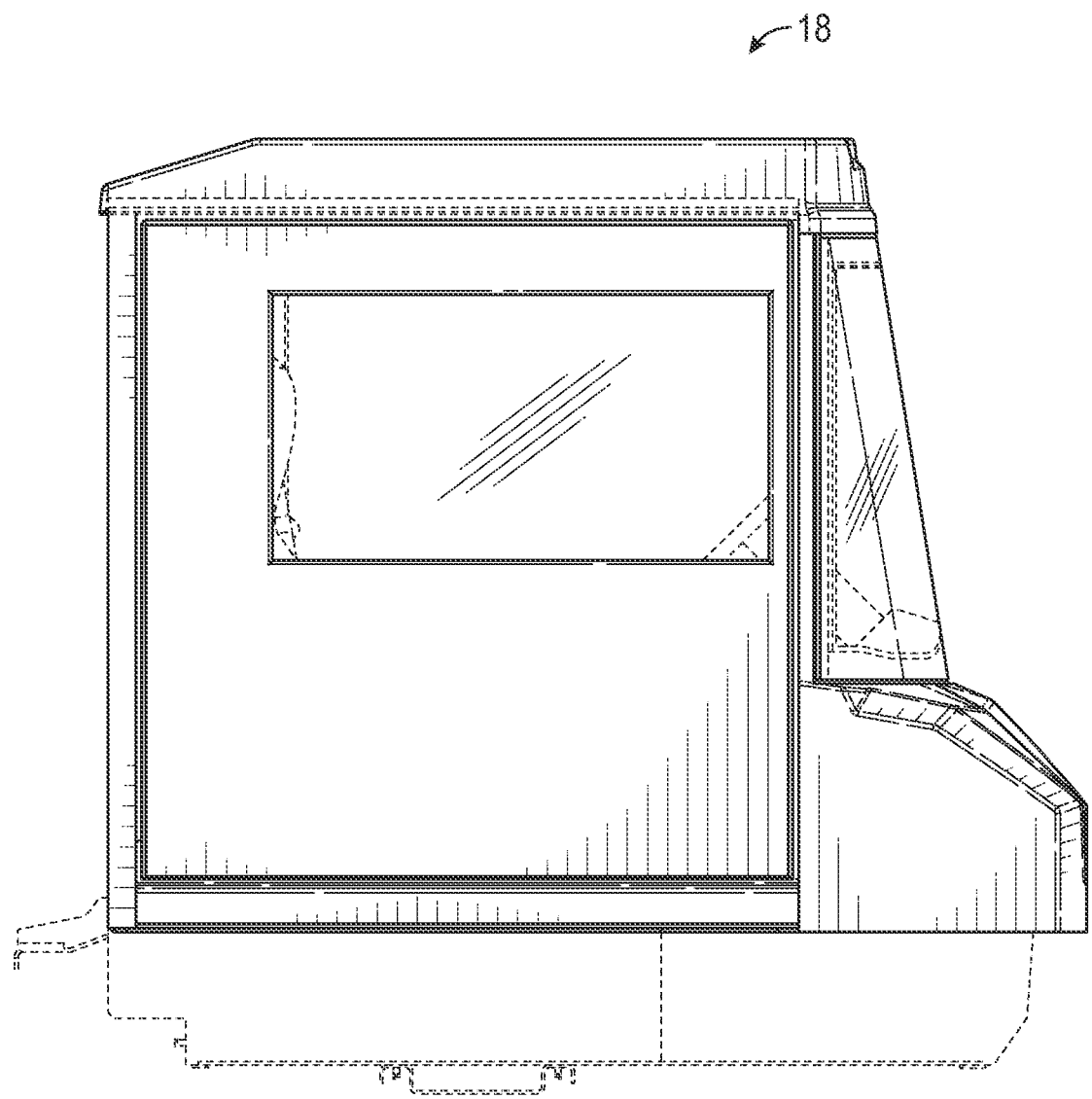
Figure 57:
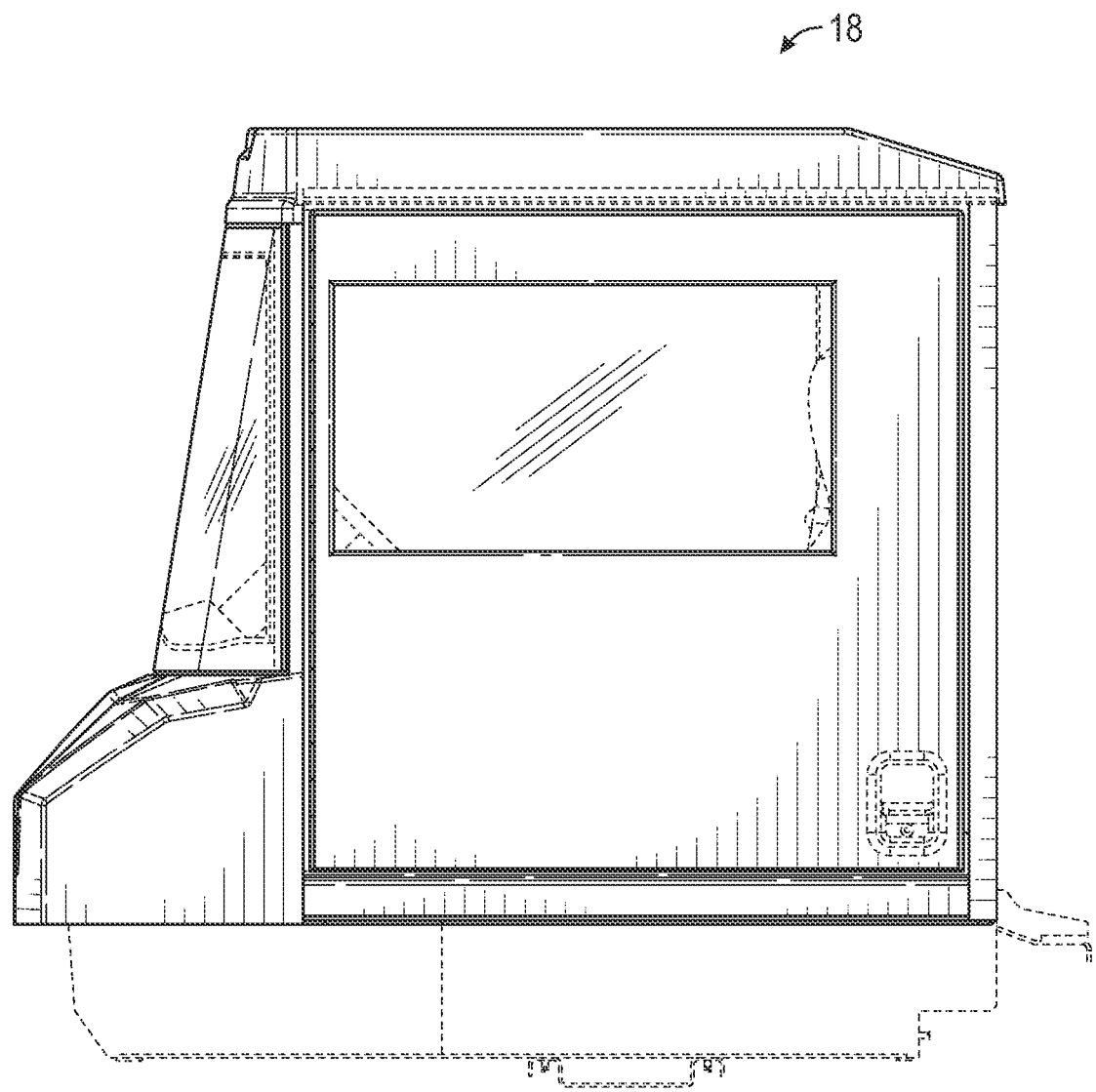
Figure 58:
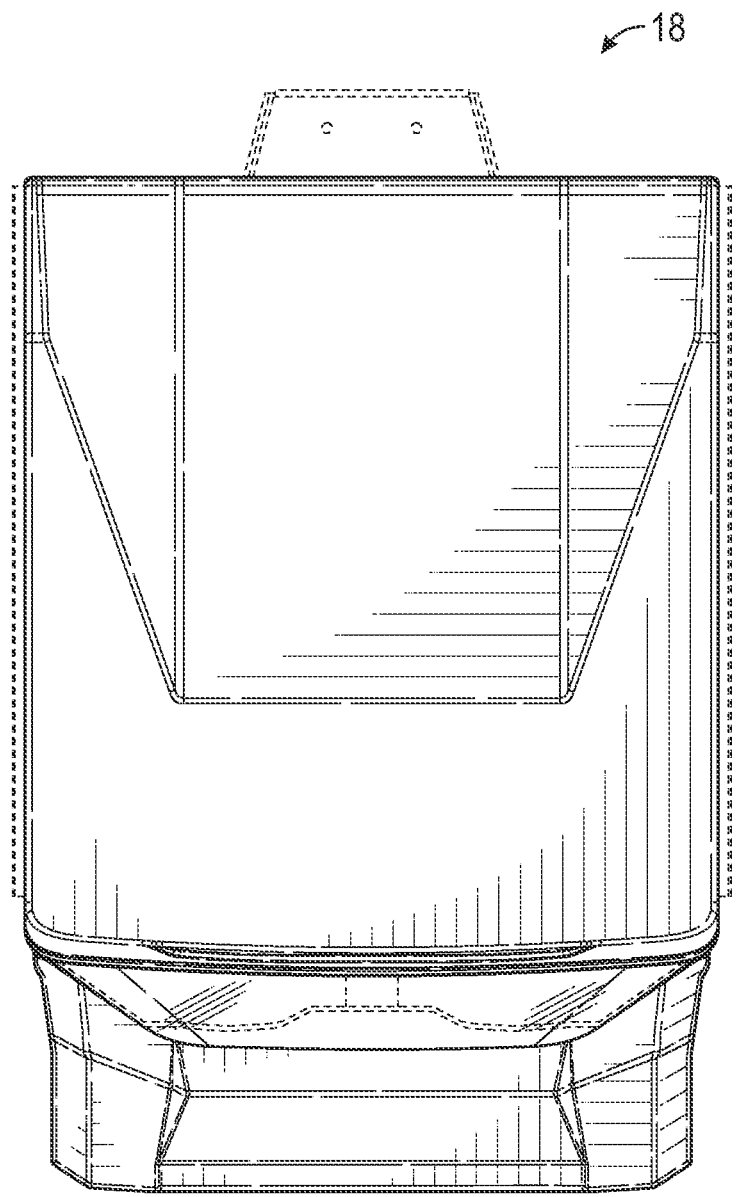
Figure 59:
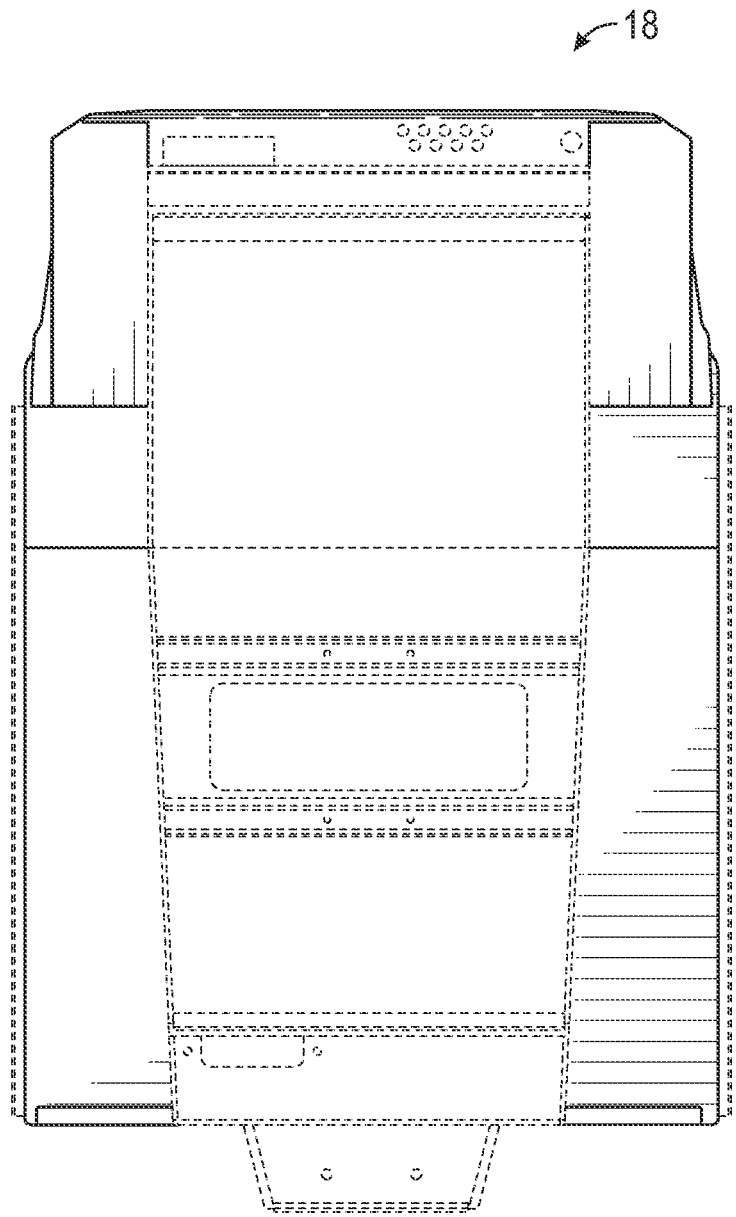
Figure 60:
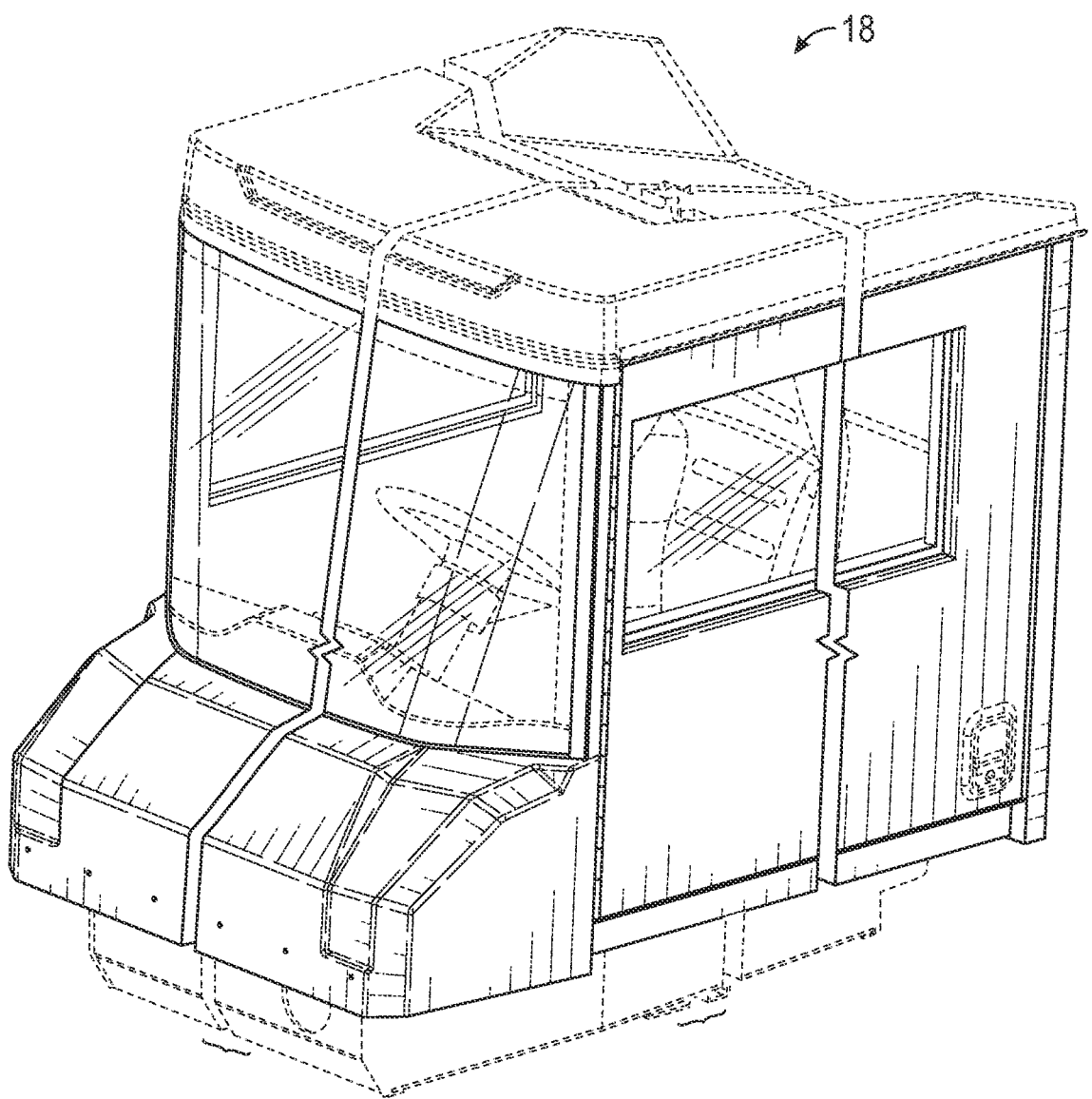
Figure 61:
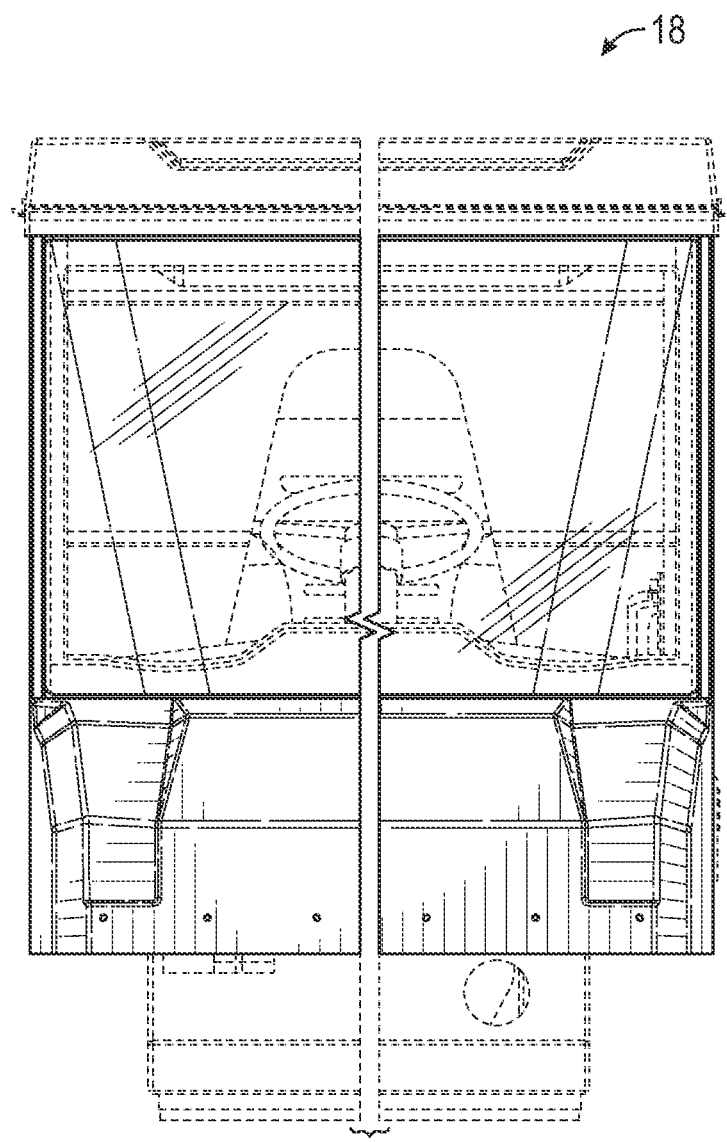
Figure 62:
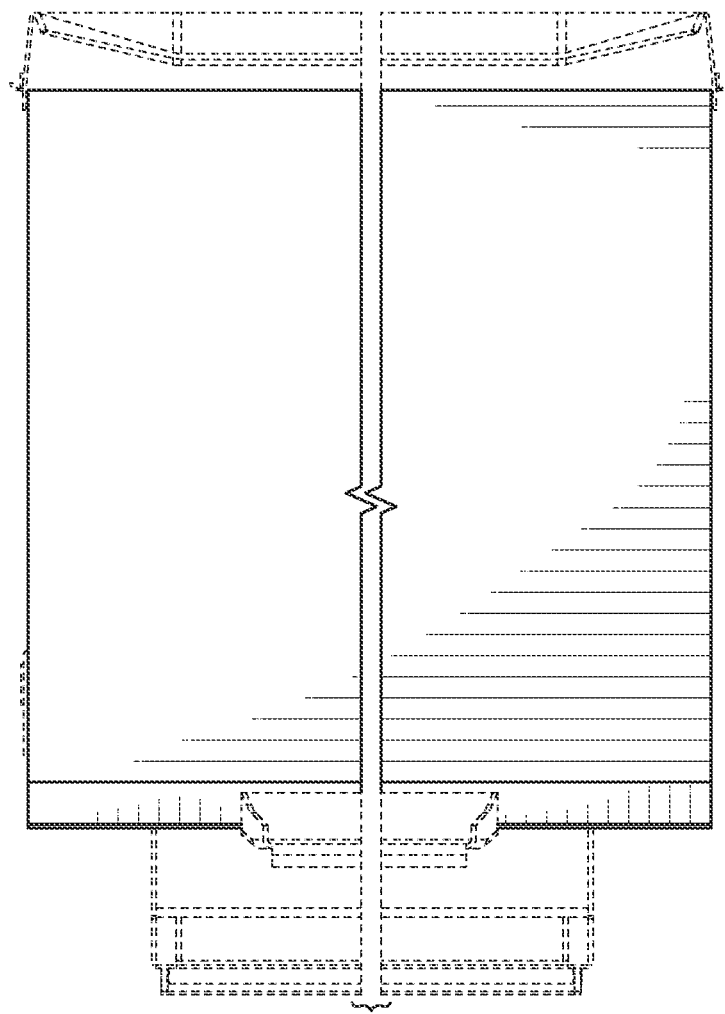
Figure 63:
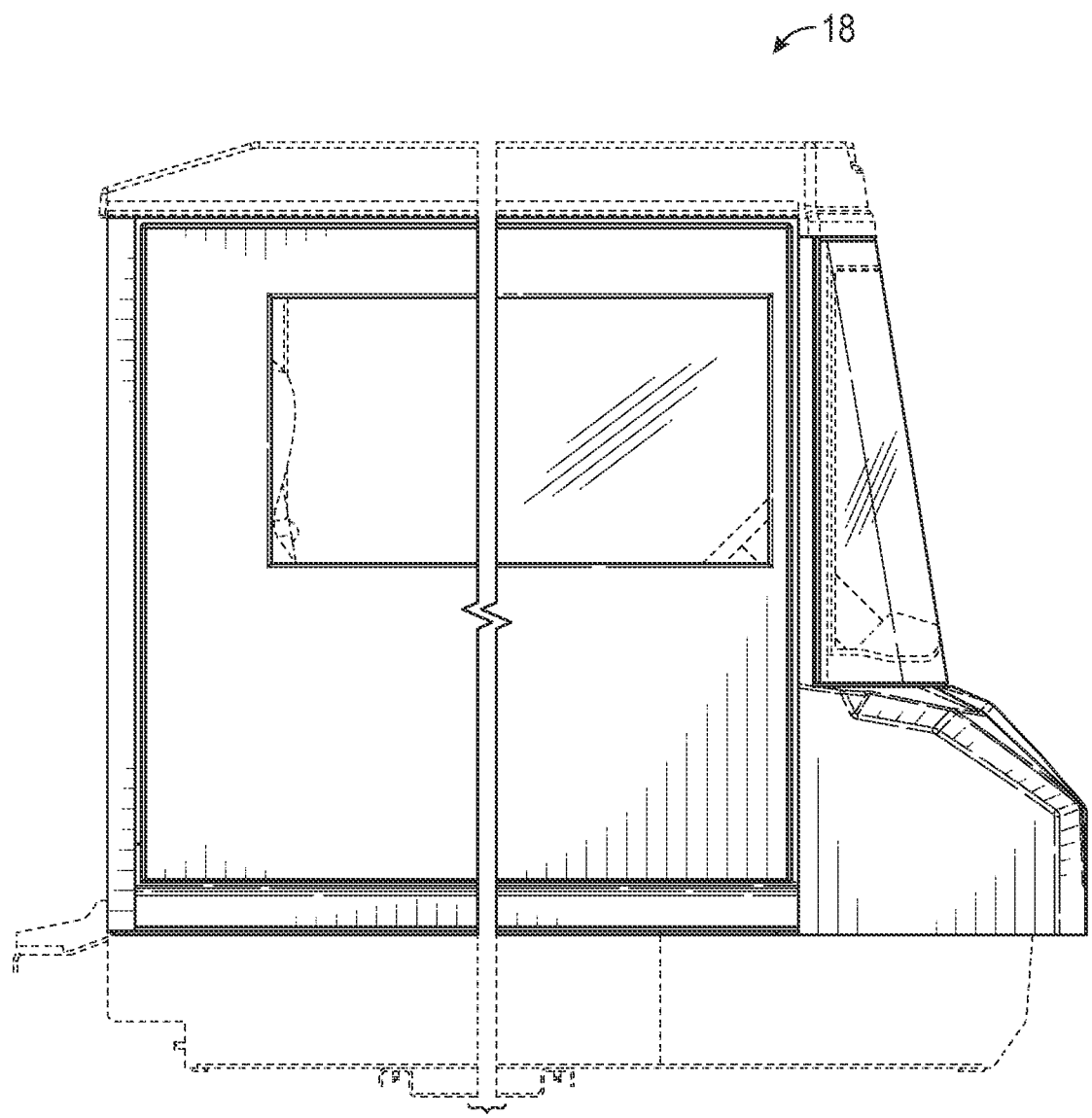
Figure 64:
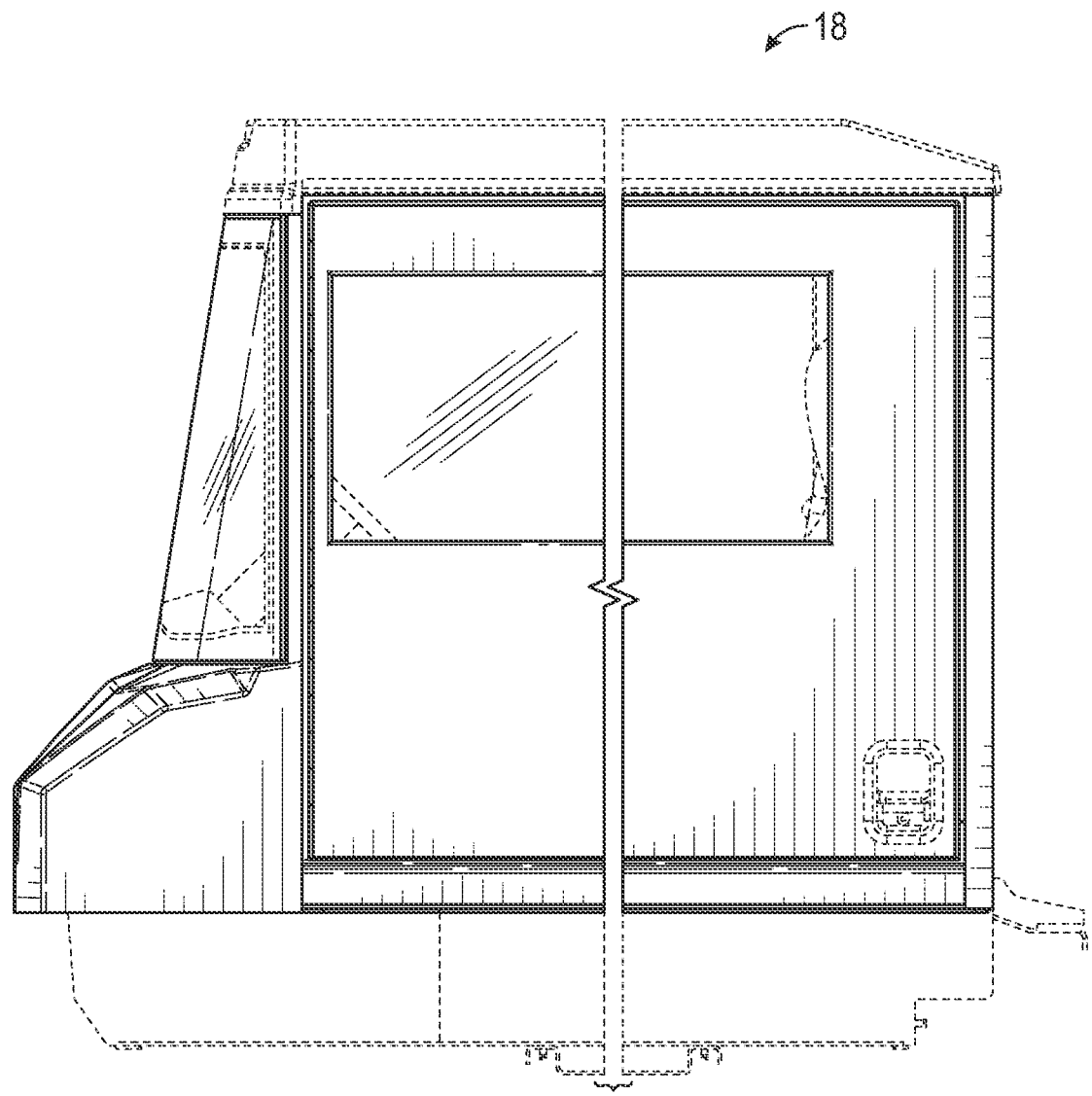
Figure 65:
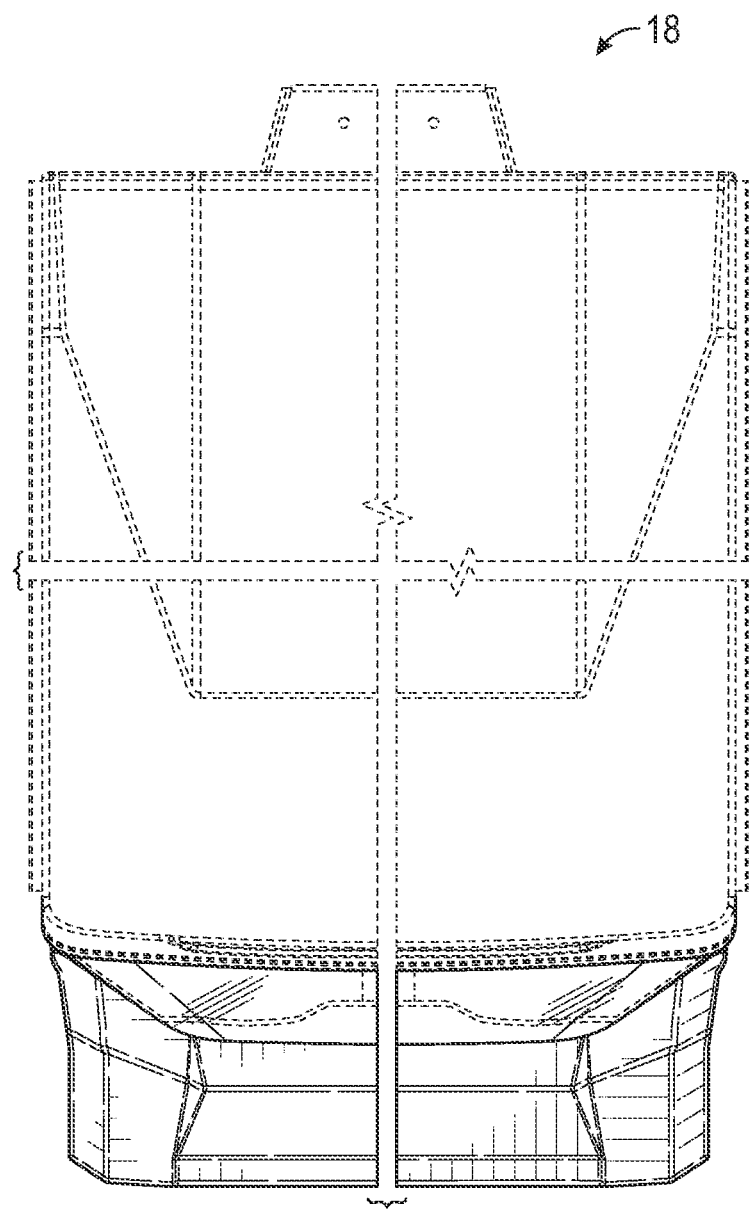
Figure 66:
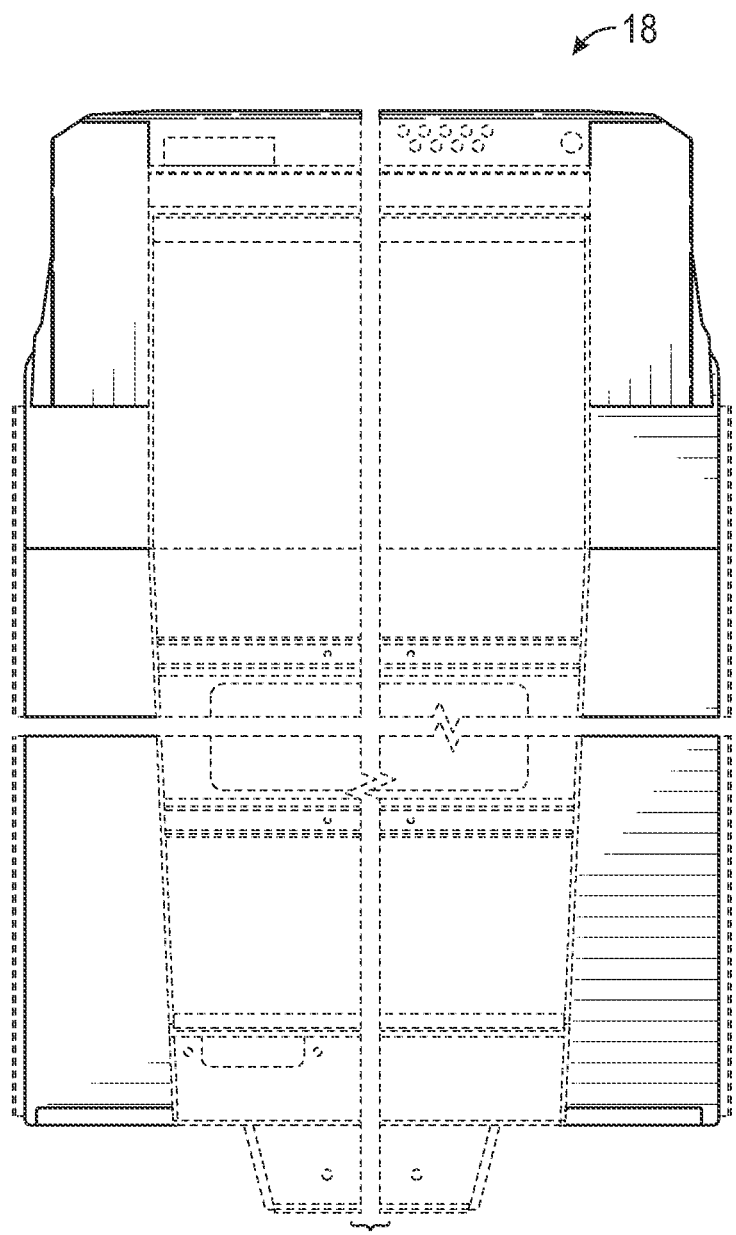
Figure 67:
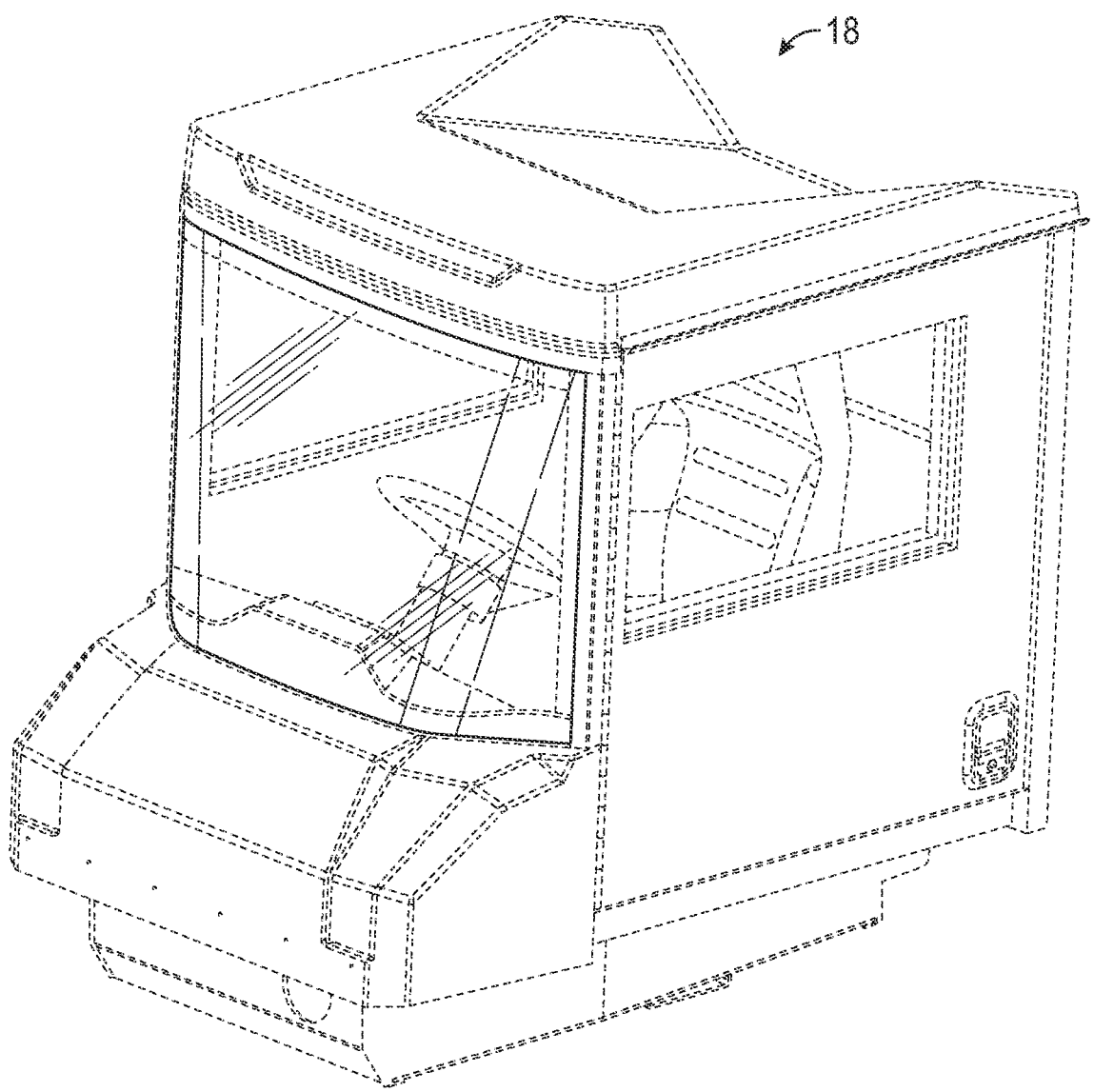
Figure 68:
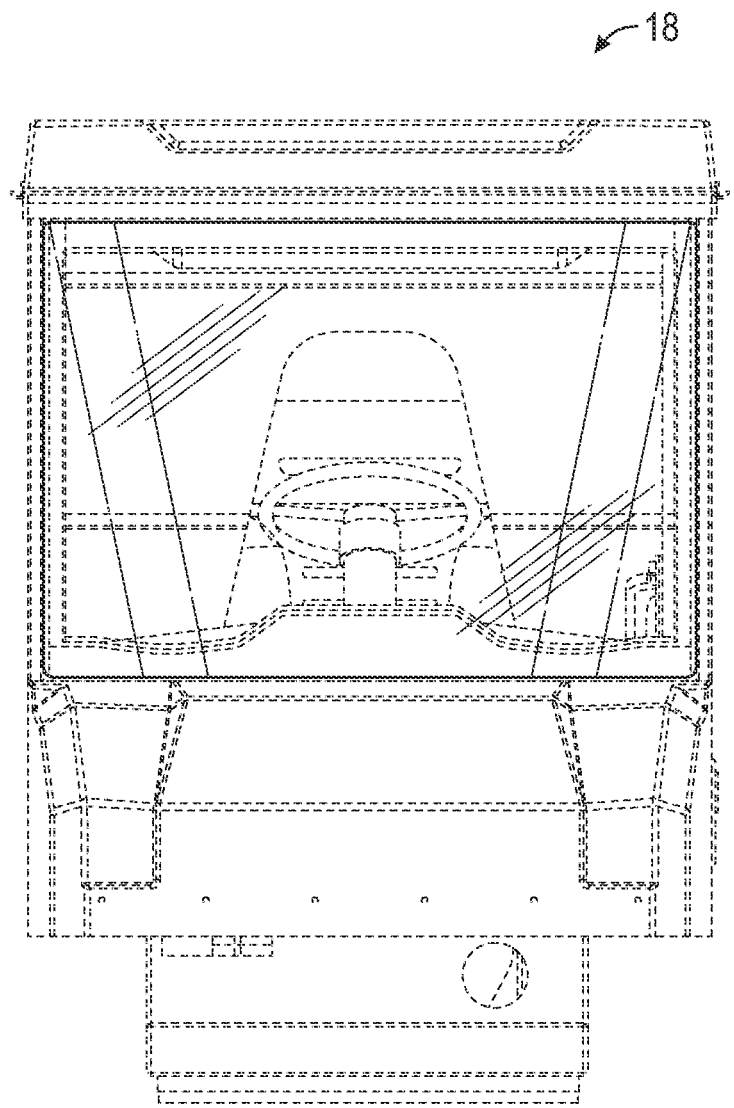
Figure 69:
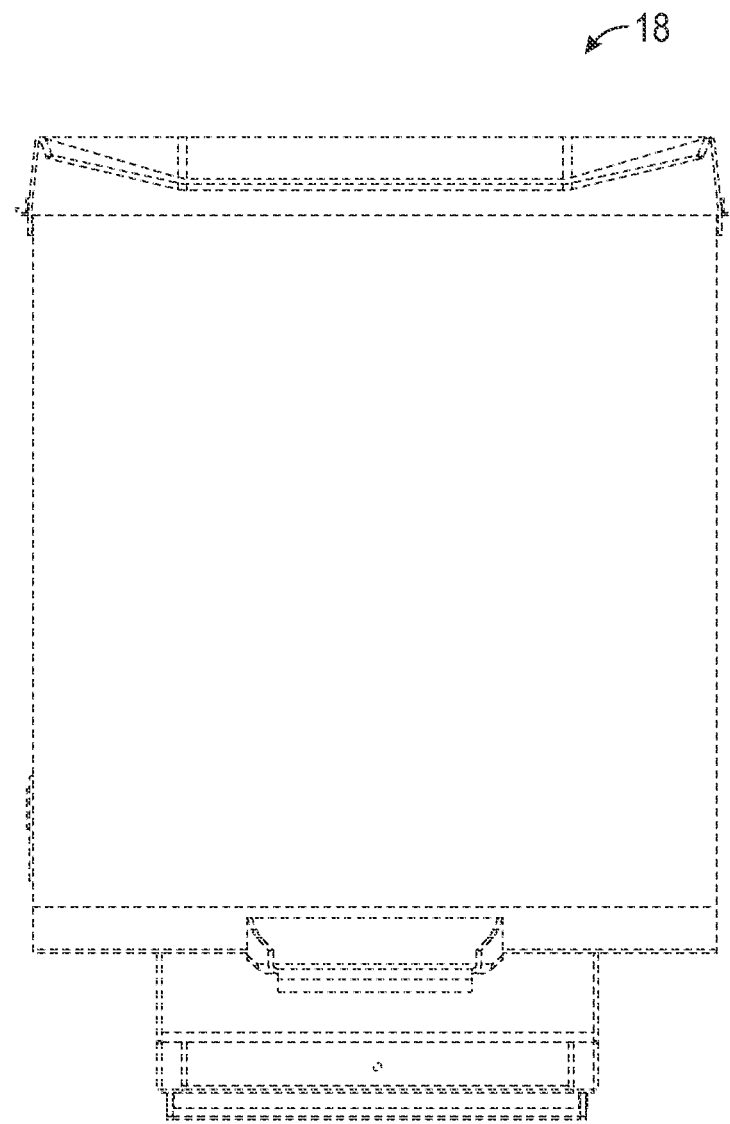
Figure 70:
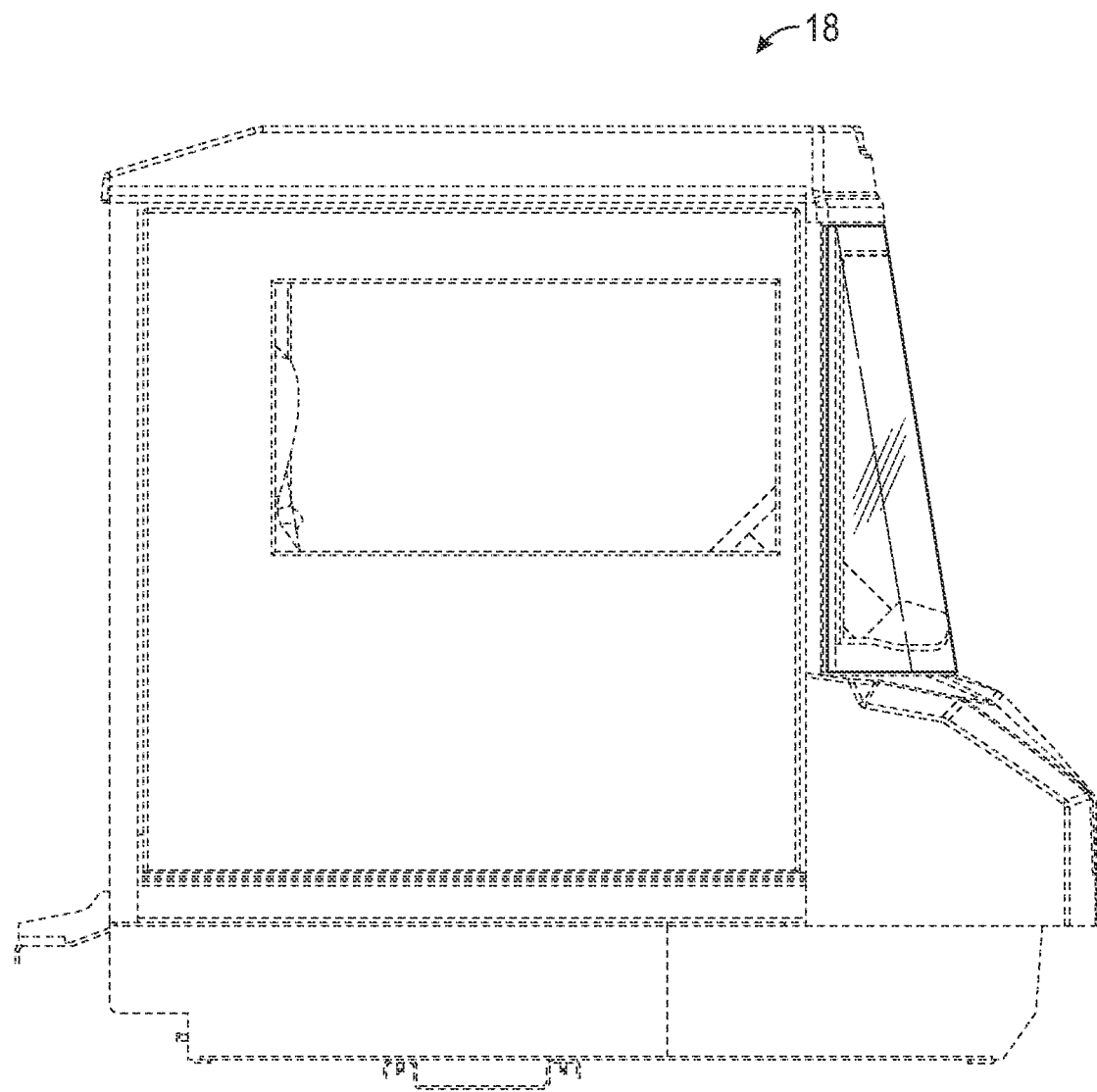
Figure 71:
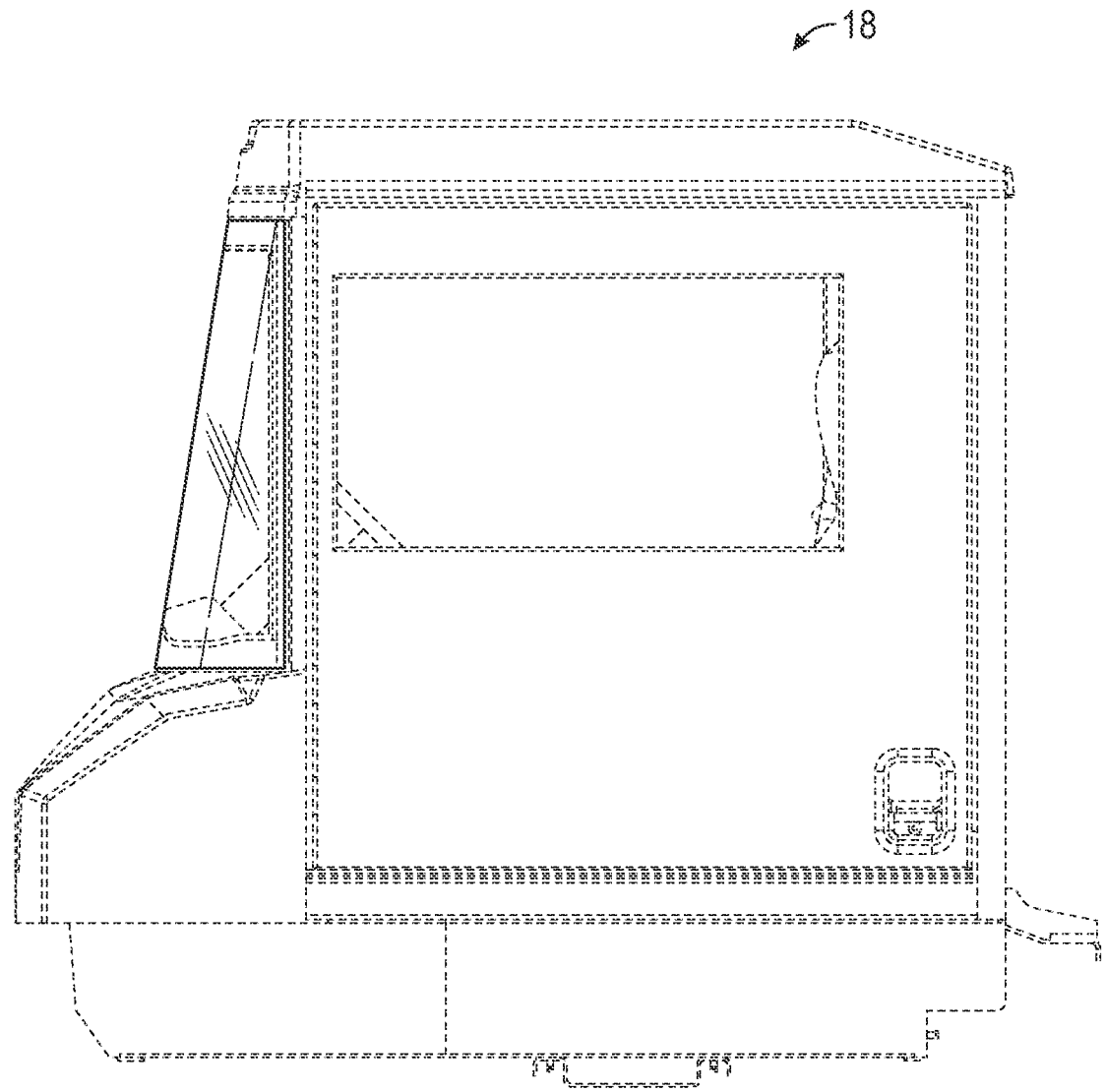
Figure 72:
Figure 73:
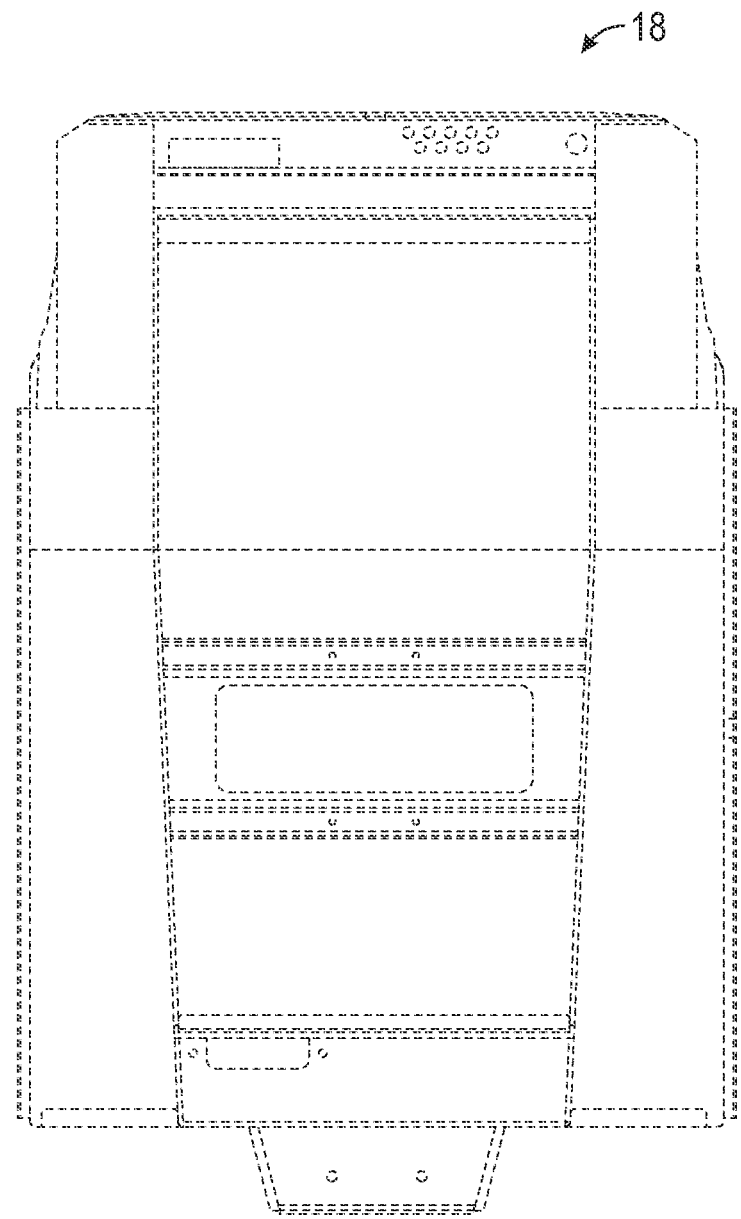

Referring to FIGS. 46-52, the hood 86 and the engine module 110 are shown, according to an exemplary embodiment. As shown in FIGS. 46,47, and 52, the hood 86 of the engine module 110 is coupled to the frame rails 40 and/or other portions of the chassis 12. As shown in FIGS. 49-52, the hood 86 is configured to be coupled to the frame rails 40 by (i) first coupling members 4220 positioned along the bottom of the first hood sidewall 4042 and the second hood sidewall 4044 proximate the front hood end 4038 thereof (ii) second coupling members 4302 positioned along the bottom of the first hood sidewall 4042 and the second hood sidewall 4044 proximate the rear hood end 4040 thereof. The hood 86 may be configured to engage a cross member disposed proximate the rear end 24 of the chassis 12.

As shown in FIGS. 46-52, the hood 86 includes an external housing 4002 having a front hood end 4038 positioned rearward of the second end 38 of the mixing drum 14, a rear hood end 4040 positioned proximate the rear end 24 of the chassis 12, a first hood sidewall 4042 adjacent the first lateral side 142, a second hood sidewall 4044 adjacent the second lateral side 144, and a top surface 4004 extending between the front hood end 4038, the rear hood end 4040, the first hood sidewall 4042, and the second hood sidewall 4044. As shown in FIGS. 46 and 48-52, the external housing 4002 includes an upper portion 4012 and a lower portion 4014. As shown in FIG. 47, the external housing 4002 defines an internal cavity 4010 that receives various components of the engine module 110 including the engine 74, a cooling system 4080, a plurality of electronic components 4082, and/or various other components. The hood 86 may, thereby, cover and protect the various components of the engine module 110. The internal cavity 4010 includes various chambers such as a lower chamber 4074, an upper chamber 4072, and a rear chamber 4070. The upper chamber 4072 is disposed above the engine and the cooling system 4080 within the upper portion 4012 of the external housing 4002. The rear chamber 4070 is disposed downstream of the fan assembly 4050. The lower chamber 4074 is disposed between the front hood end 4038 and the cooling system 4080 within the lower portion 4014 of the external housing 4002.

According to an exemplary embodiment, the cooling system 4080 is configured to thermally regulate (e.g., cool, etc.) the engine 74. In some embodiments, the cooling system 4080 may absorb thermal energy from the engine 74 and transport the thermal energy to another location where it can be expelled to the surrounding environment. As shown in FIG. 47, the cooling system 4080 includes a radiator assembly 4048 and a fan assembly 4050. The radiator assembly 4048 includes a radiator 4058 and a plurality of conduits 4084 fluidly coupling the radiator 4058 to the engine 74.

The radiator 4058 (e.g., a heat exchanger) is configured to receive incoming air to reduce the temperature of a fluid (e.g., coolant, etc.) within the radiator assembly 4048 to facilitate cooling the engine 74. The heated air then disperses (e.g., through forced or natural convection, etc.), transferring the thermal energy to the surrounding environment. The radiator 4058 is thermally conductive and has a large surface area (e.g., formed through a number of fins, etc.). In some embodiments, the radiator 4058 is liquid-cooled, rather than air-cooled. The plurality of conduits 4084 (e.g., fluid conduits) extend from the engine 74 to the radiator 4058 and are configured to deliver fluid cooled by the radiator 4058 to the engine 74 to thermally regulate the engine 74. In some embodiments, the plurality of conduits 4084 are configured to deliver coolants from one or more tanks to the engine 74. For example, a coolant circuit includes a thermal energy interface (e.g., water jacket) and is configured to transfer thermal energy from the engine 74 into the coolant through the plurality of conduits 4084.

As shown in FIG. 47, the fan assembly 4050 is positioned rearward of the radiator 4058. In other embodiments, the fan assembly 4050 is positioned forward of the radiator 4058. As shown in FIGS. 47, 51, and 52, the fan assembly 4050 includes a fan frame 4052, a fan 4016 having a plurality of fan blades 4408, a fan motor 4410, and a plurality of conduits 4414. The fan frame 4052 supports the fan 4016 and positions the fan 4016 proximate the radiator 4058. The fan motor 4410 is positioned to drive (i.e., rotate) the fan blades 4408 to draw air through the radiator 4058 to cool the coolant flowing therethrough. According to an exemplary embodiment, the fan motor 4410 is a hydraulic motor coupled to the hydraulic pump 4066 by the plurality of conduits 4414. Accordingly, the hydraulic motor is driven by the hydraulic pump 4066. In one embodiment, the hydraulic pump 4066 is driven by the engine 74 (e.g., via a power-take-off, etc.). Alternatively, the hydraulic pump 4066 may be indirectly coupled to the engine 74 through one or more power transmission devices (e.g., a transmission, a belt assembly, a geared connection, etc.). In other embodiments, the fan motor 4410 is an electrically driven motor.

Figure 49:
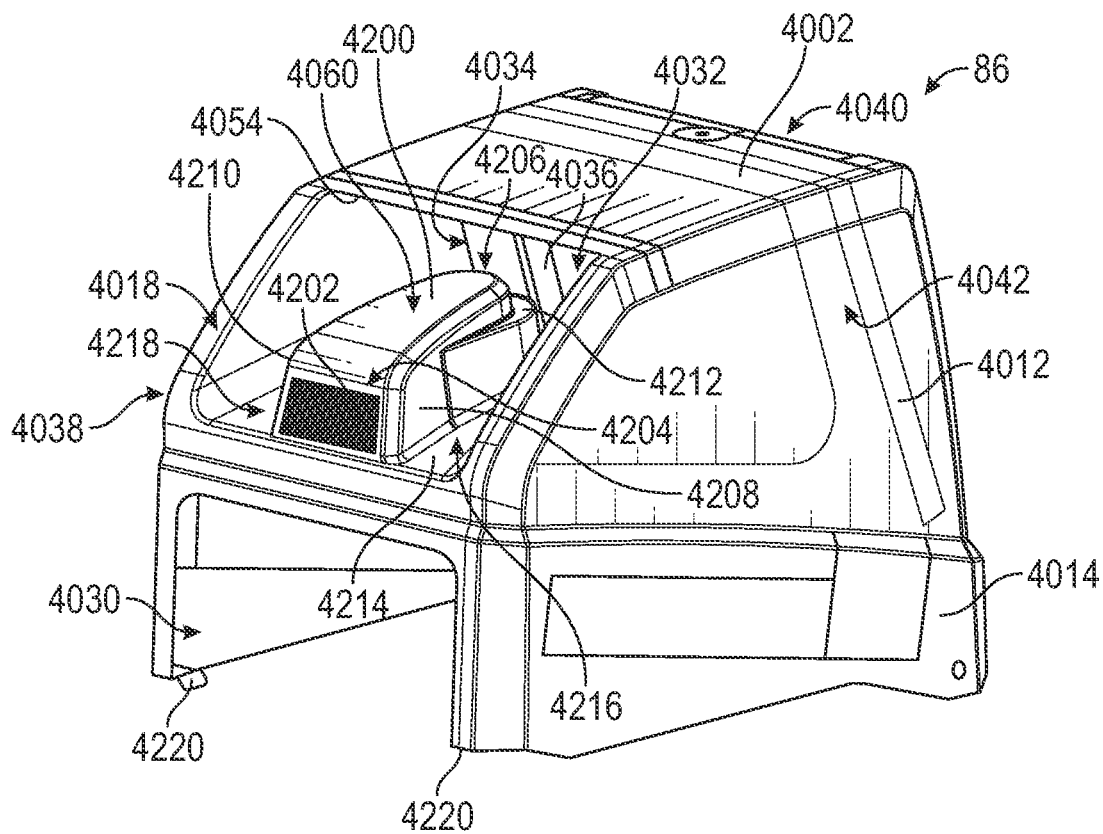

As shown in FIGS. 47 and 49, the front hood end 4038 of (i) the lower portion 4014 of the external housing 4002 defines an opening 4030 connected to the lower chamber 4074 and (ii) the upper portion 4012 of the external housing 4002 defines an inlet airflow cavity 4018 connected to the upper chamber 4072. As shown in FIG. 47, piping of an exhaust system 4096 and/or other components (e.g., fuel lines extending from the container 126, etc.) extend through the opening 4030, into the lower chamber 4074, and connects to the engine 74. Accordingly, combustion gases (i.e., exhaust) from the engine 74 can flow along the piping of the exhaust system 4096 and be expelled into the surrounding environment outside of the hood 86.

As shown in FIGS. 47 and 49, the inlet airflow cavity 4018 has a bottom surface 4214 and an air inlet 4031 positioned between the top surface 4004 of the external housing 4002 and the bottom surface 4214 of the inlet airflow cavity 4018. The air inlet 4031 connects the inlet airflow cavity 4018 to the upper chamber 4072 of the internal cavity 4010. According to the exemplary embodiment shown in FIG. 47, the bottom surface 4214 of the inlet airflow cavity 4018 is sloped such that an end of the bottom surface 4214 positioned proximate the front hood end 4038 of the external housing 4002 is lower than an opposing end of the bottom surface 4214 positioned proximate the air inlet 4031. In other embodiments, the bottom surface 4214 is substantially flat. As shown in FIG. 49, the top surface 4004 of the external housing 4002 includes an extended edge 4054 that at least partially overhangs the inlet airflow cavity 4018, extending forward past the air inlet 4031. As shown in FIG. 49, the hood 86 includes a dividing fin 4036 that (i) extends between the bottom surface 4214 of the inlet airflow cavity 4018 and the top surface 4004 of the external housing 4002 and (ii) separates the air inlet 4031 into a first air inlet 4032 and a second air inlet 4034.

As shown in FIGS. 47 and 49, the hood 86 includes divider/intake 4060. The divider/intake 4060 includes an intake housing 4200 extending upward from the bottom surface 4214 of the inlet airflow cavity 4018. As shown in FIG. 49, the intake housing 4200 separates the inlet airflow cavity 4018 into a first airflow channel 4216 aligned with the first air inlet 4032 and a second airflow channel 4218 aligned with the second air inlet 4034. As shown in FIG. 49, the intake housing 4200 has a first end 4204 positioned proximate the front hood end 4038 of the external housing 4002, an opposing second end 4206 positioned proximate the air inlet 4031, and sidewalls 4208, 4210 extending from the first end 4204 and the opposing second end 4206. As shown in FIGS. 47 and 49, the intake housing 4200 defines an air intake chamber 4213 and a third air inlet 4202 positioned along the first end 4204. The third air inlet 4202 connects to the air intake chamber 4213. In some embodiments, the first air inlet 4032, the second air inlet 4034, and/or the third air inlet 4202 includes a screen and/or filter disposed thereon. The divider/intake 4060 includes a curved protrusion 4212 extending from the sidewalls 4208, 4210 of the intake housing 4200 and around the opposing second end 4206 of the intake housing 4200. According to an exemplary embodiment, the curved protrusion 4212 is configured to direct airflow to the first air inlet 4032 and the second air inlet 4034.

As shown in FIG. 47, the engine 74 includes an air intake assembly 4062 extending from the engine 74, through the bottom surface 4214 of the inlet airflow cavity 4018, and into the air intake chamber 4213 of the intake housing 4200. The air intake assembly 4062 includes an air filter 4064 disposed between an inlet thereof and the engine 74. The air filter 4064 is configured to filter air prior to entering the engine 74. According to an exemplary embodiment, the inlet airflow cavity 4018 is configured to direct an airflow (i) along the first airflow channel 4216 and through the first air inlet 4032 into the upper chamber 4072 of the internal cavity 4010 and along the second airflow channel 4218 and through the second air inlet 4034 into the upper chamber 4072 of the internal cavity 4010 to interact with the cooling system 4080 (bypassing over the engine 74) and (ii) through the third air inlet 4202 and into the air intake chamber 4213 of the intake housing 4200 to flow into the engine 74 through the air intake assembly 4062.

As shown in FIGS. 50 and 52, the rear hood end 4040 of the external housing 4002 defines a hatch opening 4024. As shown in FIGS. 46, 48, and 50-52, the hood 86 includes a hatch 4020 including a hatch door 4022 (i) coupled to the rear hood end 4040 of the external housing 4002 about a first hatch coupling member 4402 near the first lateral side 142 and a second hatch coupling member 4404 near the second lateral side 144 and (ii) selectively pivotable between an open position 4120 where the rear chamber 4070 is exposed and a closed position 4110 where the hatch door 4022 encloses the hatch opening 4024. In the open position, various components of the engine module 110 (e.g., the cooling system 4080, the radiator assembly 4048, the fan assembly 4050, the fluid tank 410, the plurality of electronic components 4082, etc.) may be easily accessible for inspection and maintenance. In some embodiments, the first hatch coupling member 4402 and the second hatch coupling member 4404 are configured to assist in moving the hatch door 4022 from the closed position 4110 to the open position 4120. In some embodiments, the first hatch coupling member 4402 and the second hatch coupling member 4404 include gas struts that utilize gas pressure internal to the strut to provide a push or pull force depending on configuration and contain a dampening circuit typically to control the speed of motion through one or both directions of travel. In some embodiments, the first hatch coupling member 4402 and the second hatch coupling member 4404 include springs, pistons, shocks, or other compression and dampening members.

As shown in FIGS. 46, 48, and 50-52, the hatch door 4022 includes a grille 4026 that covers an air outlet defined by the hatch door 4022 and a bottom hatch portion 4028. The air outlet is positioned to permit air to flow out the rear hood end 4040 of the external housing 4002 through the hatch door 4022 and the grille 4026. The grille 4026 extends from the bottom hatch portion 4028 axially toward the top of the hatch door 4022. The grille 4026 is positioned to prevent objects from entering the rear chamber 4070 through the air outlet defined by the hatch door 4022. The bottom hatch portion 4028 defines a plurality of light apertures 4102 configured to receive a plurality of lights 4104. The light apertures 4102 may be positioned near an electrical and control system to provide power for lights and to control the brightness, illumination, and/or flickering of the plurality of lights 4104.

As shown in FIGS. 50-52, the hatch 4020 includes a conical-shaped or tapered internal housing 4300 that protrudes or extends from an interior surface of the hatch door 4022 into the rear chamber 4070. As shown in FIG. 52, the internal housing 4300 defines a slot 4310 positioned to accommodate the plurality of conduits 4414 extending between the hydraulic pump 4066 and the fan motor 4410. As shown in FIG. 51, the internal housing 4300 includes a fan ring 4406 coupled to an interior surface thereof by a plurality of coupling members 4412 (e.g., bolts, etc.). The fan ring 4406 defines an aperture that interfaces with the fan 4016 when the hatch door 4022 is in the closed position 4110 to provide a snug, interface fit. In other embodiments, the fan ring 4406 is coupled directly to the fan assembly 4050.

According to an exemplary embodiment, the shape of the internal housing 4300 is configured to direct/diffuse hot air out of the hood 86 from the fan 4016 rearward and/or or slightly upward to not disturb dust on the ground outside of the concrete mixer truck 10. The shape of the internal housing 4300 may reduce recirculation and improve efficiency of the airflow through the hood 86. Further, the shape/configuration of the internal housing 4300 may facilitate operating the fan 4016 at a reduced fan speed relative to conventional systems, while still properly cooling the engine module 110. The grille 4026 is configured to provide low restriction around the internal housing 4300.

Multi-Function Joystick

According to the exemplary embodiment shown in FIGS. 74 and 75, a user controller, shown as multi-function joystick 200, is configured to facilitate controlling multiple functions of multiple components of the concrete mixer truck 10. According to an exemplary embodiments, the multi-function joystick 200 is disposed in the housing 70 of the cab 18. In some embodiments, the multi-function joystick 200 is centrally positioned along a dash (e.g., panel) in the cab 18. In other embodiments, the multi-function joystick 200 is positioned toward the first lateral side 142 of the cab 18 so that the operator can better view the main chute 46 and other components. Generally, the multi-function joystick 200 includes more functionality and is more efficient than conventional control systems, such as a dash and/or overhead panel with switches, buttons, levers, and the like.

The multi-function joystick 200 may facilitate performing various functions including: (i) controlling actuation of the first chute actuator 122 to pivot the main chute 46 about a vertical axis (e.g., through an arc, etc.), (ii) controlling actuation of the second chute actuator 94 to pivot (e.g., raise, lower, etc.) the main chute 46 about a lateral axis, (iii) controlling actuation of the third chute actuator 78 to reposition (e.g., pivot, fold, unfold, etc.) the extension chute 48 relative to the base section 124 of the main chute 46, (iv) controlling the drum driver 114 to control a direction and/or speed of the mixing drum 14, (v) controlling the hopper actuator 66 to control the position of the charge hopper 42 (e.g., between the first position and the second position, etc.), (vi) controlling modes of the transmission of the power plant module 62 (e.g., neutral, forward, reverse, etc.), and/or (vii) controlling movement of the concrete mixer truck 10 (e.g., a speed, direction, etc. thereof). By having such a wide variety of controls and control functionality in a single device, the multi-function joystick 200 consolidates the motion, focus, and concentration of the operator to a single location (i.e., the multi-function joystick 200) to control a wide variety of functions and operations of the concrete mixer truck 10. The multi-function joystick 200 may be used in tandem with other control systems (e.g., a driver's wheel, a switch configured to control the drum assembly 6, a lever configured to control the fuel system 108, an accelerator pedal, a brake pedal, etc.) to control various other components of the concrete mixer truck 10.

The multi-function joystick 200 has an elongated body having a top end 202 and a bottom end 204. The elongated body includes a base portion 210 at the bottom end 204, a control portion 250 at the top end 202, and a shaft 212 extending between the base portion 210 and the control portion 250. The base portion 210 includes a motion assembly 216. In some embodiments, the motion assembly 216 is configured to allow for and capture movement of the multi-function joystick 200 by an operator in an x-y plane (i.e., an x-direction and a y-direction). In some embodiments, the motion assembly 216 allows for the multi-function joystick 200 to be rotated (e.g., twisted) about a z-direction (i.e., a vertical, longitudinal axis defined by the shaft 212). The x-y coordinates pinpoint the movement and position of the multi-function joystick 200 as it is moved by the operator. In some embodiments, the multi-function joystick 200 captures the movement through use of an analog-to-digital converter, an analog-to-digital converter chip, optical sensors, light emitting diodes, and/or other analog capturing and motion registering implementations. The shaft 212 includes a curved, grip portion 220 that is configured to receive a hand of an operator. In some embodiments, the curved, grip portion 220 is ergonomically shaped to provide comfort and usability when the operator moves the shaft 212 to control one or more components of the concrete mixer truck 10.

According to an exemplary embodiment, movement of the multi-function joystick 200 in the x-direction, the y-direction, and/or the z-direction causes movement of a component of the concrete mixer truck 10. In some embodiments, the movement of the multi-function joystick 200 controls the rotation and elevation of the main chute 46. By way of example, the movement of the multi-function joystick 200 in the y-direction (e.g., left and right) may be operably connected to the second chute actuator 94 such that movement of the multi-function joystick 200 in the y-direction moves the main chute 46 left and right. By way of another example, the movement of the multi-function joystick 200 in the x-direction (e.g., front and back) may be operably connected to the first chute actuator 122 such that movement of the multi-function joystick 200 in the x-direction moves the main chute 46 up and down. In other embodiments, the multi-function joystick 200 has different modes (e.g., capable of being toggled between via a button, trigger, etc.), with each mode configured such that the movement of the multi-function joystick 200 moves a different component of the concrete mixer truck 10 associated with the selected mode. For example, in a first mode, movement of the multi-function joystick 200 may cause movement of the main chute 46 and, in a second mode, movement of the multi-function joystick 200 may cause movement of another component (e.g., the drive system 20, the charge hopper 42, the mixing drum 14, etc.).

The control portion 250 includes a button interface having a plurality of buttons, adjusters, and/or dials (e.g., controls) that are configured to facilitate controlling various components of the concrete mixer truck 10. Having the controls concentrated on the top end 202 of the multi-function joystick 200 alleviates the operator from having to move their focus from the component(s) being used for accomplishing a task (e.g., move, maneuver, receive, dispense, etc.) as the controls necessary for controlling the component of the task are disposed on the control portion 250. Specifically, the control portion 250 includes a plurality of thumb-activated (or other finger-activated) controls. The controls include a chute fold control 302, a chute unfold control 304, a charge hopper close control 306, a drive/transmission control 308, a charge hopper open control 310, a mixer drum pause control 312, and a mixer drum discharge/charge control 314.

According to the exemplary embodiment shown, the chute fold control 302, the chute unfold control 304, the charge hopper close control 306, the charge hopper open control 310, and the mixer drum pause control 312 are push/press activated buttons. However, it should be understood that, in other embodiments, the chute fold control 302, the chute unfold control 304, the charge hopper close control 306, the charge hopper open control 310, and/or the mixer drum pause control 312 could be implemented using a wide variety of different types of controls including scrollable controls, rotatable controls, trigger controls, switch controls, d-pad/directional controls, and/or still other manual-activation controls. According to the exemplary embodiment shown, the drive/transmission control 308 and the mixer drum discharge/charge control 314 are dial/scrollable type controls. However, it should be understood that, in other embodiments, the drive/transmission control 308 and the mixer drum discharge/charge control 314, could be implemented using a wide variety of different types of controls including push/press button controls, rotatable controls, trigger controls, switch controls, d-pad/directional controls, and/or still other manual-activation controls. Further, it should be understood that one or more functions provided by a single control could be implemented in multiple, separate controls. Conversely, one or more functions shown as multiple controls could be implemented in a single, multifunction control.

According to an exemplary embodiment, the chute fold control 302 and the chute unfold control 304 are operably connected to the third chute actuator 78 to facilitate controlling folding and unfolding of the extension chute 48 relative to the base section 124 of the main chute 46 via the multi-function joystick 200. By way of example, when the chute unfold control 304 is pressed, the third chute actuator 78 may be engaged (e.g., extended, pivoted, etc.) to cause the extension chute 48 to pivot from the first configuration (e.g., the transport configuration, the stored configuration, etc.) to the second configuration (e.g., the use configuration, the dispensing configuration, etc.). By way of another example, when the chute fold control 302 is pressed, the third chute actuator 78 may be engaged (e.g., retracted, pivoted, etc.) to cause the extension chute 48 to pivot from the second configuration to the first configuration.

According to an exemplary embodiment, the charge hopper close control 306 and the charge hopper open control 310 are operably connected to the hopper actuator 66 to facilitate repositioning the charge hopper 42 between the first position (e.g., the lowered position, the loading position, the charging position, etc.) and the second position (e.g., the raised position, the dispensing/discharging position, the pivoted position, etc.). By way of example, when the charge hopper close control 306 is pressed, the hopper actuator 66 may be engaged (e.g., extended, pivoted, etc.) to reposition (e.g., lift, pivot, etc.) the charge hopper 42 from the first position to the second position. In the second position, the charge hopper 42 is in a configuration that allows for the discharge of material from the internal volume 30 of the mixing drum 14 into the discharge hopper 44 and the main chute 46. By way of another example, when the charge hopper open control 310 is pressed, the hopper actuator 66 may be engaged (e.g., retracted, rotated, etc.) to reposition (e.g., lower, pivot, etc.) the charge hopper 42 from the second position to the first position. In the first position, the charge hopper 42 is in a high-flow configuration allowing for unobstructed flow of material from the charge hopper 42 into the internal volume 30 of the mixing drum 14.

According to an exemplary embodiment, the mixer drum pause control 312 and the mixer drum discharge/charge control 314 are operably connected to the drum driver 114 to facilitate controlling movement of the mixing drum 14. By way of example, when the mixer drum pause control 312 is pressed, the drum driver 114 stops operation causing the mixing drum 14 to stop rotating. The mixer drum discharge/charge control 314 is a dial that can be moved in a first direction 332 or a second direction 334 from a neutral position 330. According to an exemplary embodiment, the mixer drum discharge/charge control 314 is a spring-return dial. Accordingly, when the mixer drum discharge/charge control 314 is moved in the first direction 332 or the second direction 334 and then subsequently released, the mixer drum discharge/charge control 314 is biased toward and returns to the neutral position 330. By way of example, when the mixer drum discharge/charge control 314 is moved in the first direction 332 (e.g., when the mixing drum 14 is stationary, etc.), the drum driver 114 rotates the mixing drum 14 in a first rotational direction (e.g., a charge/mix direction, etc.). In some embodiments, as the mixer drum discharge/charge control 314 is moved further in the first direction 332, the mixing drum 14 is rotated more quickly in the first rotational direction. When the mixer drum discharge/charge control 314 is released, the mixer drum discharge/charge control 314 returns to the neutral position 330 and the mixing drum 14 continues to rotate in the first rotational direction. In some implementations, once the mixing drum 14 is rotating in the first rotational direction, moving the mixer drum discharge/charge control 314 toward the second direction 334 may slow the rotation of the mixing drum 14 in the first rotational direction (e.g., until zero speed is reached and then the rotational direction may flip, etc.). By way of another example, when the mixer drum discharge/charge control 314 is moved in the second direction 334 (e.g., when the mixing drum 14 is stationary, etc.), the drum driver 114 rotates the mixing drum 14 in a second rotational direction (e.g., a discharge direction, etc.) opposite the first rotational direction. In some embodiments, as the mixer drum discharge/charge control 314 is moved further in the second direction 334, the mixing drum 14 is rotated more quickly in the second rotational direction. When the mixer drum discharge/charge control 314 is released, the mixer drum discharge/charge control 314 returns to the neutral position 330 and the mixing drum 14 continues to rotate in the second rotational direction. In some implementations, once the mixing drum 14 is rotating in the second rotational direction, moving the mixer drum discharge/charge control 314 toward the first direction 332 may slow the rotation of the mixing drum 14 in the second rotational direction (e.g., until zero speed is reached and then the rotational direction may flip, etc.).

The drive/transmission control 308 is operably connected to the transmission of the drive system 20 to facilitate controlling a mode of the transmission between a forward mode, a neutral mode, and a reverse mode. The drive/transmission control 308 is a dial that can be moved in a first direction 352 or a second direction 354 from a neutral position 350. According to an exemplary embodiment, the drive/transmission control 308 is a detent dial. Accordingly, when the drive/transmission control 308 is moved in the first direction 352, the drive/transmission control 308 engages a drive detent, securing the drive/transmission control 308 in a drive position (i.e., the drive/transmission control 308 is not biased into the neutral position 350 when released) and shifting the transmission of the drive system 20 into a drive mode. When the drive/transmission control 308 is moved in the second direction 354, the drive/transmission control 308 engages a reverse detent, securing the drive/transmission control 308 in a reverse position (i.e., the drive/transmission control 308 is not biased into the neutral position 350 when released) and shifting the transmission of the drive system 20 into a reverse mode. When the drive/transmission control 308 is moved to the neutral position 350, the drive/transmission control 308 engages a neutral detent, securing the drive/transmission control 308 in the neutral position 350 and shifting the transmission of the drive system 20 into a neutral mode. In some embodiments, an indicator light on the drive/transmission control 308 illuminates based to the position thereof (e.g., illuminates when in the neutral position 350, illuminates different colors based on the position, etc.).

Water Tracking System

Figure 76:
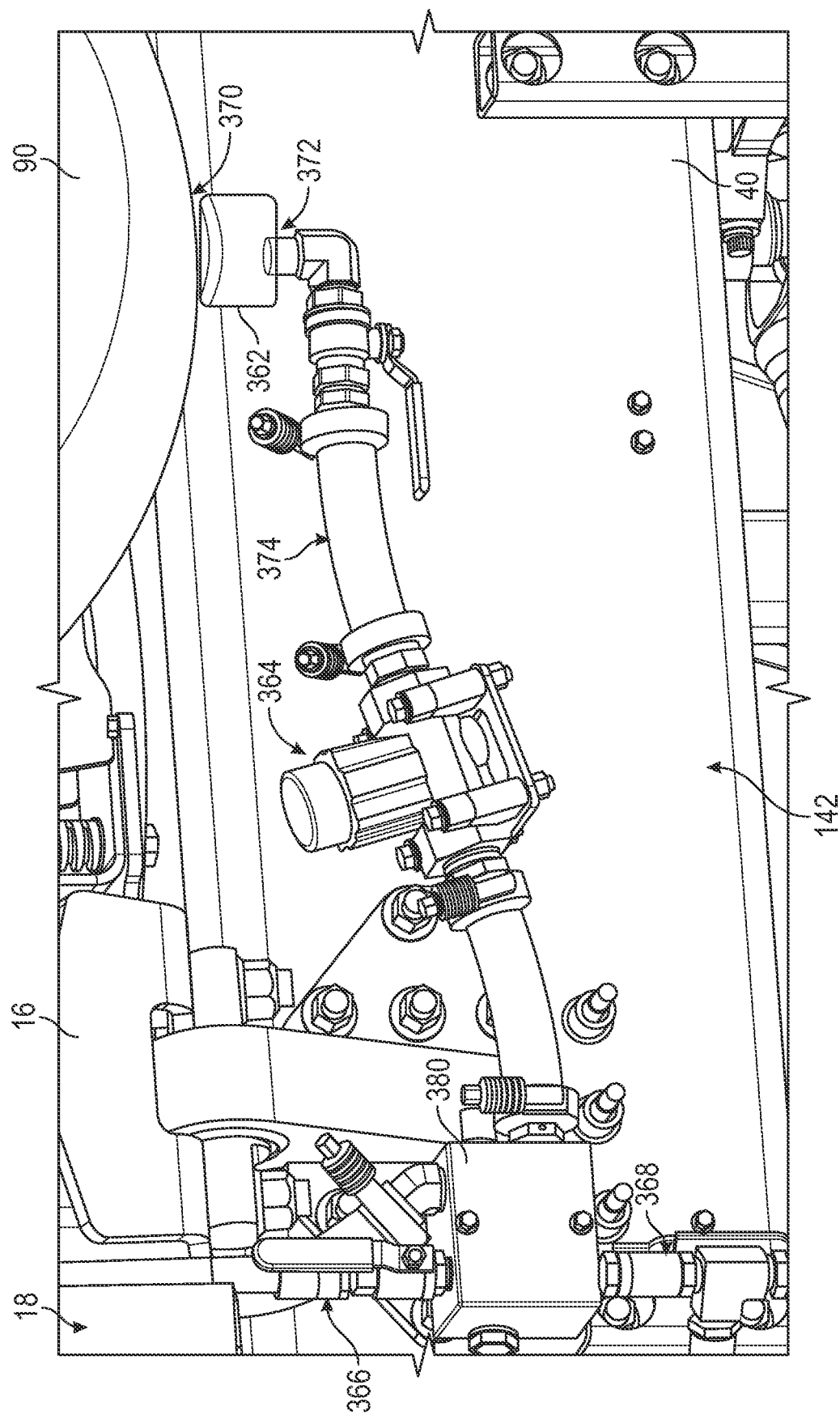
FIG. 76 is a side perspective view of a water tracking system of the concrete mixer truck of FIG. 1, according to an example embodiment.

According to the exemplary embodiment shown in FIG. 76, the concrete mixer truck 10 includes a water tracking system 362. The water tracking system 362 is positioned between an outlet 370 of the water tank 90 and an inlet 372 of water piping 374, and upstream of a water pump 364. In some embodiments, the water tracking system 362 has a fluid passageway extending therethrough, with a first end or inlet of the fluid passageway fluidly connected to the outlet 370 of the water tank 90 and a second end or outlet of the fluid passageway connected to the inlet 372 of the water piping 374. In other embodiments, the water tracking system 362 is or includes a probe that is disposed within/along the water piping 374. According to an exemplary embodiment, the water tracking system 362 is configured to track water flow flowing out of the water tank 90 and through the water piping 374. According to the exemplary embodiment shown in FIG. 76, the water tracking system 362 is implemented at a single location along the water systems of the concrete mixer truck 10, rather than at multiple locations.

The water pump 364 is positioned downstream of the water tank 90 and upstream of a water supply junction 380. The water pump 364 is configured to drive the water from the water tank 90 through a mixing drum water system 366 or a washdown system 368. The water pump 364 may be a variable displacement pump or a fixed displacement pump.

The water supply junction 380 receives the water from the water tank 90 and directs the water in a first direction toward the mixing drum water system 366 and/or a second direction toward the washdown system 368. The mixing drum water system 366 is operably connected to the mixing drum 14 to supply water from the water tank 90 to the mixing drum 14. The water may be used in the mixing drum 14 to add water to the concrete mixture, lubricate the internal portions of the mixing drum 14, and/or increase water content in the concrete mixture being dispensed, among other uses. The washdown system 368 is operably connected to one or more hosing and cleaning system components that are used to wash various components of the concrete mixer truck 10. The water supply junction 380 may switch between supplying water to the mixing drum water system 366 and the washdown system 368 by pressing a button, flipping a switch, activating a valve, or other activation/deactivation mechanisms. In some embodiments, the water tracking system 362 is implemented at the water supply junction 380 downstream of the water pump 364.

Figure 77:
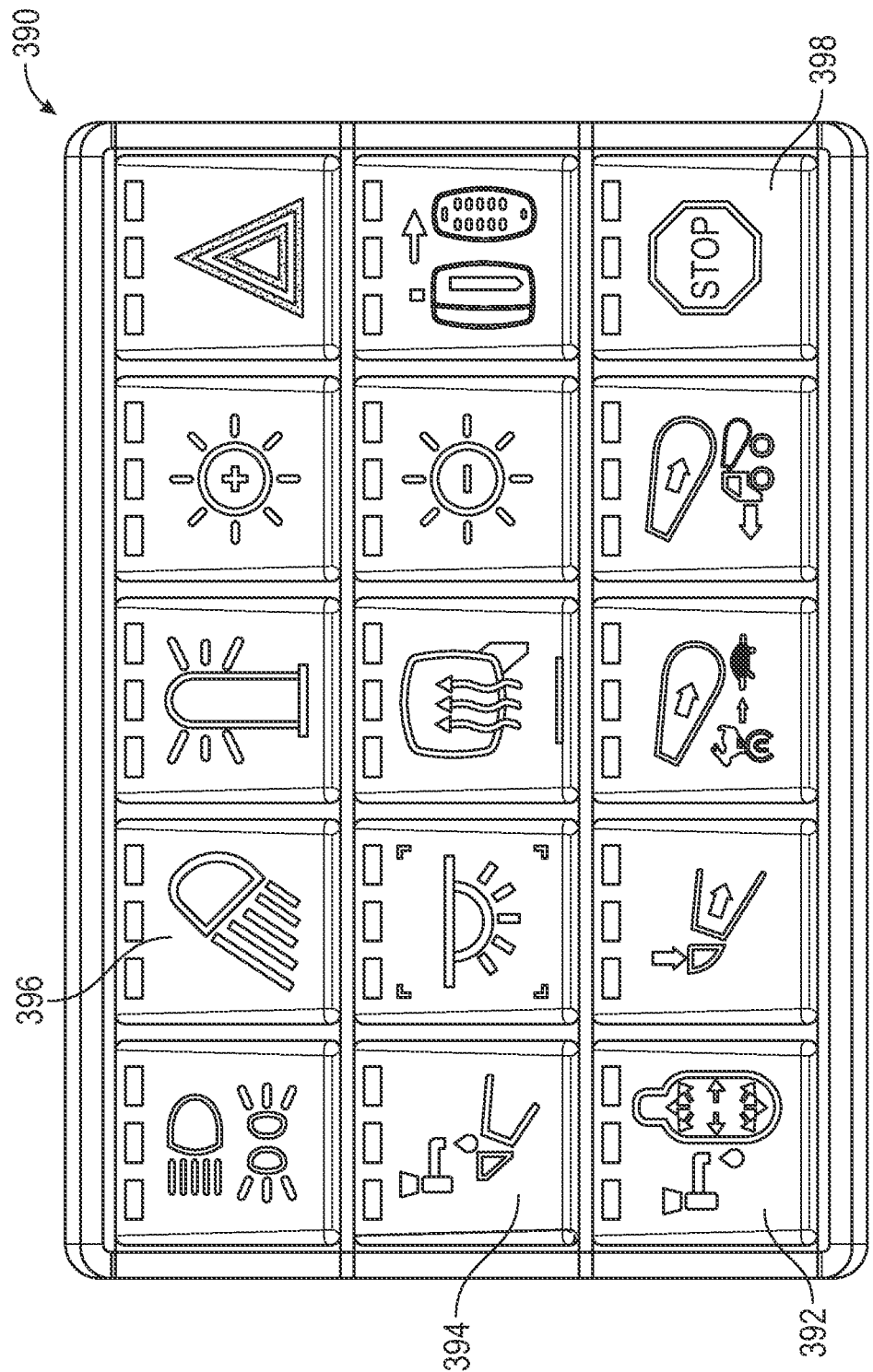
FIG. 77 is a detailed view of a user interface provided by a control panel used for controlling the water tracking system of FIG. 76, according to an example embodiment.

According to the exemplary embodiment shown in FIG. 77, the concrete mixer truck 10 includes a control panel 390. The control panel 390 may be disposed along a dash or overhead display in the cab 18 of the concrete mixer truck 10. The control panel 390 includes a user interface having physical buttons and/or having a touchscreen display that provides a graphical user interface ("GUI") with selectable GUI-defined features. The user interface of the control panel 390 includes an add water control 392, an alternative add water control 394, a washdown water control 396, and a stop control 398. The control panel 390 is communicably coupled to the water tracking system 362, according to an exemplary embodiment. The coupling may be a wired or wireless connection to the water tracking system 362. Engaging the features of the control panel 390 such pressing a control button thereon may cause a change with the water tracking system 362.

In practice, the operator presses or initiates the add water control 392 to cause the water tracking system 362 to identify the water flowing out of the water tank 90 through the water piping 374 as water that will go to the mixing drum 14 through the mixing drum water system 366. The water tracking system 362 may capture amount of water, flow rate of water, duration of usage, and other data from the water flowing from the water tank 90, through the water tracking system 362, and to the mixing drum water system 366. The operator may depress or press again the add water control 392 to stop the water tracking system 362 from identifying the water flowing out of the water tank 90 through the water piping 374 as water that will go to the mixing drum 14 through the mixing drum water system 366. The operator may press the washdown water control 396 to stop the water tracking system 362 from identifying the water flowing out of the water tank 90 through the water piping 374 as water that will go to the mixing drum 14 through the mixing drum water system 366 and transition the water tracking system 362 to identify the water flowing out of the water tank 90 through the water piping 374 as water that will go to a hose or other component (e.g., nozzles, etc.) in the washdown system 368. In some embodiments, the operator may press the stop control 398 to stop the water tracking system 362 from identifying the water flowing out of the water tank 90 through the water piping 374 as water that will go to the mixing drum 14 through the mixing drum water system 366.

In some embodiments, the alternative add water control 394 is used to cause the water tracking system 362 to identify the water flowing out of the water tank 90 through the water piping 374 as water that will go to the mixing drum 14 through the mixing drum water system 366. In some embodiments, any one of the plurality of controls, including the add water control 392, alternative add water control 394, washdown water control 396, and stop control 398 may be implemented on a joystick, such as the multi-function joystick 200 of FIG. 75. The water tracking system 362 may catalogue the water that flows to the mixing drum water system 366 so that it may be analyzed and compared to overall water usage.

Rear Drive Pedestal

Figure 78:
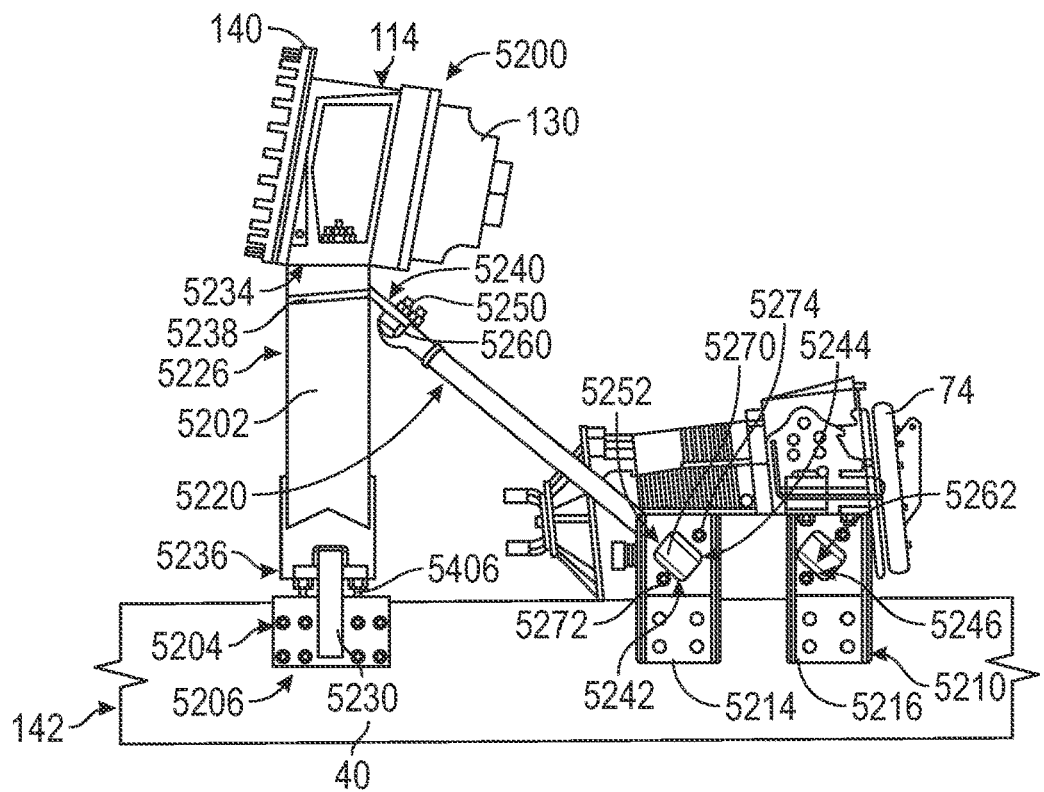
FIG. 78 is a side perspective view of a rear pedestal in a first installation configuration, according to an example embodiment.
Figure 80:
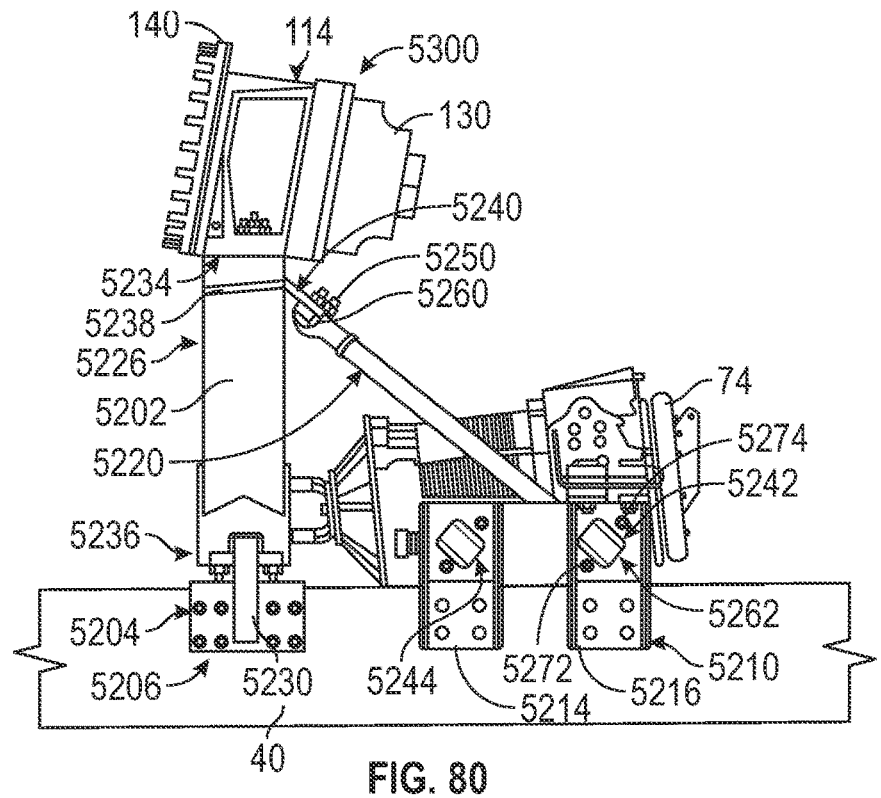
FIG. 80 is a side perspective view of a rear pedestal in a second installation configuration, according to an example embodiment.

Turning to FIG. 78, a perspective view of a rear drive pedestal 5226 installed in a short drum configuration 5200. The rear drive pedestal 5226 is similar to the rear pedestal 26 of FIG. 1. A difference between the rear drive pedestal 5226 and the rear pedestal 26, is the rear drive pedestal 5226 implements a four-point mount. Accordingly, like numbering is used to designate similar components between the rear drive pedestal 5226 and the rear pedestal 26. The rear drive pedestal 5226 is configured to be fastened with bar-pin-bushings to a transmission mounting bracket assembly 5210 that allow for several degrees of movement with the drum assembly 6. The rear drive pedestal 5226 is configured to isolate the rear drive pedestal 5226 from the frame 28 to reduce stress during articulation and other driving scenarios of the concrete mixer truck 10 by allowing the rear drive pedestal 5226 to move independently of the frame 28. The transmission mounting bracket assembly 5210 includes a first bracket 5214 with a first bar-pin engagement surface 5244 and a second bracket 5216 with a second bar-pin engagement surface 5246 on the first lateral side 142 and a third bracket 5264 with a third bar-pin engagement surface 5284 and a fourth bracket 5266 with a fourth bar-pin engagement surface 5276 on the second lateral side 144. The rear drive pedestal 5226 may be bolted in a first installation position 5252 (e.g., first bar-pin engagement surface 5244 and third bar-pin engagement surface 5284) to be in a short drum configuration 5200. Alternatively, and as shown in FIG. 80, the rear drive pedestal 5226 may be bolted at a second installation position 5262 (e.g., second bar-pin engagement surface 5246 and fourth bar-pin engagement surface 5276) to be in a long drum configuration 5300.

By implementing a four-point mount and mounting the rear drive pedestal 5226 to the web of the frame 5204, the rear drive pedestal 5226 does not constrain a rigid pedestal to a flexible frame. Additionally, the interface joints 5230 of the rear drive pedestal 5226 allows for ease of service and distribution of wear to stronger portions of the frame 28. Accordingly, the rear drive pedestal 5226 overcomes the deficiencies in conventional rear pedestals that are rigid and bolted to a flexible frame, such that it drives stress into the frame and other components that lead to structural and fastener (e.g., bolts, pins, etc.) failures. Beneficially, the rear drive pedestal 5226 impedes or eliminates wear plates, frame stress, and poor distribution of load to the weaker portions of the frame 28. Thus, the rear drive pedestal 5226 may reduce frequency of inspection and maintenance required for conventional rear pedestals.

The rear drive pedestal 5226 includes a pedestal frame 5202, a coupling brace 5238, a first mounting bracket 5206 on the first lateral side 142, a second mounting bracket 5208 on the second lateral side 144, a first bar-pin member 5220, and a second bar-pin member 5222. The pedestal frame 5202 has a first frame end 5234 disposed toward a top of the pedestal frame 5202, adjacent the drum driver 114, and a second frame end 5236 disposed at the bottom of the pedestal frame 5202, adjacent the frame 28. The pedestal frame 5202 includes one or more webbed features or frame openings 5370 (shown in FIG. 81) along the pedestal frame 5202 between the first frame end 5234 and second frame end 5236. The frame openings 5370 may be configured to further distribute stress through the rear drive pedestal 5226 and eliminate wear on other components. The first frame end 5234 is coupled to the drum drive motor 130 and/or the drum drive transmission 140. The second frame end 5236 is coupled to a first interface joint 5230 on the first lateral side 142 and the second interface joint 5232 on the second lateral side 144.

Figure 79:
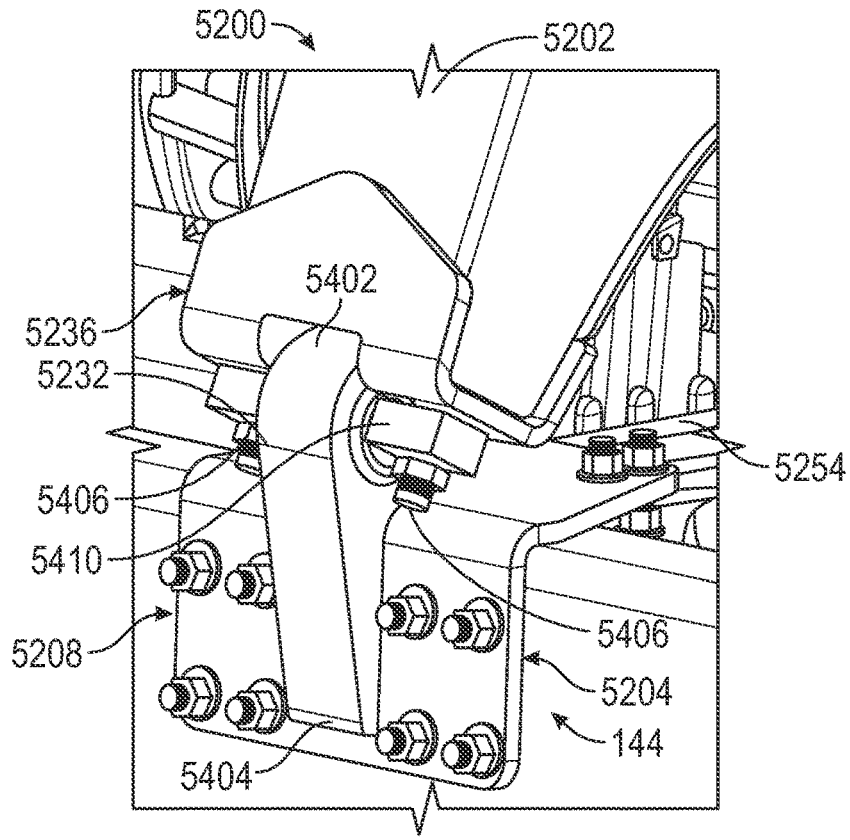
FIG. 79 is a perspective view of the interface joint of FIG. 78, according to an exemplary embodiment.

The first interface joint 5230 and the second interface joint 5232 are movable, flexible joints that are coupled to the first mounting bracket 5206 and the second mounting bracket 5208, respectively. As shown in FIG. 79, the second interface joint 5232 includes a first joint end 5402 toward the top portion of the second interface joint 5232 near the second frame end 5236 and a second joint end 5404 toward the bottom portion of the second interface joint 5232 and coupled to the second mounting bracket 5208 on the second lateral side 144. A lateral support member 5254 is coupled to an internal portion of the first mounting bracket 5206 and an internal portion of the second mounting bracket 5208. The lateral support member 5254 is configured to support the engagement of the rear drive pedestal 5226 and the frame 28 while providing flexibility to impede stress on other components of the concrete mixer truck 10.

The second joint end 5404 is coupled to the second mounting bracket 5208, which is coupled to the web of the frame 5204, as opposed to conventional rear pedestals that are coupled to a top of a flange of the frame. In some embodiments, the second mounting bracket 5208 is bolted to the web of the frame 5204. The second joint end 5404 of the second interface joint 5232 is coupled to the first mounting bracket 5206. In some embodiments, the second joint end 5404 is molded with the second mounting bracket 5208 to form a single unit. A coupling member 5406 is disposed near the first joint end 5402 and is configured to couple the second interface joint 5232 with the second frame end 5236 on the second lateral side 144. The coupling member 5406 may include a flexible joint member 5410 that allows flexibility and movement such that the second frame end 5236 and the second interface joint 5232 are not rigidly connected. Similarly, a coupling member 5406 is disposed near the first joint end 5402 of the first interface joint 5230 and is configured to couple the first interface joint 5230 with the second frame end 5236 on the first lateral side 142. In other words, the connections and configurations of the first interface joint 5230 and the second interface joint 5232 are mirrored about the longitudinal axis of the frame 28.

The coupling brace 5238 is disposed between the first frame end 5234 and the second frame end 5236 toward the first frame end 5234. The coupling brace 5238 is configured to receive a first bar-pin member 5220 and a second bar-pin member 5222 that are each coupled to a part of the transmission mounting bracket assembly 5210. In other words, the coupling brace 5238, through the first bar-pin member 5220 and second bar-pin member 5222, connects the rear drive pedestal 5226 and the transmission mounting bracket assembly 5210 to provide support and stress reduction/transfer for the rear drive pedestal 5226 supporting the mixing drum 14.

The first bar-pin member 5220 includes a first bar end 5240 coupled to the coupling brace 5238 and a second bar end 5242 coupled to first bar-pin engagement surface 5244 of the first bracket 5214 of the transmission mounting bracket assembly 5210. The first bar end 5240 is coupled to the coupling brace 5238 by a pin 5250 (e.g., bolt with nut, threaded member, substantially straight coupler, etc.) through and opening on the first bar end 5240 and the coupling brace 5238. In some embodiments, a bushing 5260 is disposed between the engagement of the coupling brace 5238 and first bar end 5240 (e.g., at the interface between two parts) damping the energy transmitted through the bushing 5260. In some embodiments, a different vibration isolator is disposed between the engagement of the coupling brace 5238 and first bar end 5240 to dampen the noise and vibrations between the coupling brace 5238 and first bar end 5240. Similarly, the second bar-pin member 5222 includes a first bar end 5240 coupled to the coupling brace 5238. As shown in FIGS. 78-81, the first bar-pin member 5220 and the second bar-pin member 5222 extend in opposite directions having the same degree offset from a central axis 5700 (shown in FIG. 81) that runs longitudinally, with respect to the concrete mixer truck 10, through the pedestal frame 5202. This configuration is to properly distribute the load and stress of supporting the mixing drum 14 and other components supported by the rear drive pedestal 5226.

As shown in FIG. 78, in the short drum configuration 5200, the second bar end 5242 of the is coupled to the first bar-pin engagement surface 5244 disposed above the first bracket 5214. The second bar end 5242 and the first bar-pin engagement surface 5244 are coupled by a flexible mount 5270. The flexible mount 5270 includes a first bolt-nut member 5272 and a second bolt-nut member 5274 configured to threadably engage corresponding holes in the first bar-pin engagement surface 5244. The flexible mount 5270 is configured to be flexible when mounted to the first bar-pin engagement surface 5244 such that the engagement between the two components is not rigid. In some embodiments, the flexible mount 5270 includes a bushing. In some embodiments, a bushing is disposed between the first bolt-nut member 5272 and/or the second bolt-nut member 5274 and the first bar-pin engagement surface 5244. Similarly, the second bar-pin member 5222 includes a second bar end 5242 coupled to third bar-pin engagement surface 5284 of the third bracket 5264 of the transmission mounting bracket assembly 5210 by the flexible mount 5270.

The rear drive pedestal 5226 is in the short drum configuration 5200 when the coupling brace 5238 is coupled to the transmission mounting bracket assembly 5210 at the first installation position 5252. Specifically, when the first bar-pin member 5220 of the coupling brace 5238 is coupled to the first bar-pin engagement surface 5244 and the second bar-pin member 5222 of the coupling brace 5238 is coupled to the third bar-pin engagement surface 5284. The bar-pin members 5220, 5222 with bushings connections between the pedestal frame 5202 and the transmission mounting bracket assembly 5210 and the interface joints 5230, 5232 between the mounting brackets 5206, 5208 on the web of the frame 5204 and the pedestal frame 5202 reduce stress through the components of the concrete mixer truck 10 and provide flexibility. Specifically, the connections between the mounting brackets 5206, 5208 on the web of the frame 5204 and the pedestal frame 5202 and between the pedestal frame 5202 and the transmission mounting bracket assembly 5210 allow for at least some relative movement between the frame rails 40, the engine 74, and the pedestal frame 5202 within the system as the rear drive pedestal 5226 is fastened, thereby allowing for several degrees of movement within the system and transmitting loads associated with operation of the concrete mixer truck 10 through the web of the frame versus onto the top frame flange.

Figure 81:
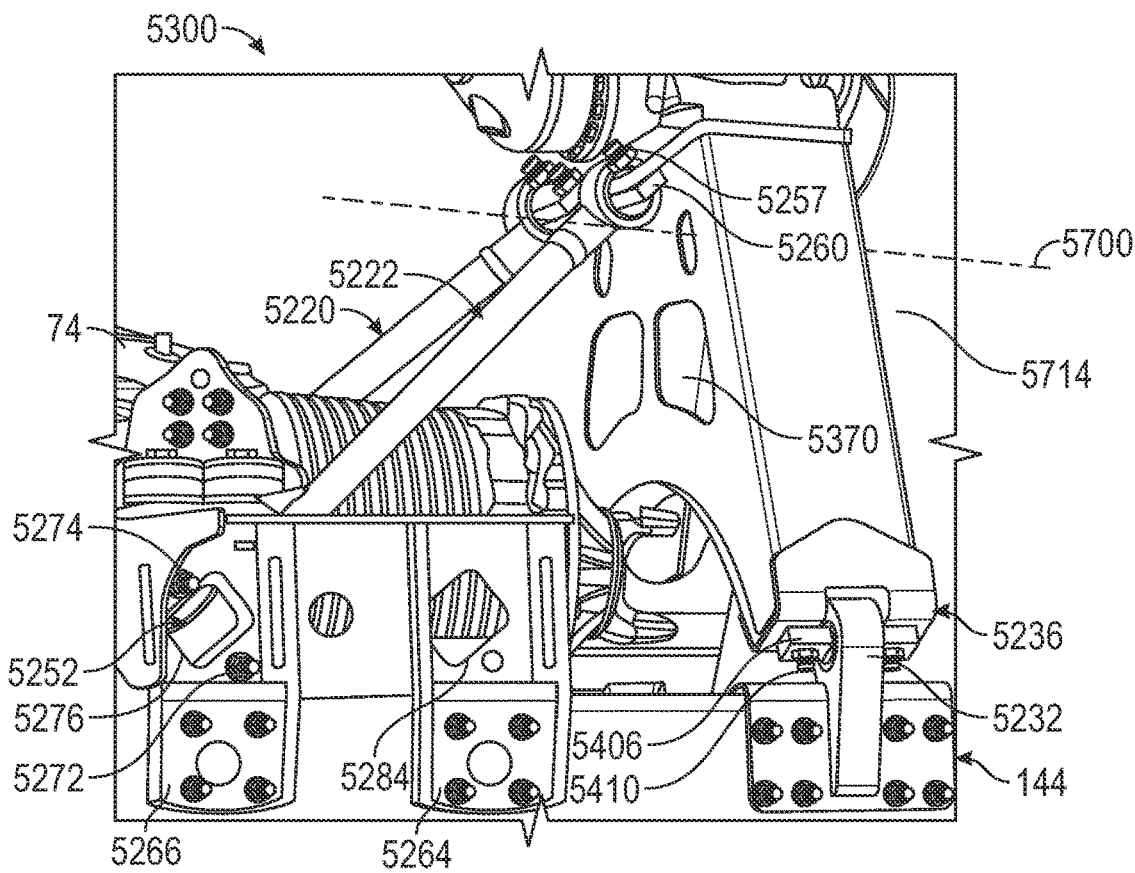
FIG. 81 is a rear perspective view of the rear pedestal in the second installation configuration of FIG. 80, according to an example embodiment.

Turning to FIGS. 80 and 81, perspective views of the rear drive pedestal 5226 installed in a long drum configuration 5300 is shown, according to an example embodiment. The rear drive pedestal 5226 in the long drum configuration 5300 is similar to the rear drive pedestal 5226 in the short drum configuration 5200 of FIGS. 78 and 79. A difference between the long drum configuration 5300 and the short drum configuration 5200 is that in the long drum configuration 5300 the first bar-pin member 5220 is coupled to the second bar-pin engagement surface 5246 of the second bracket 5216 on the first lateral side 142 and the second bar-pin member 5222 is coupled to the fourth bar-pin engagement surface 5276 of the fourth bracket 5266 on the second lateral side 144. In other words, in the long drum configuration 5300 the coupling brace 5328 is coupled to the transmission mounting bracket assembly 5210 in the second installation position 5262. Accordingly, like numbering is used to designate similar components between the rear drive pedestal 5226 installed in the long drum configuration 5300 and the rear drive pedestal 5226 installed in the short drum configuration 5200.

As shown in FIG. 80, when in the long drum configuration 5300, the first mounting bracket 5206 on the first lateral side 142 and the second mounting bracket 5208 on the second lateral side 144 are disposed further along the frame 28 in the direction of the rear end 24 and closer to the engine 74. The disposition of the rear drive pedestal 5226 closer to the engine 74 is a result of the mixing drum 14 in the long drum configuration 5300 being larger than the mixing drum 14. Because the first bar-pin member 5220 and the second bar-pin member 5222 have the same length as in the short drum configuration 5200, the first bar-pin member 5220 and the second bar-pin member 5222 extend past the first bar-pin engagement surface 5244 of the first bracket and the third bar-pin engagement surface 5284 of the third bracket 5264.

Accordingly, the first bar-pin member 5220 is coupled to the second bar-pin engagement surface 5246 of the second bracket 5216 and the second bar-pin member 5222 is coupled to the fourth bar-pin engagement surface 5276 of the fourth bracket 5266 in a similar fashion as with the first bar-pin engagement surface 5244 and the third bar-pin engagement surface 5284 of the short drum configuration 5200, respectively.

Front Roller Pedestal

Figure 82:
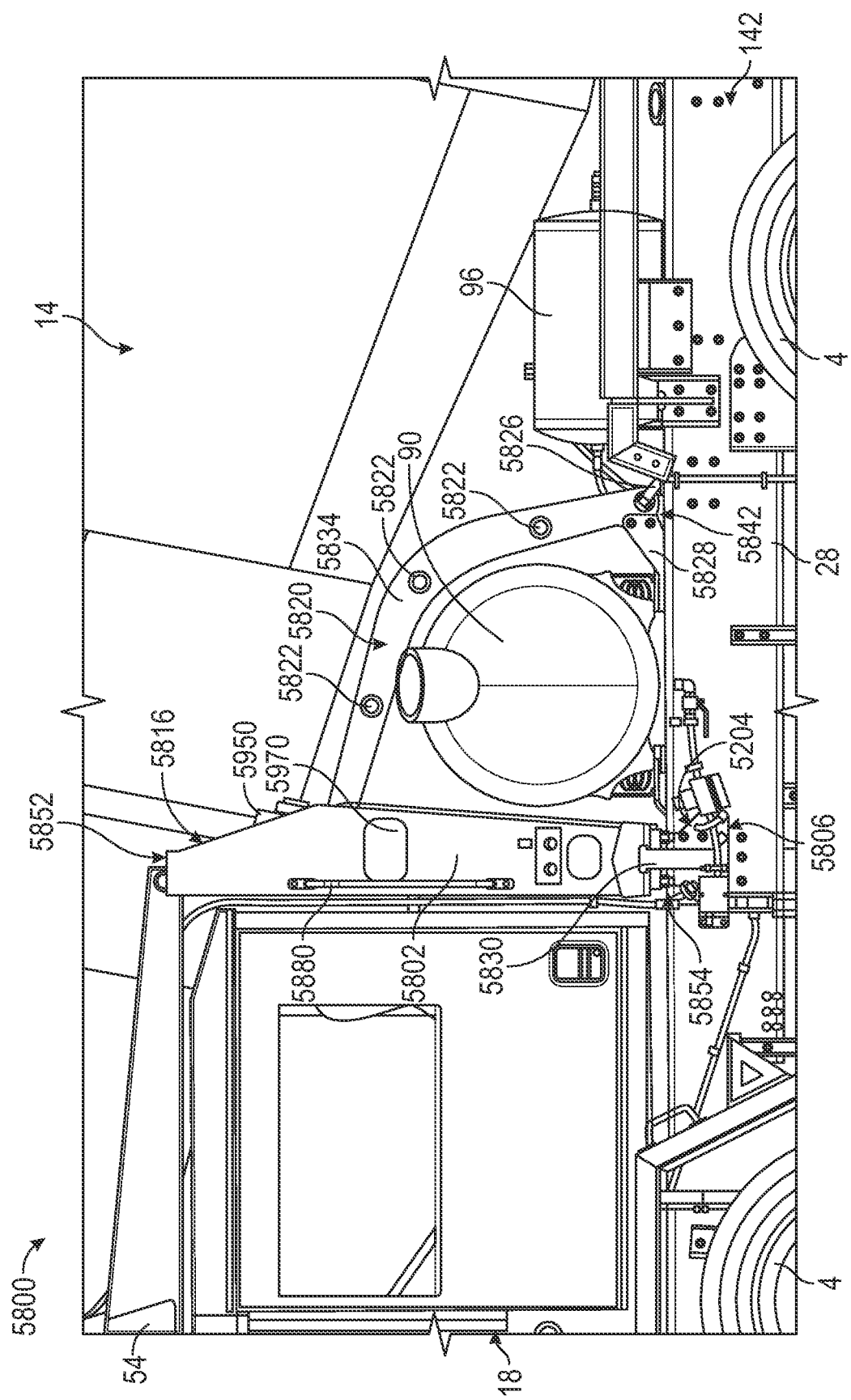
FIG. 82 is a side perspective view of a front pedestal with a curved bar, according to an example embodiment.
Figure 83:
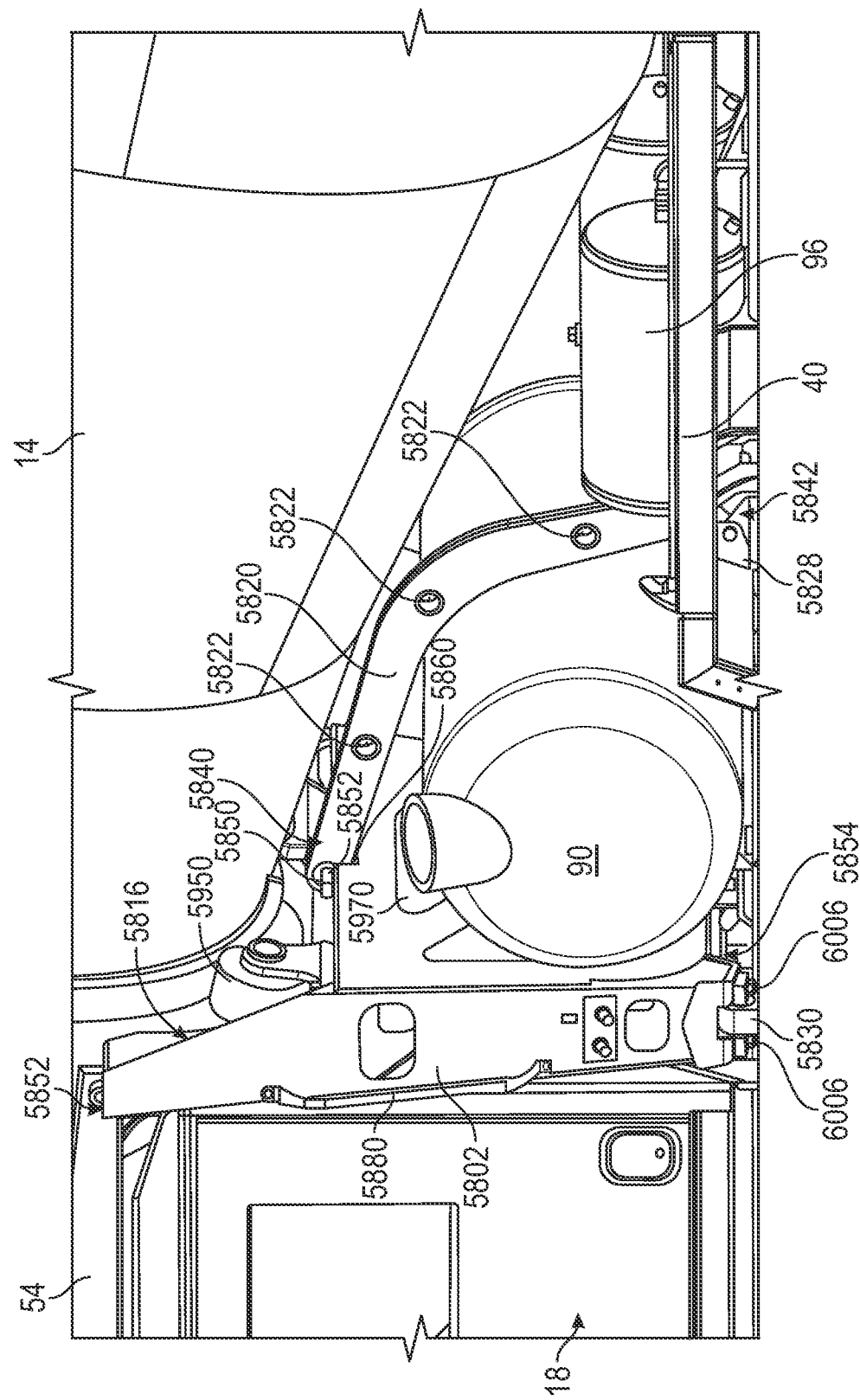
FIG. 83 is a rear perspective view of the rear pedestal in FIG. 82, according to an example embodiment.

Referring to FIGS. 82 and 83, perspective views of a front roller pedestal 5816 with a curved support bar (e.g., frame) 5834 installed in a concrete mixer truck 5800 are shown, according to an example embodiment. The front roller pedestal 5816 is similar to the front pedestal 16 of FIG. 1. A difference between the front roller pedestal 5816 and the front pedestal 16, is the front roller pedestal 5816 implements a three-point mount. The front roller pedestal 5816 is configured to include a support member 5820 from the pedestal frame 5802 to provide longitudinal stability (i.e., in a longitudinal direction with respect to the longitudinal axis of the frame 28), thereby allowing the pedestal frame 5802 to be narrower in design (e.g., in the longitudinal direction with respect to the longitudinal axis of the frame 28).

The three points of contact—the support member 5820, a first mounting bracket 5806 on the first lateral side 142, and a second mounting bracket 5808 on the second lateral side 144—decreases the restriction within the mounting structure of the front roller pedestal 5816 and drives less stress into the frame 28 and pedestal components compared to traditional configurations having four points of contact. Further, as will be described below, each of the three points of contact—the support member 5820, the first mounting bracket 5806, and the second mounting bracket 5808—may include flexible coupling members thereby further allowing at least some relative movement between the frame 28 and the front roller pedestal 5816, thereby allowing for several degrees of movement within the system and better dispersing transmitted loads associated with operation of the concrete mixer truck 10 into the web of the frame 5204.

Beneficially, the curved support bar 5834 extends over the water tank 90 and allows the front roller pedestal 5816 to be much more narrow in design by providing longitudinal support to the front roller pedestal 5816. Additionally, the pedestal frame 5802 is coupled to the web of the frame 5204, as opposed to conventional front pedestals that are coupled to a top of a flange of the frame. In some embodiments, one or more bushings may be implemented at engagement locations and/or joints to dampen the noise and vibrations between the components. Accordingly, the front roller pedestal 5816 overcomes the deficiencies in conventional front pedestals that are rigid and bolted to a flexible frame, such that it drives stress into the frame and other components that lead to structural and fastener (e.g., bolts, pins, etc.) failures. Beneficially, the front roller pedestal 5816 impedes or eliminates wear plates, frame stress, and poor distribution of load to the weaker portions of the frame 28. Thus, the front roller pedestal 5816 may reduce frequency of inspection and maintenance required for conventional rear pedestals.

The front roller pedestal 5816 includes a pedestal frame 5802, a support slot 5860, a first mounting bracket 5806 on the first lateral side 142 (shown in FIG. 82), a second mounting bracket 5808 on the second lateral side 144 (shown in FIG. 84), and a support member 5820. The pedestal frame 5802 has a frame upper portion 5852 disposed toward a top of the pedestal frame 5802, adjacent the platform 54 of the hopper assembly 8, and a lower portion 5854 disposed at the bottom of the pedestal frame 5802, adjacent the frame 28. The pedestal frame 5802 includes one or more webbed features or frame openings 5970 along the pedestal frame 5802 between the frame upper portion 5852 and frame lower portion 5854. The frame openings 5970 may be configured to further distribute stress through the front roller pedestal 5816 and eliminate wear on other components. The frame upper portion 5852 includes a pair of drum drive rollers 5950 that are configured to receive and facilitate rolling of the mixing drum 14. The frame lower portion 5854 is coupled to a first interface joint 5830 on the first lateral side 142 and the second interface joint 5832 on the second lateral side 144. A handle 5880 may be disposed on the pedestal frame 5802 on the first lateral side 142 to assist with an operator entering and exiting the cab 18.

The first interface joint 5830 and second interface joint 5832 are movable, flexible joints that are coupled to the first mounting bracket 5806 and the second mounting bracket 5808, respectively. As shown in FIG. 84, the second interface joint 5832 includes a first joint end 6002 toward the top portion of the second interface joint 5832 near the frame lower portion 5854 and a second joint end 6004 toward the bottom portion of the second interface joint 5832 and coupled to the second mounting bracket 5808 on the second lateral side 144. A lateral support member 6054 is coupled to an internal portion of the first mounting bracket 5806 and an internal portion of the second mounting bracket 5808. The lateral support member 6054 is configured to support the engagement of the front roller pedestal 5816 and the frame 28 while providing flexibility to impede stress on other components of the concrete mixer truck 5800.

The second joint end 6004 is coupled to the second mounting bracket 5808, which is coupled to the web of the frame 5204, as opposed to conventional front pedestals that are coupled to a top of a flange of the frame. As shown in FIG. 84, the second mounting bracket 5808 is bolted to the web of the frame 5204 using a plurality of fasteners 6012. As will be appreciated, the second joint end 5804 of the second interface joint 5832 is coupled to the second mounting bracket 5808. In some embodiments, the second joint end 6004 is molded with the second mounting bracket 5808 to form a single unit. A coupling member 6006 is disposed near the first joint end 6002 and is configured to couple the second interface joint 5832 with the frame lower portion 5854 on the second lateral side 144. The coupling member 6006 may include a flexible joint member 6010 that allows flexibility and movement such that the frame lower portion 5854 and the second interface joint 5832 are not rigidly connected. Similarly, a coupling member 6006 is disposed near the first joint end 6002 of the first interface joint 5830 and is configured to couple the first interface joint 5830 with the frame lower portion 5854 on the first lateral side 142. In other words, the connections and configurations of the first interface joint 5830 and the second interface joint 5832 are mirrored about the longitudinal axis of the frame 28.

The support slot 5860 is disposed between the frame upper portion 5852 and the frame lower portion 5854 toward the frame upper portion 5852. The support slot 5860 is configured to receive a first support end 5840 of the support member 5820. In other words, the support slot 5860, through the support member 5820, connects the pedestal frame 5802 with a third contact point that provides longitudinal stability. The support slot 5860 is coupled to the first support end 5840 by a joint member 5858 that extends laterally through the first support end 5840 and includes a first engagement member 5850 and a second engagement member 5856 on each end of the joint member 5858 that couples the joint member to the pedestal frame 5802. The first engagement member 5850 and the second engagement member 5856 may be a bolt with a nut, a threaded member, a substantially straight coupler, or a similar fastening member.

The support member 5820 includes the first support end 5840, which is coupled to the support slot 5860, and a curved support bar 5834 extending between the first support end 5840 and the second support end 5842. The curved support bar 5834 is configured to provide longitudinal stability to the front roller pedestal 5816 while having a shape that extends over and provides clearance for (e.g., does not interfere with) the water tank 90 disposed behind the cab 18 of the concrete mixer truck 5800. The curved support bar 5834 may include a plurality of openings 5822 along the body of the curved support bar 5834 to provide additional stress reduction or structural support throughout the curved support bar 5834.

As shown in FIG. 83, the second support end 5842 is coupled to the frame 28, on a side adjacent the water tank, with a first support joint 5828. The first support joint 5828 may be flexible, while still providing additional longitudinal stability to the front roller pedestal 5816. A second support joint 5826 couples the second support end 5842 with an interior portion of the frame 28, on a side adjacent the air tank 96 (e.g., toward the rear end 24). The downwardly angled second support joint 5826 may be flexible in the longitudinal direction to provide additional longitudinal stability to the front roller pedestal 5816. In some embodiments, the second support joint 5826 is a dampener that is configured to dampen a longitudinal force toward the rear end 24 or a piston that is configured to provide a counteracting longitudinal force toward the front end 22. In some embodiments, one or both of the first support joint 5828 or second support joint 5826 may implement one or more bushings or a vibration isolator to dampen the noise and vibrations between the support member 5820 and the frame 28.

Figure 86:
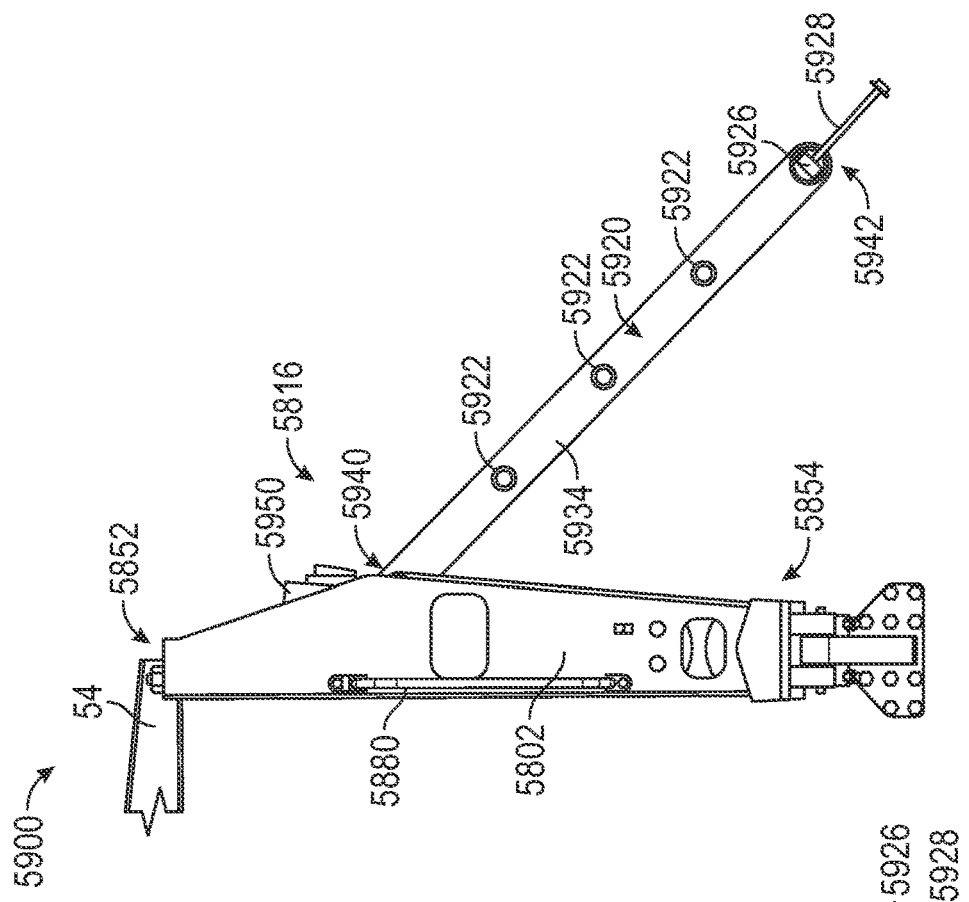
FIG. 86 is a side perspective view of the rear pedestal in FIG. 85, according to an example embodiment.
Figure 85:
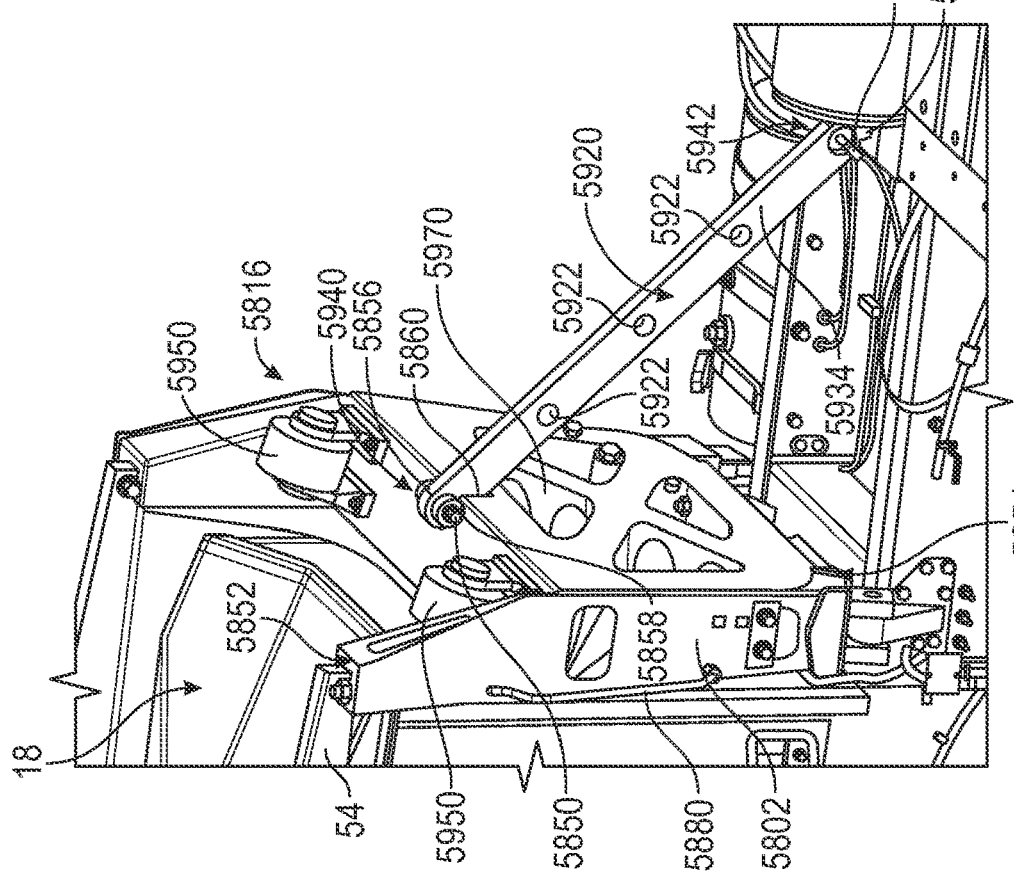
FIG. 85 is a rear perspective view of a front pedestal with a straight, according to an example embodiment.

Turning to FIGS. 85 and 86, perspective views of a front roller pedestal 5816 with a straight support bar 5934 installed in a concrete mixer truck 5900 are shown, according to an example embodiment. The front roller pedestal 5816 with the straight support bar 5934 is similar to the front roller pedestal 5816 with the curved support bar 5834 of FIGS. 82-84. A difference between the front roller pedestal 5816 with the curved support bar 5834 and the front roller pedestal 5816 with the straight support bar 5934, is the straight support bar 5934 is substantially straight, forming an approximately 45-degree angle with the frame 28. Accordingly, like numbering is used to designate similar components between front roller pedestal 5816 with the straight support bar 5934 and the front roller pedestal 5816 with the straight support bar 5934.

As shown in FIGS. 85 and 86, the support slot 5860 is disposed between the frame upper portion 5852 and the frame lower portion 5854 toward the frame upper portion 5852. The support slot 5860 is configured to receive a first support end 5940 of the support member 5920. In other words, the support slot 5860, through the support member 5920, connects the pedestal frame 5802 with a third contact point that provides longitudinal stability. The support slot 5860 is coupled to the first support end 5940 by a joint member 5858 that extends laterally through the first support end 5940 and includes a first engagement member 5850 and a second engagement member 5856 on each end of the joint member 5858 that couples the joint member to the pedestal frame 5802. The first engagement member 5850 and the second engagement member 5856 may be a bolt with a nut, a threaded member, a substantially straight coupler, or a similar fastening member.

The support member 5920 includes the first support end 5940, which is coupled to the support slot 5860, and a straight support bar 5934 extending between the first support end 5940 and the second support end 5942. The straight support bar 5934 is configured to provide longitudinal stability to the front roller pedestal 5816 while having a shape that extends over (e.g., does not interfere with) the water tank 90 disposed behind the cab 18 of the concrete mixer truck 5800. The water tank 90 may be disposed closer to the cab 18 in order to fit under the straight support bar 5934. The straight support bar 5934 may include a plurality of openings 5922 along the body of the straight support bar 5934 to provide additional stress reduction or structural support throughout the straight support bar 5934.

As shown in FIGS. 85 and 86, the second support end 5942 is coupled to the frame 28 with a support joint 5926. The support joint 5926 couples the second support end 5942 with an interior portion of the frame 28 by way of an extending member 5928, on a side toward the rear end 24. The downwardly support joint 5926 may be rotatable and flexible in the longitudinal direction to provide additional longitudinal stability to the front roller pedestal 5816. In some embodiments, the support joint 5926 is a dampener that is configured to dampen a longitudinal force toward the rear end 24 or a piston that is configured to provide a counteracting longitudinal force toward the front end 22. In some embodiments, the support joint 5926 implements bushings or a vibration isolator to dampen the noise and vibrations between the support member 5920 and the frame 28.

Chute Motor

Figure 87:
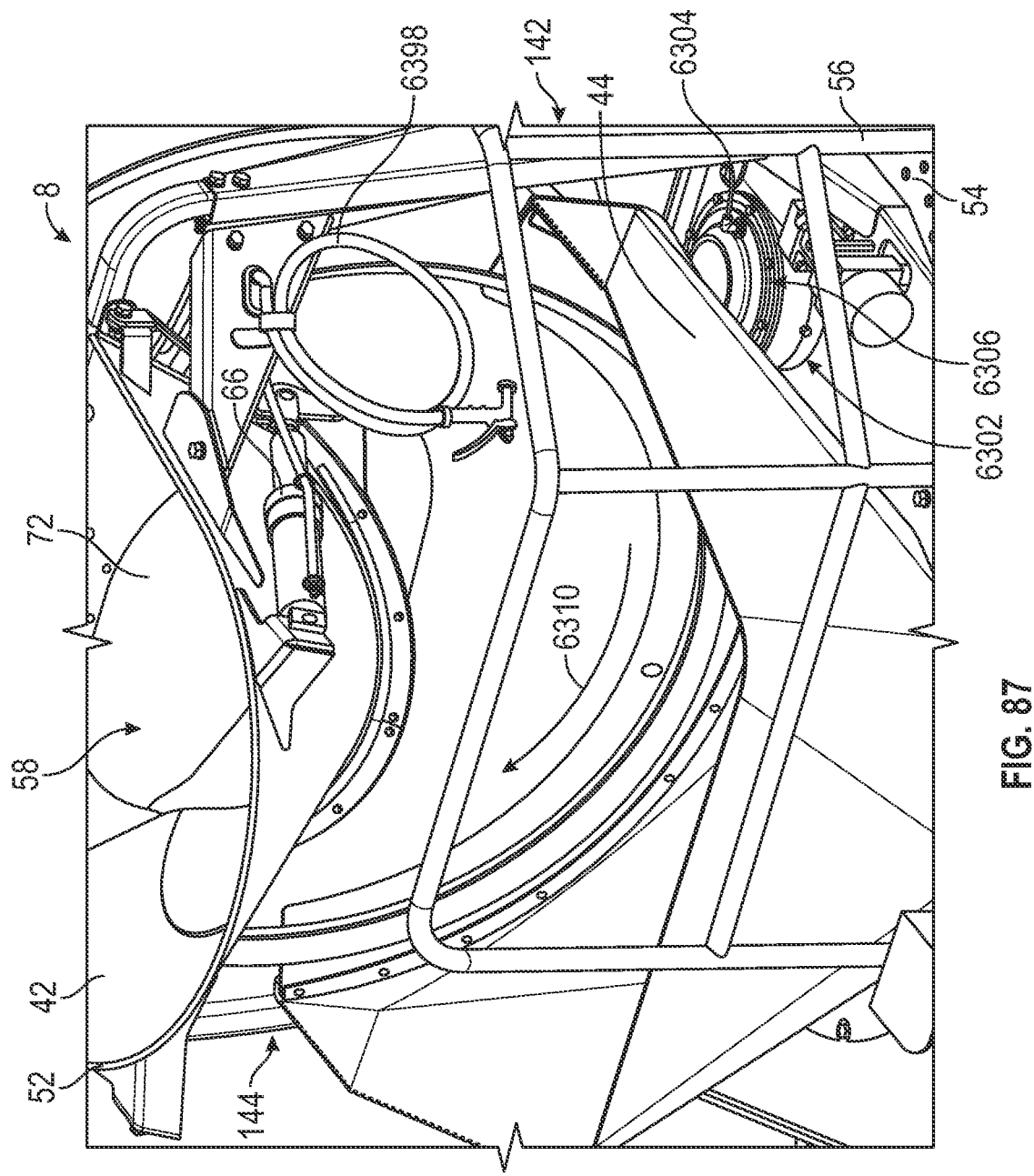
FIG. 87 is a perspective view of a concrete mixer truck with a chute motor, according to an example embodiment.

Referring to FIG. 87, a chute motor 6302 and gear assembly 6306 positioned on the first lateral side 142 is shown, according to an example embodiment. The chute motor 6302 and gear assembly 6306 are configured to drive the second chute actuator 94 that is coupled to the base section 124 of the main chute 46 and the platform 54. The chute motor 6302 is configured to drive the gear assembly 6306 to rotate the main chute 46 about the vertical axis. The term gear assembly 6306, as used herein, is used to describe a series of gears, a motor wheel (e.g., a sprocket, a cogged wheel, a grooved wheel, a smooth-sided wheel, etc.), an output shaft, an electrical conduit, a hydraulic fluid conduit, belt, or similar member to transfer rotational motion generated by the chute motor 6302. In some embodiments, the chute motor is configured to move the distal end of the main chute 46 through an arc along the left, front, and right sides of the chassis 12 (e.g., a 150 degree arc, a 180 degree arc, a 210 degree arc, etc.). While the chute motor 6302 is described in relation to driving the second chute actuator 94, in some embodiments, the chute motor 6302 may be configured to control the hopper actuator 66 to move the charge hopper 42 between the raised and lowered positions.

Figure 88:
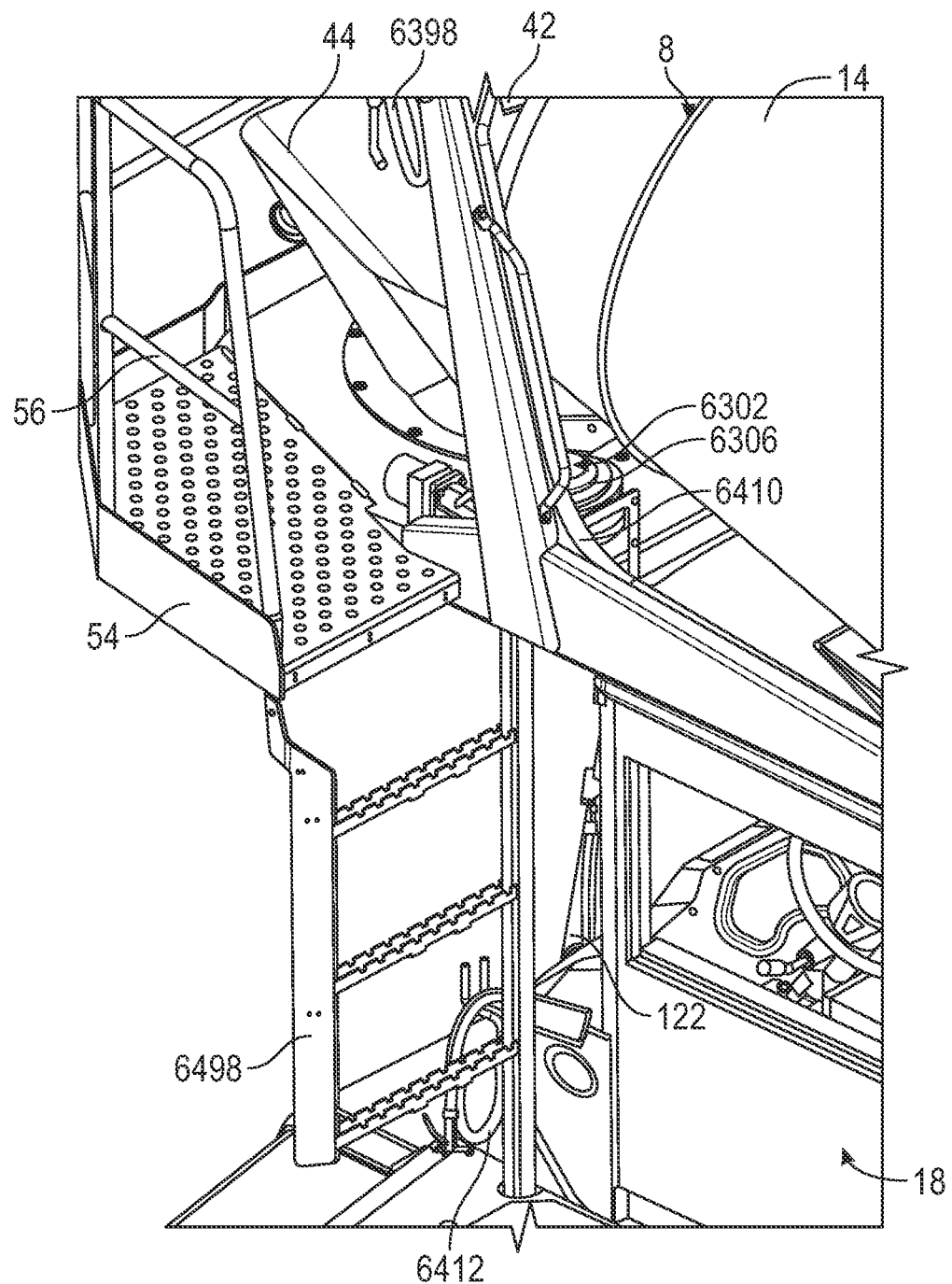
FIG. 88 is a rear perspective view of the chute motor of the concrete mixer truck of FIG. 13, according to an example embodiment.
Figure 89:
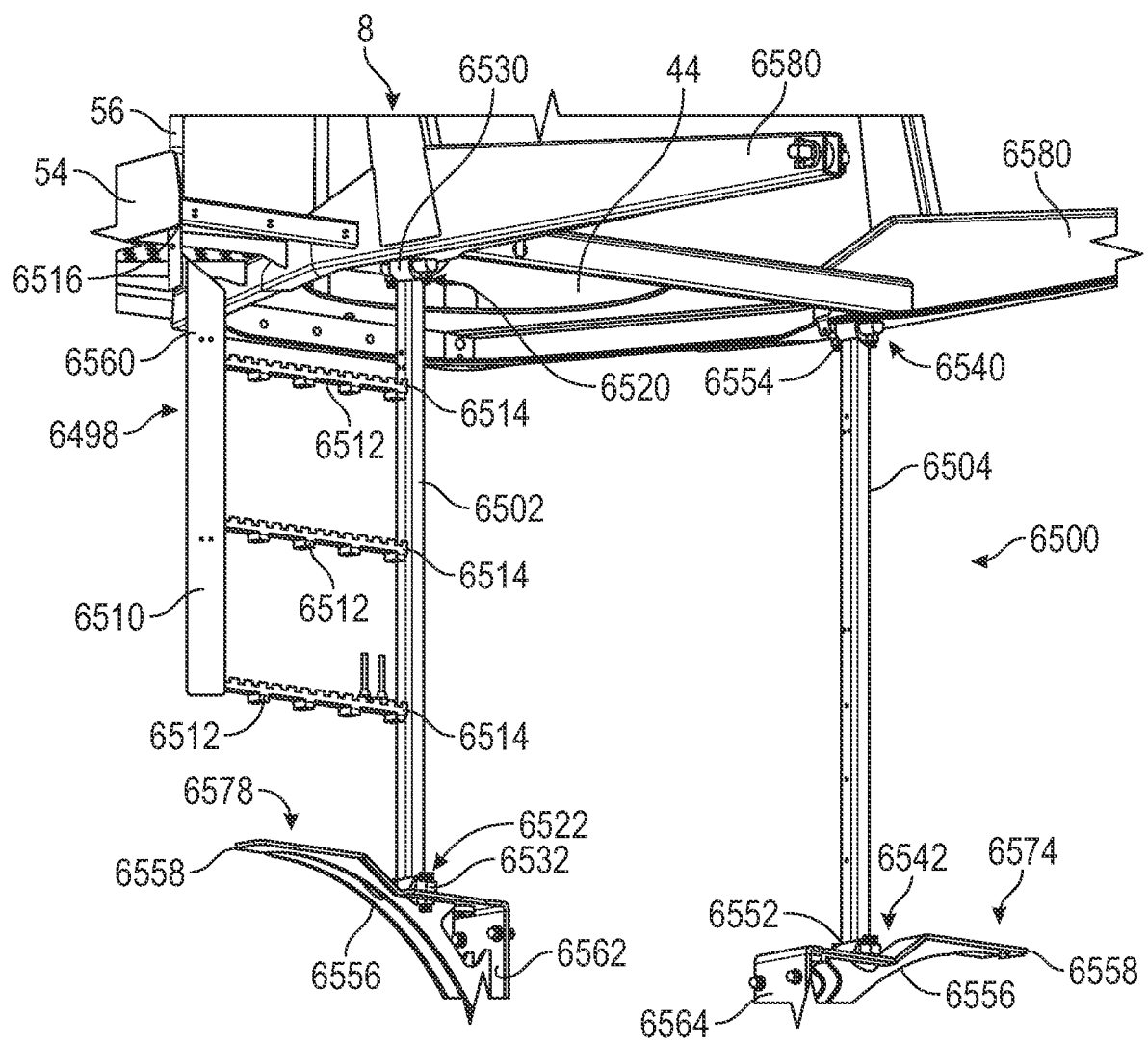
FIG. 89 is a rear perspective view of a superstructure, according to an example embodiment, according to an example embodiment.

As shown in FIGS. 1 and 87, when the mixing drum 14 is driven by the drum driver 114 in the clockwise direction 6310 the contents of a mixture located within an internal volume 30 of the mixing drum 14 are discharged. While the concrete is being discharged, the concrete flows through the main chute 46 and movement of the concrete mixer truck 10 during the discharge may agitate the flow and cause the concrete to spill over the right side, the second lateral side 144, of the hopper assembly 8. By positioning the chute motor 6302 on the left side, the first lateral side 142, of the hopper assembly 8 and underneath the mixing drum 14, the chute motor 6302 is avoids receiving concrete build up that could impede operation of the chute motor 6302 and, in turn, the second chute actuator 94. In addition to avoiding concrete spillover, by positioning the chute motor 6302 adjacent to the platform 54 and ladder 6498 as shown in FIG. 88, an operator can easily access the chute motor 6302 from the ladder 6498 and/or platform 54 and can use the hose 6398 to clean off the chute motor 6302 from concrete debris. Additionally, a cab hose 6412 may be used to clean the chute motor 6302. The hose 6398 and cab hose 6412 may be fluidly connected to a water tank 90.

In some embodiments, the chute motor 6302 is a hydraulic motor that is fluidly coupled to a pump by a conduit 6304. The pump may be configured to pump fluid (e.g., hydraulic fluid, etc.) stored within the fluid reservoir to drive the chute motor 6302. In some embodiments, the pump is configured to use mechanical energy supplied by the engine 74 and provide a flow of pressurized hydraulic fluid to the chute motor 6302. The hydraulic pump may be directly coupled to the engine 74 (e.g., coupled to a crank shaft of the engine 74 or an output shaft of the engine 74, etc.). Alternatively, the hydraulic pump may be indirectly coupled to the engine 74 through one or more power transmission devices (e.g., the transmission, a serpentine belt assembly, a geared connection, a power take-off, etc.). The pump may be a variable displacement hydraulic pump (e.g., an axial piston pump, etc.) and has a pump stroke that is variable. The pump may be configured to provide hydraulic fluid at a flow rate that varies based on the pump stroke (e.g., the greater the pump stroke, the greater the flow rate provided to the chute motor 6302, etc.). The pressure of the hydraulic fluid provided by the pump may also increase in response to an increase in pump stroke (e.g., where pressure may be directly related to work load, higher flow may result in higher pressure, etc.). The pressure of the hydraulic fluid provided by the pump may alternatively not increase in response to an increase in pump stroke (e.g., in instances where there is little or no work load, etc.). The pump may include a throttling element (e.g., a swash plate, etc.). The pump stroke of the pump may vary based on the orientation of the throttling element. In one embodiment, the pump stroke of the pump varies based on an angle of the throttling element (e.g., relative to an axis along which the pistons move within the axial piston pump, etc.). By way of example, the pump stroke may be zero where the angle of the throttling element is equal to zero. The pump stroke may increase as the angle of the throttling element increases.

In those embodiments, the outlet of the hydraulic pump is fluidly coupled (e.g., indirectly or indirectly) to the chute motor 6302 via the conduit 6304. Accordingly, the flow of pressurized hydraulic fluid from the hydraulic pump drives the chute motor 6302. After exiting the chute motor 6302, the hydraulic fluid returns to the tank. In some embodiments, the gear assembly 6306 is an output shaft of the chute motor 6302 that is coupled to the second chute actuator 94 (either directly or indirectly). In other embodiments, the gear assembly 6306 is a plurality of gears (e.g., a planetary gear reduction set, etc.) configured to rotate the main chute 46 by way of rotating (e.g., torque applied to) the second chute actuator 94. The plurality of gears of the gear assembly 6306 may be disposed within a housing adjacent the chute motor 6302. In some embodiments, the chute motor 6302 may be an electric motor, an internal combustion engine, or another suitable mechanical power source. In embodiments where the chute motor 6302 is an internal combustion engine, a fluid reservoir may be configured to store liquid and/or gaseous fuel (e.g., gasoline, diesel, propane, natural gas, hydrogen, etc.) and the pump may be configured as a fuel pump. In still other embodiments, the chute motor 6302 is or includes an electric motor. In such embodiments, the fluid reservoir may be an energy storage device (e.g., a battery, a capacitor, etc.) configured to store and provide chemical and/or electrical energy though electrical conduits 6410 to the chute motor 6302. The chute motor 6302 may not include the pump in such embodiments.

Visibility Superstructure

Referring to FIGS. 89-92, a superstructure 6500 that includes a first pillar 6502, a second pillar 6504, and an operator ladder 6498 that improves driver visibility, increases driver perspective, and minimizes blind spots is described, according to an example embodiment. The operator ladder 6498 may include a ladder rail 6510 that couples to the ladder rungs 6512 at an angle, such that the ladder rail 6510 extends in a direction that is parallel to the driver's sight line when operating the concrete mixer truck 10 in the cab 18, thereby minimizing a blind spot caused by the ladder rail 6510. Beneficially, the superstructure 6500 components improve visibility and operability for when the operator is pouring concrete and controlling the hopper assembly 8 and the main chute 46. The superstructure 6500, including the pillars 6502, 6504, the ladder rail 6510, and the ladder rungs 6512, has been located to minimize view obstruction from the perspective of an operator inside the cab 18.

The superstructure 6500 includes the platform 54, a pair of support arms 6580 configured to couple to the front pedestal 16, a first pillar 6502, a second pillar 6504, and a ladder 6498. Each of the first pillar 6502, the second pillar 6504, and the ladder 6498 are configured to minimize view obstruction for the operator driving the concrete mixer truck 10. The first pillar 6502 includes a first pillar top 6520 and a first pillar bottom 6522 spaced axially away from the first pillar top 6520. The first pillar top 6520 includes a first bar-pin coupling member 6530 or torque rod end to couple the first pillar 6502 to a bottom portion of the platform 54, adjacent an end of the mouth of the discharge hopper 44. Similarly, the first pillar bottom 6522 includes a second bar-pin coupling member 6532 or torque rod end to couple the first pillar 6502 to a first chassis support member 6578. The first chassis support member 6578 includes a chassis coupling surface 6562 and a support arm 6558 that extends laterally away from the chassis coupling surface 6562. The support arm 6558 forms a wheel accommodating portion 6556.

Each of the first bar-pin coupling member 6530 and the second bar-pin coupling member 6532 are configured such that the joints are flexible (e.g., movable) and able to articulate without driving stress into other components of the superstructure 6500 and/or concrete mixer truck 10. In some embodiments, one or more bushings may be implemented with the first bar-pin coupling member 6530 and the second bar-pin coupling member 6532 to keep the joints from wearing, vibrating, or making noise that may distract or annoy the operators. The bushings and the first bar-pin coupling member 6530 and the second bar-pin coupling member 6532 are described in greater detail below in FIGS. 94-96.

Figure 92A:
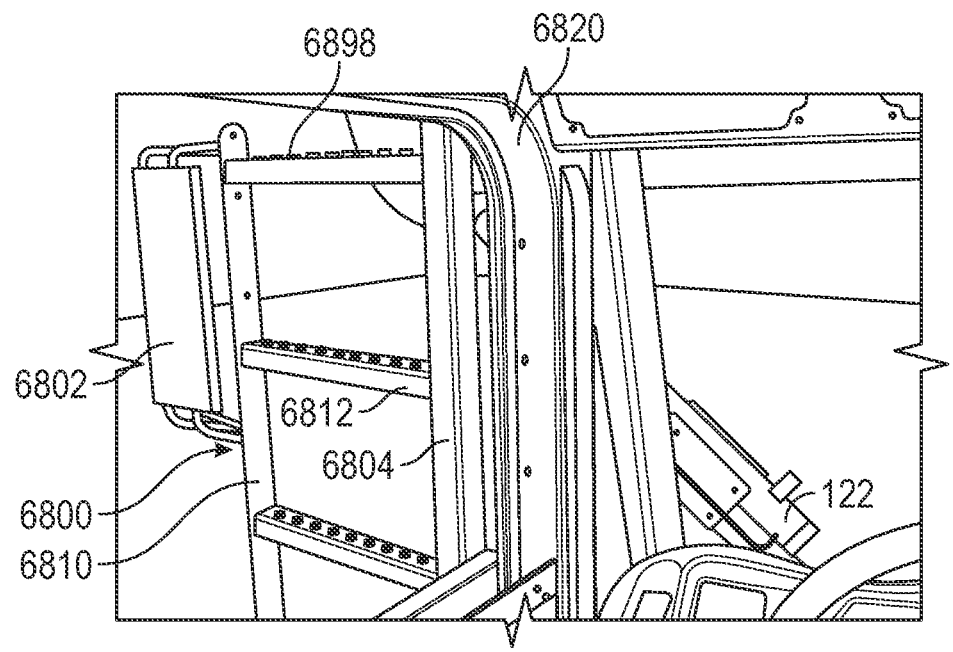
FIG. 92A is a perspective view of a conventional superstructure from the perspective of a driver, according to an example embodiment.
Figure 92B:
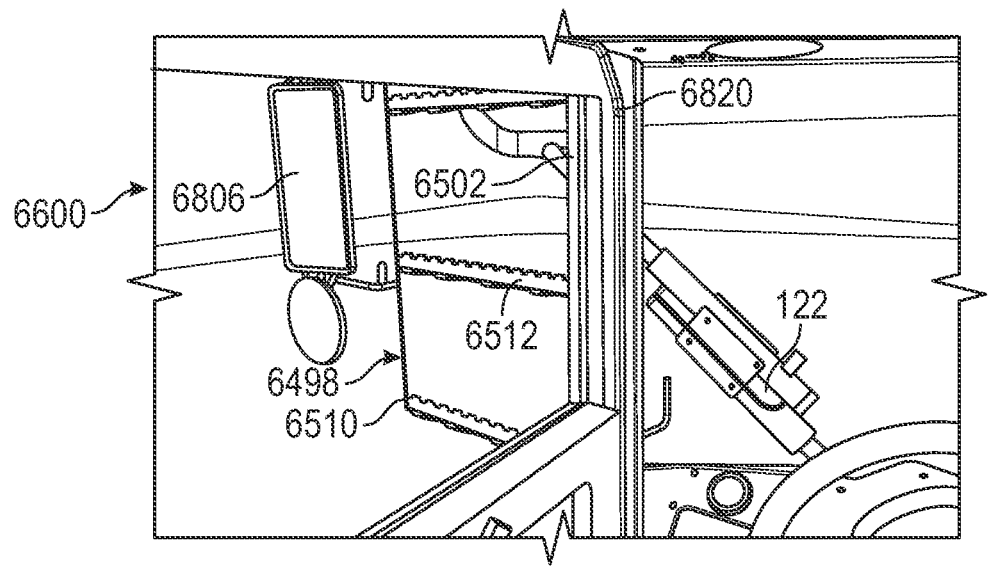
FIG. 92B is a perspective view of the superstructure of FIG. 90 from the perspective of a driver, according to an example embodiment.

The first pillar 6502 includes the ladder 6498 configured to be positioned behind an a-pillar 6820 of the cab 18 to increase operator visibility and minimize obstruction of view (shown in FIG. 92B). The ladder 6498 includes a ladder rail 6510 parallel to the first pillar 6502 and extending from the platform 54 axially downward. The ladder rail 6510 is coupled to the platform 54 by a coupling plate 6516. The distal end of the ladder rail 6510 is free-standing (e.g., not connected to another component). A plurality of rungs 6512 extend from the ladder rail 6510 laterally toward the first pillar 6502. The plurality of rungs 6512 are a series of structural members or steps that are flat or tubular members each having a rectangular or round cross section, respectively. Each rung in the plurality of rungs 6512 is coupled to a portion 6514 of the first pillar 6502. In some embodiments, the plurality of rungs 6512 are welded to the first pillar 6502 and the ladder rail 6510. In other embodiments, the plurality of rungs are coupled to the first pillar 6502 and the ladder rail 6510. In some embodiments, the coupling plate 6516 and plurality of rungs 6512 are angled such that the plurality of rungs 6512 are parallel to the operator's sight line when positioned in the cab 18. As shown in FIG. 92B, the first pillar top 6520 is positioned behind an a-pillar 6820 of the cab 18 to provide improved visibility compared to a conventional superstructure 6800 with a conventional ladder rail 6810 and first pillar 6804, as shown in FIG. 92A.

The second pillar 6504 includes a second pillar top 6540 and a second pillar bottom 6542 spaced axially away from the second pillar top 6540. The second pillar top 6540 includes a third bar-pin coupling member 6554 or torque rod end to couple the second pillar 6504 to a bottom portion of the platform 54, adjacent an end of the mouth of the discharge hopper 44. Similarly, the second pillar bottom 6542 includes a fourth bar-pin coupling member 6552 or torque rod end to couple the second pillar 6504 to a second chassis support member 6574. The second chassis support member 6574 includes a chassis coupling surface 6564 and a support arm 6558 that extends laterally away from the chassis coupling surface 6564. The support arm 6558 forms a wheel accommodating portion 6556.

Figure 94:
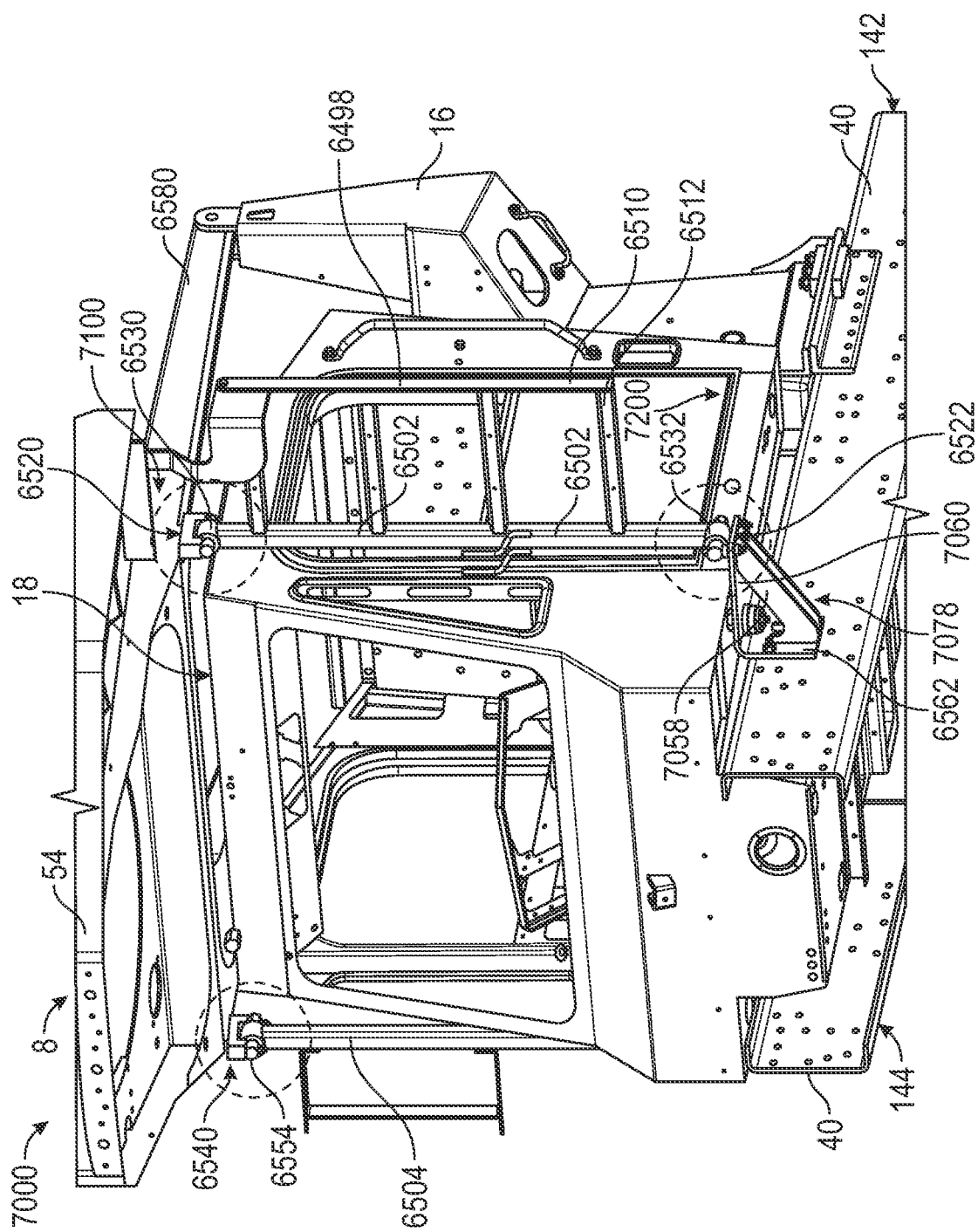
FIG. 94 is a perspective view of a superstructure, according to an example embodiment.

Each of the third bar-pin coupling member 6554 and the fourth bar-pin coupling member 6552 are configured such that the joints are flexible (e.g., movable) and able to articulate without driving stress into other components of the superstructure 6500 and/or concrete mixer truck 10. In some embodiments, one or more bushings may be implemented with the third bar-pin coupling member 6554 and the fourth bar-pin coupling member 6552 to keep the joints from wearing, vibrating, or making noise that may distract or annoy the operators. The bushings and the third bar-pin coupling member 6554 and the fourth bar-pin coupling member 6552 are described in greater detail below in FIGS. 94-96. As best illustrated in FIG. 94, the second pillar top 6540 is similarly positioned behind an a-pillar of the cab 18 to provide improved visibility compared to a conventional superstructure 6800 with a conventional second pillar.

Figure 91:
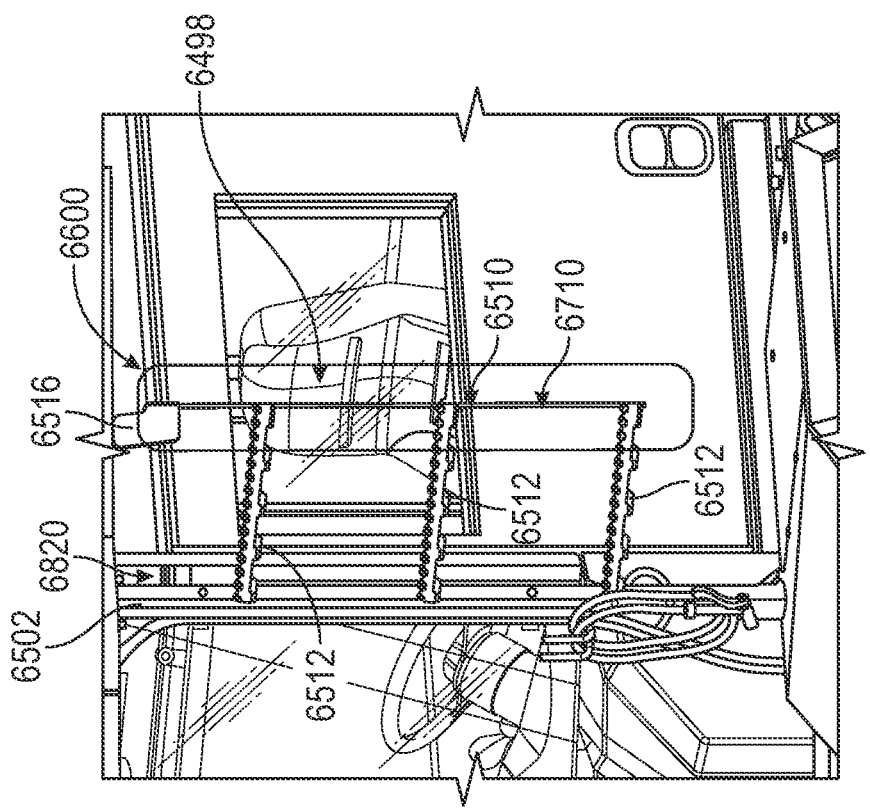
FIG. 91 is front, side perspective view of the portion of the superstructure of FIG. 90, according to an example embodiment.
Figure 90:
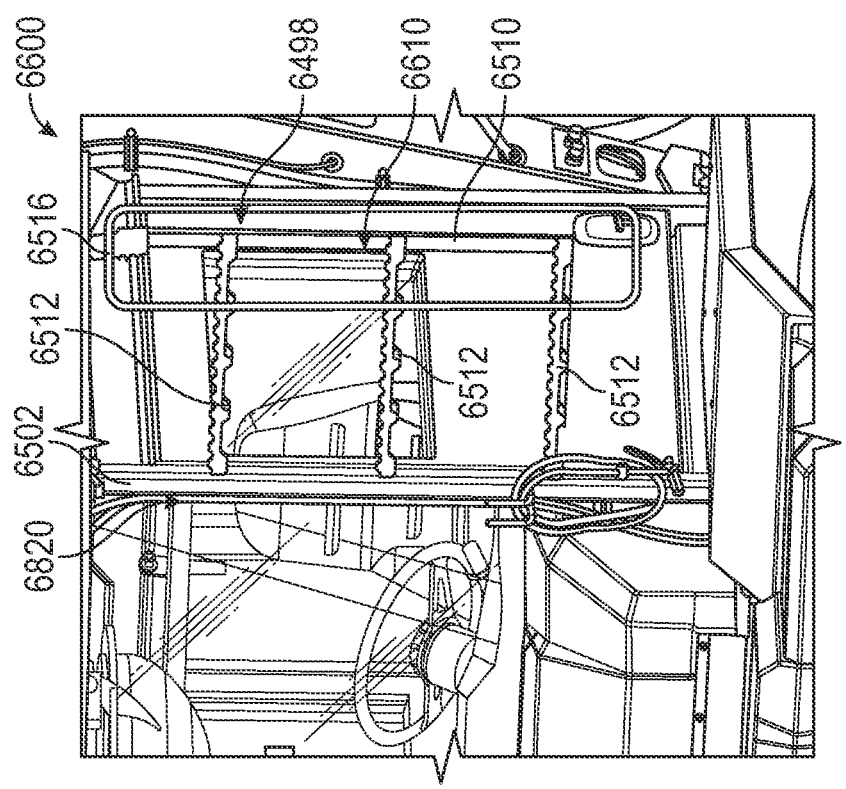
FIG. 90 is front perspective view of a portion of the superstructure of FIG. 89, according to an example embodiment.

Turning to FIGS. 90 and 91, a superstructure 6600 is shown. The superstructure 6600 includes the ladder 6498 of FIG. 89. Accordingly, like numbering is used to designate similar components between the superstructure 6600 and the superstructure 6500. FIG. 90 shows the view width (e.g., width as perceived from a vantage point) of ladder rail 6510 at a first view position 6610 and FIG. 91 shows the view width of the ladder rail 6510 at a second view position 6710. The second view position 6710 is an angled view position compared to the first view position 6610, such that the second view position 6710 is a similar angle to that an operator would view the ladder 6498 when in the cab 18 operating the concrete mixer truck 10. In other words, the coupling plate 6516, the plurality of rungs 6512, and the ladder rail 6510 are angled such that when positioned and installed onto the superstructure 6600 provide less obstruction in the field of view of the operator of the concrete mixer truck 10.

Turning to FIG. 92B, the superstructure 6600 of the improved visibility ladder 6498 is shown from the perspective of an operator in the cab 18. As shown in FIG. 92B, the ladder 6498 is seen by the operator as having a very thin ladder rail 6510 and a narrow plurality of rungs 6512. That is, the ladder 6498 of the superstructure 6600 is very thin compared to a conventional ladder 6898 of a conventional superstructure 6800 (shown in FIG. 92A). As shown, the conventional ladder 6898 includes a conventional ladder rail 6810 and a plurality of rungs 6812 that are wider than the ladder rail 6510 and plurality of rungs 6512 of the ladder 6498. Further, the side mirror 6806 of the superstructure 6600 is positioned at a more convenient angle that provides greater visibility and less blind spots compared to the conventional mounting and angle of the side mirror 6802 of the ladder 6898.

Figure 93:
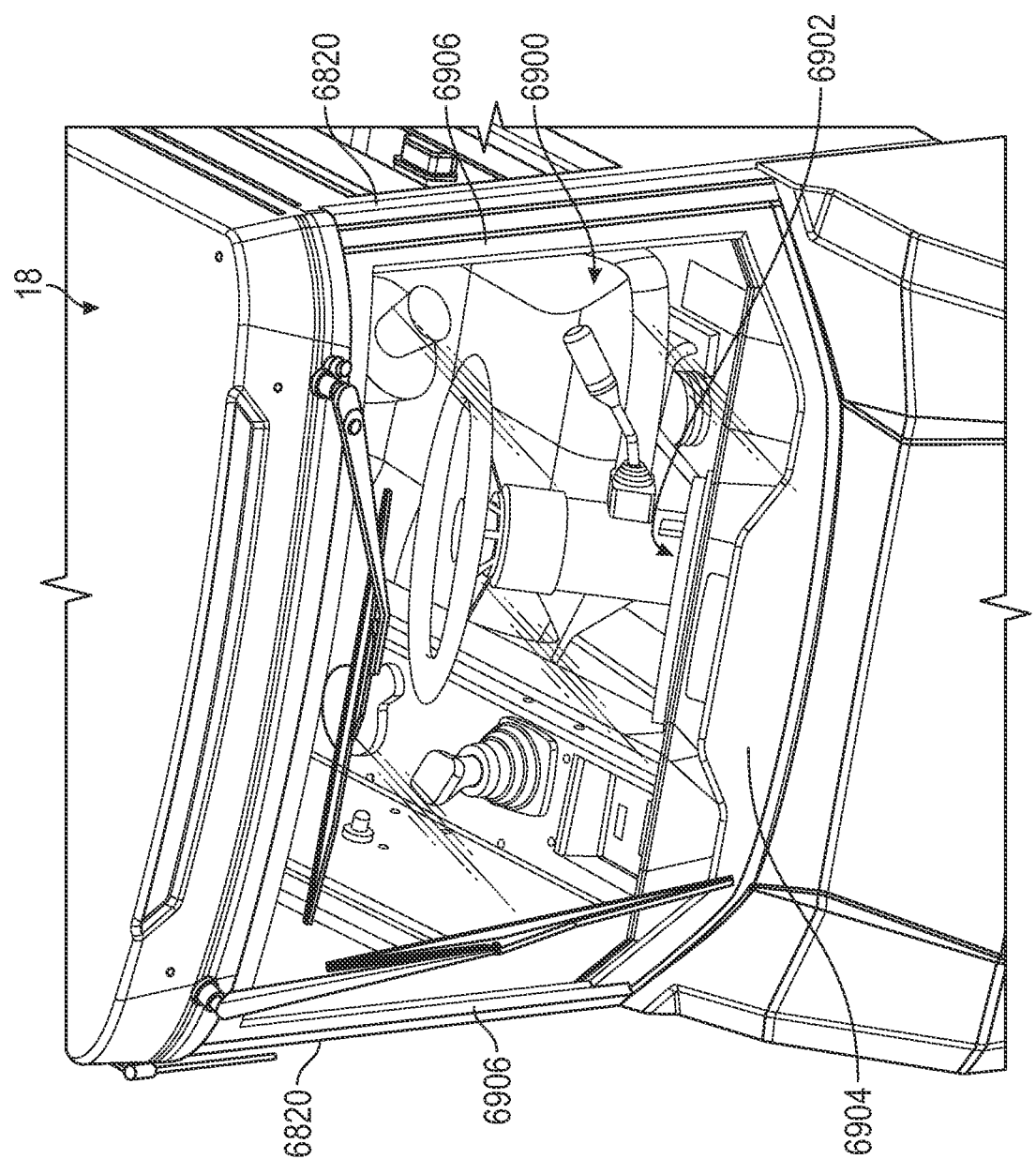
FIG. 93 is a top perspective view of a windshield coupled to the superstructure of FIG. 90, according to an example embodiment.

Turning to FIG. 93, a larger, curved windshield 6900 may be implemented within the cab 18 to provide greater visibility. To maximize visibility the windshield 6900 may be a single piece of glass that mounts to vertical pillars 6820 on the cab 18. The windshield 6900 includes a curved portion 6906 on each side of the windshield adjacent the vertical pillars 6820. A central sloped portion 6904 extends between the two end curved portions 6906 and slopes forward to allow space for the instrument panel 6902.

Flexible Bar-Pin Bushing Rod

Referring to FIG. 94, a superstructure 7000 is shown, according to an example embodiment. The superstructure 7000 of FIG. 94 is similar to the superstructure 6500 of FIG. 89. A difference between the superstructure 7000 and the superstructure 6500 is the superstructure 7000 has a first chassis support member without a wheel accommodating portion. Accordingly, like numbering is used to designate similar components between the superstructure 7000 and the superstructure 6600. The first pillar 6502 includes the first pillar top 6520 that includes the first bar-pin coupling member 6530 coupled to a platform coupling member 7130 (shown in FIG. 95) on the platform 54 and a first pillar bottom 6522 that includes the second bar-pin coupling member 6532 coupled to the first chassis support member 7078. The first chassis support member 7078 includes a chassis coupling surface 6562 that is configured to couple to an outer surface of the frame rail 40 on the first lateral side 142. A support arm 7058 extends from a bottom of the chassis coupling surface 6562 upward to a base portion 7060 that receives and is coupled to the second bar-pin coupling member 6532.

Figure 95:
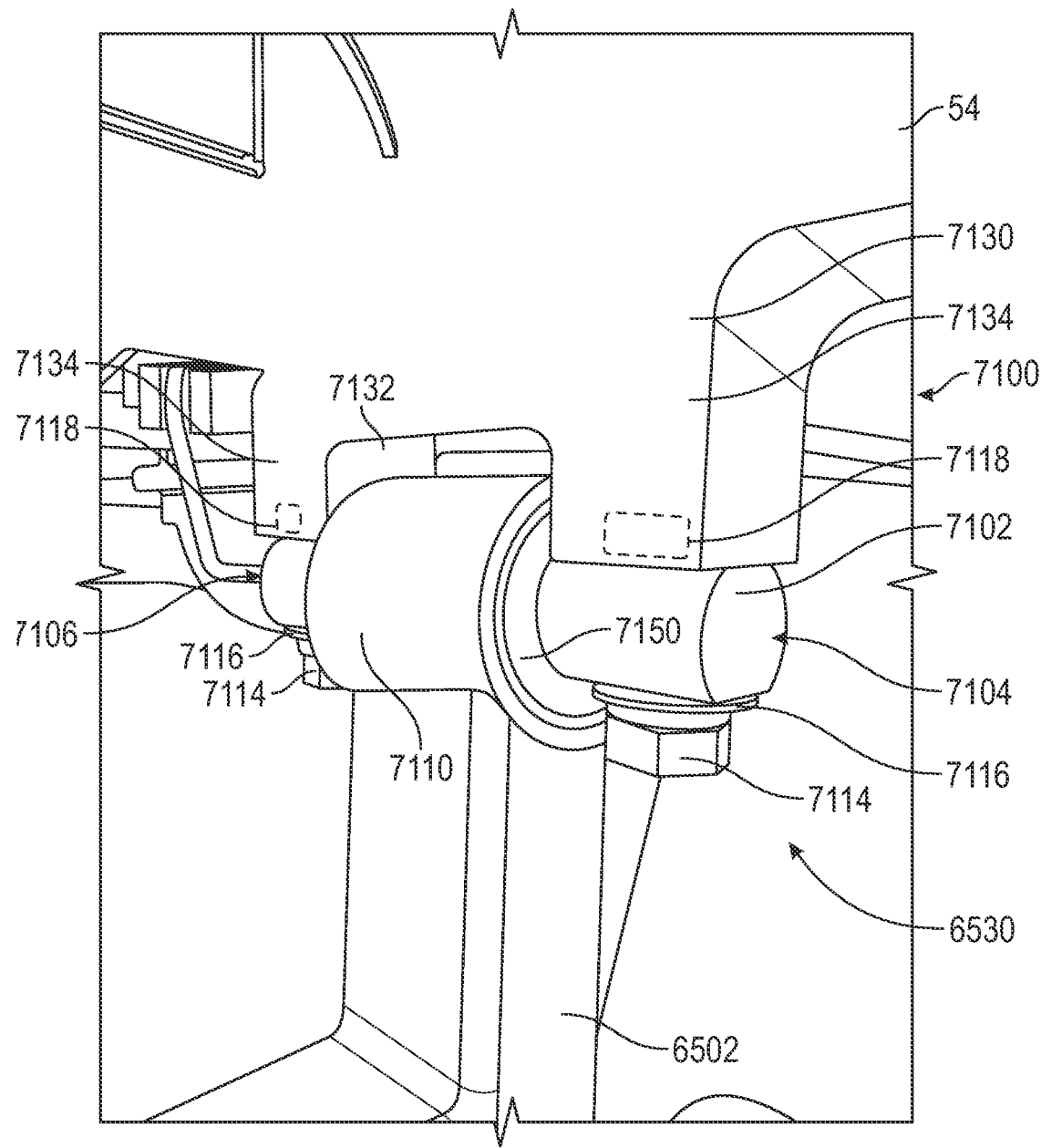
FIG. 95 is a portion of the superstructure of FIG. 94, according to an example embodiment.

Referring to FIG. 95, a portion 7100 of the superstructure 7000 focused on the coupling of the first bar-pin coupling member 6530 and the platform 54 is shown. The platform 54 includes a platform coupling member 7130 that is "U"-shaped. The platform coupling member 7130 includes a recessed portion 7132 that allows the joint member 7110 of the first bar-pin coupling member 6530 to flex and move. A protruding portion 7134 is disposed on both sides of the recessed portion 7132. Each protruding portion 7134 includes a connecting portion 7118 to receive a complementary fastener 7114 of the first bar-pin coupling member 6530. The connection portion 7118 may be a threaded member and/or nut configured to receive a bolt fastener 7114. The first bar-pin coupling member 6530 includes a joint member 7110 with an assembly pin 7102 extending laterally through an opening in the joint member 7110. In some embodiments, a bushing 7150 is disposed in the opening of the joint between the joint member 7110 and the assembly pin 7102. Beneficially, the bushing 7150 is configured to keep the joint member 7110 from wearing, vibrating, or making noise that may distract or annoy the operators and may be replaced. The bushing 7150 may be a polymeric wear resistant material, a dampening material, or another low-friction material.

The assembly pin 7102 of the first bar-pin coupling member 6530 includes a first pin end 7104 and a second pin end 7106 disposed laterally away from the first pin end 7104. The first pin end 7104 includes an opening therethrough configured to receive a fastener 7114. The second pin end includes an opening therethrough configured to receive a fastener 7114. As shown in FIG. 95, a washer 7116 is disposed between the fastener 7114 and an end of the first pin end 7104 to minimize wear on each element and dampen vibrations and noise. A washer 7116 is disposed between the fastener 7114 and an end of the second pin end 7106 to minimize wear on each element and dampen vibrations and noise.

To assemble the first bar-pin coupling member 6530, the bushing 7150 is placed around the assembly pin 7102 such that a central portion of the assembly pin 7102 is surrounded by the bushing 7150. The assembly pin 7102 and bushing 7150 are inserted through the opening in the joint member 7110 such that the first pin end 7104 and the second pin end 7106 are equidistance from the center of the joint member 7110. The bushing 7150 and the assembly pin 7102 pivotally interface with the joint member 7110. A pair of fasteners 7114 with washers 7116 are inserted through an opening axially formed within each of the first pin end 7104 and the second pin end 7106. Each fastener 7114 is configured to engage a complementary connection portion 7118 disposed within each protruding portion 7134 of the platform coupling member 7130. A technician may easily replace the first pillar 6502 and/or a component of the first bar-pin coupling member 6530 by uncoupling the pair of fasteners 7114 and the complementary connection portion 7118. As will be appreciated, the third bar-pin coupling member 6554 of the second pillar 6504 is coupled to the platform 54 in a similar manner using similar components as described above with respect to the first bar-pin coupling member 6530 of the first pillar 6502.

Figure 96:
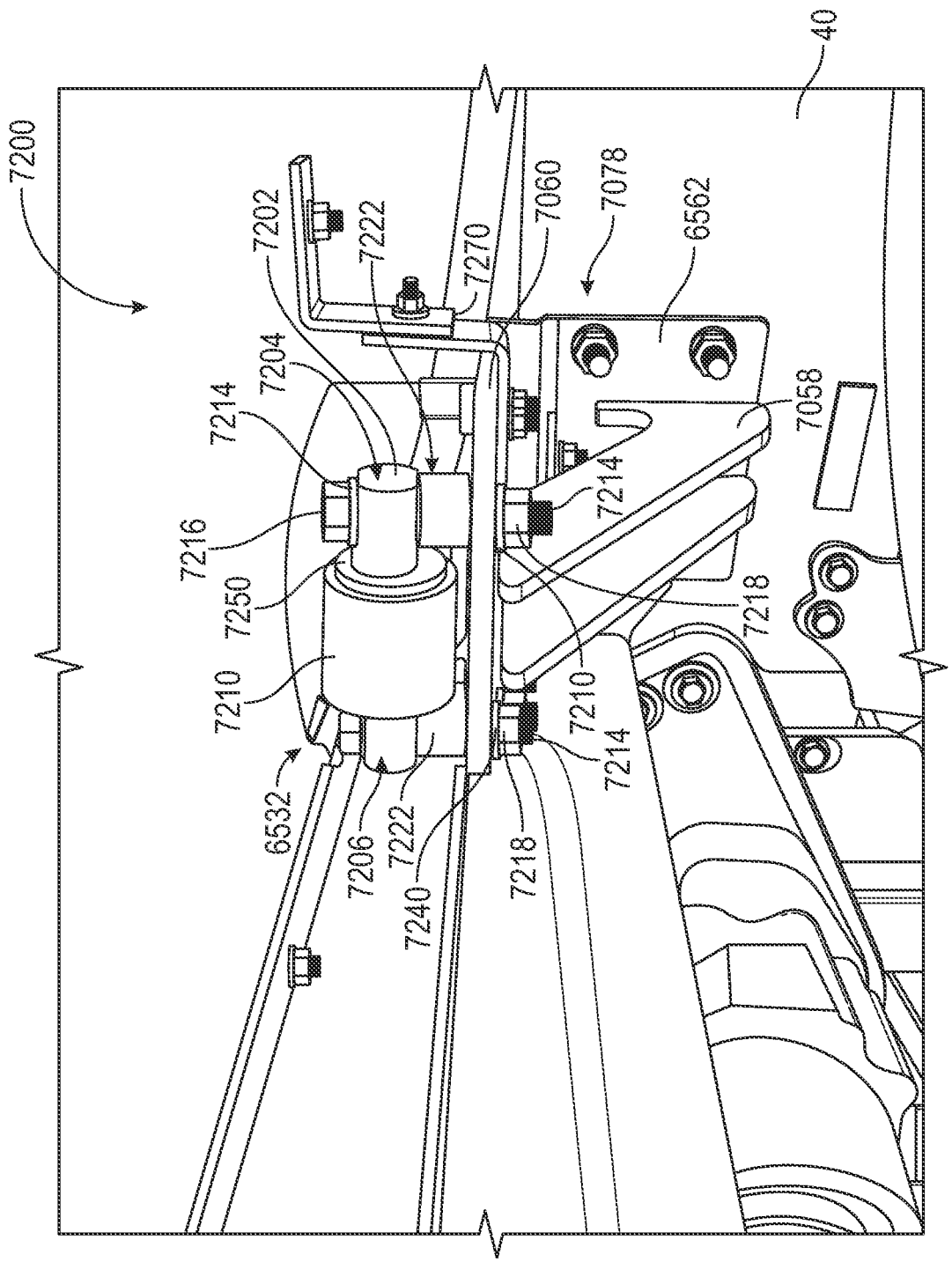
FIG. 96 is another portion of the superstructure of FIG. 94, according to an example embodiment.

Referring to FIG. 96, a portion 7200 of the superstructure 7000 focused on the coupling of the second bar-pin coupling member 6532 and the first chassis support member 7078 is shown. As shown in FIG. 96, a support bracket 7270 is coupled to the base portion 7060. The first chassis support member 7078 includes a chassis coupling surface 6562 that is configured to couple to an outer surface of the frame rail 40 on the first lateral side 142. A support arm 7058 extends from a bottom of the chassis coupling surface 6562 upward to a base portion 7060 that receives and is coupled to the second bar-pin coupling member 6532. The base portion 7060 includes a pair of openings 7240 formed therethrough that are configured to receive fasteners 7214. A washer 7222 is disposed above each opening 7240 to provide clearance between the joint member 7210 and the base portion 7060. In some embodiments, the washer 7222 is configured to minimize wear on each element and dampen vibrations and noise. A connector 7218 is disposed below each opening 7240 to receive the fastener 7214. As shown in FIG. 22, the fastener 7214 is a bolt and the connector 7218 is a nut.

The second bar-pin coupling member 6532 includes a joint member 7210 with an assembly pin 7202 extending laterally through an opening in the joint member 7210. In some embodiments, a bushing 7250 is disposed in the opening of the joint between the joint member 7210 and the assembly pin 7202. Beneficially, the bushing 7250 is configured to keep the joint member 7210 from wearing, vibrating, or making noise that may distract or annoy the operators and may be replaced. The bushing 7250 may be a polymeric wear resistant material, a dampening material, or another low-friction material. The assembly pin 7202 of the second bar-pin coupling member 6532 includes a first pin end 7204 and a second pin end 7206 disposed laterally away from the first pin end 7204. The first pin end 7204 includes an opening therethrough configured to receive a fastener 7214. The second pin end includes an opening therethrough configured to receive a fastener 7214.

To assemble the second bar-pin coupling member 6532, the bushing 7250 is placed around the assembly pin 7202 such that a central portion of the assembly pin 7202 is surrounded by the bushing 7250. The assembly pin 7202 and bushing 7250 are inserted through the opening in the joint member 7210 such that the first pin end 7204 and the second pin end 7206 are equidistance from the center of the joint member 7210. The bushing 7250 and assembly pin 7202 pivotally interface with the joint member 7210. A pair of fasteners 7214 with flared portions 7216 are inserted through an opening axially formed within each of the first pin end 7204 and the second pin end 7206. Each fastener 7214 is configured to pass through an opening 7240 in the base portion 7060 and engage a complementary connector 7218. A technician could easily replace the first pillar 6502 and/or a component of the second bar-pin coupling member 6532 by uncoupling the pair of fasteners 7214 and the complementary connector 7218. As will be appreciated, the fourth bar-pin coupling member 6552 of the second pillar 6504 is coupled to a second chassis support member 6574 in a similar manner using similar components as described above with respect to the second bar-pin coupling member 6532 of the first pillar 6502.

Cooling System

Figure 97:
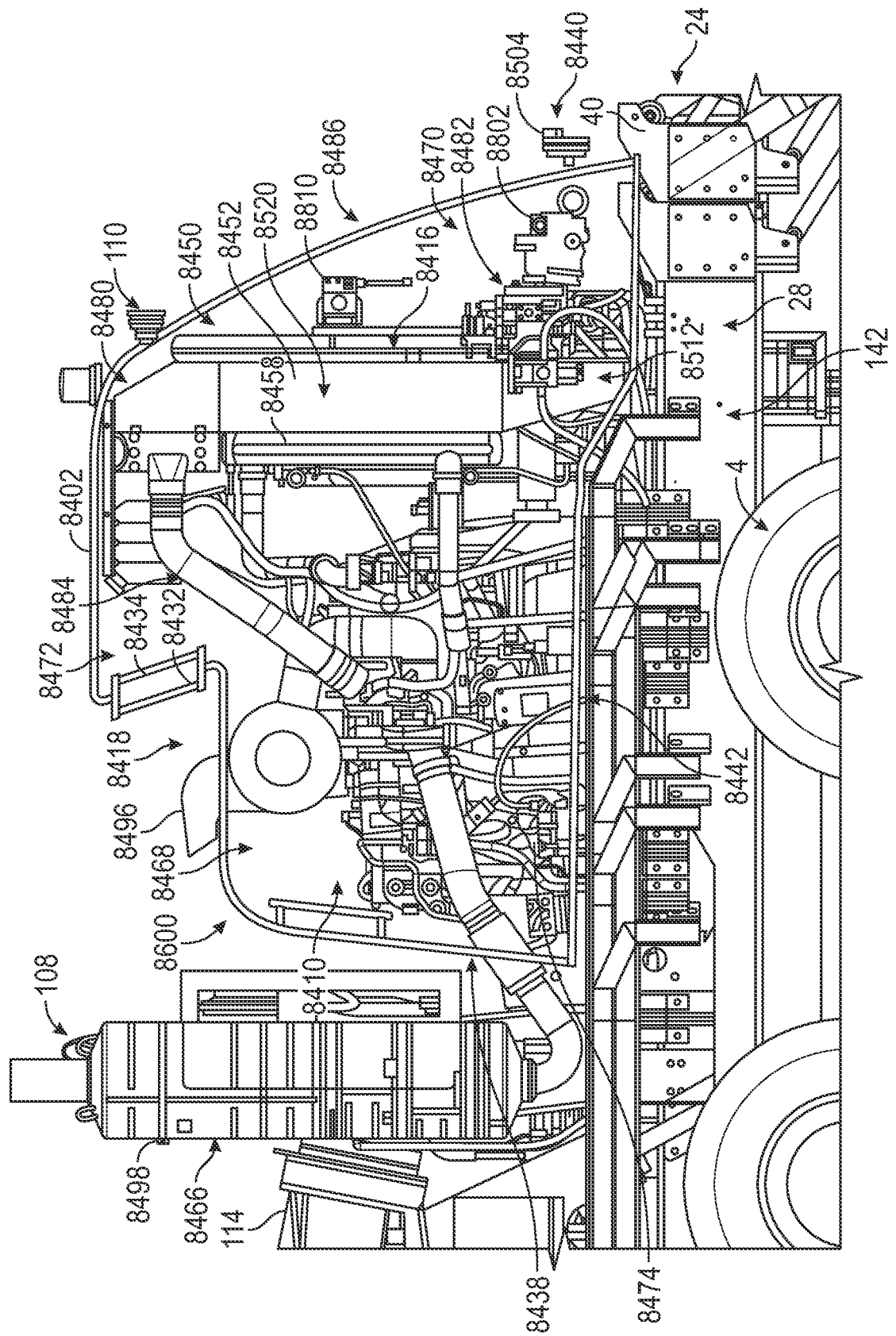
FIG. 97 is a perspective view of a concrete mixer truck with a hood design and cooling system, according to an example embodiment.
Figure 98:
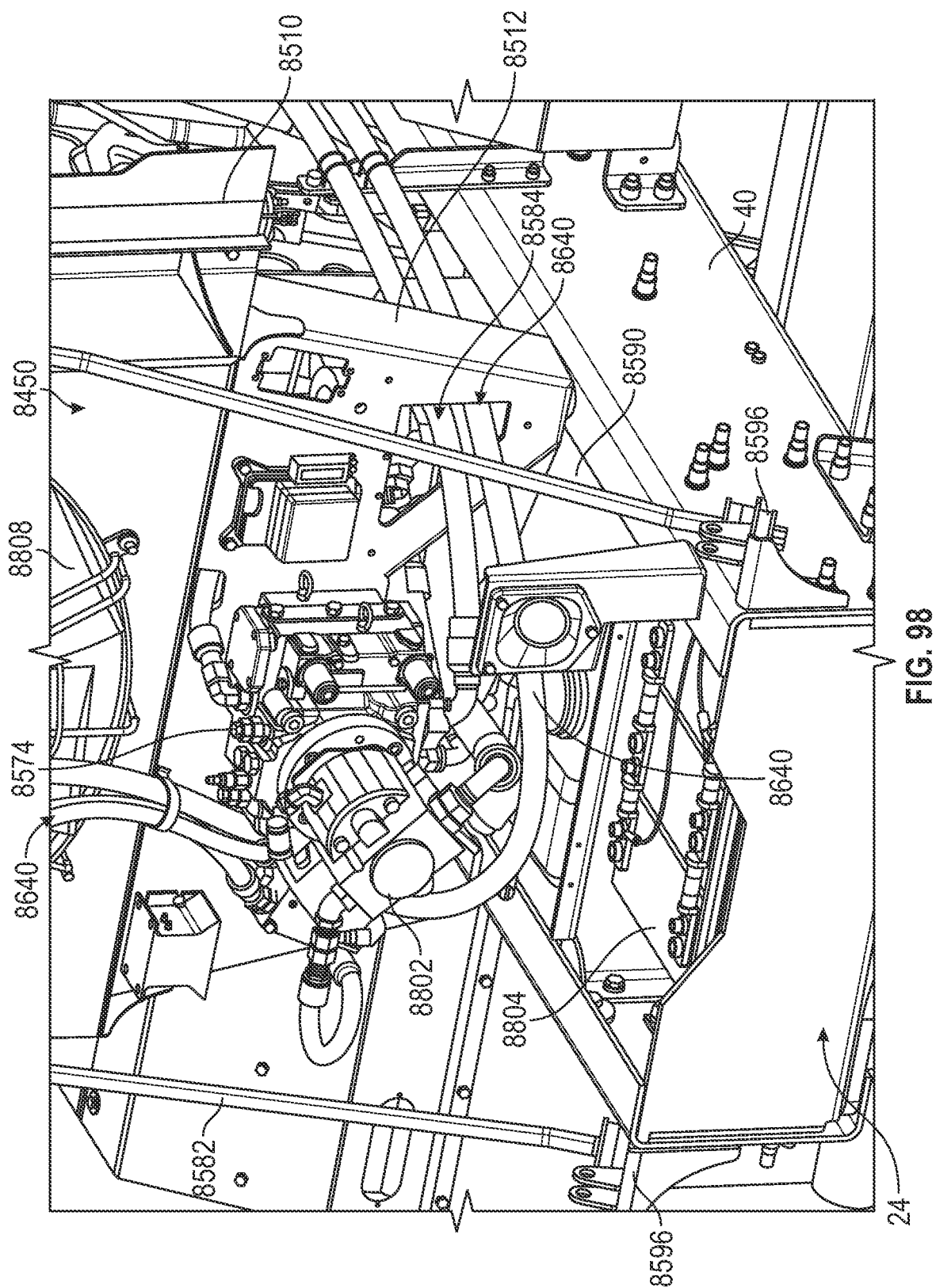
FIG. 98 is a rear perspective view of the cooling system and drum pump of FIG. 97.
Figure 99:
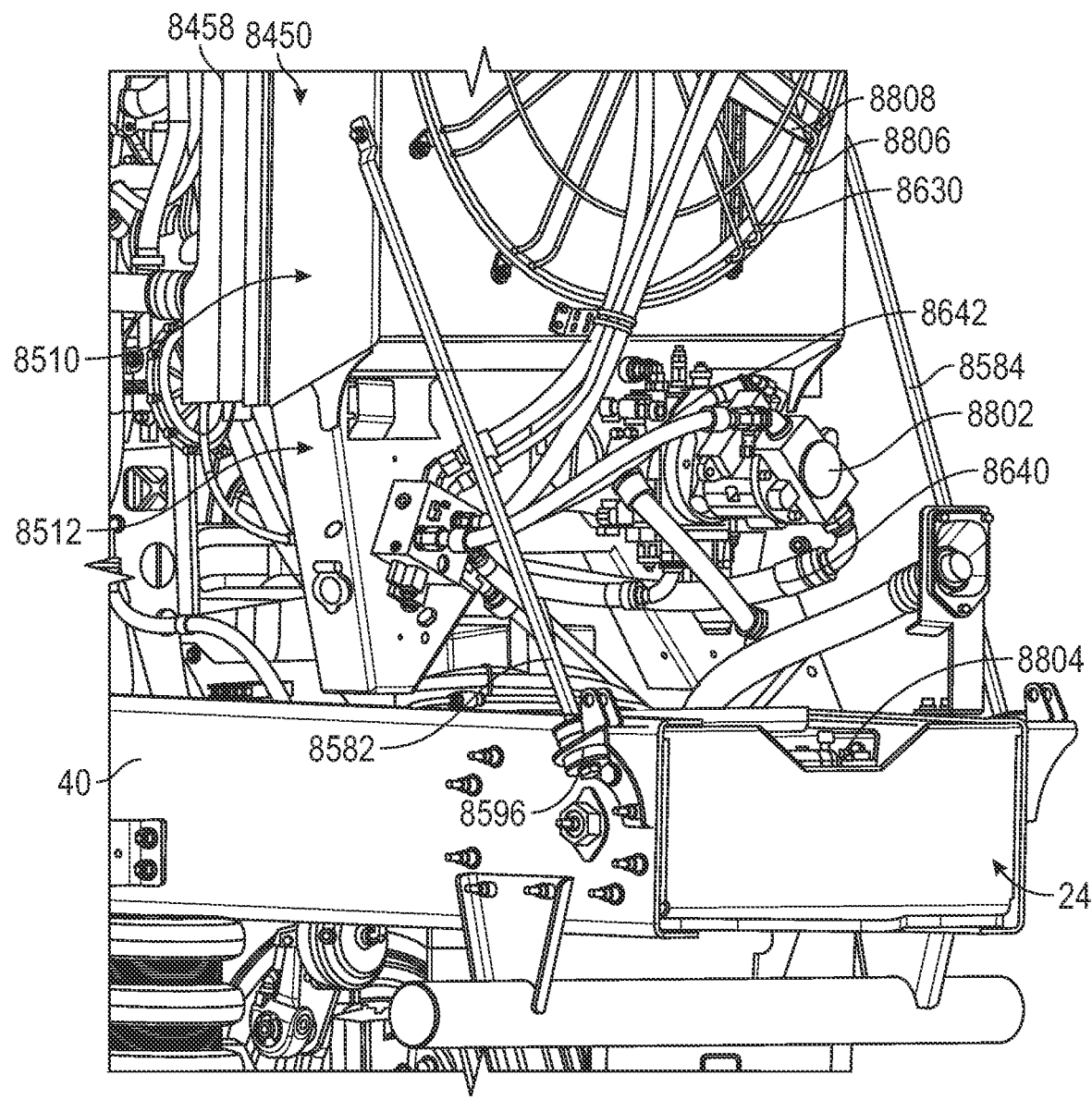
FIG. 99 is a rear perspective view of the cooling system and drum pump of FIG. 97.

Referring to FIGS. 97-99, the engine module 110 includes an engine 8474 (e.g., prime mover), a cooling system 8480, and a fan assembly 8450. The cooling system 8480 includes a pump 8802 coupled to a cooling frame 8452 and the fan assembly 8450. In some embodiments, the fan assembly 8450 is coupled to a cooling frame upper portion 8510 and the pump 8802 is coupled to a cooling frame lower portion 8512. The cooling system 8480 and the pump 8802 are disposed along the frame rails 40 and in an internal hood cavity 8410 of a hood 8486 that provides cooling via an improved airflow 8600 and rear accessibility through a hatch 8420 (see FIG. 110). As shown in FIG. 97, the hood 8486 is coupled to the frame rails 40 and/or other portions of the chassis 12 and is configured to cover and protect the engine module 110. The hood 8486 includes a hood frame 8402, a front hood end 8438, a rear hood end 8440 adjacent the rear end 24, a first hood side 8442 adjacent the first lateral side 142, and a second hood side 8444 adjacent the second lateral side 144. The hood frame 8402 includes a lower frame portion 8414 and an upper frame portion above the lower frame portion 8414 and an outer cavity 8418 formed on the front hood end 8438. The front hood end 8438 is downstream of the second end 38 of the mixing drum 14 such that air flow 8600 moves along the top and sides of the mixing drum 14 toward the front hood end 8438. A plurality of cavities are formed throughout the internal hood cavity 8410 of the hood 8486 by the various components and form airflow conduits and/or paths. A front cavity 8468 is formed between the front hood end 8438, the engine 8474, and the top portion of the lower frame portion 8414. An upper cavity 8472 is disposed between the engine 8474 and fan assembly 8450 in the upper frame portion 8412. A rear cavity 8470 is disposed downstream of the fan assembly 8450 and upstream of a hatch door 8422 of the hatch 8420. The air flow 8600 may enter through the front hood end 8438 and travel through any one of the front cavity 8468, upper cavity 8472, and rear cavity 8470 as the air flow 8600 travels through the hood 8486 toward the rear hood end 8440.

The engine 8474 is connected to and powered by a fuel tank 8498 of the fuel system 108. The fuel tank 8498 is configured to provide fuel to the engine 8474. In some embodiments, the engine 8474 is a plurality of batteries for an electronic concrete mixer truck 10. The cooling system 8480 is configured to thermally regulate (e.g., cool, etc.) the engine 8474. In some embodiments, the cooling system 8480 may absorb thermal energy from the engine 8474 and transport the thermal energy to another location where it can be disseminated to the surrounding environment. The cooling system 8480 includes a plurality of controllers 8482, a hydraulic pump 8464, a radiator 8458, and a plurality of conduits 8484. In some embodiments, the engine 8474 includes an aftertreatment system including a DEF tank positioned downstream of the engine 8474 and upstream of an engine exhaust 8496. The DEF tank is configured to provide a consumable in selective catalytic reduction (SCR) that lowers NOx concentration in the diesel exhaust emissions from the engine 8474.

The plurality of conduits 8484 (e.g., fluid conduits) extend from the engine 8474 to the radiator 8458 and are configured to deliver fluid cooled by the radiator to the engine 8474 and/or thermally regulate the engine 8474. In some embodiments, the plurality of conduits 8484 are configured to deliver coolant from one or more tanks to the engine 8474. For example, a coolant circuit includes a thermal energy interface (e.g., water jacket) and is configured to transfer thermal energy from the engine 8474 into the coolant and move the heated coolant through the plurality of conduits 8484. The controllers 8482 include control valves, power providers, and electronics. In some embodiments, one or more control valves are configured to regulate and/or control the flow of pressurized hydraulic fluid within the fan assembly 8450. In some embodiments, the control valves may include check valves, relief valves, flow control valves, directional control valves, or other types of valves and may be passively controlled. An electronic controller of the controllers 8482 may be actively controlled by an operator through a lever, switch, or dial, electronically by the controller, by a pneumatic or hydraulic pilot pressure controlled by the controller, or similar electronic control mechanisms. By way of example, the fan assembly 8450 may include flow control valves and/or pressure control valves that control the flow hydraulic fluid to the fan motor 8810 and thereby control the speed and/or torque of the fan motor 8810. By way of another example, the control valves may include a pressure relief valve that extends across the inlet and the outlet of the fan motor 8810 to reduce line pressure if the fan motor 8810 is ever backdriven.

The radiator 8458, or similar heat exchanger, is configured to receive incoming air through the front hood end 8438 to reduce the temperature of a fluid (e.g., coolant, etc.) within the cooling system 8480 and thereby cool the engine 8474. The heated air then disperses (e.g., through forced or natural convection, etc.), transferring the thermal energy to the surrounding environment. The radiator 8458 is thermally conductive and has a large surface area (e.g., formed through a number of fins, etc.). In some embodiments, the radiator 8458 may be liquid-cooled, rather than air-cooled. An air cleaner 8462 is positioned upstream of the fan 8416 and is configured to clean air as it flows through the fan 8416. In some embodiments, the air cleaner 8462 is positioned downstream of the fan 8416.

The fan assembly 8450, or similar driver configured to draw incoming air 8600 through the radiator 8458, is downstream of the cooling system 8480. The fan assembly 8450 is disposed on the cooling frame 8452 and includes a fan 8416, a fan motor 8810, a fan ring 8806, fan blades 8808, and a fan grill 8630 to protect other components from the rotating fan blades 8808. A plurality of fan coupling members 8812 couple the fan ring 8806 to the internal portion of the hood 8486. A fan motor 8810 is operably connected to the fan 8416 and is configured to drive the fan 8416 to rotate the fan blades 8808. The fan ring 8806 is configured to receive a conical internal portion 8700 on the hatch door 8422 of the hatch 8420. Beneficially, the conical internal portion 8700 is configured to direct hot air out of the hood 8486 from the fan 8416 rearward, or slightly upward to not disturb dust on the ground outside of the concrete mixer truck 10, to reduce recirculation and improve efficiency of the airflow 8600 in the hood 8486. Further, the configuration of the conical internal portion 8700 provides for reduced fan speed for properly cool the engine module 110. The outlet of the hydraulic pump 8464 may be fluidly coupled (e.g., indirectly or indirectly) to a hydraulic motor, shown as fan motor 8810. Accordingly, the flow of pressurized hydraulic fluid from the hydraulic pump 8464 drives the fan motor 8810. After exiting the fan motor 8810, the hydraulic fluid returns to the tank 8466. An output shaft of the fan motor 8810 is coupled to an air mover, shown as fan 8416. The fan 8416 is positioned adjacent the radiator 8458 such that rotation of the fan motor 8810 causes the fan 8416 to pull air through the radiator 8458, cooling the coolant flowing therethrough. As shown in FIG. 97, the fan 8416 is positioned rearward of the radiator 8458. In other embodiments, the fan 8416 is positioned forward of the radiator 8458 or positioned remotely from the radiator 8458 and fluidly coupled to the radiator 8458 through one or more ducts.

Figure 100:
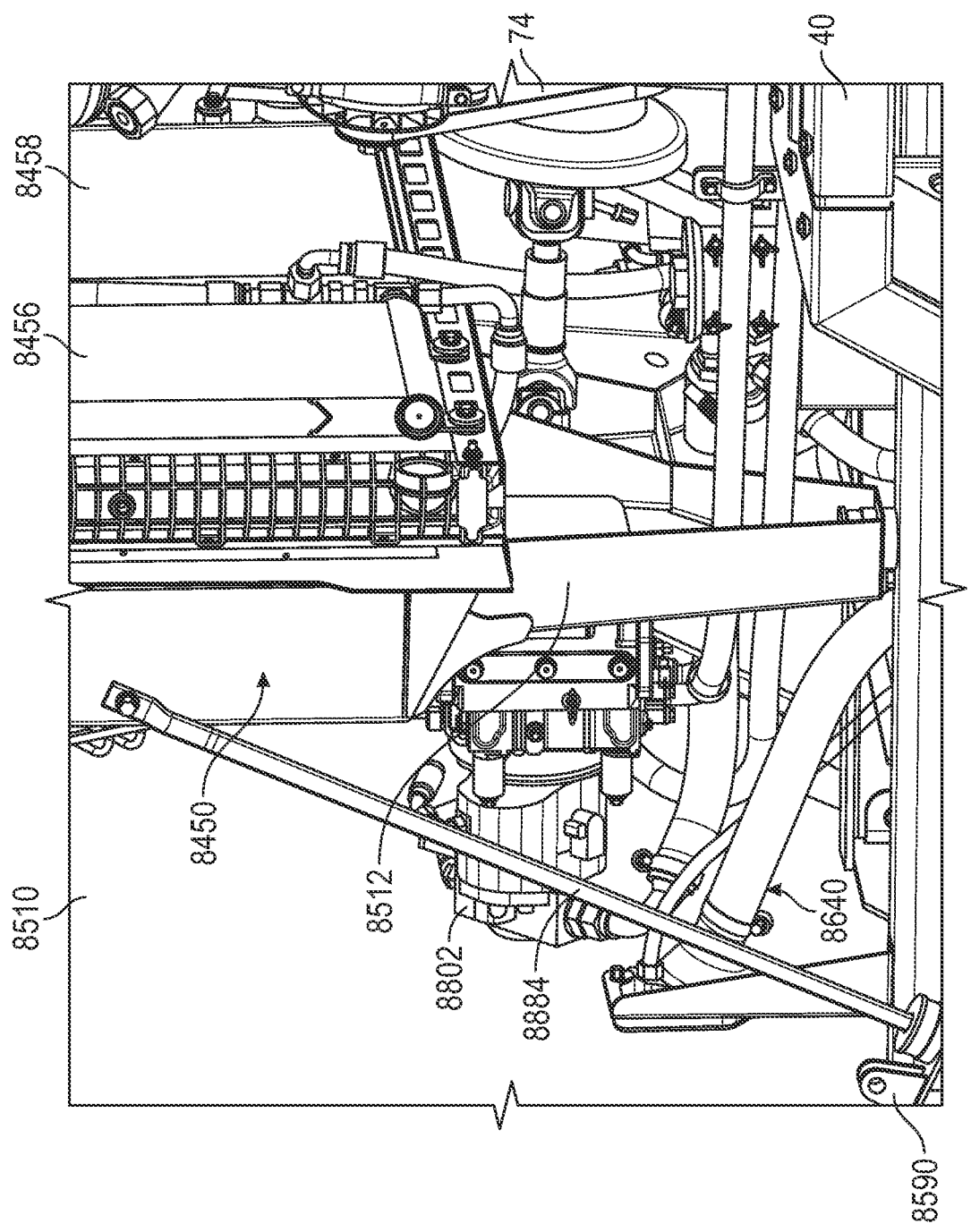
FIG. 100 is a side perspective view of the cooling system and drum pump of FIG. 97.

Referring to FIGS. 98-100, the rear end 24 of the concrete mixer truck 10 without a hood 8486 is shown. The cooling frame 8452 is coupled to the frame rails 40 and includes a first support pin 8582 coupled to the cooling frame upper portion 8510 and a pin support member 8596 on the first lateral side 142 and a second support pin 8584 coupled to the cooling frame upper portion 8510 and a pin support member 8596 on the second lateral side 144. The pin support member 8596 may include one or more bushings to dampen vibration and minimize wear along the components. The first support pin 8582 and the second support pin 8584 are configured to provide longitudinal support to the cooling frame 8452 without taking up too much space or impeding in the operation of the components within the hood 8486. In some embodiments, a battery module 8804 and a fluid reservoir 8590 are disposed between the frame rails 40 (e.g., between the first lateral side 142 and second lateral side 144). The battery module 8804 may be operably connected to the pump 8802 to provide power to drive the pump 8802. In other embodiments, the pump 8802 is driven by a motor 8574 disposed between the pump 8802 and the cooling frame lower portion 8512. The fluid reservoir 8590 may be fluidly coupled to the pump 8802 to provide fluid to various components along the concrete mixer truck 10 pumped by the pump 8802.

The pump 8802 is coupled to a cooling frame lower portion 8512 positioned below the fan assembly 8450 and fan 8416 and is coupled to the cooling frame upper portion 8514. According to an exemplary embodiment, the drum drive motor 130 is a hydraulic motor, the fluid reservoir 8590 is a hydraulic fluid reservoir, and the pump 8802 is a hydraulic pump. The pump 8802 may be configured to pump fluid (e.g., hydraulic fluid, etc.) stored within the fluid reservoir 124 to drive the drum drive motor 130 through one conduit in the plurality of conduits 8640.

According to an exemplary embodiment, the pump 8802 is a variable displacement hydraulic pump (e.g., an axial piston pump, etc.) and has a pump stroke that is variable. The pump 8802 may be configured to provide hydraulic fluid at a flow rate that varies based on the pump stroke (e.g., the greater the pump stroke, the greater the flow rate provided to the drum drive motor 130, etc.). The pressure of the hydraulic fluid provided by the pump 8802 may also increase in response to an increase in pump stroke (e.g., where pressure may be directly related to work load, higher flow may result in higher pressure, etc.). The pressure of the hydraulic fluid provided by the pump 8802 may alternatively not increase in response to an increase in pump stroke (e.g., in instances where there is little or no work load, etc.). The pump 8802 may include a throttling element (e.g., a swash plate, etc.). The pump stroke of the pump 8802 may vary based on the orientation of the throttling element. In one embodiment, the pump stroke of the pump 8802 varies based on an angle of the throttling element (e.g., relative to an axis along which the pistons move within the axial piston pump, etc.). By way of example, the pump stroke may be zero where the angle of the throttling element is equal to zero. The pump stroke may increase as the angle of the throttling element increases. According to an exemplary embodiment, the variable pump stroke of the pump 8802 provides a variable speed range of up to about 10:1. In other embodiments, the pump 8802 is configured to provide a different speed range (e.g., greater than 10:1, less than 10:1, etc.).

In one embodiment, the throttling element of the pump 8802 is movable between a stroked position (e.g., a maximum stroke position, a partially stroked position, etc.) and a destroked position (e.g., a minimum stroke position, a partially destroked position, etc.). According to an exemplary embodiment, an actuator is coupled to the throttling element of the pump 8802. The actuator may be positioned to move the throttling element between the stroked position and the destroked position. In some embodiments, the pump 8802 is configured to provide no flow, with the throttling element in a non-stroked position, in a default condition (e.g., in response to not receiving a stroke command, etc.). The throttling element may be biased into the non-stroked position. In some embodiments, the drum driver 114 is configured to provide a first command signal. In response to receiving the first command signal, the pump 8802 (e.g., the throttling element by the actuator thereof, etc.) may be selectively reconfigured into a first stroke position (e.g., stroke in one direction, a destroked position, etc.). In some embodiments, the drum driver 114 is configured to additionally or alternatively provide a second command signal. In response to receiving the second command signal, the pump 8802 (e.g., the throttling element by the actuator thereof, etc.) may be selectively reconfigured into a second stroke position (e.g., stroke in an opposing second direction, a stroked position, etc.). The pump stroke may be related to the position of the throttling element and/or the actuator.

According to another exemplary embodiment, a valve is positioned to facilitate movement of the throttling element between the stroked position and the destroked position. In one embodiment, the valve includes a resilient member (e.g., a spring, etc.) configured to bias the throttling element in the destroked position (e.g., by biasing movable elements of the valve into positions where a hydraulic circuit actuates the throttling element into the destroked positions, etc.). Pressure from fluid flowing through the pump 8802 may overcome the resilient member to actuate the throttling element into the stroked position (e.g., by actuating movable elements of the valve into positions where a hydraulic circuit actuates the throttling element into the stroked position, etc.).

Multi-Function Pump with a Hydraulic Circuit and Pump Control Logic

Figure 103:
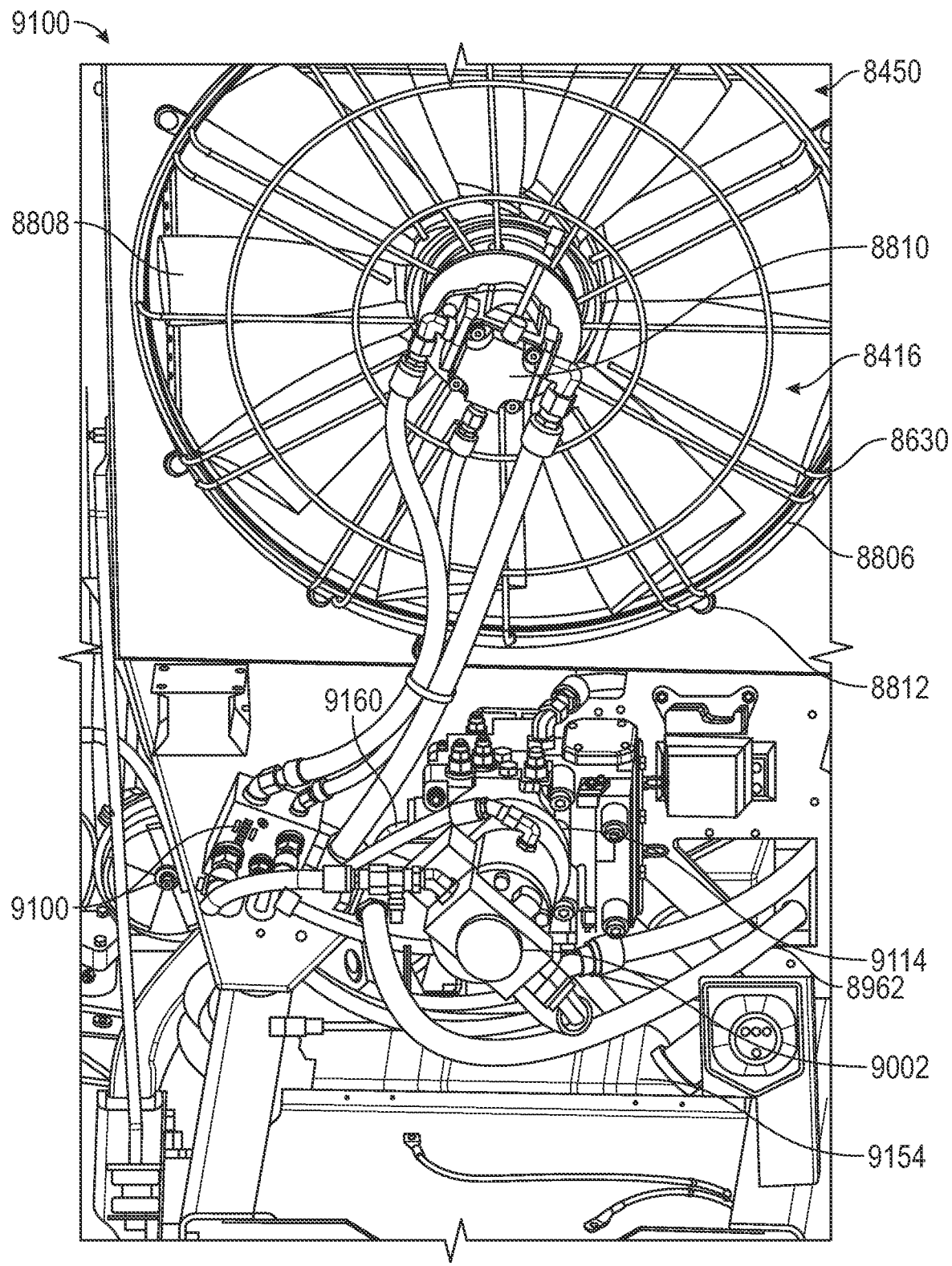
FIG. 103 is a rear perspective view of a multi-function pump, according to an example embodiment.

As shown in FIG. 103, the pump 8802 of FIGS. 97-100 may be implemented with a hydraulic circuit and pump control logic 9100 to provide a single pump 9002 that provides power to multiple auxiliary functions of the concrete mixer truck 10 including any one of chute 46 movement (e.g., rotation, raise/lower, etc.), chute 46 folding and unfolding, providing water to the drum assembly 6 or other components, driving a fan assembly 8450, and controlling an axle assembly of the drive system 20. As shown in FIG. 103, the pump 9002 is coupled to the cooling frame lower portion 8512. In some embodiments, the pump 9002 is coupled to another portion of the cooling frame 8452 or is disposed along a different portion of the concrete mixer truck 10 or proximally located. The pump 9002 is configured to reduce hydraulic complexity along the concrete mixer truck 10, improve hydraulic efficiency, and allows ease of installation of additional hydraulic components.

Figure 101:
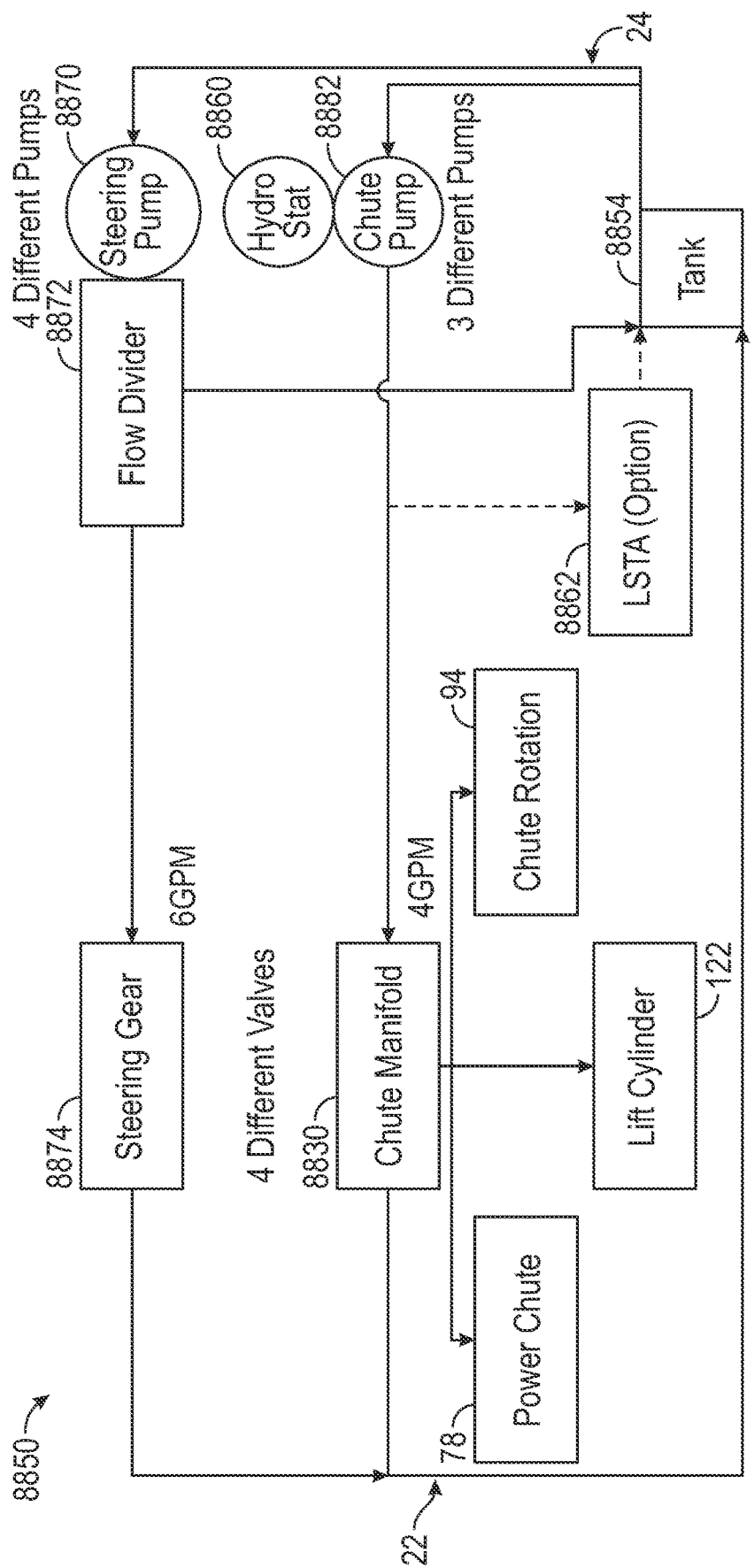
FIG. 101 is a system flow diagram of a conventional hydraulic circuit design and control logic, according to an example embodiment.

As shown in FIG. 101, a hydraulic circuit and pump control logic 8850 extends from the front end 22 to the rear end 24 of the concrete mixer truck 10 is shown. The hydraulic circuit and pump control logic includes a chute pump 8882 with three different pumps that is operably connected to a hydrostat device 8860. The hydrostat device 8860 is configured to detect the presence of water as a prevention against drying out, overflow, etc. The chute pump 8882 is configured to control movement of the main chute 46 by providing pressurized hydraulic oil from the fluid tank 8854 to power the chute manifold 8880. The three pumps of the chute pump 8882 each provide pressurized hydraulic oil to power the chute actuator 122, chute folding actuator 78, and chute rotation actuator 94, respectively. The three pumps of the chute pump 8882 may be a 1.02 CIPR (16.7 cc), 1.16 CIPR (19 cc), and a 1.87 CIPR (30.6 cc). In some embodiments, a load span tag axle (LSTA) 8862 is powered by one of the chute pumps 8882. A steering pump 8870 is coupled to a steering gear 8874 and is configured to provide feel (e.g., feedback) and wheel speed to a steering wheel in the cab 18 and physically operated by the operator. In some embodiments, the steering pump 8870 includes four pumps configured to pressurized hydraulic oil from the fluid tank 8854 to a steering assembly and steering gear 8874. A flow divider 8872 is configured to provide control flow to the steering gear 8874 and return excess or unnecessary pressurized hydraulic oil back to the fluid tank 8854.

Figure 102:
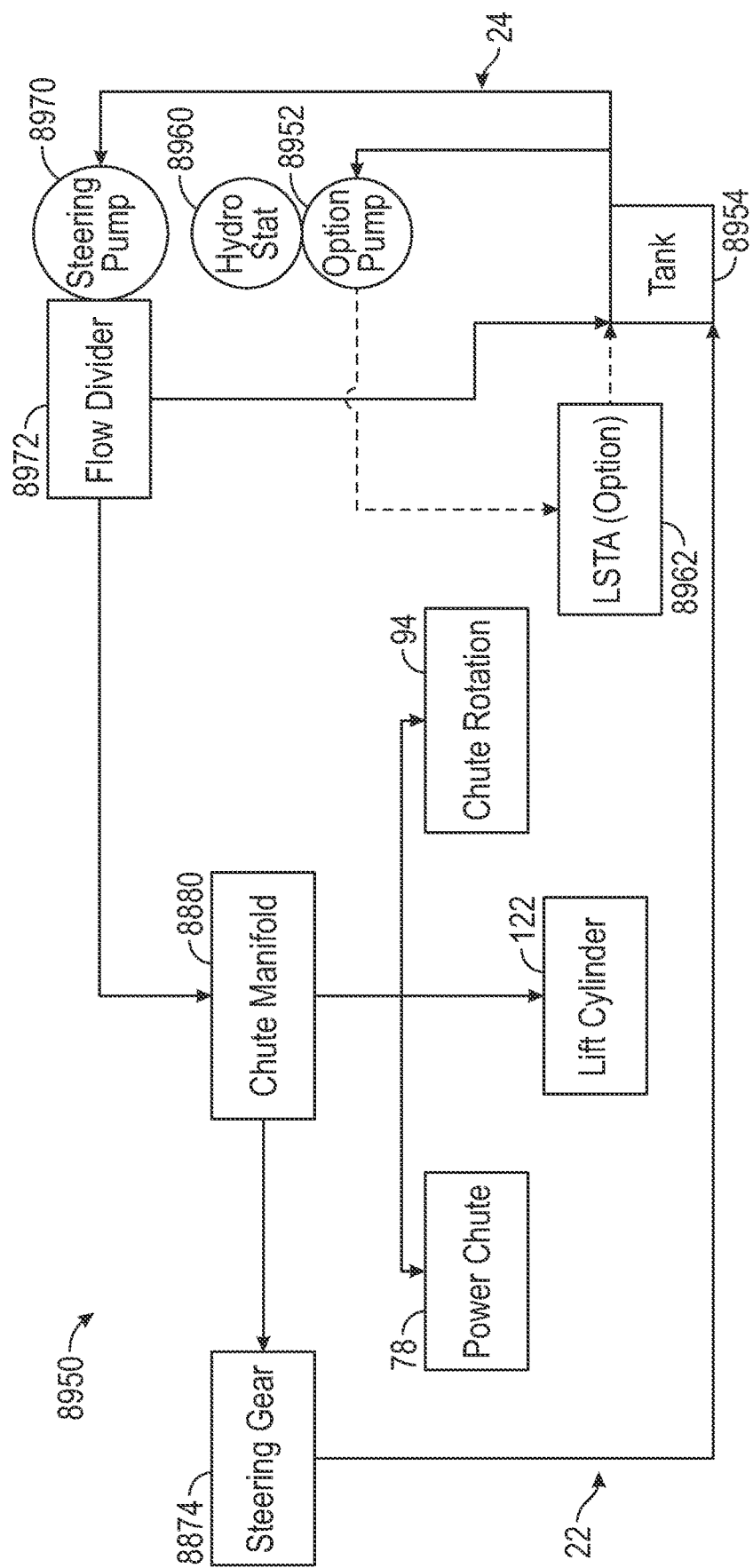
FIG. 102 is a system flow diagram of another conventional hydraulic circuit design and control logic, according to another example embodiment.

As shown in FIG. 102, a hydraulic circuit and pump control logic 8950 that extends from the front end 22 to the rear end 24 of the concrete mixer truck 10 is shown. The hydraulic circuit and pump control logic 8950 of FIG. 102 is similar to the hydraulic circuit and pump control logic 8850 of FIG. 101. A difference between the hydraulic circuit and pump control logic 8950 and the hydraulic circuit and pump control logic 8850 is the steering pump 8970 of the hydraulic circuit and pump control logic 8950 powers a majority of the components. Accordingly, like numbering is used to identify like components of the hydraulic circuit and pump control logic 8850 and the hydraulic circuit and pump control logic 8950. The hydraulic circuit and pump control logic 8950 includes an optional pump 8952 that is operably connected to a hydrostat device 8960. The hydrostat device 8960 is configured to detect the presence of water as a prevention against drying out, overflow, etc. In some embodiments, a load span tag axle (LSTA) 8962 is powered by the optional pump 8952. A steering pump 8970 is configured to provide pressurized hydraulic oil from the fluid tank 8954 to power the steering gear 8874 and the chute manifold 8880. The steering pump 8970 is configured to control movement of the main chute 46 by providing pressurized hydraulic oil from the fluid tank 8954 to power the chute manifold 8980. The steering pump 8970 provides pressurized hydraulic oil to power the chute actuator 122, chute folding actuator 78, and chute rotation actuator 94. The steering pump 8970 is further configured to provide pressurized hydraulic oil to power a steering gear 8974 downstream of the chute manifold 8880. The steering gear 8874 is configured to provide feel (e.g., feedback) and wheel speed to a steering wheel in the cab 18 and physically operated by the operator. A flow divider 8972 is configured to provide control flow to the steering gear 8974 and return excess or unnecessary pressurized hydraulic oil back to the fluid tank 8954. A drawback of the steering pump 8970 solely providing pressurized hydraulic oil from the fluid tank 8954 to power the chute manifold 8880 and the steering gear 8874 is that the steering feel and speed of the concrete mixer truck and/or the chute manifold 8880 may be impeded when the multi-function pump is powering one or more of the multiple auxiliary functions.

Figure 104:
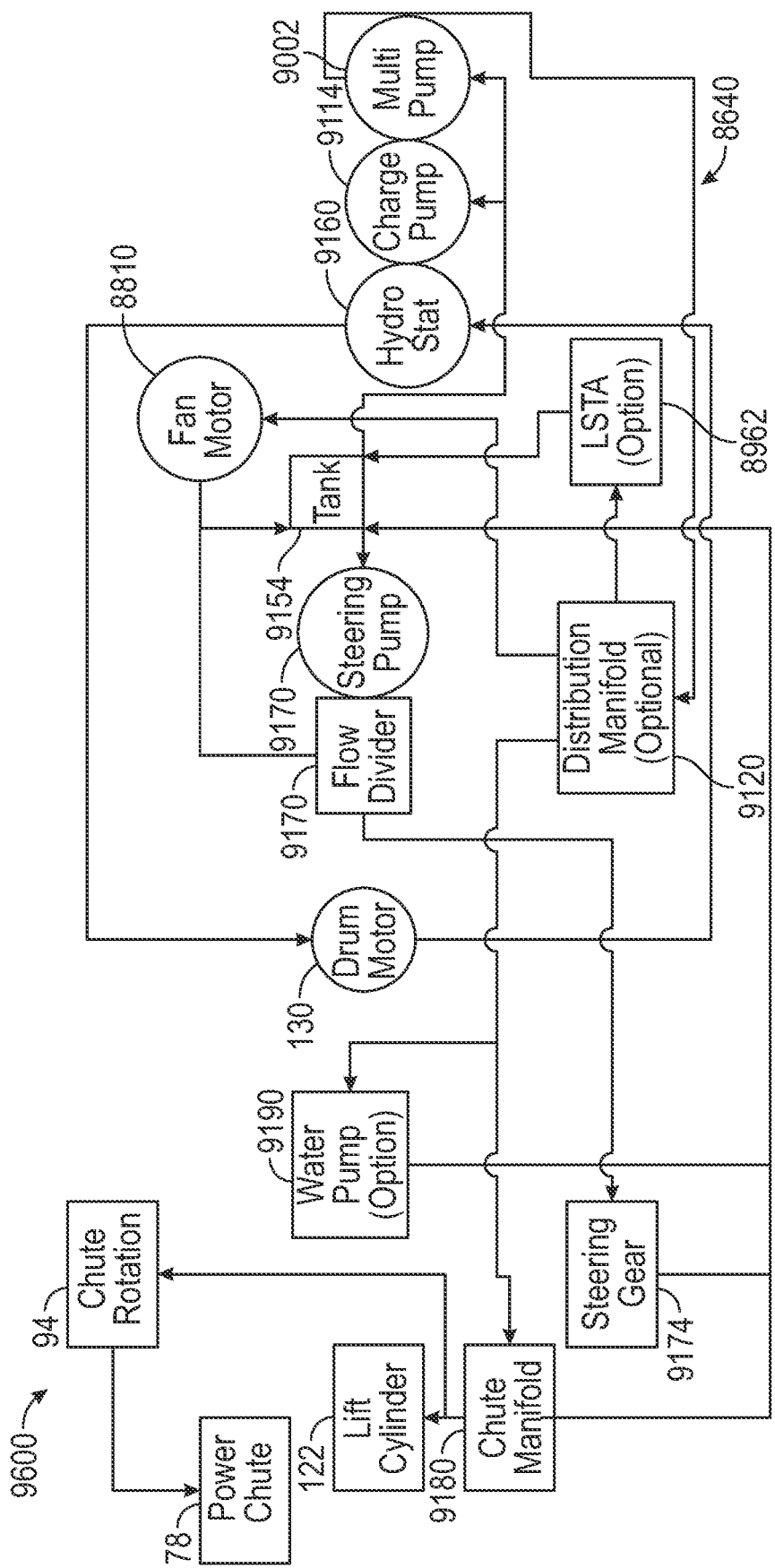
FIG. 104 is a system flow diagram of a hydraulic circuit design and control logic implemented with the multi-function pump of FIG. 103.

Turning to FIGS. 103 and 104, a hydraulic circuit and pump control logic 9100 and multi-function pump 9002 are shown. The multi-function pump 9002 is operably connected to a hydrostat device 9160 that is configured to detect the presence of water as a prevention against drying out, overflow, or other undesirable water conditions. In some embodiments, a charge pump 9114 is operably connected to the multi-pump 9002 to provide additional pump power to the multi-function pump 9002. The multi-function pump 9002 is configured to provide pressurized hydraulic oil from the fluid tank 9154 to power the chute manifold 9180, drum drive motor 130, and the fan motor 8810. The multi-pump 9002 provides pressurized hydraulic oil to power the chute actuator 122, the chute folding actuator 78, and the chute rotation actuator 94 by way of the chute manifold 9180. In some embodiments, a distribution manifold 9120 (e.g., actuator) is implemented to control the flow of pressurized hydraulic oil from the multi-pump 9002 to the chute manifold 9180. In some embodiments, a load span tag axle (LSTA) 9162 is powered by the multi-function pump 9002. A separate steering pump 9170 is implemented within the hydraulic circuit and pump control logic 9100 and is coupled to a steering gear 9174 and is configured to provide feel (e.g., feedback) and wheel speed to a steering wheel in the cab 18 and physically operated by the operator. A flow divider 9172 is configured to provide control flow to the steering gear 9174 and return excess or unnecessary pressurized hydraulic oil back to the fluid tank 9154. The dedicated steering pump 9170 and/or steering circuit prevents the steering feel and speed of the concrete mixer truck 10 to be impeded when the multi-function pump 9002 is powering one or more of the multiple auxiliary functions.

Expanding upon the multi-function pump 9002, the multi-function pump 9002 may be an electronically controlled variable displacement piston pump. A controller may be configured to determine a status of a component (e.g., fan assembly 8450, a drum assembly 6, a hopper assembly 8) and use the status of the component to determine the displacement of the multi-function pump 9002 and which conduit in the plurality of conduits 8640 is needed to provide the hydraulic fluid to the component. In some embodiments, the controller is an actuator that is electrically controlled (e.g., by applying a voltage to the actuator), pneumatically controlled (e.g., by applying pressurized air to the actuator), or hydraulically controlled (e.g., by applying a hydraulic pressure to the actuator). In some embodiments, one or more control valves are fluidly coupled between the multi-function pump 9002 and the various components. The control valves are configured to regulate and/or control the flow of pressurized hydraulic fluid within component or assembly. The control valves may include check valves, relief valves, flow control valves, directional control valves, or other types of valves. The control valves may be passively controlled (e.g., activated when a pressure overcomes a spring within the valve, etc.) or actively controlled (e.g., by an operator through a lever, switch, or dial, electronically by the controller, by a pneumatic or hydraulic pilot pressure controlled by the controller). In some embodiments, the multi-function pump 9002 is configured to receive hydraulic fluid at a relatively low pressure (e.g., atmospheric pressure, etc.) from a fluid tank 9154 (e.g., reservoir). Because the multi-function pump 9002 has a variable displacement, the flow rate of hydraulic fluid leaving the multi-function pump 9002, and accordingly the speeds of the various components powered by the multi-function pump 9002, can be controlled using the distribution manifold 9120, actuator, or similar controller. Beneficially, the variable displacement of the multi-function pump 9002 experiences only minimal energy losses (e.g., due to the flowing of hydraulic fluid), and experiences no significant decrease in efficiency when operating the various components at less than the maximum speed.

With respect to the drum drive motor 130, the multi-function pump 9002 may be configured to pump fluid (e.g., hydraulic fluid, etc.) stored within the fluid tank 9154 to drive the drum driver 114. According to an exemplary embodiment, the multi-function pump 9002 is configured to facilitate selectively and/or adaptively controlling the output of the drum driver 114. In one embodiment, the multi-function pump 9002 includes a variable displacement hydraulic pump (e.g., an axial piston pump, etc.) and has a pump stroke that is variable. The multi-function pump 9002 may be configured to pressurize hydraulic fluid based on the pump stroke (e.g., the greater the pump stroke, the higher the pressure, and the faster the drum driver 114 rotates the mixing drum 14, etc.). The multi-function pump 9002 may include a throttling element (e.g., a swash plate, etc.). In some embodiments, the multi-function pump 9002 may function as a water pump to provide a flow of fluid (e.g., water) through a nozzle (e.g., for fire suppressant applications, for irrigation applications, for pressure washing applications, for concrete mixing applications, etc.).

The multi-function pump 9002 can control the fan motor 8810 and facilitates the fan 8416 operating at any speed within a range (e.g., a range from 0 rpm to 2000 rpm) as desired. The maximum speed of this range is determined by the speed of the engine 8474 and the displacements of the multi-function pump 9002 and fan motor 8810. Accordingly, a controller on the fan assembly 8450 or on the multi-function pump 9002 may control the speed of the fan 8416 such that the fan 8416 operates for long periods of time at a relatively low speed. The multi-function pump 9002 can also be controlled to provide pressurized hydraulic oil to power one or more hydraulic actuators (e.g., chute actuator 122, chute folding actuator 78, and chute rotation actuator 94, etc.).

Cooling System Access

Turning to FIGS. 105-111, a concrete mixer truck 9200 with a cooling system 9280 downstream of an engine 8474 is described, according to an exemplary embodiment. The concrete mixer truck 9200 of FIGS. 105-111 is similar to the concrete mixer truck 10 of FIGS. 1-3 and 97-100. A difference between the concrete mixer truck 9200 and the concrete mixer truck 10 is the concrete mixer truck 9200 includes a cooling core 9202 adjacent the fan assembly 8450 downstream of the engine 8474. Accordingly, like numbering is used to identify like components of the concrete mixer truck 10 and the concrete mixer truck 9200. Conventional cooling systems typically mount the fan assembly to the engine with the pusher fan of the fan assembly upstream of the engine. Conversely, the cooling system 9280 of FIGS. 105-111 positions the cooling system 9280, and therefore the fan assembly 8450, downstream of the engine 8474 with the fan 8416 on a rear side 9206 of a cooling core 9202. Positioning the fan assembly 8450 on the rear side 9206 of the cooling package improves accessibility to the front side 9204 of the cooling cores, provides greater access to the rear side 9206 of the cooling cores, and increases serviceability of the cooling system 9280. Further, the front side 9204 is visible for inspection when an operator is in a standing position next to the concrete mixer truck 9200, thereby improving regular core inspection accuracy, convenience, and efficiency. Beneficially, the engine 8474 has minimal connection to the cooling core 9202, which reduces the time needed to replace the engine in the concrete mixer truck 9200.

Figure 105:
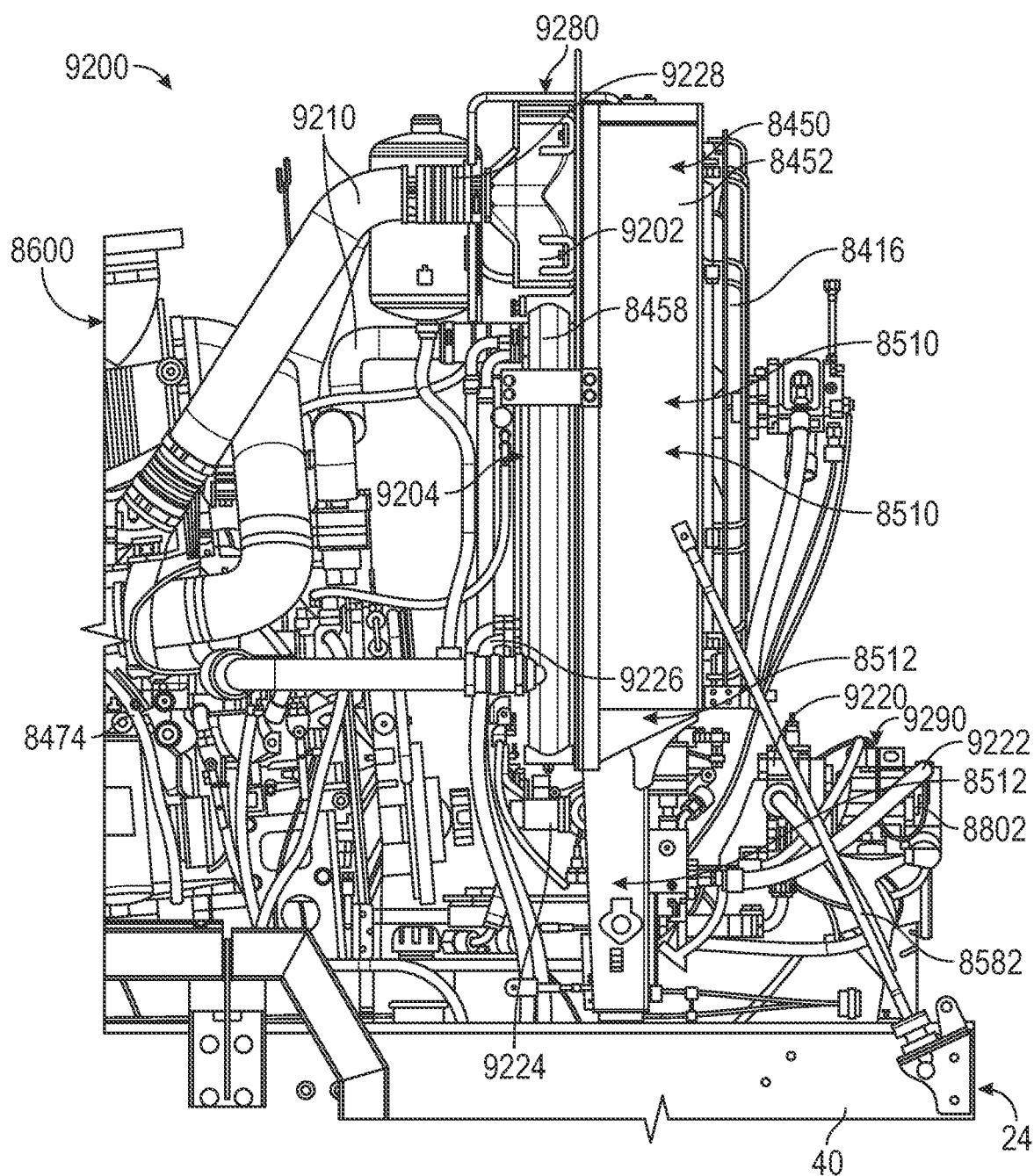
FIG. 105 is a side view of a cooling system with a fan assembly rear of a cooling package core, according to another example embodiment.
Figure 106:
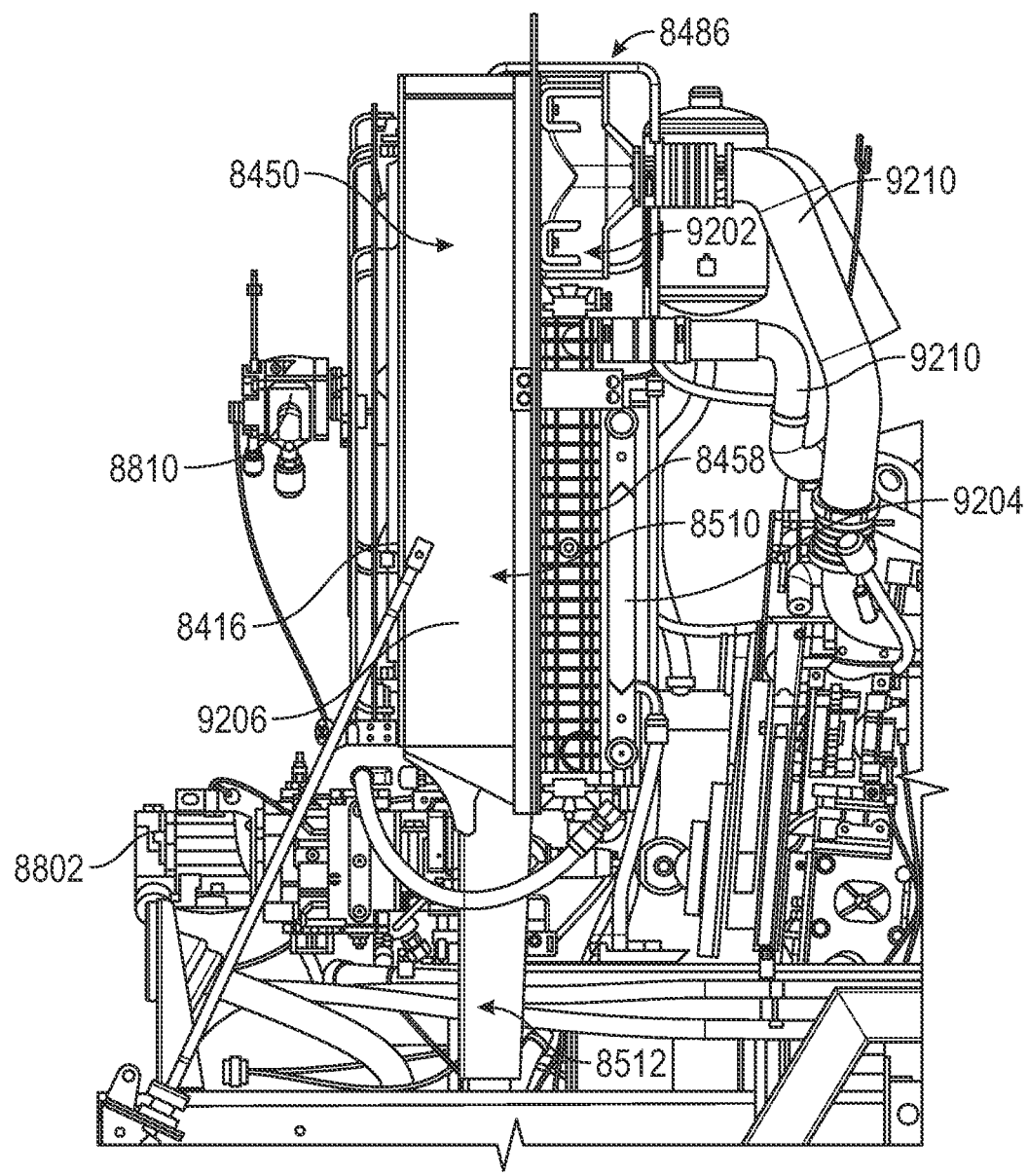
FIG. 106 is a side view of the cooling system with the fan assembly rear of the cooling package core of FIG. 105.
Figure 107:
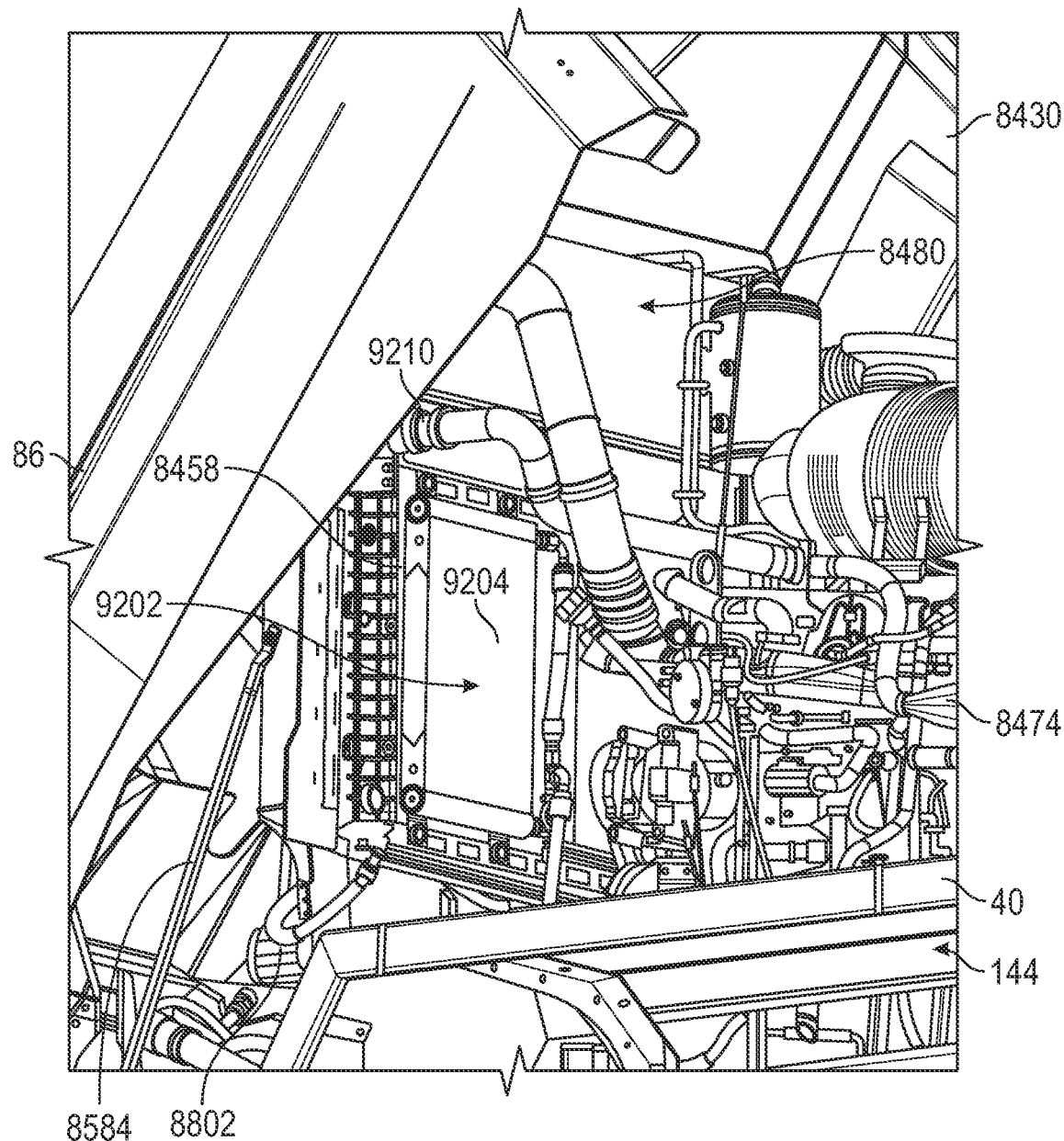
FIG. 107 is a left rear perspective view of the cooling system with the fan assembly rear of the cooling package core of FIG. 105.
Figure 108:
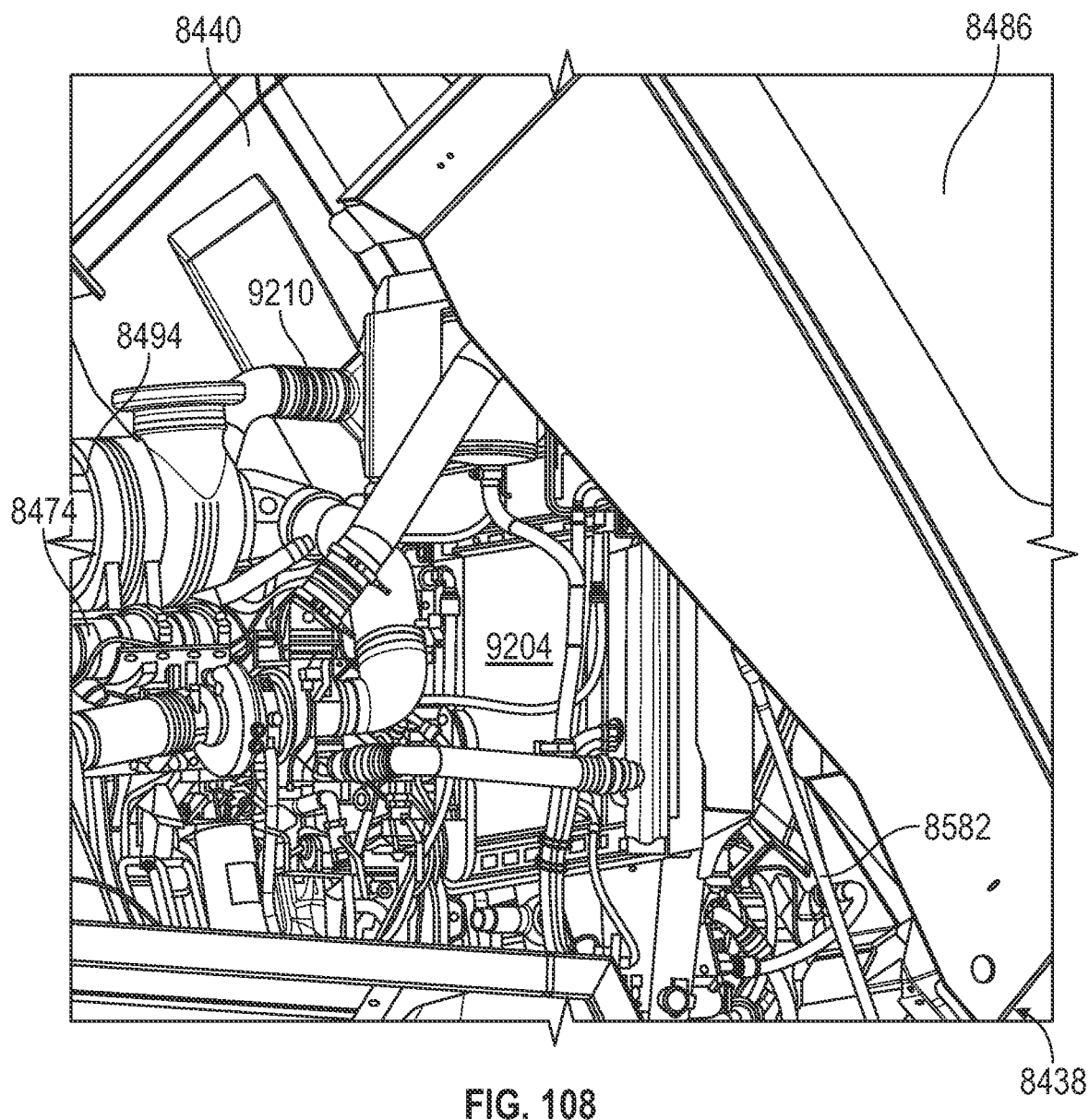
FIG. 108 is a right rear perspective view of the cooling system with the fan assembly rear of the cooling package core of FIG. 105.

Turning to FIG. 105, the engine 8474 is coupled to the frame rails 40 upstream of the cooling system 9280. The cooling system 9280 includes the cooling frame 8452 with a fan assembly 8450 and cooling core 9202. The fan assembly 8450 and cooling core 9202 are coupled to an upper portion 8510 of the cooling frame 8452. The lower portion 8512 of the cooling frame 8452 is coupled to the frame rails 40 and provides support, along with the first support pin 8582 and second support pin 8584, to the components coupled to the cooling frame 8452. An accessory module 9290 is positioned downstream of the engine 8474 and disposed below the cooling system 9280. The accessory module 9290 may be coupled to the engine 8474 and/or the fan motor 8810. In some embodiments, the accessory module 9290 may include a drive motor, transmission, and/or accessory pump 9222. In other embodiments, the accessory module 9290 may include a hydraulic drive pump 9220 and a hydraulic accessory pump 9222. One or both of the drive pump 9220 and the accessory pump 9222 may be fluidly coupled to the hydraulic fluid tank and configured to receive a working fluid, such as, e.g., hydraulic fluid, at a low pressure (e.g., atmospheric pressure) from the hydraulic fluid tank. The drive pump 9220 and the accessory pump 9222 may be configured to receive rotational mechanical energy and output a flow of pressurized hydraulic fluid to drive one or more components of the concrete mixer truck 10. The shaft 9224 may be coupled to the engine 9274 and accessory module 9290 and is configured to receive rotational mechanical energy from the transmission and transfer this energy to the various operably attached drive elements attached thereto.

Referring to FIGS. 105-108, the cooling core 9202 includes a front side 9204 and a rear side 9206 with a plurality of cooling cores disposed between the front side 9204 and the rear side 9206. The plurality of cooling cores may include one or more radiators 8458. Cooling conduits 9210 are fluidly connected to the cooling core 9202 and include a conduit inlet 9228 on a top end of the cooling core 9202 configured to receive a fluid and an conduit outlet 9226 on a bottom end of the cooling core 102 configured to expel the fluid. The rear side 9206 is adjacent to the fan assembly 8450 such that air flowing through the cooling core 9202 exits into the fan assembly 8450. An operator can more readily access the cooling core 9202 due to the positioning away from, and separate from, the engine.

Figure 109:
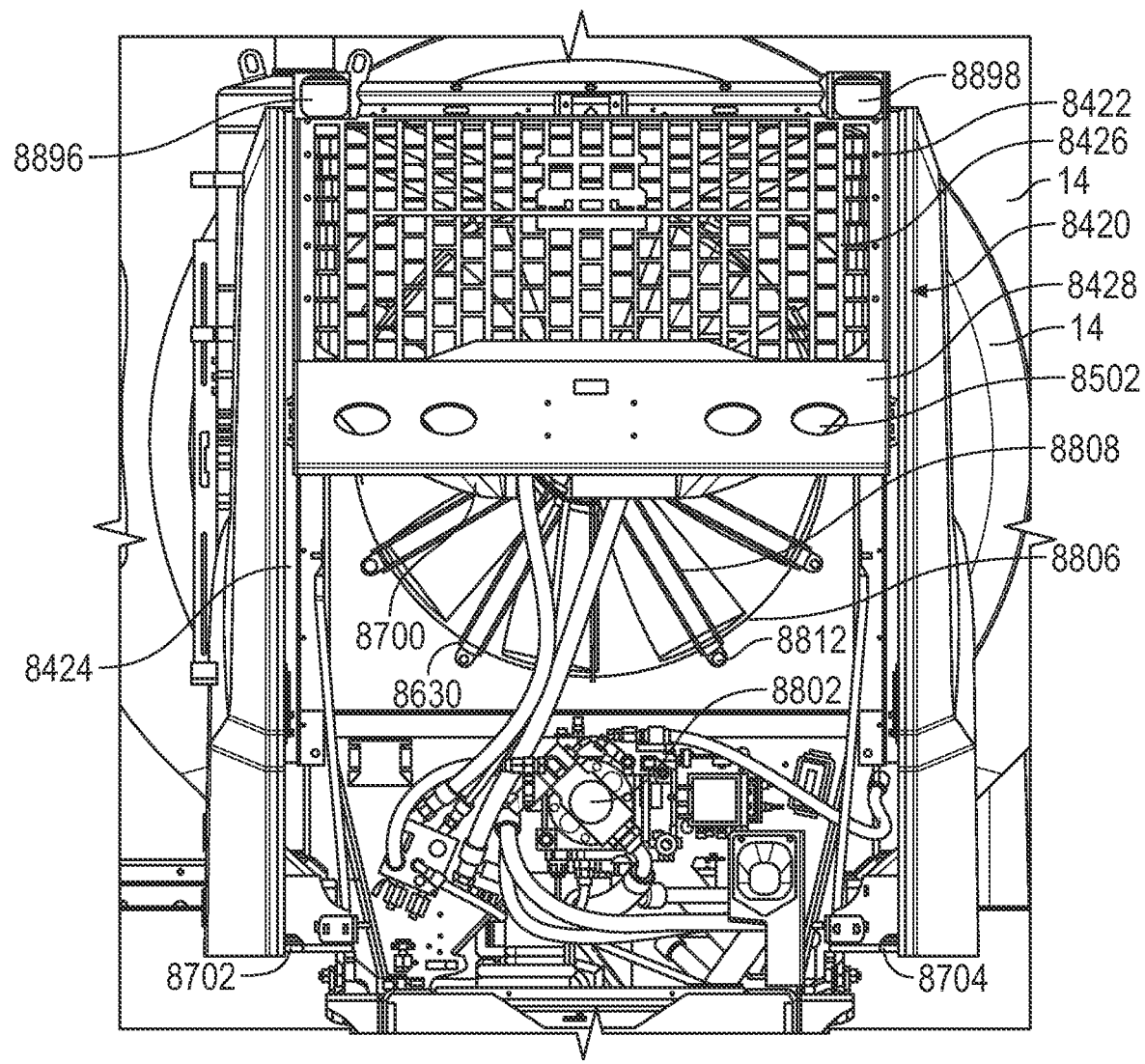
FIG. 109 is a rear view of the cooling system with the fan assembly rear of the cooling package core of FIG. 105.
Figure 110:
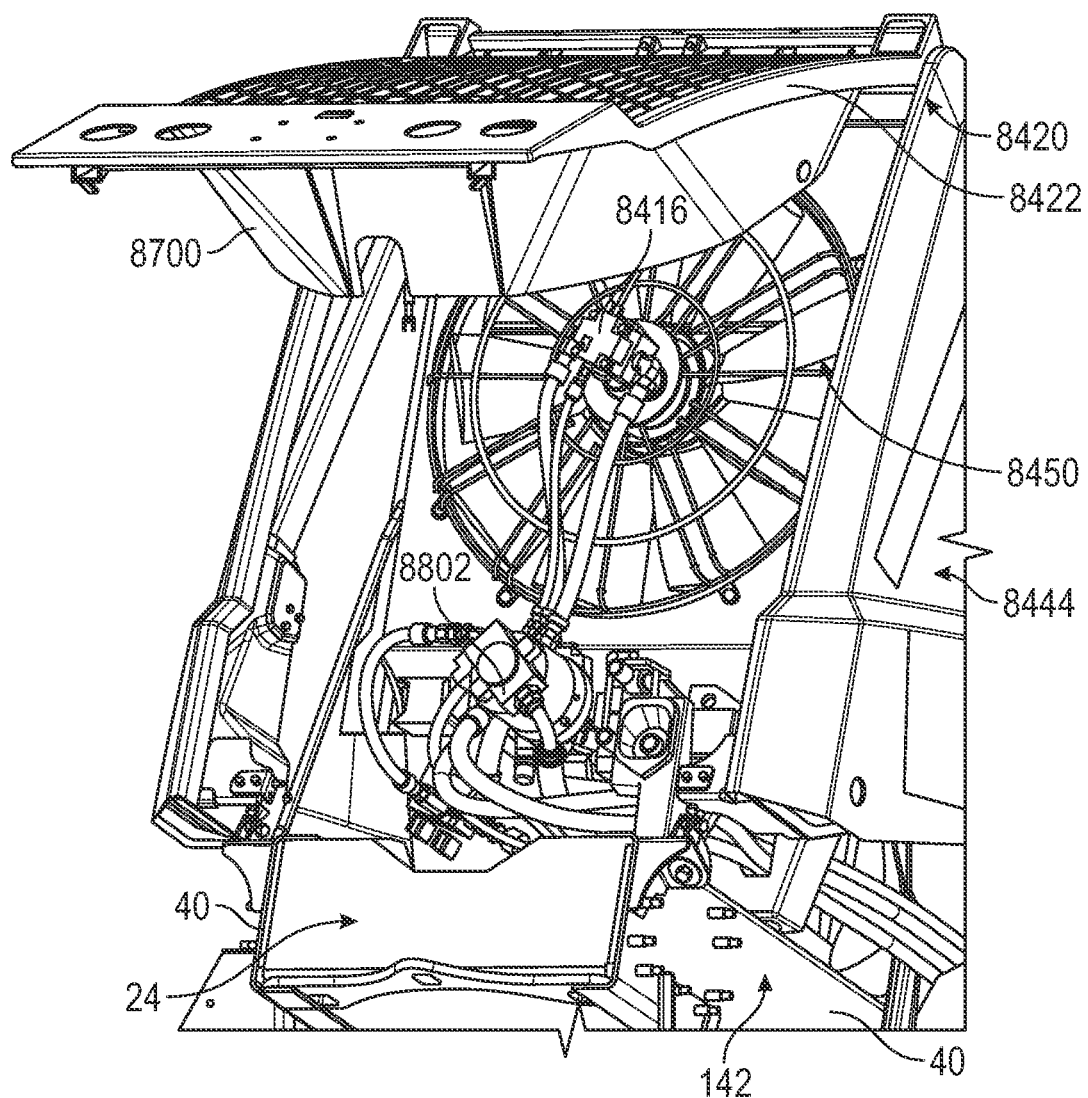
FIG. 110 is a right rear perspective view of the cooling system with the fan assembly rear of the cooling package core of FIG. 105.
Figure 111:
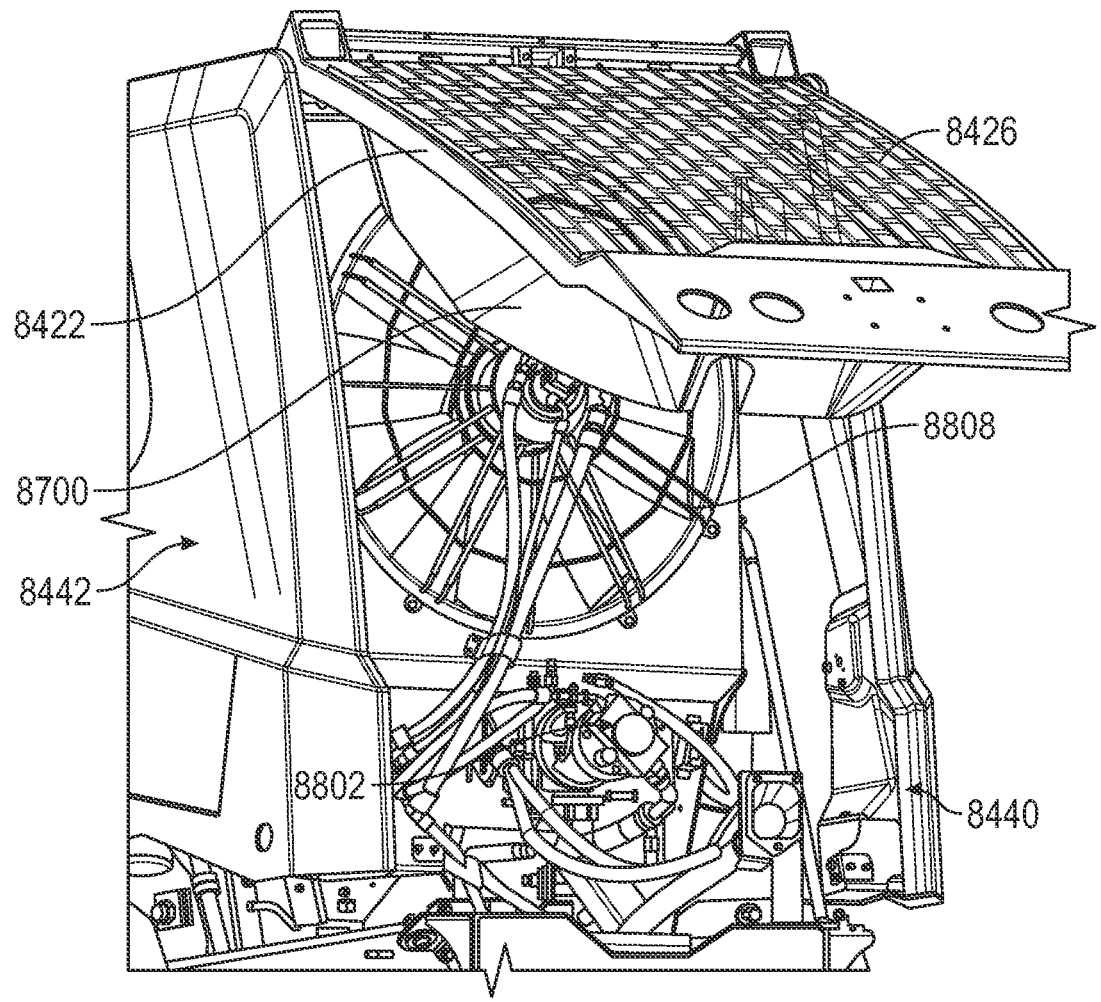
FIG. 111 is a left rear perspective view of the cooling system with the fan assembly rear of the cooling package core of FIG. 105.

Referring to FIGS. 109-111, the cooling system 9280 is shown installed within the hood 8486 with the hatch 8420 in an open position. The hatch 8420 is disposed over a hatch opening 8424 and is configured to provide access to the components of the cooling system 9280 on the downstream side (e.g., fan assembly 8450) when the hatch 8420 is in an open, as shown in FIGS. 106-111. The hatch 8420 includes a first hatch coupling member 8896 near the first lateral side 142, a second hatch coupling member 8898 near the second lateral side 144, and a hatch door 8422. The first hatch coupling member 8896 and the second hatch coupling member 8898 are configured to move the hatch door 8422 from the closed, first position to the open, second position. The hatch door 8422 includes a grill 8426 and a bottom hatch portion 8428. The bottom hatch portion 8428 includes a plurality of light apertures 8502 configured to receive a plurality of lights. The grill 8426 extends from the bottom hatch portion 8428 axially toward the top of the hatch 8420. The grill 8426 is configured to provide low restriction around the outer parts of the conical internal portion 8700 as the conical internal portion 8700 is where a majority of the airflow 8600 from the fan 8416 flows.

As shown in FIGS. 110 and 111, the hatch door 8422 includes a conical internal portion 8700 that protrudes from an internal surface of the hatch door 8422 toward the front hood end 8438. The conical internal portion 8700 is configured to direct hot air 8600 out of the hood 8486 from the fan 8416 rearward—or slightly upward toward the rear hood end 8440 to not disturb dust on the ground outside of the concrete mixer truck 10—to reduce recirculation and improve efficiency of the airflow in the hood 8486. The conical internal portion 8700 includes a slot 8710 to accommodate one or more components and conduits that are configured to engage the fan motor 8810. The conical internal portion 8700 is configured to fit around the fan ring 8806. The hood 8486 may be coupled to the frame rails 40 by a first coupling member 8702 along the bottom of the first hood side 8442 and a second coupling member 8704 along the bottom of the second hood side 8444.

In operation, air 8600 flows into the hood 8486 through one or more openings and past the engine 8474. The air 8600 may be drawn (e.g., pulled) by the rotation of the fan blades 8808 of the fan 8416 downstream of the engine 8474. The air 8600 flows through the front side 9204 of the cooling core 9202 and passes through one or more cooling cores, including a radiator 8458, and out of the rear side 9206 of the cooling core. The air 8600 entering the front side 9204 will be at a higher temperature than the air 8600 exiting the rear side 9206. The air 8600 passes through the fan 8416 and is pushed out of the hatch door 8422 and grill 8426 in the rear hood end 8440. In some embodiments, the cooling conduits 9210 provide a fluid through the cooling cores to further dissipate heat and assist with cooling. In some embodiments, the accessory module 9290 may be configured to control the fan motor 8810 and facilitates the fan 8416 operating at any speed within a range (e.g., a range from 0 rpm to 2000 rpm) as desired. Accordingly, a controller on the fan assembly 8450 or on the accessory module 9290 may control the speed of the fan 8416 such that the fan 8416 operates for long periods of time at a relatively low speed or higher speeds to achieve a certain level of cooling in the system.

Referring to FIGS. 112-115, a cooling system 9902 with a cooling core 9904 and a fan assembly 8450 with a fan 9906 is shown in various installation orientation with respect to the engine 9974 and an accessory module 9990. In some embodiments, the accessory module 9990 may include a drive motor, transmission, and/or accessory pump 9922. In other embodiments, the accessory module 9990 may include a hydraulic drive pump 9920 and a hydraulic accessory pump 9922. One or both of the drive pump 9920 and the accessory pump 9922 may be fluidly coupled to the hydraulic fluid tank and configured to receive a working fluid, such as, e.g., hydraulic fluid, at a low pressure (e.g., atmospheric pressure) from the hydraulic fluid tank. The drive pump 9920 and the accessory pump 9922 may be configured to receive rotational mechanical energy and output a flow of pressurized hydraulic fluid to drive one or more components of the concrete mixer truck 10. The shaft 9924 may be coupled to the engine 9974 and accessory module 9990 and is configured to receive rotational mechanical energy from the transmission and transfer this energy to the various operably attached drive elements attached thereto.

Figure 112:
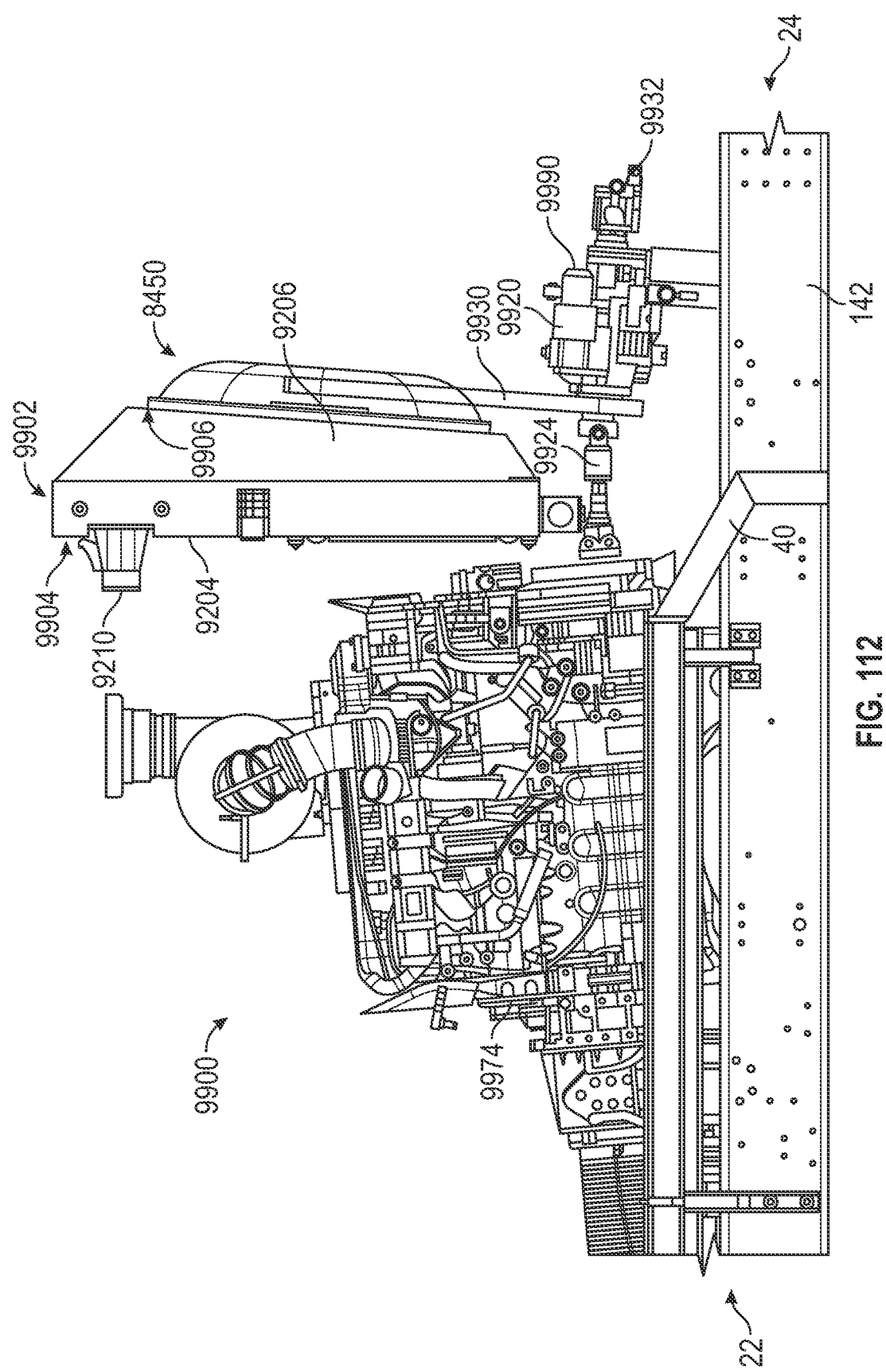
FIG. 112 is a side view of a cooling system with a fan assembly rear of a cooling package core in a first orientation, according to another example embodiment.

FIG. 112 shows a first orientation 9900 of the cooling system 9902 with a cooling core 9904 and a fan assembly 8450. In the first orientation 9900, air flows past the engine 9974 drawn by the fan 9906 and passes through the front side 9204 of the cooling core 9904, out of the rear side 9206 of the cooling core and into the fan assembly 8450. The front side 9204 of the cooling core 9904 is positioned downstream (e.g., toward the rear end 24) of the engine 9974. The rear side 9206 of the cooling core 9904 is positioned adjacent the fan 9906. In some embodiments, the fan 9906 has a size of 38" to increase flow capacity. The accessory module 9990 is downstream of the fan assembly 8450 and includes drive member 9930 configured to drive the fan motor 8810. As shown in FIG. 112, the drive member 9930 is a fan belt. In the first orientation 9900, the fan 9906 is on the rear side 9206 of the cooling package 9904 and improves accessibility to the front side 9204 of the cooling cores of the cooling package 9904. Further, the rear side 9206 of the cooling cores of the cooling package 9904 are more accessible than conventional cooling system orientations.

Figure 113:
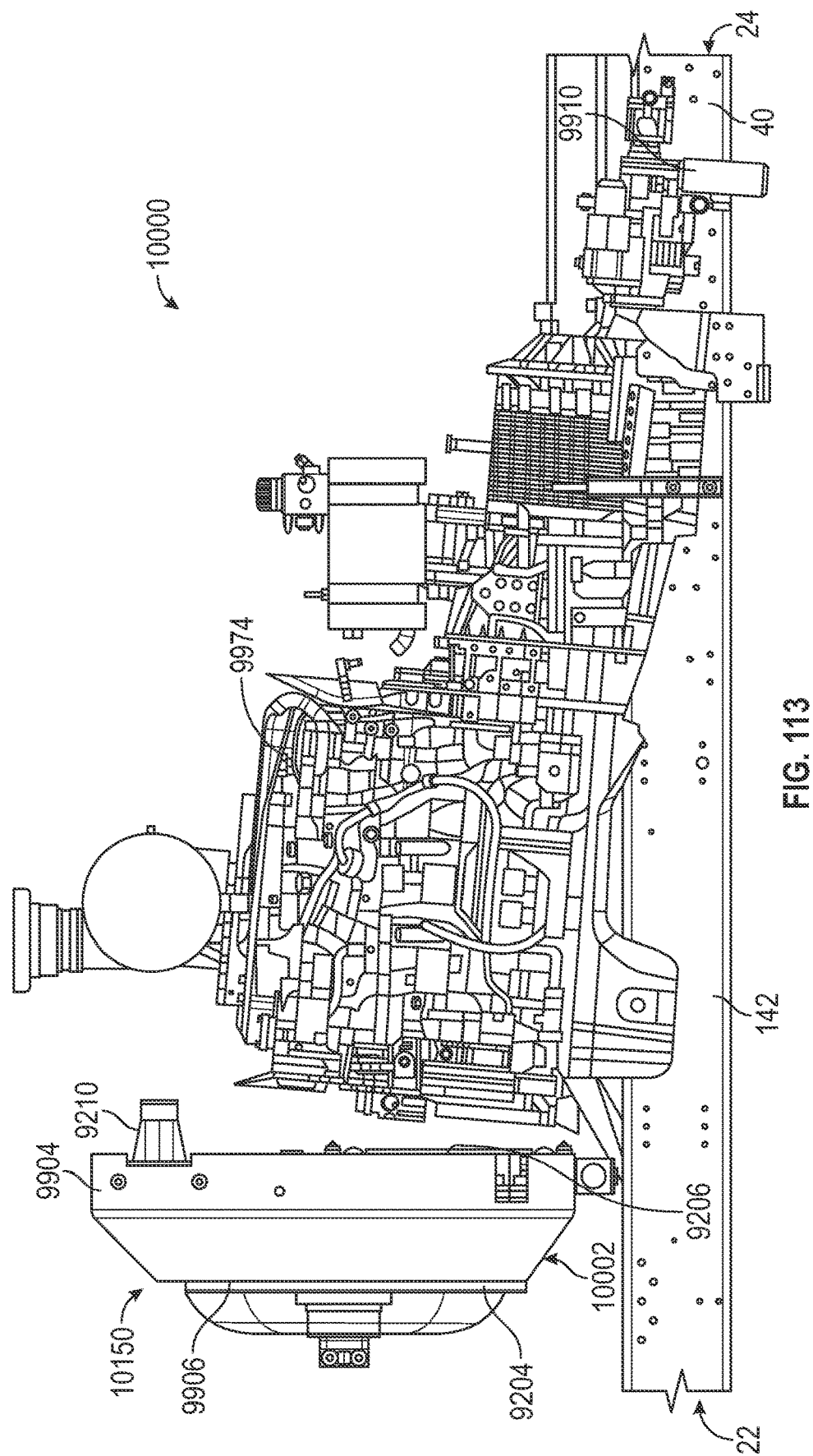
FIG. 113 is a side view of a cooling system with a fan assembly rear of a cooling package core in a second orientation, according to another example embodiment.

FIG. 113 shows a second orientation 10000 of the cooling system 10002 with a cooling core 9904 and a fan assembly 8450. In the second orientation 10000, the cooling system 10002 is positioned upstream (e.g., toward the front end 22) of the engine 9974 and flipped about the central axis. In the second orientation 10000, air flows through the fan 9906 of the fan assembly 8450 and is pushed through the rear side 9206 of the cooling core 9904 and out of the front side 9204 of the cooling core 9904 toward the engine 9974. The front side 9204 of the cooling core 9904 is positioned upstream (e.g., toward the rear end 24) of the engine 9974. The rear side 9206 of the cooling core 9904 is orientated upstream of the front side 9204 and is positioned adjacent the fan 9906. In some embodiments, the fan 9906 has a size of 38" to increase flow capacity. The accessory module 9990 is downstream of the engine 9974.

Figure 114:
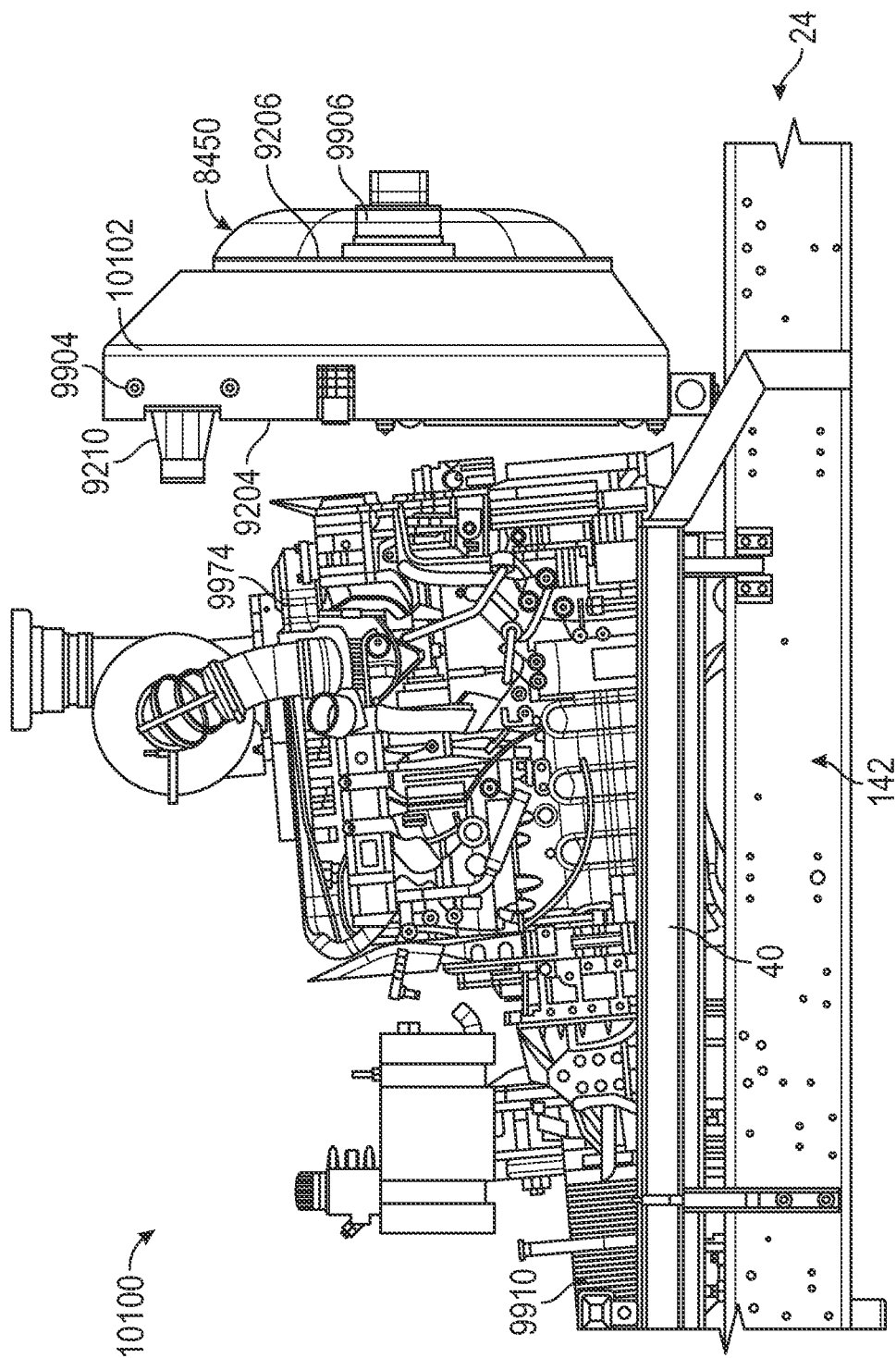
FIG. 114 is a side view of a cooling system with a fan assembly rear of a cooling package core in a third orientation, according to another example embodiment.

FIG. 114 shows a third orientation 10100 of the cooling system 10102 with a cooling core 9904 and a fan assembly 8450. In the third orientation 10100, air flows past the engine 9974 drawn by the fan 9906 and passes through the front side 9204 of the cooling core 9904, out of the rear side 9206 of the cooling core and into the fan assembly 8450. The front side 9204 of the cooling core 9904 is positioned upstream (e.g., toward the rear end 24) of the engine 9974. The rear side 9206 of the cooling core 9904 is orientated upstream of the front side 9204 and is positioned adjacent the fan 9906. In some embodiments, the fan 9906 has a size of 38" to increase flow capacity. In the third orientation 10100, the fan 9906 is on the rear side 9206 of the cooling package 9904 and improves accessibility to the front side 9204 of the cooling cores of the cooling package 9904. Further, the rear side 9206 of the cooling cores of the cooling package 9904 are more accessible than conventional cooling system orientations.

Figure 115:
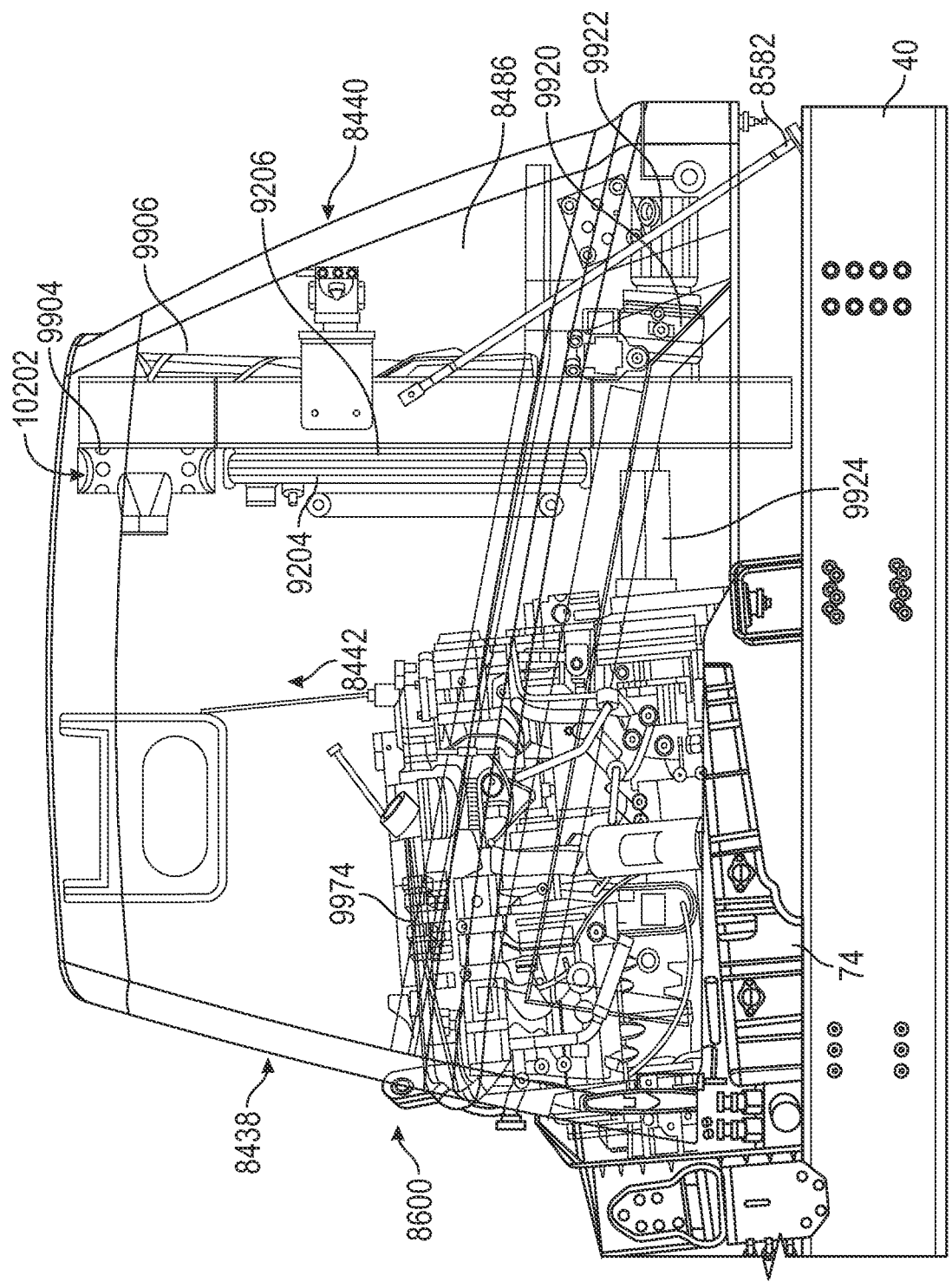
FIG. 115 is a side view of a cooling system with a fan assembly rear of a cooling package core in a fourth orientation, according to another example embodiment.

FIG. 115 shows a fourth orientation 10200 of the cooling system 10202 with a cooling core 9904 and a fan assembly 8450 positioned within a hood 8486. In the fourth orientation 10200, air flows past the engine 9974 drawn by the fan 9906 and passes through the front side 9204 of the cooling core 9904, out of the rear side 9206 of the cooling core and into the fan assembly 8450. The front side 9204 of the cooling core 9904 is positioned downstream (e.g., toward the rear end 24) of the engine 9974. The rear side 9206 of the cooling core 9904 is positioned adjacent the fan 9906. In some embodiments, the fan 9906 has a size of 38" to increase flow capacity. The accessory module 9990 is downstream of the fan assembly 8450 and includes drive member 9930 configured to drive the fan motor 8810. As shown in FIG. 112, the drive member 9930 is a fan belt. In the fourth orientation 10200, the fan 9906 is on the rear side 9206 of the cooling package 9904 and improves accessibility to the front side 9204 of the cooling cores of the cooling package 9904. Further, the rear side 9206 of the cooling cores of the cooling package 9904 are more accessible than conventional cooling system orientations when the hatch door 8422 of the hood 8486 is open.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the concrete mixer truck 10 and the components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A concrete mixer vehicle comprising:
   a chassis;
   a cab coupled to the chassis;
   a front bumper coupled to a front end of the chassis;
   a drum assembly coupled to the chassis, the drum assembly including:
      a mixing drum defining an aperture and an internal volume;
      a charge hopper positioned proximate the aperture and above the cab;
      a chute positioned proximate the aperture, beneath the charge hopper; and
      a drum driver; and
   an engine module coupled to the chassis and positioned rearward of the drum assembly, the engine module including:
      an engine;
      a cooling system; and
      a hood including:
         a housing within which the engine and the cooling system are disposed, the housing having a first end proximate the drum assembly and an opposing second end defining an opening; and
         a door pivotally coupled to the opposing second end of the housing and positioned to selectively enclose the opening;
         wherein the hood has a top surface; and
         wherein the first end of the housing defines an inlet airflow cavity leading to an internal cavity of the hood, the inlet airflow cavity having a bottom surface and an air inlet positioned between the top surface and the bottom surface.

2. The concrete mixer vehicle of claim 1, wherein the housing includes a dividing fin extending between the bottom surface and the top surface, the dividing fin separating the air inlet into a first air inlet and a second air inlet.

3. The concrete mixer vehicle of claim 1, wherein the hood includes a divider extending upward from the bottom surface of the inlet airflow cavity, the divider separating the inlet airflow cavity into a first airflow channel and a second airflow channel.

4. The concrete mixer vehicle of claim 3, wherein the air inlet is a first air inlet, wherein the divider defines an air intake chamber and a second air inlet positioned proximate the first end of the housing, and wherein the engine module includes an air intake extending from the engine, through the bottom surface of the inlet airflow cavity, and into the air intake chamber of the divider.

5. The concrete mixer vehicle of claim 3, wherein the divider includes a curved protrusion extending from sidewalls of the divider and around an end of the divider proximate the air inlet.

6. The concrete mixer vehicle of claim 1, wherein the bottom surface of the inlet airflow cavity is sloped such that an end of the bottom surface positioned proximate the first end of the housing is lower than an opposing end of the bottom surface positioned proximate the air inlet.

7. The concrete mixer vehicle of claim 1, wherein the top surface of the housing at least partially overhangs the inlet airflow cavity, extending forward past the air inlet.

8. The concrete mixer vehicle of claim 1, wherein the door defines an air outlet positioned to permit air to flow out the opposing second end of the housing.

9. The concrete mixer vehicle of claim 1, wherein the chassis includes a pair of frame rails and a front cross-member coupled to the pair of frame rails at the front end of the chassis, wherein the front cross-member is positioned behind the front bumper.

10. The concrete mixer vehicle of claim 1, wherein the chassis includes a pair of frame rails and a rear cross-member extending between the pair of frame rails at a rear end of the chassis, wherein the rear cross-member includes a battery box that is configured to receive and store one or more batteries.

11. A concrete mixer vehicle comprising:
   a chassis;
   a cab coupled to the chassis;
   a front bumper coupled to a front end of the chassis;
   a drum assembly coupled to the chassis, the drum assembly including:
      a mixing drum defining an aperture and an internal volume;
      a charge hopper positioned proximate the aperture and above the cab;
      a chute positioned proximate the aperture, beneath the charge hopper; and
      a drum driver; and
   an engine module coupled to the chassis and positioned rearward of the drum assembly, the engine module including:
      an engine;
      a cooling system; and
      a hood including:
         a housing within which the engine and the cooling system are disposed, the housing having a first end proximate the drum assembly and an opposing second end defining an opening; and a door pivotally coupled to the opposing second end of the housing and positioned to selectively enclose the opening;

wherein the door defines an air outlet positioned to permit air to flow out the opposing second end of the housing;

wherein the hood includes a conical-shaped housing extending from an interior side of the door; and wherein the conical-shaped housing is positioned to selectively engage a fan assembly of the cooling system.

12. The concrete mixer vehicle of claim 11, wherein the door is pivotable between a closed position and an open position, and wherein the fan assembly is accessible when the door is in the open position.

13. A concrete mixer vehicle comprising:
a chassis including a pair of frame rails and a front cross-member coupled to the pair of frame rails at a front end of the chassis;
a cab coupled to the chassis;
a front bumper coupled to the front end of the chassis, wherein the front cross-member is positioned behind the front bumper, wherein a top portion of the front bumper defines a slot, and wherein the front cross-member includes a shaft extending upward through the slot;
a drum assembly coupled to the chassis, the drum assembly including:
  a mixing drum defining an aperture and an internal volume;
  a charge hopper positioned proximate the aperture and above the cab;
  a chute positioned proximate the aperture, beneath the charge hopper; and
  a drum driver;
a first actuator extending between the shaft and the chute, wherein the first actuator is configured to pivot the chute up and down about a lateral axis; and
an engine module coupled to the chassis and positioned rearward of the drum assembly, the engine module including:
  an engine;
  a cooling system; and
  a hood including:
    a housing within which the engine and the cooling system are disposed, the housing having a first end proximate the drum assembly and an opposing second end defining an opening; and
    a door pivotally coupled to the opposing second end of the housing and positioned to selectively enclose the opening;
    wherein the door defines an air outlet positioned to permit air to flow out the opposing second end of the housing.

14. The concrete mixer vehicle of claim 13, further comprising a second actuator positioned to rotate the chute about a vertical axis, wherein the first actuator rotates about the shaft when the second actuator rotates the chute.

15. A concrete mixer vehicle comprising:
a chassis including a pair of frame rails and a front cross-member coupled to the pair of frame rails at the front end of the chassis;
a cab coupled to the chassis;
a front bumper coupled to a front end of the chassis, wherein the front cross-member is positioned behind the front bumper, wherein a front portion of the front bumper defines a slot, and wherein the front cross-member includes a protrusion that extends through the slot;
a drum assembly coupled to the chassis, the drum assembly including:
  a mixing drum defining an aperture and an internal volume;
  a charge hopper positioned proximate the aperture and above the cab;
  a chute positioned proximate the aperture, beneath the charge hopper; and
  a drum driver; and
an engine module coupled to the chassis and positioned rearward of the drum assembly, the engine module including:
  an engine;
  a cooling system; and
  a hood including:
    a housing within which the engine and the cooling system are disposed, the housing having a first end proximate the drum assembly and an opposing second end defining an opening; and
    a door pivotally coupled to the opposing second end of the housing and positioned to selectively enclose the opening.

* * * * *